US012603091B2

(12) United States Patent
Makker et al.

(10) Patent No.: US 12,603,091 B2
(45) Date of Patent: Apr. 14, 2026

(54) IMMERSIVE COLLABORATION OF REMOTE PARTICIPANTS VIA MEDIA DISPLAYS

(71) Applicant: View, Inc., Milpitas, CA (US)

(72) Inventors: Tanya Makker, Milpitas, CA (US);
Nitesh Trikha, Pleasanton, CA (US);
Brian Lee Smith, Benicia, CA (US);
Keivan Ebrahimi, Fremont, CA (US);
Todd Daniel Antes, San Jose, CA (US);
Aditya Dayal, Sunnyvale, CA (US);
Amit Sarin, Milpitas, CA (US)

(73) Assignee: View Operating Corporation, San Jose, CA (US)

( * ) Notice: Subject to any disclaimer, the term of this patent is extended or adjusted under 35 U.S.C. 154(b) by 0 days.

(21) Appl. No.: 18/555,129

(22) PCT Filed: Apr. 14, 2022

(86) PCT No.: PCT/US2022/024812
§ 371 (c)(1),
(2) Date: Oct. 12, 2023

(87) PCT Pub. No.: WO2022/221532
PCT Pub. Date: Oct. 20, 2022

(65) Prior Publication Data
US 2024/0242717 A1 Jul. 18, 2024

Related U.S. Application Data

(63) Continuation-in-part of application No. 17/313,760, filed on May 6, 2021, now abandoned, which is a
(Continued)

(51) Int. Cl.
*G10L 15/22* (2006.01)
*E06B 3/67* (2006.01)
(Continued)

(52) U.S. Cl.
CPC ............ *G10L 15/22* (2013.01); *E06B 3/6722* (2013.01); *E06B 9/24* (2013.01); *G02F 1/163* (2013.01);
(Continued)

(58) Field of Classification Search
CPC ......... G10L 15/22; E06B 3/6722; E06B 9/24; G02F 1/163; G06F 3/04883; G06F 3/04886; G06F 3/16; G06F 3/167; G06F 21/32
(Continued)

(56) References Cited

U.S. PATENT DOCUMENTS 4,129,861 A 12/1978 Giglia
4,231,135 A 11/1980 Fradin
(Continued)

FOREIGN PATENT DOCUMENTS

AU 2015101660 A4 12/2015
CA 2968665 A1 6/2016
(Continued)

OTHER PUBLICATIONS

"Sage Product Highlights" screenshot, accessed Aug. 28, 2015, 1 page.
(Continued)

*Primary Examiner* — Mohammad Ali
*Assistant Examiner* — Joshua T Sanders
(74) *Attorney, Agent, or Firm* — Cha & Reiter , LLC

(57) ABSTRACT

An immersive digital experience for video conferencing simulates common presence of a virtual participant in a local environment. Such simulation may include (i) using a transparent media display having a portion of its pixels projecting the virtual participant's body image while keeping at least a portion of the background transparent (e.g., to visible light), (ii) disposing sensor(s) (e.g., camera) behind the transparent
(Continued)

media display at the gaze of the participant, and/or (iii) using added virtual overlays (e.g., of plants, memorabilia, and/or furniture) to the virtual image (e.g., that are consistent with the local environment), e.g., to provide a sense of depth ranging from the overlays to the virtual participant projection and to the background showing through the transparent media display.

11 Claims, 28 Drawing Sheets

Related U.S. Application Data continuation-in-part of application No. 17/300,303, filed on Apr. 29, 2021, now abandoned, which is a continuation-in-part of application No. PCT/US2021/027418, filed on Apr. 15, 2021, said application No. PCT/US2022/024812 is a continuation-in-part of application No. 17/338,562, filed on Jun. 3, 2021, now Pat. No. 11,231,633, which is a continuation of application No. 16/950,774, filed on Nov. 17, 2020, now abandoned, which is a continuation of application No. 16/608,157, filed as application No. PCT/US2018/029476 on Apr. 25, 2018, now Pat. No. 11,886,089, said application No. 17/300,303 is a continuation-in-part of application No. 17/083,128, filed on Oct. 28, 2020, now abandoned, which is a continuation of application No. 16/664,089, filed on Oct. 25, 2019, now Pat. No. 11,294,254, which is a continuation-in-part of application No. PCT/US2019/030467, filed on May 2, 2019, said application No. 16/664,089 is a continuation-in-part of application No. PCT/US2018/029460, filed on Apr. 25, 2018, said application No. 17/300,303 is a continuation-in-part of application No. 17/081,809, filed on Oct. 27, 2020, now Pat. No. 11,460,749, which is a continuation of application No. 16/608,159, filed as application No. PCT/US2018/029406 on Apr. 25, 2018, now Pat. No. 11,300,849, which is a continuation-in-part of application No. PCT/US2021/052587, filed on Sep. 29, 2021, which is a continuation-in-part of application No. PCT/US2021/052595, filed on Sep. 29, 2021, which is a continuation-in-part of application No. PCT/US2021/052597, filed on Sep. 29, 2021, said application No. PCT/US2021/052587 is a continuation-in-part of application No. PCT/US2020/053641, filed on Sep. 30, 2020, said application No. PCT/US2021/052595 is a continuation-in-part of application No. PCT/US2020/053641, filed on Sep. 30, 2020, said application No. PCT/US2021/052597 is a continuation-in-part of application No. PCT/US2020/053641, filed on Sep. 30, 2020.

(60) Provisional application No. 63/255,679, filed on Oct. 14, 2021, provisional application No. 63/080,899, filed on Sep. 21, 2020, provisional application No. 63/052,639, filed on Jul. 16, 2020, provisional application No. 63/010,977, filed on Apr. 16, 2020, provisional application No. 62/607,618, filed on Dec. 19, 2017, provisional application No. 62/523,606, filed on Jun. 22, 2017, provisional application No. 62/507,704, filed on May 17, 2017, provisional application No. 62/506,514, filed on May 15, 2017, provisional application No. 62/490,457, filed on Apr. 26, 2017, provisional application No. 62/666,033, filed on May 2, 2018, provisional application No. 63/247,684, filed on Sep. 23, 2021, provisional application No. 63/246,770, filed on Sep. 21, 2021, provisional application No. 63/212,483, filed on Jun. 18, 2021, provisional application No. 63/211,400, filed on Jun. 16, 2021, provisional application No. 63/170,245, filed on Apr. 2, 2021, provisional application No. 63/154,352, filed on Feb. 26, 2021, provisional application No. 63/135,021, filed on Jan. 8, 2021, provisional application No. 63/115,842, filed on Nov. 19, 2020, provisional application No. 63/085,254, filed on Sep. 30, 2020, provisional application No. 62/975,706, filed on Feb. 12, 2020, provisional application No. 62/952,207, filed on Dec. 20, 2019, provisional application No. 62/911,271, filed on Oct. 5, 2019.

(51) Int. Cl.
| | |
|---|---|
| *E06B 9/24* | (2006.01) |
| *G02F 1/163* | (2006.01) |
| *G06F 3/04883* | (2022.01) |
| *G06F 3/04886* | (2022.01) |
| *G06F 3/16* | (2006.01) |
| *G06F 21/32* | (2013.01) |
| *G10L 15/26* | (2006.01) |

(52) U.S. Cl.
CPC ...... *G06F 3/04883* (2013.01); *G06F 3/04886* (2013.01); *G06F 3/16* (2013.01); *G06F 3/167* (2013.01); *G06F 21/32* (2013.01); *G10L 15/26* (2013.01); *E06B 2009/2464* (2013.01); *G06F 2203/0381* (2013.01); *G10L 2015/223* (2013.01)

(58) Field of Classification Search
USPC ........................................................ 713/186
See application file for complete search history.

(56) References Cited

U.S. PATENT DOCUMENTS

| | | | |
|---|---|---|---|
| 4,340,813 | A | 7/1982 | Sauer |
| 4,553,085 | A | 11/1985 | Canzano |
| 5,384,653 | A | 1/1995 | Benson et al. |
| 5,406,762 | A | 4/1995 | Buard |
| 5,416,617 | A | 5/1995 | Loiseaux et al. |
| 5,440,317 | A | 8/1995 | Jalloul et al. |
| D364,234 | S | 11/1995 | Caley |
| 5,477,152 | A | 12/1995 | Hayhurst |
| D375,446 | S | 11/1996 | Nelson |
| 5,579,149 | A | 11/1996 | Moret et al. |
| 5,625,369 | A | 4/1997 | Newman |
| 5,684,619 | A | 11/1997 | Shabrang et al. |
| 5,729,824 | A | 3/1998 | O'Neill et al. |
| 5,754,329 | A | 5/1998 | Coleman |
| 5,847,858 | A | 12/1998 | Krings et al. |
| 5,867,495 | A | 2/1999 | Elliott et al. |
| D411,434 | S | 6/1999 | Russell |
| 6,039,390 | A | 3/2000 | Agrawal et al. |
| 6,055,089 | A | 4/2000 | Schulz et al. |
| 6,066,801 | A | 5/2000 | Kodaira et al. |
| 6,104,513 | A | 8/2000 | Bloom |
| 6,262,831 | B1 | 7/2001 | Bauer et al. |
| 6,344,748 | B1 | 2/2002 | Gannon |
| 6,389,644 | B1 | 5/2002 | Russo |
| 6,407,847 | B1 | 6/2002 | Poll et al. |
| 6,481,851 | B1 | 11/2002 | McNelley et al. |
| 6,567,708 | B1 | 5/2003 | Bechtel et al. |
| 6,588,250 | B2 | 7/2003 | Schell |
| 6,707,590 | B1 | 3/2004 | Bartsch |
| 6,795,226 | B2 | 9/2004 | Agrawal et al. |
| 6,897,936 | B1 | 5/2005 | Li et al. |

(56)　　　　　References Cited

U.S. PATENT DOCUMENTS

| | | | |
|---|---|---|---|
| 6,965,813 | B2 | 11/2005 | Granqvist et al. |
| 7,031,727 | B2 | 4/2006 | Baskin |
| 7,111,952 | B2 | 9/2006 | Veskovic |
| 7,133,181 | B2 | 11/2006 | Greer |
| D541,623 | S | 5/2007 | Hord et al. |
| 7,310,355 | B1 | 12/2007 | Krein et al. |
| 7,347,608 | B2 | 3/2008 | Emde |
| 7,382,636 | B2 | 6/2008 | Baarman et al. |
| 7,391,420 | B1 | 6/2008 | Coyne |
| 7,536,370 | B2 | 5/2009 | Masurkar |
| 7,554,437 | B2 | 6/2009 | Axelsen |
| 7,588,067 | B2 | 9/2009 | Veskovic |
| 7,629,400 | B2 | 12/2009 | Hyman |
| 7,684,105 | B2 | 3/2010 | Lamontagne et al. |
| 7,739,138 | B2 | 6/2010 | Chauhan et al. |
| D623,041 | S | 9/2010 | Ayrest |
| 7,800,812 | B2 | 9/2010 | Moskowitz |
| D628,409 | S | 12/2010 | Anzai |
| 7,911,348 | B2 | 3/2011 | Rodgers |
| 7,941,245 | B1 | 5/2011 | Popat |
| 7,950,827 | B2 | 5/2011 | Veskovic |
| 7,963,675 | B2 | 6/2011 | Veskovic |
| 8,022,977 | B2 | 9/2011 | Kanade et al. |
| 8,086,433 | B2 | 12/2011 | Lee et al. |
| 8,149,756 | B2 | 4/2012 | Hottinen |
| 8,213,074 | B1 | 7/2012 | Shrivastava et al. |
| 8,218,224 | B2 | 7/2012 | Kwak et al. |
| 8,249,731 | B2 | 8/2012 | Tran et al. |
| 8,254,013 | B2 | 8/2012 | Mehtani et al. |
| 8,290,627 | B2 | 10/2012 | Richards et al. |
| 8,363,178 | B2 | 1/2013 | Chung et al. |
| D679,418 | S | 4/2013 | Nolan et al. |
| 8,509,400 | B2 | 8/2013 | Liu et al. |
| 8,584,319 | B1 | 11/2013 | Ludin et al. |
| D700,717 | S | 3/2014 | Campacci |
| 8,686,984 | B2 | 4/2014 | Hummel et al. |
| 8,705,162 | B2 | 4/2014 | Brown et al. |
| 8,711,465 | B2 | 4/2014 | Bhatnagar et al. |
| 8,800,221 | B1 | 8/2014 | Header |
| 8,843,238 | B2 | 9/2014 | Wenzel et al. |
| 8,927,069 | B1 | 1/2015 | Estinto et al. |
| 8,963,378 | B1 | 2/2015 | Fornage et al. |
| 8,976,440 | B2 | 3/2015 | Berland et al. |
| 9,081,246 | B2 | 7/2015 | Rozbicki |
| 9,121,837 | B2 | 9/2015 | Chan et al. |
| 9,128,346 | B2 | 9/2015 | Shrivastava et al. |
| 9,170,008 | B2 | 10/2015 | Reul et al. |
| 9,225,286 | B1 | 12/2015 | Tweedie |
| 9,261,751 | B2 | 2/2016 | Pradhan et al. |
| 9,300,581 | B1 | 3/2016 | Hui et al. |
| 9,341,912 | B2 | 5/2016 | Shrivastava et al. |
| 9,348,192 | B2 | 5/2016 | Brown et al. |
| D764,075 | S | 8/2016 | Honda |
| 9,412,290 | B2 | 8/2016 | Jack et al. |
| 9,442,338 | B2 | 9/2016 | Uhm et al. |
| 9,442,341 | B2 | 9/2016 | Shrivastava et al. |
| 9,454,055 | B2 | 9/2016 | Brown et al. |
| 9,470,947 | B2 | 10/2016 | Nagel et al. |
| 9,483,083 | B1 | 11/2016 | Zaloom |
| 9,494,055 | B2 | 11/2016 | Rusche |
| 9,551,913 | B2 | 1/2017 | Kim et al. |
| 9,615,054 | B1 * | 4/2017 | McNelley .............. H04N 7/144 |
| 9,677,327 | B1 | 6/2017 | Nagel et al. |
| 9,690,174 | B2 | 6/2017 | Wang |
| D792,190 | S | 7/2017 | Lewis et al. |
| 9,709,869 | B2 | 7/2017 | Baumann et al. |
| 9,715,242 | B2 | 7/2017 | Pillai et al. |
| 9,740,074 | B2 | 8/2017 | Agrawal et al. |
| 9,778,533 | B2 | 10/2017 | Bertolini |
| 9,791,701 | B2 | 10/2017 | Ato et al. |
| 9,898,912 | B1 | 2/2018 | Jordan, II et al. |
| 9,906,956 | B1 | 2/2018 | Huang |
| 9,917,867 | B2 | 3/2018 | Sallam |
| 9,930,463 | B2 | 3/2018 | Little |
| 9,946,138 | B2 | 4/2018 | Shrivastava et al. |
| 9,948,387 | B2 | 4/2018 | Frankel et al. |
| D818,340 | S | 5/2018 | Smalls |
| 9,965,865 | B1 | 5/2018 | Agrawal et al. |
| 10,001,691 | B2 | 6/2018 | Shrivastava et al. |
| 10,031,356 | B2 | 7/2018 | Van Oosten et al. |
| 10,048,561 | B2 | 8/2018 | Brown |
| 10,049,402 | B1 | 8/2018 | Miranda |
| 10,067,344 | B2 | 9/2018 | Kilcher et al. |
| 10,110,631 | B2 | 10/2018 | Bauer et al. |
| 10,137,764 | B2 | 11/2018 | Driscoll et al. |
| D834,917 | S | 12/2018 | Alberti et al. |
| 10,156,852 | B2 | 12/2018 | Bakhishev et al. |
| 10,178,638 | B1 | 1/2019 | Stamatakis et al. |
| 10,190,349 | B1 | 1/2019 | Jacobson et al. |
| 10,191,318 | B2 | 1/2019 | Park et al. |
| 10,253,558 | B2 | 4/2019 | Vigano et al. |
| 10,268,098 | B2 | 4/2019 | Shrivastava et al. |
| 10,286,839 | B1 | 5/2019 | Mazuir et al. |
| 10,288,971 | B2 | 5/2019 | Phillips et al. |
| 10,289,094 | B2 | 5/2019 | Ashdown et al. |
| 10,303,035 | B2 | 5/2019 | Brown et al. |
| 10,322,680 | B2 | 6/2019 | Terashima et al. |
| 10,329,839 | B2 | 6/2019 | Fasi et al. |
| 10,359,681 | B2 | 7/2019 | Brown |
| 10,365,531 | B2 | 7/2019 | Shrivastava et al. |
| 10,379,265 | B2 | 8/2019 | Brown |
| 10,387,221 | B2 | 8/2019 | Shrivastava et al. |
| 10,394,070 | B2 | 8/2019 | Park et al. |
| 10,400,509 | B2 | 9/2019 | Fasi et al. |
| 10,409,652 | B2 | 9/2019 | Shrivastava et al. |
| 10,416,520 | B2 | 9/2019 | Jovanovic |
| 10,460,636 | B2 | 10/2019 | Salmimaa et al. |
| 10,481,459 | B2 | 11/2019 | Shrivastava et al. |
| 10,488,837 | B2 | 11/2019 | Cirino |
| 10,505,751 | B2 | 12/2019 | Casilli |
| 10,514,963 | B2 | 12/2019 | Shrivastava et al. |
| 10,532,268 | B2 | 1/2020 | Tran et al. |
| 10,591,798 | B1 | 3/2020 | Nagel et al. |
| D881,614 | S | 4/2020 | Wilke |
| D888,530 | S | 6/2020 | Smalls |
| D888,531 | S | 6/2020 | Smalls |
| D888,532 | S | 6/2020 | Smalls |
| 10,699,604 | B2 | 6/2020 | Hicks et al. |
| 10,704,322 | B2 | 7/2020 | Vigano et al. |
| 10,720,766 | B2 | 7/2020 | Krammer et al. |
| 10,724,867 | B1 | 7/2020 | Waful et al. |
| 10,746,761 | B2 | 8/2020 | Rayman et al. |
| 10,747,082 | B2 | 8/2020 | Shrivastava et al. |
| D894,713 | S | 9/2020 | Hall |
| 10,768,582 | B2 | 9/2020 | Shrivastava et al. |
| D898,545 | S | 10/2020 | Becker |
| D902,687 | S | 11/2020 | Van Cronenburg |
| 10,824,040 | B2 | 11/2020 | Agrawal et al. |
| 10,859,983 | B2 | 12/2020 | Shrivastava et al. |
| 10,867,266 | B1 | 12/2020 | Carlin et al. |
| 10,917,259 | B1 | 2/2021 | Chein et al. |
| 10,921,675 | B2 | 2/2021 | Barnum et al. |
| 10,923,226 | B2 | 2/2021 | Macary et al. |
| 10,949,267 | B2 | 3/2021 | Shrivastava et al. |
| 10,954,677 | B1 | 3/2021 | Scanlin |
| 10,956,231 | B2 | 3/2021 | Shrivastava et al. |
| 10,968,688 | B1 | 4/2021 | Bedford |
| 10,982,487 | B2 | 4/2021 | Ramirez |
| 10,989,977 | B2 | 4/2021 | Shrivastava et al. |
| 11,016,357 | B2 | 5/2021 | Brown et al. |
| 11,054,792 | B2 | 7/2021 | Shrivastava et al. |
| 11,073,800 | B2 | 7/2021 | Shrivastava et al. |
| 11,150,616 | B2 | 10/2021 | Shrivastava et al. |
| 11,168,910 | B2 | 11/2021 | Alcala Perez |
| 11,182,970 | B1 | 11/2021 | Kathol |
| D939,321 | S | 12/2021 | Leimkuehler et al. |
| 11,229,301 | B2 | 1/2022 | Schwarz et al. |
| 11,231,633 | B2 | 1/2022 | Trikha et al. |
| 11,294,254 | B2 | 4/2022 | Patterson et al. |
| 11,300,849 | B2 | 4/2022 | Trikha et al. |
| 11,322,818 | B2 | 5/2022 | Kum et al. |
| 11,335,232 | B2 | 5/2022 | Huang et al. |
| D959,031 | S | 7/2022 | Wagner |
| 11,384,596 | B2 | 7/2022 | Shrivastava et al. |

(56) References Cited

U.S. PATENT DOCUMENTS

| | | | |
|---|---|---|---|
| 11,436,061 B2 | 9/2022 | Shrivastava et al. | |
| 11,454,854 B2 | 9/2022 | Trikha et al. | |
| 11,460,749 B2 | 10/2022 | Trikha et al. | |
| 11,467,464 B2 | 10/2022 | Trikha et al. | |
| 11,493,819 B2 | 11/2022 | Trikha et al. | |
| 11,513,412 B2 | 11/2022 | Trikha et al. | |
| 11,566,468 B2 | 1/2023 | Vigano et al. | |
| 11,579,571 B2 | 2/2023 | Shrivastava et al. | |
| 11,631,493 B2 | 4/2023 | Schlameuss et al. | |
| 11,681,197 B2 | 6/2023 | Shrivastava et al. | |
| 11,687,045 B2 | 6/2023 | Shrivastava et al. | |
| 11,733,660 B2 | 8/2023 | Shrivastava et al. | |
| 11,740,948 B2 | 8/2023 | Shrivastava et al. | |
| 11,743,071 B2 | 8/2023 | Trikha et al. | |
| 11,747,696 B2 | 9/2023 | Trikha et al. | |
| 11,747,698 B2 | 9/2023 | Trikha et al. | |
| 11,750,594 B2 | 9/2023 | Vangati et al. | |
| 11,754,902 B2 | 9/2023 | Brown et al. | |
| 11,822,159 B2 | 11/2023 | Brown et al. | |
| 11,868,019 B2 | 1/2024 | Trikha et al. | |
| 11,868,103 B2 | 1/2024 | Shrivastava et al. | |
| 11,882,111 B2 | 1/2024 | Vangati et al. | |
| 11,886,089 B2 | 1/2024 | Trikha et al. | |
| 11,892,737 B2 | 2/2024 | Shrivastava et al. | |
| 11,892,738 B2 | 2/2024 | Trikha et al. | |
| 11,948,015 B2 | 4/2024 | Shrivastava et al. | |
| 12,057,220 B2 | 8/2024 | Schlameuss et al. | |
| 12,078,906 B2 | 9/2024 | Shrivastava et al. | |
| 12,087,997 B2 | 9/2024 | Brown et al. | |
| 12,130,597 B2 | 10/2024 | Shrivastava et al. | |
| 12,176,596 B2 | 12/2024 | Rozbicki et al. | |
| 2001/0005083 A1 | 6/2001 | Serizawa et al. | |
| 2001/0042976 A1 | 11/2001 | Breed et al. | |
| 2002/0024424 A1 | 2/2002 | Burns et al. | |
| 2002/0027504 A1 | 3/2002 | Davis et al. | |
| 2002/0149829 A1 | 10/2002 | Mochizuka et al. | |
| 2003/0039257 A1 | 2/2003 | Manis et al. | |
| 2003/0101154 A1 | 5/2003 | Hisano et al. | |
| 2003/0163351 A1 | 8/2003 | Brown et al. | |
| 2003/0169574 A1 | 9/2003 | Maruyama et al. | |
| 2003/0191546 A1 | 10/2003 | Bechtel et al. | |
| 2003/0196297 A1 | 10/2003 | Gerali et al. | |
| 2003/0227663 A1 | 12/2003 | Agrawal et al. | |
| 2004/0001056 A1 | 1/2004 | Atherton et al. | |
| 2004/0158494 A1 | 8/2004 | Suthar | |
| 2004/0215520 A1 | 10/2004 | Butler et al. | |
| 2004/0236620 A1 | 11/2004 | Chauhan et al. | |
| 2005/0002662 A1 | 1/2005 | Arpa et al. | |
| 2005/0046584 A1 | 3/2005 | Breed | |
| 2005/0063036 A1 | 3/2005 | Bechtel et al. | |
| 2005/0157675 A1 | 7/2005 | Feder et al. | |
| 2005/0198777 A1 | 9/2005 | Mabe | |
| 2005/0213992 A1 | 9/2005 | Piehler | |
| 2005/0254442 A1 | 11/2005 | Proctor, Jr. et al. | |
| 2005/0270620 A1 | 12/2005 | Bauer et al. | |
| 2005/0270621 A1 | 12/2005 | Bauer et al. | |
| 2006/0018000 A1 | 1/2006 | Greer | |
| 2006/0026798 A1 | 2/2006 | Gerali | |
| 2006/0074494 A1 | 4/2006 | McFarland | |
| 2006/0077126 A1 | 4/2006 | Kothari | |
| 2006/0077511 A1 | 4/2006 | Poll et al. | |
| 2006/0107616 A1 | 5/2006 | Ratti et al. | |
| 2006/0174333 A1 | 8/2006 | Thomas et al. | |
| 2006/0270440 A1 | 11/2006 | Shearer et al. | |
| 2006/0279518 A1 | 12/2006 | Jang et al. | |
| 2006/0279527 A1 | 12/2006 | Zehner et al. | |
| 2007/0008603 A1* | 1/2007 | Sotzing | C09K 9/02 |
| | | | 359/265 |
| 2007/0053053 A1 | 3/2007 | Moskowitz | |
| 2007/0067048 A1 | 3/2007 | Bechtel et al. | |
| 2007/0097482 A1 | 5/2007 | Park et al. | |
| 2007/0115979 A1 | 5/2007 | Balay et al. | |
| 2007/0188676 A1 | 8/2007 | Choi et al. | |
| 2007/0191074 A1 | 8/2007 | Harrist et al. | |
| 2007/0222542 A1 | 9/2007 | Joannopoulos et al. | |
| 2007/0285759 A1 | 12/2007 | Ash et al. | |
| 2008/0042012 A1 | 2/2008 | Callahan et al. | |
| 2008/0043316 A2 | 2/2008 | Moskowitz | |
| 2008/0048101 A1 | 2/2008 | Romig et al. | |
| 2008/0088821 A1 | 4/2008 | Hurvitz et al. | |
| 2008/0147847 A1 | 6/2008 | Pitkow et al. | |
| 2008/0172312 A1 | 7/2008 | Synesiou et al. | |
| 2008/0182506 A1 | 7/2008 | Jackson et al. | |
| 2008/0184350 A1 | 7/2008 | Chu | |
| 2008/0186562 A2 | 8/2008 | Moskowitz | |
| 2008/0198584 A1 | 8/2008 | Fouraux et al. | |
| 2008/0211682 A1 | 9/2008 | Hyland et al. | |
| 2008/0238706 A1 | 10/2008 | Kenwright | |
| 2008/0239192 A1 | 10/2008 | Oohira | |
| 2008/0259416 A1 | 10/2008 | Peters et al. | |
| 2008/0277486 A1 | 11/2008 | Seem et al. | |
| 2009/0015740 A1 | 1/2009 | Sagitov et al. | |
| 2009/0163170 A1 | 6/2009 | Norp et al. | |
| 2009/0210252 A1 | 8/2009 | Silver | |
| 2009/0217485 A1 | 9/2009 | Springer | |
| 2009/0230263 A1 | 9/2009 | Burge | |
| 2009/0231662 A1 | 9/2009 | Sorensson et al. | |
| 2009/0271042 A1 | 10/2009 | Voysey | |
| 2009/0322347 A1 | 12/2009 | Hashimshony et al. | |
| 2009/0323160 A1 | 12/2009 | Egerton et al. | |
| 2010/0039410 A1 | 2/2010 | Becker et al. | |
| 2010/0052844 A1 | 3/2010 | Wesby | |
| 2010/0157063 A1* | 6/2010 | Basso | G09F 27/00 |
| | | | 348/169 |
| 2010/0172010 A1 | 7/2010 | Gustavsson et al. | |
| 2010/0188057 A1 | 7/2010 | Tarng | |
| 2010/0218010 A1 | 8/2010 | Musti et al. | |
| 2010/0228854 A1 | 9/2010 | Morrison et al. | |
| 2010/0243427 A1 | 9/2010 | Kozlowski et al. | |
| 2010/0245973 A1 | 9/2010 | Wang et al. | |
| 2010/0274366 A1 | 10/2010 | Fata et al. | |
| 2010/0286839 A1 | 11/2010 | Iaquinangelo et al. | |
| 2010/0286937 A1 | 11/2010 | Hedley et al. | |
| 2010/0315693 A1 | 12/2010 | Lam et al. | |
| 2011/0050756 A1 | 3/2011 | Cassidy et al. | |
| 2011/0071685 A1 | 3/2011 | Huneycutt et al. | |
| 2011/0083152 A1 | 4/2011 | Centore, III et al. | |
| 2011/0097081 A1 | 4/2011 | Gupta et al. | |
| 2011/0124313 A1 | 5/2011 | Jones | |
| 2011/0137853 A1 | 6/2011 | Mackay | |
| 2011/0148218 A1 | 6/2011 | Rozbicki | |
| 2011/0154022 A1 | 6/2011 | Cheng et al. | |
| 2011/0164317 A1 | 7/2011 | Vergohl et al. | |
| 2011/0223886 A1 | 9/2011 | Nasielski et al. | |
| 2011/0261429 A1 | 10/2011 | Sbar et al. | |
| 2011/0266137 A1 | 11/2011 | Wang et al. | |
| 2011/0266138 A1 | 11/2011 | Wang et al. | |
| 2011/0267674 A1 | 11/2011 | Wang et al. | |
| 2011/0267675 A1 | 11/2011 | Wang et al. | |
| 2011/0299149 A1 | 12/2011 | Park et al. | |
| 2011/0310519 A1 | 12/2011 | Baba et al. | |
| 2012/0026573 A1 | 2/2012 | Collins et al. | |
| 2012/0032855 A1 | 2/2012 | Reede et al. | |
| 2012/0033287 A1 | 2/2012 | Friedman et al. | |
| 2012/0039526 A1 | 2/2012 | Garaas et al. | |
| 2012/0062975 A1 | 3/2012 | Mehtani et al. | |
| 2012/0086363 A1 | 4/2012 | Golding et al. | |
| 2012/0112883 A1 | 5/2012 | Wallace et al. | |
| 2012/0133315 A1 | 5/2012 | Berman et al. | |
| 2012/0140492 A1 | 6/2012 | Alvarez | |
| 2012/0143516 A1 | 6/2012 | Mezic et al. | |
| 2012/0188627 A1 | 7/2012 | Chen et al. | |
| 2012/0190386 A1 | 7/2012 | Anderson | |
| 2012/0194895 A1 | 8/2012 | Podbelski et al. | |
| 2012/0229275 A1 | 9/2012 | Mattern | |
| 2012/0235493 A1 | 9/2012 | Kiuchi et al. | |
| 2012/0239209 A1 | 9/2012 | Brown et al. | |
| 2012/0259583 A1 | 10/2012 | Noboa et al. | |
| 2012/0268369 A1 | 10/2012 | Kikkeri | |
| 2012/0275008 A1 | 11/2012 | Pradhan et al. | |
| 2012/0293855 A1 | 11/2012 | Shrivastava et al. | |
| 2012/0296610 A1 | 11/2012 | Hailemariam et al. | |
| 2013/0013921 A1 | 1/2013 | Bhathena et al. | |
| 2013/0024029 A1 | 1/2013 | Tran et al. | |

(56)         References Cited

U.S. PATENT DOCUMENTS

| | | |
|---|---|---|
| 2013/0054033 A1 | 2/2013 | Casilli |
| 2013/0057937 A1 | 3/2013 | Berman et al. |
| 2013/0060357 A1 | 3/2013 | Li et al. |
| 2013/0073681 A1 | 3/2013 | Jiang et al. |
| 2013/0085614 A1 | 4/2013 | Wenzel et al. |
| 2013/0085615 A1 | 4/2013 | Barker |
| 2013/0085616 A1 | 4/2013 | Wenzel |
| 2013/0088331 A1 | 4/2013 | Cho et al. |
| 2013/0099447 A1 | 4/2013 | Patton |
| 2013/0130227 A1 | 5/2013 | Peltz et al. |
| 2013/0131869 A1 | 5/2013 | Majewski et al. |
| 2013/0157493 A1 | 6/2013 | Brown |
| 2013/0158790 A1 | 6/2013 | McIntyre, Jr. et al. |
| 2013/0182308 A1 | 7/2013 | Guarr et al. |
| 2013/0196600 A1 | 8/2013 | Capers et al. |
| 2013/0226353 A1 | 8/2013 | Park |
| 2013/0241299 A1 | 9/2013 | Snyker et al. |
| 2013/0242370 A1 | 9/2013 | Wang |
| 2013/0243425 A1 | 9/2013 | Franklin |
| 2013/0250422 A1 | 9/2013 | Tandler |
| 2013/0271812 A1 | 10/2013 | Brown et al. |
| 2013/0271813 A1 | 10/2013 | Brown |
| 2013/0271814 A1 | 10/2013 | Brown |
| 2013/0277539 A1 | 10/2013 | Smilansky et al. |
| 2013/0278989 A1 | 10/2013 | Lam et al. |
| 2013/0306615 A1 | 11/2013 | Rozbicki et al. |
| 2013/0319756 A1 | 12/2013 | Snyker et al. |
| 2013/0335350 A1 | 12/2013 | Choi |
| 2014/0001977 A1 | 1/2014 | Zacharchuk et al. |
| 2014/0007244 A1 | 1/2014 | Martin et al. |
| 2014/0021903 A1* | 1/2014 | Seiling ................. H02J 7/0042 |
| | | 52/173.3 |
| 2014/0028551 A1 | 1/2014 | Ruff et al. |
| 2014/0098007 A1 | 4/2014 | Delpier et al. |
| 2014/0101573 A1 | 4/2014 | Kuo |
| 2014/0144083 A1 | 5/2014 | Artwohl et al. |
| 2014/0156097 A1 | 6/2014 | Nesler et al. |
| 2014/0160550 A1 | 6/2014 | Brown et al. |
| 2014/0168745 A1 | 6/2014 | Satou et al. |
| 2014/0170863 A1 | 6/2014 | Brown |
| 2014/0171016 A1 | 6/2014 | Sennett et al. |
| 2014/0172557 A1 | 6/2014 | Eden et al. |
| 2014/0177028 A1 | 6/2014 | Shrivastava et al. |
| 2014/0182350 A1 | 7/2014 | Bhavaraju et al. |
| 2014/0236323 A1 | 8/2014 | Brown et al. |
| 2014/0243033 A1 | 8/2014 | Wala et al. |
| 2014/0247475 A1 | 9/2014 | Parker et al. |
| 2014/0249876 A1 | 9/2014 | Wu et al. |
| 2014/0259931 A1 | 9/2014 | Plummer |
| 2014/0267384 A1 | 9/2014 | Kwon et al. |
| 2014/0273911 A1 | 9/2014 | Dunn et al. |
| 2014/0274458 A1 | 9/2014 | Kronenberg et al. |
| 2014/0300945 A1 | 10/2014 | Parker |
| 2014/0303788 A1 | 10/2014 | Sanders et al. |
| 2014/0317514 A1 | 10/2014 | Bokotey |
| 2014/0320950 A1 | 10/2014 | Saxe et al. |
| 2014/0330538 A1 | 11/2014 | Conklin et al. |
| 2014/0331598 A1 | 11/2014 | White |
| 2014/0333899 A1 | 11/2014 | Smithwick |
| 2014/0347190 A1 | 11/2014 | Grimm |
| 2014/0349497 A1 | 11/2014 | Brown et al. |
| 2014/0367057 A1 | 12/2014 | Feldstein |
| 2014/0368899 A1 | 12/2014 | Greer |
| 2014/0371931 A1 | 12/2014 | Lin et al. |
| 2015/0002919 A1 | 1/2015 | Jack et al. |
| 2015/0003822 A1 | 1/2015 | Fukada et al. |
| 2015/0023661 A1 | 1/2015 | Borkenhagen et al. |
| 2015/0032264 A1 | 1/2015 | Emmons et al. |
| 2015/0070745 A1 | 3/2015 | Pradhan |
| 2015/0092259 A1 | 4/2015 | Greer et al. |
| 2015/0098121 A1 | 4/2015 | Turnbull et al. |
| 2015/0106121 A1 | 4/2015 | Muhsin et al. |
| 2015/0116811 A1 | 4/2015 | Shrivastava et al. |
| 2015/0120297 A1 | 4/2015 | Meruva |
| 2015/0122474 A1 | 5/2015 | Petersen |
| 2015/0129140 A1 | 5/2015 | Dean et al. |
| 2015/0137792 A1 | 5/2015 | Filippi et al. |
| 2015/0160525 A1 | 6/2015 | Shi |
| 2015/0195644 A1 | 7/2015 | Wilson et al. |
| 2015/0219975 A1 | 8/2015 | Phillips et al. |
| 2015/0255651 A1 | 9/2015 | Barr et al. |
| 2015/0270823 A1 | 9/2015 | Sobolewski |
| 2015/0323915 A1 | 11/2015 | Warren et al. |
| 2015/0325167 A1 | 11/2015 | Eom |
| 2015/0327010 A1 | 11/2015 | Gottschalk et al. |
| 2015/0327304 A1 | 11/2015 | Tinnakornsrisuphap et al. |
| 2015/0331295 A1 | 11/2015 | Takahashi et al. |
| 2015/0338713 A1 | 11/2015 | Brown |
| 2015/0355521 A1 | 12/2015 | Alton et al. |
| 2015/0362819 A1 | 12/2015 | Bjornard et al. |
| 2015/0368967 A1 | 12/2015 | Lundy et al. |
| 2015/0378230 A1 | 12/2015 | Gudmunson et al. |
| 2015/0378231 A1 | 12/2015 | Greer et al. |
| 2015/0378715 A1 | 12/2015 | Solnit et al. |
| 2016/0024827 A1 | 1/2016 | Lambright et al. |
| 2016/0026060 A1 | 1/2016 | Koo et al. |
| 2016/0027391 A1 | 1/2016 | Gibson et al. |
| 2016/0054633 A1 | 2/2016 | Brown et al. |
| 2016/0054634 A1 | 2/2016 | Brown et al. |
| 2016/0070151 A1 | 3/2016 | Shrivastava et al. |
| 2016/0071183 A1 | 3/2016 | Joshi et al. |
| 2016/0091769 A1 | 3/2016 | Rozbicki |
| 2016/0109778 A1 | 4/2016 | Shrivastava et al. |
| 2016/0133222 A1 | 5/2016 | Paxson |
| 2016/0134932 A1 | 5/2016 | Karp et al. |
| 2016/0135175 A1 | 5/2016 | Tarlazzi |
| 2016/0147100 A1 | 5/2016 | Van Oosten et al. |
| 2016/0154290 A1 | 6/2016 | Brown et al. |
| 2016/0170402 A1* | 6/2016 | Lindström ............... A47B 9/00 |
| | | 700/275 |
| 2016/0202589 A1* | 7/2016 | Nagel ....................... E06B 9/24 |
| | | 359/275 |
| 2016/0203403 A1 | 7/2016 | Nagel et al. |
| 2016/0210711 A1 | 7/2016 | Krupa et al. |
| 2016/0225832 A1 | 8/2016 | Kwon et al. |
| 2016/0231354 A1 | 8/2016 | Rayman et al. |
| 2016/0231755 A1 | 8/2016 | Ajax et al. |
| 2016/0255279 A1 | 9/2016 | Sudo |
| 2016/0261837 A1 | 9/2016 | Thompson et al. |
| 2016/0318525 A1 | 11/2016 | Lardy |
| 2016/0330042 A1 | 11/2016 | Andersen |
| 2016/0359965 A1 | 12/2016 | Murphy et al. |
| 2016/0363831 A1 | 12/2016 | Ash et al. |
| 2016/0372083 A1 | 12/2016 | Taite et al. |
| 2016/0376831 A1 | 12/2016 | Plummer |
| 2017/0010880 A1 | 1/2017 | Yamazaki |
| 2017/0039339 A1 | 2/2017 | Bitran et al. |
| 2017/0044057 A1 | 2/2017 | Rozbicki et al. |
| 2017/0052289 A1 | 2/2017 | Boissevain et al. |
| 2017/0063429 A1 | 3/2017 | Flask |
| 2017/0068414 A1 | 3/2017 | Plumb |
| 2017/0070457 A1 | 3/2017 | Sachs |
| 2017/0075183 A1 | 3/2017 | Brown |
| 2017/0075323 A1 | 3/2017 | Shrivastava et al. |
| 2017/0077988 A1 | 3/2017 | Flask |
| 2017/0080341 A1 | 3/2017 | Mao et al. |
| 2017/0082903 A1 | 3/2017 | Vigano et al. |
| 2017/0085834 A1* | 3/2017 | Kim ....................... H04L 51/10 |
| 2017/0086003 A1 | 3/2017 | Rabinowitz et al. |
| 2017/0097259 A1 | 4/2017 | Brown et al. |
| 2017/0102907 A1 | 4/2017 | Kuo et al. |
| 2017/0122802 A1 | 5/2017 | Brown et al. |
| 2017/0132976 A1 | 5/2017 | Yang et al. |
| 2017/0139301 A1 | 5/2017 | Messere et al. |
| 2017/0146884 A1 | 5/2017 | Vigano et al. |
| 2017/0147023 A1 | 5/2017 | Kumar et al. |
| 2017/0157466 A1 | 6/2017 | Korpela et al. |
| 2017/0161911 A1 | 6/2017 | Kumar et al. |
| 2017/0170776 A1 | 6/2017 | Janowski |
| 2017/0197494 A1 | 7/2017 | Li |
| 2017/0200424 A1 | 7/2017 | Xu et al. |
| 2017/0212399 A1 | 7/2017 | Tarng et al. |
| 2017/0212400 A1 | 7/2017 | Shrivastava et al. |
| 2017/0213503 A1 | 7/2017 | Zhang et al. |

(56) References Cited

U.S. PATENT DOCUMENTS

| | | |
|---|---|---|
| 2017/0221425 A1 | 8/2017 | Lu et al. |
| 2017/0223312 A1* | 8/2017 | McNelley ............ H04N 9/3147 |
| 2017/0234067 A1 | 8/2017 | Fasi et al. |
| 2017/0243122 A1 | 8/2017 | Komatsu et al. |
| 2017/0248564 A1 | 8/2017 | Miyajima |
| 2017/0251488 A1 | 8/2017 | Urban et al. |
| 2017/0253801 A1 | 9/2017 | Bae et al. |
| 2017/0264865 A1* | 9/2017 | Huangfu ............. H10K 50/828 |
| 2017/0272317 A1 | 9/2017 | Singla et al. |
| 2017/0276542 A1 | 9/2017 | Klawuhn et al. |
| 2017/0277342 A1 | 9/2017 | Hong et al. |
| 2017/0279930 A1 | 9/2017 | Zhang |
| 2017/0284691 A1 | 10/2017 | Sinha et al. |
| 2017/0285432 A1 | 10/2017 | Shrivastava et al. |
| 2017/0285433 A1 | 10/2017 | Shrivastava et al. |
| 2017/0297498 A1 | 10/2017 | Larson et al. |
| 2017/0309215 A1 | 10/2017 | Perdices-Gonzalez et al. |
| 2017/0310956 A1 | 10/2017 | Perdices-Gonzalez et al. |
| 2017/0322760 A1 | 11/2017 | Soh et al. |
| 2017/0328121 A1 | 11/2017 | Purdy et al. |
| 2017/0336692 A1 | 11/2017 | Park et al. |
| 2017/0345267 A1 | 11/2017 | Flint et al. |
| 2017/0347129 A1 | 11/2017 | Levi et al. |
| 2017/0364046 A1 | 12/2017 | Westrick, Jr. et al. |
| 2017/0364395 A1 | 12/2017 | Shrivastava et al. |
| 2017/0374255 A1 | 12/2017 | Campbell et al. |
| 2017/0374437 A1 | 12/2017 | Schwarzkopf et al. |
| 2018/0004059 A1 | 1/2018 | Jovanovic |
| 2018/0011383 A1 | 1/2018 | Higashihara et al. |
| 2018/0025679 A1 | 1/2018 | Park et al. |
| 2018/0076978 A1 | 3/2018 | Schubert et al. |
| 2018/0088432 A1 | 3/2018 | Shrivastava et al. |
| 2018/0090992 A1 | 3/2018 | Shrivastava et al. |
| 2018/0106098 A1 | 4/2018 | Unveren et al. |
| 2018/0119973 A1 | 5/2018 | Rothman et al. |
| 2018/0129172 A1 | 5/2018 | Shrivastava et al. |
| 2018/0130455 A1 | 5/2018 | Plummer et al. |
| 2018/0139517 A1 | 5/2018 | Schwartz et al. |
| 2018/0144696 A1 | 5/2018 | Zhang et al. |
| 2018/0144712 A1 | 5/2018 | Threlkel et al. |
| 2018/0153454 A1 | 6/2018 | Hayter et al. |
| 2018/0156484 A1 | 6/2018 | Kim et al. |
| 2018/0157141 A1 | 6/2018 | Brown et al. |
| 2018/0176799 A1 | 6/2018 | Lange et al. |
| 2018/0181085 A1 | 6/2018 | Gabriel et al. |
| 2018/0187484 A1 | 7/2018 | Hebeisen et al. |
| 2018/0188627 A1 | 7/2018 | Vigano et al. |
| 2018/0189117 A1 | 7/2018 | Shrivastava et al. |
| 2018/0195752 A1 | 7/2018 | Sasaki et al. |
| 2018/0217429 A1* | 8/2018 | Busch ...................... G02F 1/076 |
| 2018/0225585 A1 | 8/2018 | Dong et al. |
| 2018/0231860 A1* | 8/2018 | Podbelski ............. G02F 1/1524 |
| 2018/0241587 A1 | 8/2018 | Bull et al. |
| 2018/0252423 A1 | 9/2018 | Hieke et al. |
| 2018/0259373 A1 | 9/2018 | Staton et al. |
| 2018/0259804 A1 | 9/2018 | Bae et al. |
| 2018/0267380 A1 | 9/2018 | Shrivastava et al. |
| 2018/0269974 A1 | 9/2018 | Luciano |
| 2018/0270542 A1* | 9/2018 | Ramalingam ............. B60R 1/27 |
| 2018/0284555 A1 | 10/2018 | Klawuhn et al. |
| 2018/0306609 A1 | 10/2018 | Agarwal et al. |
| 2018/0307114 A1 | 10/2018 | Brown et al. |
| 2018/0321042 A1 | 11/2018 | Brewer et al. |
| 2018/0324696 A1 | 11/2018 | Subramanian et al. |
| 2018/0335939 A1 | 11/2018 | Karunamuni et al. |
| 2018/0347258 A1 | 12/2018 | Wexler |
| 2018/0349710 A1 | 12/2018 | Houri et al. |
| 2018/0364654 A1 | 12/2018 | Locke et al. |
| 2019/0004386 A1 | 1/2019 | Bergh et al. |
| 2019/0011798 A9 | 1/2019 | Brown et al. |
| 2019/0025661 A9 | 1/2019 | Brown et al. |
| 2019/0028287 A1 | 1/2019 | Jin et al. |
| 2019/0036209 A1 | 1/2019 | Au |
| 2019/0049812 A1 | 2/2019 | Brown |
| 2019/0058977 A1 | 2/2019 | Gherardi et al. |
| 2019/0097827 A1 | 3/2019 | Angle et al. |
| 2019/0130189 A1 | 5/2019 | Zhou et al. |
| 2019/0134940 A1 | 5/2019 | Inoue et al. |
| 2019/0155122 A1 | 5/2019 | Brown et al. |
| 2019/0178511 A1 | 6/2019 | Zimmerman et al. |
| 2019/0205774 A1 | 7/2019 | Ba et al. |
| 2019/0215694 A1 | 7/2019 | Rubin et al. |
| 2019/0221148 A1 | 7/2019 | Pradhan et al. |
| 2019/0229768 A1 | 7/2019 | Jeremy et al. |
| 2019/0235451 A1 | 8/2019 | Shrivastava et al. |
| 2019/0243206 A1 | 8/2019 | Brown et al. |
| 2019/0257143 A1 | 8/2019 | Nagel et al. |
| 2019/0267933 A1 | 8/2019 | Janowski |
| 2019/0271895 A1 | 9/2019 | Shrivastava et al. |
| 2019/0294018 A1 | 9/2019 | Shrivastava et al. |
| 2019/0303086 A1 | 10/2019 | Nagayama et al. |
| 2019/0317458 A1 | 10/2019 | Shrivastava et al. |
| 2019/0320033 A1 | 10/2019 | Nagata et al. |
| 2019/0324431 A1 | 10/2019 | Cella et al. |
| 2019/0327320 A1 | 10/2019 | Rubin et al. |
| 2019/0331978 A1 | 10/2019 | Shrivastava et al. |
| 2019/0346417 A1 | 11/2019 | Benefield |
| 2019/0347141 A1 | 11/2019 | Shrivastava et al. |
| 2019/0353972 A1 | 11/2019 | Shrivastava et al. |
| 2019/0354071 A1 | 11/2019 | Turney et al. |
| 2019/0356508 A1 | 11/2019 | Trikha et al. |
| 2019/0361411 A1 | 11/2019 | Park et al. |
| 2019/0384652 A1 | 12/2019 | Shrivastava et al. |
| 2020/0004096 A1 | 1/2020 | Brown et al. |
| 2020/0022072 A1 | 1/2020 | Cho et al. |
| 2020/0026141 A1 | 1/2020 | Brown et al. |
| 2020/0033163 A1 | 1/2020 | Agarwal et al. |
| 2020/0041963 A1 | 2/2020 | Shrivastava et al. |
| 2020/0041967 A1 | 2/2020 | Shrivastava et al. |
| 2020/0045261 A1* | 2/2020 | Lim ...................... H04N 5/272 |
| 2020/0056423 A1 | 2/2020 | Bjergaard et al. |
| 2020/0057421 A1 | 2/2020 | Trikha et al. |
| 2020/0067865 A1 | 2/2020 | Jiménez et al. |
| 2020/0073193 A1 | 3/2020 | Pradhan et al. |
| 2020/0090089 A1 | 3/2020 | Aston et al. |
| 2020/0096775 A1 | 3/2020 | Franklin et al. |
| 2020/0103068 A1 | 4/2020 | Ahn |
| 2020/0103841 A1 | 4/2020 | Pillai et al. |
| 2020/0104090 A1 | 4/2020 | Kim et al. |
| 2020/0133615 A1 | 4/2020 | Kim et al. |
| 2020/0150508 A1 | 5/2020 | Patterson et al. |
| 2020/0150602 A1 | 5/2020 | Trikha et al. |
| 2020/0162856 A1 | 5/2020 | Ziv et al. |
| 2020/0176125 A1 | 6/2020 | Chatterjea et al. |
| 2020/0193155 A1 | 6/2020 | Keohane et al. |
| 2020/0193206 A1 | 6/2020 | Turkelson et al. |
| 2020/0200416 A1 | 6/2020 | Granger et al. |
| 2020/0227159 A1 | 7/2020 | Boisvert et al. |
| 2020/0241379 A1 | 7/2020 | Barnum et al. |
| 2020/0256118 A1 | 8/2020 | Hicks et al. |
| 2020/0257179 A1 | 8/2020 | Barnum et al. |
| 2020/0259237 A1 | 8/2020 | Shrivastava et al. |
| 2020/0260556 A1 | 8/2020 | Rozbicki et al. |
| 2020/0319765 A1 | 10/2020 | Badr et al. |
| 2020/0387041 A1 | 12/2020 | Shrivastava et al. |
| 2021/0021788 A1 | 1/2021 | Mcnelley et al. |
| 2021/0041759 A1 | 2/2021 | Trikha et al. |
| 2021/0063836 A1 | 3/2021 | Patterson et al. |
| 2021/0126063 A1 | 4/2021 | Vanderveen et al. |
| 2021/0132458 A1 | 5/2021 | Trikha et al. |
| 2021/0165696 A1 | 6/2021 | Shrivastava et al. |
| 2021/0191218 A1 | 6/2021 | Trikha et al. |
| 2021/0191221 A1 | 6/2021 | Shrivastava et al. |
| 2021/0210053 A1 | 7/2021 | Ng et al. |
| 2021/0225528 A1 | 7/2021 | Viengkham et al. |
| 2021/0232015 A1 | 7/2021 | Brown et al. |
| 2021/0246719 A1 | 8/2021 | Shrivastava et al. |
| 2021/0302799 A1 | 9/2021 | Khanna |
| 2021/0325753 A1 | 10/2021 | Trikha et al. |
| 2021/0373511 A1 | 12/2021 | Shrivastava et al. |
| 2021/0375440 A1 | 12/2021 | Schlameuss et al. |
| 2021/0383804 A1 | 12/2021 | Makker et al. |
| 2021/0390953 A1 | 12/2021 | Makker et al. |
| 2021/0398691 A1 | 12/2021 | Dhamija et al. |

(56) References Cited

U.S. PATENT DOCUMENTS

| | | |
|---|---|---|
| 2021/0405493 A1 | 12/2021 | Tinianov et al. |
| 2022/0011729 A1 | 1/2022 | Shrivastava et al. |
| 2022/0044673 A1 | 2/2022 | Park et al. |
| 2022/0121078 A1 | 4/2022 | Vollen et al. |
| 2022/0137474 A1 | 5/2022 | Trikha et al. |
| 2022/0137475 A1 | 5/2022 | Trikha et al. |
| 2022/0137476 A1 | 5/2022 | Trikha et al. |
| 2022/0159077 A1 | 5/2022 | Shrivastava et al. |
| 2022/0171248 A1 | 6/2022 | Shrivastava et al. |
| 2022/0179274 A1 | 6/2022 | Trikha et al. |
| 2022/0179275 A1 | 6/2022 | Patterson et al. |
| 2022/0231396 A1 | 7/2022 | Rozbicki et al. |
| 2022/0231399 A1 | 7/2022 | Brown et al. |
| 2022/0298850 A1 | 9/2022 | Shrivastava et al. |
| 2022/0316269 A1 | 10/2022 | Shrivastava et al. |
| 2022/0337596 A1 | 10/2022 | Smith et al. |
| 2022/0365494 A1 | 11/2022 | Shrivastava et al. |
| 2022/0365830 A1 | 11/2022 | Shrivastava et al. |
| 2022/0386414 A1 | 12/2022 | Bush et al. |
| 2022/0413351 A1 | 12/2022 | Trikha et al. |
| 2023/0040424 A1 | 2/2023 | Gopinathanasari et al. |
| 2023/0041490 A1 | 2/2023 | Vangati et al. |
| 2023/0065864 A1 | 3/2023 | Trikha et al. |
| 2023/0070288 A1 | 3/2023 | Trikha et al. |
| 2023/0074720 A1 | 3/2023 | Brown et al. |
| 2023/0077008 A1 | 3/2023 | Trikha et al. |
| 2023/0096768 A1 | 3/2023 | Trikha et al. |
| 2023/0111311 A1 | 4/2023 | Shrivastava et al. |
| 2023/0120049 A1 | 4/2023 | Vangati et al. |
| 2023/0152652 A1 | 5/2023 | Trikha et al. |
| 2023/0176669 A1 | 6/2023 | Gupta et al. |
| 2023/0194115 A1 | 6/2023 | Malik et al. |
| 2023/0230686 A1 | 7/2023 | Schlameuss et al. |
| 2023/0288770 A1 | 9/2023 | Gupta et al. |
| 2023/0324952 A1 | 10/2023 | Martinson et al. |
| 2023/0333434 A1 | 10/2023 | Gupta et al. |
| 2023/0333520 A1 | 10/2023 | Shrivastava et al. |
| 2023/0341740 A1 | 10/2023 | Shrivastava et al. |
| 2023/0350260 A1 | 11/2023 | Martinson et al. |
| 2023/0353416 A1 | 11/2023 | Trikha et al. |
| 2023/0367584 A1 | 11/2023 | Tai et al. |
| 2023/0393443 A1 | 12/2023 | Marquez et al. |
| 2023/0393542 A1 | 12/2023 | Shrivastava et al. |
| 2024/0085754 A1 | 3/2024 | Martinson et al. |
| 2024/0085755 A1 | 3/2024 | Trikha et al. |
| 2024/0094590 A1 | 3/2024 | Trikha et al. |
| 2024/0171566 A1 | 5/2024 | Vangati et al. |
| 2024/0192563 A1 | 6/2024 | Hur et al. |
| 2024/0201314 A1 | 6/2024 | Gomez-Martinez et al. |
| 2024/0220337 A1 | 7/2024 | Shrivastava et al. |
| 2024/0276204 A1 | 8/2024 | Lee et al. |
| 2024/0284155 A1 | 8/2024 | Lee et al. |
| 2024/0329484 A1 | 10/2024 | Trikha et al. |
| 2024/0420830 A1 | 12/2024 | Schlameuss et al. |
| 2025/0004343 A1 | 1/2025 | Shrivastava et al. |
| 2025/0023222 A1 | 1/2025 | Brown et al. |

FOREIGN PATENT DOCUMENTS

| | | | |
|---|---|---|---|
| CH | 556612 | A | 11/1974 |
| CN | 1161092 | A | 10/1997 |
| CN | 1219251 | A | 6/1999 |
| CN | 1311935 | A | 9/2001 |
| CN | 1599280 | A | 3/2005 |
| CN | 1692348 | A | 11/2005 |
| CN | 1723658 | A | 1/2006 |
| CN | 101154104 | A | 4/2008 |
| CN | 101253460 | A | 8/2008 |
| CN | 101501757 | A | 8/2009 |
| CN | 101510078 | A | 8/2009 |
| CN | 101669287 | A | 3/2010 |
| CN | 101856193 | A | 10/2010 |
| CN | 102318210 | A | 1/2012 |
| CN | 102325326 | A | 1/2012 |
| CN | 102388340 | A | 3/2012 |
| CN | 102414601 | A | 4/2012 |
| CN | 102598469 | A | 7/2012 |
| CN | 202443309 | U | 9/2012 |
| CN | 103003739 | A | 3/2013 |
| CN | 103051737 | A | 4/2013 |
| CN | 103119845 | A | 5/2013 |
| CN | 103168269 | A | 6/2013 |
| CN | 203019761 | U | 6/2013 |
| CN | 103207493 | A | 7/2013 |
| CN | 103238107 | A | 8/2013 |
| CN | 103266828 | A | 8/2013 |
| CN | 103282841 | A | 9/2013 |
| CN | 103327126 | A | 9/2013 |
| CN | 103345236 | A | 10/2013 |
| CN | 103547965 | A | 1/2014 |
| CN | 103649826 | A | 3/2014 |
| CN | 103701694 | A | 4/2014 |
| CN | 103781645 | A | 5/2014 |
| CN | 103842735 | A | 6/2014 |
| CN | 103987909 | A | 8/2014 |
| CN | 104114804 | A | 10/2014 |
| CN | 104321497 | A | 1/2015 |
| CN | 104335595 | A | 2/2015 |
| CN | 104364706 | A | 2/2015 |
| CN | 104885002 | A | 9/2015 |
| CN | 105143586 | A | 12/2015 |
| CN | 205264276 | U | 5/2016 |
| CN | 105676556 | A | 6/2016 |
| CN | 105974160 | A | 9/2016 |
| CN | 106125442 | A | 11/2016 |
| CN | 106125444 | A | 11/2016 |
| CN | 106164973 | A | 11/2016 |
| CN | 106364442 | A | 2/2017 |
| CN | 106462023 | A | 2/2017 |
| CN | 205992531 | U | 3/2017 |
| CN | 106575064 | A | 4/2017 |
| CN | 107111287 | A | 8/2017 |
| CN | 107112620 | A | 8/2017 |
| CN | 107850815 | A | 3/2018 |
| CN | 207409225 | U | 5/2018 |
| CN | 108139644 | A | 6/2018 |
| CN | 108388058 | A | 8/2018 |
| CN | 208537871 | U | 2/2019 |
| CN | 209044229 | U | 6/2019 |
| CN | 110515425 | A | 11/2019 |
| CN | 110543057 | A | 12/2019 |
| DE | 102011050469 | A1 | 11/2012 |
| EP | 0917667 | A1 | 5/1999 |
| EP | 1929701 | A2 | 6/2008 |
| EP | 2090961 | A1 | 8/2009 |
| EP | 2357544 | A2 | 8/2011 |
| EP | 2648086 | A2 | 10/2013 |
| EP | 2733998 | A1 | 5/2014 |
| EP | 2764998 | A1 | 8/2014 |
| EP | 2357544 | B1 | 10/2014 |
| EP | 2837205 | A1 | 2/2015 |
| EP | 3015915 | A1 | 5/2016 |
| EP | 2837205 | B1 | 2/2017 |
| EP | 3293941 | A1 | 3/2018 |
| EP | 3299957 | A1 | 3/2018 |
| EP | 3328000 | A1 | 5/2018 |
| EP | 3352053 | A1 | 7/2018 |
| EP | 3230943 | B1 | 7/2021 |
| GB | 6147609 | | 7/2021 |
| GB | 6147618 | | 7/2021 |
| JP | H0611477 | A | 1/1994 |
| JP | H06242044 | A | 9/1994 |
| JP | H06308073 | A | 11/1994 |
| JP | H10215492 | A | 8/1998 |
| JP | H10246078 | A | 9/1998 |
| JP | H11500838 | A | 1/1999 |
| JP | 2003284160 | A | 10/2003 |
| JP | 2004332350 | A | 11/2004 |
| JP | 2006287729 | A | 10/2006 |
| JP | 2007156909 | A | 6/2007 |
| JP | 4139109 | B2 | 8/2008 |
| JP | 2008293024 | A | 12/2008 |
| JP | 2009005116 | A | 1/2009 |
| JP | 2010152646 | A | 7/2010 |

(56) References Cited

FOREIGN PATENT DOCUMENTS

| | | | |
|---|---|---|---|
| JP | 2012017614 A | 1/2012 | |
| JP | 2012533060 A | 12/2012 | |
| JP | 3184348 U | 6/2013 | |
| JP | 2018050290 A | 3/2018 | |
| JP | 2018507337 A | 3/2018 | |
| JP | 2019502145 A | 1/2019 | |
| JP | 2019508946 A | 3/2019 | |
| JP | 2019520552 A | 7/2019 | |
| JP | 2019186771 A | 10/2019 | |
| KR | 19990088613 A | 12/1999 | |
| KR | 20030040361 A | 5/2003 | |
| KR | 20030073121 A | 9/2003 | |
| KR | 20060069742 A | 6/2006 | |
| KR | 20070024837 A | 3/2007 | |
| KR | 20070089370 A | 8/2007 | |
| KR | 20080043487 A | 5/2008 | |
| KR | 20090066107 A | 6/2009 | |
| KR | 20110003698 A | 1/2011 | |
| KR | 20120045915 A | 5/2012 | |
| KR | 20120092921 A | 8/2012 | |
| KR | 20120117409 A | 10/2012 | |
| KR | 20130023668 A | 3/2013 | |
| KR | 20130026740 A | 3/2013 | |
| KR | 101254602 B1 | 4/2013 | |
| KR | 101319216 B1 | 10/2013 | |
| KR | 20130112693 A | 10/2013 | |
| KR | 101323668 B1 | 11/2013 | |
| KR | 101346862 B1 | 1/2014 | |
| KR | 20140004175 A | 1/2014 | |
| KR | 101471443 B1 | 12/2014 | |
| KR | 20150060051 A | 6/2015 | |
| KR | 20150136981 A | 12/2015 | |
| KR | 20160012564 A | 2/2016 | |
| KR | 20160105005 A | 9/2016 | |
| KR | 20170022132 A | 3/2017 | |
| KR | 20170095892 A | 8/2017 | |
| KR | 20170121858 A | 11/2017 | |
| KR | 101799323 B1 | 12/2017 | |
| KR | 20170134321 A | 12/2017 | |
| KR | 20180012615 A | 2/2018 | |
| KR | 101853568 B1 | 4/2018 | |
| KR | 20190077583 A | 7/2019 | |
| KR | 20190142032 A | 12/2019 | |
| KR | 20210032133 A | 3/2021 | |
| KR | 20210039721 A | 4/2021 | |
| RU | 104808 U1 | 5/2011 | |
| RU | 2012107324 A | 9/2013 | |
| TW | 200532346 A | 10/2005 | |
| TW | 201029838 A | 8/2010 | |
| TW | 201348828 A | 12/2013 | |
| TW | 201621138 A | 6/2016 | |
| TW | 201635840 A | 10/2016 | |
| TW | 1607269 B | 12/2017 | |
| TW | 201907213 A | 2/2019 | |
| WO | WO-0124700 A1 | 4/2001 | |
| WO | WO-0237332 A2 | 5/2002 | |
| WO | WO-02054086 A1 | 7/2002 | |
| WO | WO-03092309 A1 | 11/2003 | |
| WO | WO-2007146862 A2 | 12/2007 | |
| WO | WO-2012079159 A1 | 6/2012 | |
| WO | WO-2012125332 A2 | 9/2012 | |
| WO | WO-2012125348 A2 | 9/2012 | |
| WO | WO-2012130262 A1 | 10/2012 | |
| WO | WO-2013046112 A1 | 4/2013 | |
| WO | WO-2013121103 A1 | 8/2013 | |
| WO | WO-2013155467 A1 | 10/2013 | |
| WO | WO-2013158464 A1 | 10/2013 | |
| WO | WO-2013159778 A1 | 10/2013 | |
| WO | WO-2013177575 A1 | 11/2013 | |
| WO | WO-2014032023 A1 | 2/2014 | |
| WO | WO-2014059268 A2 | 4/2014 | |
| WO | WO-2014082092 A1 | 5/2014 | |
| WO | WO-2014121809 A1 | 8/2014 | |
| WO | WO-2014124701 A1 | 8/2014 | |
| WO | WO-2014124710 A1 | 8/2014 | |
| WO | WO-2014130471 A1 | 8/2014 | |
| WO | WO-2014209812 A1 | 12/2014 | |
| WO | WO-2015051262 A1 | 4/2015 | |
| WO | WO-2015100419 A1 | 7/2015 | |
| WO | WO-2015113592 A1 | 8/2015 | |
| WO | WO-2015120045 A1 | 8/2015 | |
| WO | WO-2015134789 A1 | 9/2015 | |
| WO | WO-2016004109 A1 | 1/2016 | |
| WO | WO-2016054112 A1 | 4/2016 | |
| WO | WO-2016072620 A1 | 5/2016 | |
| WO | WO-2016085964 A1 | 6/2016 | |
| WO | WO-2016086017 A1 | 6/2016 | |
| WO | WO-2016094139 A1 | 6/2016 | |
| WO | WO-2016094445 A1 | 6/2016 | |
| WO | WO-2016153467 A1 | 9/2016 | |
| WO | WO-2016183059 A1 | 11/2016 | |
| WO | WO-2017007841 A1 | 1/2017 | |
| WO | WO-2017007942 A1 | 1/2017 | |
| WO | WO-2017035650 A1 | 3/2017 | |
| WO | WO-2017058568 A1 | 4/2017 | |
| WO | WO-2017062592 A1 | 4/2017 | |
| WO | WO-2017075059 A1 | 5/2017 | |
| WO | WO-2017075472 A1 | 5/2017 | |
| WO | WO-2017120262 A1 | 7/2017 | |
| WO | WO-2017137904 A1 | 8/2017 | |
| WO | WO-2017155833 A1 | 9/2017 | |
| WO | WO-2017180734 A1 | 10/2017 | |
| WO | WO-2017182920 A1 | 10/2017 | |
| WO | WO-2017189618 A1 | 11/2017 | |
| WO | WO-2017192881 A1 | 11/2017 | |
| WO | WO-2018039080 A1 | 3/2018 | |
| WO | WO-2018063919 A1 | 4/2018 | |
| WO | WO-2018067377 A1 | 4/2018 | |
| WO | WO-2018098089 A1 | 5/2018 | |
| WO | WO-2018102103 A1 | 6/2018 | |
| WO | WO-2018200702 A1 | 11/2018 | |
| WO | WO-2018200740 A2 | 11/2018 | |
| WO | WO-2018200752 A1 | 11/2018 | |
| WO | WO-2019040809 A1 | 2/2019 | |
| WO | WO-2019157602 A1 | 8/2019 | |
| WO | WO-2019178282 A1 | 9/2019 | |
| WO | WO-2019203931 A1 | 10/2019 | |
| WO | WO-2019204205 A1 | 10/2019 | |
| WO | WO-2019213441 A1 | 11/2019 | |
| WO | WO-2020146766 A1 | 7/2020 | |
| WO | WO-2020172187 A1 | 8/2020 | |
| WO | WO-2020185941 A1 | 9/2020 | |
| WO | WO-2020243690 A1 | 12/2020 | |
| WO | WO-2021067505 A1 | 4/2021 | |
| WO | WO-2021154915 A1 | 8/2021 | |
| WO | WO-2021211798 A1 | 10/2021 | |

OTHER PUBLICATIONS

"SageGlass Mobile App" screenshot, accessed Aug. 28, 2015, 1 page.

"SageGlass Unplugged" screenshot, accessed Aug. 28, 2015, 1 page.

"SageGlass Unplugged™—wireless dynamic glass", 2014, 2 pages.

Alarifi, A. et al., "Ultra Wideband Indoor Positioning Technologies: Analysis and Recent Advances", Sensors, May 16, 2016, vol. 16 No. 5, pp. 1-36.

Alguindigue. I., et al., "Monitoring and Diagnosis of Rolling Element Bearings Using Artificial Neural Networks," IEEE Transactions on Industrial Electronics, 1993, vol. 40 (2), pp. 209-217.

APC by Schneider Electric, Smart-UPS 120V Product Brochure, 2013, 8 pp.

AU Office Action dated Jan. 11, 2022, in Application No. AU2021201145.

AU Office action dated Sep. 30, 2022, in AU Application No. AU2021215134.

AU Office action dated Apr. 4, 2022, in AU Application No. AU2020226999.

AU Office action dated Mar. 20, 2023, in AU Application No. AU20210215134.

AU Office action dated Oct. 12, 2022, in AU Application No. AU2020226999.

(56) References Cited

OTHER PUBLICATIONS

AU Office action dated Oct. 22, 2021, in AU Application No. AU2020226999.

Australian Examination Report dated Dec. 24, 2019 in AU Application No. 2015227056.

Australian Examination Report dated Mar. 2, 2020 in AU Application No. 2015353569.

Australian Office Action dated Aug. 10, 2020 in AU Application No. 2015360714.

Australian Office Action dated Aug. 9, 2021 in AU Application No. 2015360714.

Australian Office Action dated Dec. 4, 2020 in AU Application No. 2015360714.

Australian Office Action dated Jun. 4, 2021 in AU Application No. 2015360714.

Bannat, A., et al., "Artificial Cognition in Production Systems", IEEE Transactions on Automation Science and Engineering, 2011, vol. 8, No. 1, pp. 148-174.

Bucci, G., et al., "Digital Measurement Station for Power Quality Analysis in Distributed Environments," IEEE Transactions on Instrumentation and Measurement, 2003, vol. 52(1), pp. 75-84.

Byun, J. et al., "Development of a Self-adapting Intelligent System for Building Energy Saving and Context-aware Smart Services", IEEE Transactions on Consumer Electronics, Feb. 2011, vol. 57, No. 1, pp. 90-98.

CA Office Action dated Dec. 5, 2023 in Application No. 2970300.

CA Office Action dated Dec. 13, 2021, in Application No. CA2970300.

CA Office Action dated Dec. 23, 2021, in Application No. CA2941526.

CA Office Action dated Dec. 27, 2023 in CA Application No. 3172227.

CA Office Action dated Feb. 22, 2023, in Application No. CA2970300.

CA Office Action dated Jul. 31, 2023, in Application No. CA3156883.

CA Office Action dated Nov. 9, 2023, in CA Application No. 3139813.

CA Office Action dated Oct. 11, 2023 in CA Application No. CA3062818.

CA Office Action dated Oct. 11, 2023 in CA Application No. CA3169935.

CA Office Action dated Oct. 25, 2023, in Application No. CA3169929.

CA Office Action dated Oct. 26, 2023, in CA Application No. 3039342.

CA Office Action dated Oct. 31, 2023, in Application No. CA3129952.

CA Office Action dated Sep. 13, 2022, in Application No. CA2970300.

CA Office Action dated Sep. 27, 2023, in Application No. CA3103480.

CA Office Action dated Sep. 28, 2023, in Application No. CA3062817.

CAN in Automation (CiA): PDO protocol, 2016; can-cia.org, http://www.can-cia.org/can-knowledge/canopen/pdo-protocol. Retrived from https ://web .archive .org/web/20161028171403/http :1/www .cancia .org/can-knowledge/canopen/pdo-protocol on Feb. 8, 2023, Year: 2016.

Cecilio, J., et al., "A Configurable Middleware for Processing Heterogenous Industrial Intelligent Sensors," IEEE 16th International Conference on Intelligent Engineering Systems (INES), Jun. 15, 2012, pp. 145-149.

Chan, E.C.L, et al., "Effect of Channel Interference on Indoor Wireless Local Area Network Positioning" IEEE 6th International Conference on Wireless and Mobile Computing, Networking and Communications, Oct. 11, 2010, pp. 239-245.

Chen, H. et al. "The Design and Implementation of a Smart Building Control System", 2009 IEEE International Conference on e-Business Engineering, pp. 255-262.

Chinese Office Action dated Nov. 1, 2022 in CN Application No. CN201880035570 with English translation.

CN Office Action dated Dec. 29, 2021, in application No. 202010466929.9 with English translation.

CN Notice of Allowance with Supplemental Search Report (w/translation) dated Mar. 1, 2021 in CN Application No. 201580040461.4.

CN Office Action dated Apr. 18, 2022, in Application No. CN202011547257.0 with English translation.

CN Office Action dated Aug. 1, 2022, in Application No. CN201880037591.6 With English translation.

CN Office Action dated Aug. 16, 2019 in CN Application No. 201580015979.2.

CN Office Action dated Aug. 19, 2022, in Application No. CN202080022001.X with English translation.

CN Office action dated Aug. 22, 2022 in Application No. CN202011547257.0 With English translation.

CN Office Action dated Aug. 28, 2018 in CN Application No. 201580070776.3.

CN Office Action dated Aug. 31, 2022 in Application No. CN201780069604.3 with English translation.

CN Office Action dated Dec. 1, 2021, in application No. CN201780069604.3 with English translation.

CN Office Action dated Dec. 12, 2023 in CN Application No. 201980003232.3.

CN Office Action dated Feb. 9, 2023, in Application No. CN201880035614.X with English translation.

CN Office Action dated Feb. 2, 2019 in CN Application No. 201580015979.2.

CN Office Action dated Feb. 3, 2020 in CN Application No. 201580072749.X.

CN Office Action dated Jan. 10, 2023, in Application No. CN202080022001.X with English translation.

CN Office Action dated Jan. 12, 2023 in CN Application No. CN202011547257 with English translation.

CN Office Action dated Jan. 15, 2020 in CN Application No. 201580015979.2.

CN Office Action dated Jul. 28, 2023, in Application No. CN201980031543 with English translation.

CN Office Action dated Jul. 29, 2023, in Application No. CN201880035570.0 with English Translation.

CN Office Action dated Jun. 29, 2021 in CN Application No. 202010466929.9.

CN Office Action dated Jun. 3, 2020 in CN Application No. 201580015979.2.

CN Office Action dated Jun. 3, 2021 in CN Application No. 201580072749.X.

CN Office Action dated Mar. 8, 2022, in Application No. CN201880035614.X with English translation.

CN Office Action dated Mar. 16, 2023, in Application No. CN202080022001 .X with English translation.

CN Office Action dated Mar. 19, 2019 in CN Application No. 201580070776.3.

CN Office Action dated Mar. 2, 2022, in Application No. CN201880037591.6 with English translation.

CN Office Action dated Mar. 2, 2022 in Application No. CN201980042340.1 with English translation.

CN Office Action dated Mar. 30, 2023 in Application No. CN201980031543 with English translation.

CN Office Action dated Mar. 8, 2021 in CN Application No. 201580072749.X.

CN Office Action dated Mar. 9, 2020 in CN Application No. 201580040461.4.

CN Office Action dated May 17, 2022, in Application No. CN201780069604.3 With English Translation.

CN Office Action dated May 20, 2022, in Application No. CN202010466929.9 with English translation.

CN Office Action dated May 24, 2023, in Application No. CN202080022001 .X with English translation.

CN Office Action dated Nov. 1, 2022, in Application No. CN201880037591.6 with English translation.

CN Office Action dated Nov. 2, 2022, in ApplicationNo. CN201980042340.1 with English translation.

CN Office Action dated Nov. 12, 2021, in Application No. CN20158072749 with English translation.

CN Office Action dated Oct. 21, 2020 in CN Application No. 201580040461.4.

CN Office Action dated Oct. 24, 2022, in Application No. CN201880035614.X with English translation.

CN Office Action dated Oct. 9, 2019 in CN Application No. 201580070776.3.

(56) References Cited

OTHER PUBLICATIONS

CN Office Action dated Sep. 28, 2022 in Application No. CN202010466929.9 with English translation.

CN Office Action dated Sep. 30, 2020 in CN Application No. 201580072749.X.

Density DPU Technical Specifications v1.0, Density, 2018, downloaded from www.density.io.

Dols, W. Stuart, et al., A tool to model the fate and transport of indoor microbiological aerosols (FaTIMA), NIST Technical Note 2095, National Institute of Standards and Technology, US Department of Commerce, Jun. 2020, 32 pp. https://doi.org/10.6028/NIST. TN.2095.

Duchon, Claude E. et al., "Estimating Cloud Type from Pyranometer Observations," Journal of Applied Meteorology, vol. 38, Jan. 1999, pp. 132-141.

EP Office Action dated Jul. 13, 2022 in Application No. EP20170858928.

EP Office Action dated Sep. 12, 2022 in Application No. EP20180791117.7.

EP Examination Report dated Mar. 4, 2019 in EP Application No. 15814233.1.

EP Extended European search report dated Jan. 3, 2023 in Application No. EP22198532.8.

EP Extended European Search report dated Oct. 24, 2023, in Application No. EP23161161.7.

EP Extended European Search Report mailed on Sep. 14, 2021, in the application EP21182449.7.

EP Extended Search Report dated Dec. 17, 2019 in EP Application No. 19202054.

EP Extended Search Report dated Feb. 15, 2018 in EP Application No. 15814233.1.

EP Extended Search Report dated Jun. 19, 2017 in EP Application No. 15758538.1.

EP Extended Search Report dated Jun. 5, 2018 in EP Application No. 15868003.3.

EP Extended Search Report dated Nov. 11, 2020 in EP Application No. 18791117.7.

EP Extended Search Report dated Nov. 28, 2019 in EP Application No. 19188907.0.

EP Extended Search Report dated Nov. 8, 2018 in EP Application No. 15863112.7.

EP Extended Search Report dated Oct. 1, 2020 in EP Application No. 17858928.9.

EP Office Action dated Jan. 17, 2022, in Application No. 17858928. 9.

EP Office Action dated Jun. 30, 2022 in Application No. EP20190727174.

EP office action dated Apr. 24, 2023, in application No. EP21182448. 7.

EP Office Action dated Aug. 21, 2018 in EP Application No. 15758538.1.

EP office action dated Aug. 25, 2021, in EP Application No. EP19202054.3.

EP Office Action dated Feb. 6, 2023 in Application No. EP20797262. 1.

EP Office Action dated Feb. 15, 2022, in Application No. EP19188907. 0.

EP Office action dated Jan. 10, 2022, in Application No. EP19745809. 4.

EP Office Action dated Jan. 29, 2021 in EP Application No. 15868003.3.

EP office action dated Jul. 3, 2023, in application No. EP17858928. 9.

EP Office Action dated Jun. 19, 2023 in Application No. EP19727174. 5.

EP office action dated Jun. 29, 2023, in application No. EP19787808. 5.

EP office action dated Mar. 10, 2023, in application No. EP20712740. 8.

EP Office Action dated May 14, 2020 in EP Application No. 15868003.3.

EP Office action dated May 16, 2023, in Application No. EP19745809. 4.

EP Office Action dated Nov. 19, 2020 in EP Application No. 15758538.1.

EP Search Report dated Dec. 10, 2021, in Application No. EP19787808. 5.

European Extended Search Report dated Nov. 11, 2020 in EP Application No. 18791268.8.

European Extended Search Report dated Nov. 12, 2020 in EP Application No. 18791669.7.

European Office Action dated Apr. 25, 2023 in Application No. EP19188907.

European Office Action dated Feb. 25, 2021 in EP Application No. 15863112.7.

Hadziosmanovic, D., et al., "Through the Eye of the Plc: Semantic Security Monitoring for Industrial Processes," Proceedings of the 30th Annual Computer Security Applications Conference, 2014, pp. 126-135.

"Halio Rooftop Sensor Kit (Model SR500)," Product Data Sheet, Kinestral Technologies, 2020, 4 pp.

Hameed, Z. et al., "Condition Monitoring and Fault Detection of Wind Turbines and Related Algorithms: a Review.", Renewable and Sustainable energy reviews, 2009, vol. 13, pp. 1-39.

IN Office Action dated Aug. 5, 2022 In Application No. IN201937050525.

IN Office Action dated Jan. 13, 2022, in Application No. 201937044701.

IN Office Action dated Aug. 2, 2021 in IN Application No. 201637028587.

IN Office Action dated Jan. 24, 2022 in Application No. IN201937044699.

IN Office Action dated Nov. 24, 2020 in IN Application No. 201737020192.

IN Office Action dated Oct. 31, 2022 in Application No. IN202238012864.

IN Office Action dated Sep. 13, 2022, in Application No. IN202037054068.

IN Office action dated Sep. 28, 2021, in IN Application No. IN201937045203.

Indian Office Action dated Feb. 24, 2021 in IN Application No. 201737021981.

International Preliminary Report on Patentability and written opinion dated Jul. 21, 2022 in Application PCT/US2021/012313.

International Preliminary Report on Patentability dated Mar. 3, 2022, in Application No. PCT/US2020/070427.

International Preliminary Report on Patentability dated Oct. 6, 2022 in PCT Application PCT/US2021/023433.

International Preliminary Report on Patentability dated Oct. 6, 2022 in PCT Application PCT/US2021/023834.

International Search Report and Written Opinion dated Aug. 2, 2022 in Application No. PCT/US2022/030757.

International Search Report and Written Opinion dated Aug. 22, 2022 in Application No. PCT/US2022/024343.

International Search Report and Written Opinion dated Mar. 25, 2022 in Application No. PCT/US2021/062774.

International Search Report and Written Opinion dated Sep. 26, 2022 in Application No. PCT/US2022/032993.

International Preliminary Report on Patentability and Written Opinion dated Dec. 7, 2023 in PCT Application No. PCT/US2022/ 030757.

International Preliminary Report on Patentability and Written Opinion dated Dec. 21, 2023 in PCT Application No. PCT/US2022/ 032993.

International Preliminary Report on Patentability and Written Opinion dated Nov. 23, 2023 in PCT Application No. PCT/US2022/ 024999.

International Preliminary Report on Patentability and Written Opinion dated Nov. 23, 2023 in PCT Application No. PCT/US2022/ 028850.

International Preliminary Report on Patentability dated Apr. 13, 2023 in PCT Application No. No. PCT/US2021/052595.

International Preliminary Report on Patentability dated Apr. 13, 2023 in PCT Application No. No. PCT/US2021/052597.

(56) References Cited

OTHER PUBLICATIONS

International Preliminary Report on Patentability dated Apr. 18, 2019 in PCT Application No. PCT/US17/54120.

International Preliminary Report on Patentability dated Aug. 10, 2023, in PCT Application No. PCT/US2022/014135.

International Preliminary Report on Patentability dated Aug. 11, 2022 in PCT Application No. PCT/US2021/015378.

International Preliminary Report on Patentability dated Dec. 1, 2022, in PCT Application No. PCT/US2021/033544.

International Preliminary Report on Patentability dated Dec. 9, 2021, in PCT Application No. PCT/US2020/035485.

International Preliminary Report on Patentability dated Dec. 22, 2020 in PCT/US2019/038429.

International Preliminary Report on Patentability dated Feb. 9, 2023 in PCT Application No. PCT/US2021/043143.

International Preliminary Report on Patentability dated Jan. 12, 2017 in PCT Application No. PCT/US15/38667.

International Preliminary Report on Patentability dated Jun. 22, 2017 in PCT Application No. PCT/US15/64555.

International Preliminary Report on Patentability dated Jun. 22, 2023, in Application No. PCT/US2021/062774.

International Preliminary Report on Patentability dated Jun. 8, 2017 in PCT/US2015/062480.

International Preliminary Report on Patentability dated Mar. 9, 2023 in PCT Application No. PCT/US2021/046838.

International Preliminary Report on Patentability dated May 19, 2023 in PCT Application No. PCT/US2021/057678.

International Preliminary Report on Patentability dated Nov. 12, 2020 in PCT Application No. PCT/US2019/030467.

International Preliminary Report on Patentability dated Nov. 7, 2019 in PCT Application No. PCT/US2018/029406.

International Preliminary Report on Patentability dated Nov. 7, 2019 in PCT Application No. PCT/US2018/029460.

International Preliminary Report on Patentability dated Nov. 7, 2019 in PCT Application No. PCT/US2018/029476.

International Preliminary Report on Patentability dated Oct. 19, 2023, in PCT Application No. PCT/US2022/023605.

International Preliminary Report on Patentability dated Oct. 26, 2023, in Application No. PCT/US2022/024343.

International Preliminary Report on Patentability dated Oct. 26, 2023, in Application No. PCT/US2022/024812.

International Preliminary Report on Patentability dated Oct. 29, 2020 in PCT/US2019/019455.

International Preliminary Report on Patentability dated Sep. 15, 2016 in Application No. PCT/US2015/019031.

International Preliminary Reporton Patentability dated Apr. 13, 2023 in PCT Application No. No. PCT/US2021/052587.

International Preliminary Reporton Patentability dated Sep. 28, 2023, in PCT Application No. PCT/US2022/020730.

International Search Report and Written Opinion dated Apr. 28, 2020 in PCT Application No. PCT/US2020/018677.

International Search Report and Written Opinion dated Apr. 19, 2022 in PCT Application No. PCT/U S2021 /0576 78.

International Search Report and Written Opinion dated Aug. 8, 2022, in Application No. PCT/US2022/023605.

International Search Report and Written Opinion dated Feb. 15, 2016 in PCT/US2015/062480.

International Search Report and Written Opinion dated Jan. 17, 2022 in PCT Application No. PCT/US2021/046838.

International Search Report and Written Opinion dated Jan. 20, 2022 in PCT Application No. PCT/US2021/052597.

International Search Report and Written Opinion dated Jul. 6, 2022, in PCT Application No. PCT/US2022/020730.

International Search Report and Written Opinion dated Jul. 11, 2019 in PCT Application No. PCT/US2019/030467.

International Search Report and Written Opinion dated Jul. 26, 2022 in Application No. PCT/US2022/024999.

International Search Report and Written Opinion dated Jun. 23, 2021 in PCT Application No. PCT/US2021/015378.

International Search Report and Written Opinion dated Mar. 8, 2022 in PCT Application No. PCT/US2021/052587.

International Search Report and Written Opinion dated Mar. 15, 2021 in PCT Application No. PCT/US2020/053641.

International Search Report and Written Opinion dated Mar. 15, 2022 in PCT Application No. PCT/US2021/052595.

International Search Report and Written Opinion dated Mar. 29, 2016 in PCT Application No. PCT/US15/64555.

International Search Report and Written Opinion dated May 4, 2022, in PCT Application No. PCT/US2022/014135.

International Search Report and Written Opinion dated May 29, 2015 in Application No. PCT/US2015/019031.

International Search Report and Written Opinion dated Nov. 10, 2021 in PCT Application No. PCT/US2021/043143.

International Search Report and Written Opinion dated Nov. 16, 2018 in PCT Application No. PCT/US2018/029460.

International Search Report and Written Opinion dated Nov. 16, 2022 in PCT Application No. PCT/US2022/074162.

International Search Report and Written Opinion dated Oct. 15, 2018 in PCT Application No. PCT/US2018/029406.

International Search Report and Written Opinion dated Oct. 16, 2015 in PCT Application No. PCT/US15/38667.

International Search Report and Written Opinion dated Sep. 1, 2022, in Application No. PCT/US2022/024812.

International Search Report and Written Opinion dated Sep. 1, 2022 in Application No. PCT/US2022/028850.

International Search Report and Written Opinion dated Sep. 3, 2021 in PCT Application No. PCT/US2021/033544.

International Search Report and Written Opinion dated Sep. 16, 2019 in PCT/US2019/038429.

International Search Report and Written Opinion (ISA/EP) dated Sep. 30, 2020 in PCT Application No. PCT/US2020/035485.

International Search Report and Written Opinion (ISA/KR) dated Jan. 9, 2018 in PCT Application No. PCT/US17/54120.

International Search Report and Written Opinion (ISA/KR) dated Jun. 14, 2019 in PCT/US2019/019455.

Joseph, J., "Xiaomi shows off near perfect Under Screen Camera Technology," Gizchina.com, Aug. 28, 2020, 7 pp., title="Link: https://www.gizmochina.com/2020/08/28/xiaomi-perfected-third-gen-under-screen-camera-technology-prototype/>">https://www. gizmochina.com/2020/08/28/xiaomi-perfected-third-gen-under-screen-camera-technology-prototype/, retrieved Apr. 21, 2021.

JP Examination Report dated Nov. 26, 2020 in JP Application No. 2017-549175.

JP Office Action dated Dec. 7, 2021, in Application No. JP20170549175 with English translation.

JP Office Action dated Dec. 20, 2022 in JP Application No. JP2020-570981 with English translation.

JP Office Action dated Jul. 20, 2021 in JP Application No. 2017-549175.

JP Office Action dated Jul. 26, 2023 in Application No. JP2022-520878 with English translation.

JP Office Action dated Jun. 6, 2023, in application No. JP2022-149815 with English translation.

JP Office Action dated Jun. 16, 2020 in JP Application No. 2017-549175.

JP Office Action dated Jun. 6, 2023, in Application No. JP2020-560912 with English translation.

JP Office Action dated Mar. 1, 2022, in Application No. JP2020-175033 with translation.

JP Office Action dated Mar. 9, 2023 in Application No. JP2022-520878 with English translation.

JP Office Action dated Nov. 19, 2019 in JP Application No. 2017-549175.

JP Office Action dated Oct. 6, 2022 in Application No. JP2022-520878 with English translation.

JP office action dated Sep. 7, 2021, in JP Application No. 2020-175033 with English translation.

Kipp & Zonen, "Solar Radiation" (known as of Sep. 3, 2014) [http://www.kippzonen.com/Knowledge-Center/Theoretical-info/Solar-Radiation].

KR Office Action dated Apr. 13, 2022, in KR Application No. KR1020217028044 with English translation.

(56) References Cited

OTHER PUBLICATIONS

KR Office Action dated Apr. 25, 2023, in Application No. KR10-2017-7017128 with English translation.
KR Office Action dated Dec. 7, 2022 in Application No. KR10-2022-7036992 with English translation.
KR Office Action dated Dec. 22, 2021, in Application No. KR1020177018491 with English translation.
KR Office Action dated Jan. 22, 2021 in KR Application No. 10-2016-7025862.
KR Office Action dated Jul. 10, 2023, in application No. KR 10-2023-7021596 with English Translation.
KR Office Action dated Jul. 26, 2023, in Application No. KR10-2022-7037562 with English translation.
KR Office Action dated Jul. 31, 2021 in KR Application No. 10-2016-7025862.
KR Office Action dated Mar. 31, 2023, in Application No. KR10-2022-7014814 with English translation.
KR Office Action dated May 12, 2023, in Application No. KR10-2022-7027386 with English translation.
KR Office Action dated Nov. 3, 2022, in Application No. KR10-2022-7027386 with English Translation.
KR Office Action dated Oct. 26, 2021, in KR Application No. KR1020217028044 with English translation.
KR Office Action dated Sep. 25, 2023, in Application No. KR10-2022-7027386 withEnglish Translation.
KR Office Action dated Sep. 27, 2022, in Application No. KR10-2022-7014814 with English Translation.
Laskar, S.H., et al., "Power Quality Monitoring by Virtual Instrumentation using LabVIEW", 2011 46th International Universities' Power Engineering Conference (UPEC), 2011, pp. 1-6.
Lululemon athletica, "Mirror", The Mirror Gym product brochure, known Dec. 8, 2020, 9 pp, >https://shop.lululemon.com/story/mirror-home-gym , retrieved Jan. 29, 2021.
Mumaw, R.J et al., "There is More to Monitoring a Nuclear Power Plant Than Meets the Eye", Human factors, 2000, vol. 42, No. 1, pp. 36-55.
National Aeronautics & Space Administration, "Cloud Remote Sensing and Modeling," (known as of Sep. 3, 2014), published date of Sep. 15, 2014, [http://atmospheres.gsfc.nasa.gov/climate/index.php?section=134 ].
"Ossia Wireless Charging", screenshot and picture of Cota device, accessed Apr. 20, 2015, 1 page.
PCT Application No. PCT/US2021/012313 filed Jan. 6, 2021.
PCT Application No. PCT/US2021/023433 filed Mar. 22, 2021.
PCT Application No. PCT/US2021/030798 filed May 5, 2021.
PCT Application No. PCT/US2021/052587 filed Sep. 29, 2021.
PCT Application No. PCT/US2021/052595 filed Sep. 29, 2021.
PCT Application No. PCT/US2021/052597 filed Sep. 29, 2021.
PCT International Search Report and Written Opinion (ISA:KIPO) dated Aug. 13, 2018 for PCT Application No. PCT/US2018/029476.
"SPN1 Sunshine Pyranometer," Product Overview, Specification, Accessories and Product Resources, Delta-T Devices, May 5, 2016, 9 pp. https://www.delta-t.co.uk/product/spn1/ (downloaded Apr. 28, 2020).
Porter, J., "LG developing sliding doors made of transparent OLED displays," The Verge, Dec. 7, 2020, 2 pp, title="Link: https://www.theverge.com/2020/12/7/22158335/lg-assa-abloy-automatic-sliding-doors-transparent-oled-displays>">https://www.theverge.com/2020/12/7/22158335/lg-assa-abloy-automatic-sliding-doors-transparent-oled-displays , retrieved Dec. 8, 2020.
Preliminary Amendment dated Jan. 18, 2017 in U.S. Appl. No. 15/123,069.
Rajiv, "How does Cloud Radio Access Network (C-RAN) works," RF Page, Apr. 16, 2018, 5 pp. https://www.rfpage.com/how-cloud-radio-access-network-works/ Accessed May 19, 2021.
"Remote Radio Head for CPRI and 4G, 5G & LTE Networks," CableFree by Wireless Excellence Limited, 2020, 8 pp., https://www.cablefree.net/wirelesstechnology/4glte/remote-radio-head/ Accessed May 19, 2021.
RU Office Action dated Sep. 24, 2018 in RU Application No. 2016139012.
Russian Office Action dated Jul. 10, 2019 in RU Application No. 2017123902.
Science News, "New technique could help spot snooping drones", Jan. 23, 2018, 2 pp, title="Link: https://www.sciencenews.org/article/new-technique-could-help-spot-snooping-drones>">https://www.sciencenews.org/article/new-technique-could-help-spot-snooping-drones retrieved Jan. 24, 2018.
Sim, S., et al., "Next Generation Data Interchange: Tool-to-tool Application Programming Interfaces," IEEE Working Conference on Reverse Engineering, Nov. 25, 2000, pp. 278-280.
Taiwanese Office Action dated Dec. 12, 2018 in TW Application No. 107129150.
Taiwanese Office Action dated Feb. 27, 2020 in TW Application No. 108126548.
Taiwanese Office Action dated May 13, 2019 in TW Application No. 104139217.
Tuokko, R., et al., "Micro and Desktop Factory Road Map", Tampere University of Technology, 2012, pp. 1-114.
TW Notice of Allowance & Search Report (translated) dated Jul. 30, 2021 in TW Application No. 106133985.
TW Office Action dated Jun. 6, 2022 in Application No. TW108115291 With English Translation.
TW Office Action dated Apr. 27, 2023, in application No. TW20220142122 with Englishtranslation.
TW Office Action dated Apr. 29, 2022, in Application No. TW110140314 with English translation.
TW Office Action dated Feb. 16, 2023, in Application No. TW108121734 with English translation.
TW Office Action dated Feb. 24, 2022, in Application No. TW107114102 with English Translation.
TW Office Action dated Jan. 12, 2023 in Application No. TW108115291 with English translation.
TW Office Action dated Jan. 28, 2022, in Application No. TW110109128 with English translation.
TW Office Action dated Jul. 14, 2022, in Application No. TW108121734 with English translation.
TW Office Action dated Jun. 17, 2023, in application No. TW107114217 with English translation.
TW Office Action dated Mar. 15, 2022, in Application No. TW109112242 with Englishtranslation.
TW Office Action dated May 4, 2023 in Application No. TW20180114105 with English translation.
TW Office Action dated Nov. 23, 2022 in Application No. TW107114217 with English translation.
TW Office Action dated Oct. 18, 2023 in TW Application No. 112127320 with English Translation.
TW Office Action dated Oct. 31, 2022, in Application No. TW107114102 with English Translation.
TW Office Action dated Sep. 13, 2022 In Application No. TW20180114105 with English translation.
U.S Advisory Action dated Aug. 31, 2022 in U.S. Appl. No. 16/447,169.
U.S. Corrected Notice of Allowance dated Aug. 10, 2022 in U.S. Appl. No. 17/578,196.
U.S. Corrected Notice of Allowance dated Aug. 31, 2022 in U.S. Appl. No. 17/578,226.
U.S. Non-Final office Action dated Sep. 14, 2022 in U.S. Appl. No. 16/950,774.
U.S. Non-Final office Action dated Sep. 21, 2022 in U.S. Appl. No. 17/301,026.
U.S. Notice of Allowance dated Aug. 3, 2022 in U.S. Appl. No. 17/578,218.
U.S. Notice of Allowance dated Aug. 4, 2022 in U.S. Appl. No. 17/578,226.
U.S. Notice of Allowance dated Aug. 11, 2022 in U.S. Appl. No. 17/578,234.
U.S. Notice of Allowance dated May 12, 2022, in U.S. Appl. No. 17/171,667.
U.S. Restriction Requirement dated May 12, 2022 in U.S. Appl. No. 16/950,774.

(56)     References Cited

OTHER PUBLICATIONS

U.S. Advisory Action dated Apr. 29, 2022 in U.S. Appl. No. 17/328,346.
U.S Advisory Action dated Aug. 23, 2023 in U.S. Appl. No. 17/194,795.
U.S. Advisory Action dated Dec. 15, 2021 in U.S. Appl. No. 16/447,169.
U.S. Advisory Action dated Dec. 23, 2022 in U.S. Appl. No. 17/232,598.
U.S. Advisory Action dated Feb. 3, 2023 in U.S. Appl. No. 16/608,157.
U.S Advisory Action dated Jan. 14, 2022 in U.S. Appl. No. 16/608,159.
U.S Advisory Action dated Jan. 22, 2023 in U.S. Appl. No. 16/550,052.
U.S Advisory Action dated Jun. 9, 2023 in U.S. Appl. No. 16/950,774.
U.S. Appl. No. 62/958,653, inventors Gopinathanasari et al., filed Jan. 8, 2020.
U.S. Appl. No. 62/993,617, inventors Gupta et al., filed Mar. 23, 2020.
U.S. Appl. No. 63/020,819, inventors Gupta et al., filed May 6, 2020.
U.S. Appl. No. 63/029,301, inventors Gupta et al., filed May 22, 2020.
U.S. Appl. No. 63/033,474, inventors Gupta et al., filed Jun. 2, 2020.
U.S. Appl. No. 63/034,792, inventors Gupta et al., filed Jun. 4, 2020.
U.S. Appl. No. 63/041,002, inventors Gupta et al., filed Jun. 18, 2020.
U.S. Appl. No. 63/057,120, Inventors Gupta et al., filed Jul. 27, 2020.
U.S. Appl. No. 63/069,358, inventors Gupta et al., filed Aug. 24, 2020.
U.S. Appl. No. 63/078,805, Inventors Gupta et al., filed Sep. 15, 2020.
U.S. Appl. No. 63/079,851, inventors Gupta et al., filed Sep. 17, 2020.
U.S. Appl. No. 63/106,058, inventors Rasmus-Vorrath et al., filed Oct. 27, 2020.
U.S. Appl. No. 63/115,886, Inventors Gupta et al., filed Nov. 19, 2020.
U.S. Appl. No. 63/133,725, inventors Gopinathanasari et al., filed Jan. 4, 2021.
U.S. Appl. No. 63/159,814, Inventors Gupta et al., filed Mar. 11, 2021.
U.S. Appl. No. 63/173,759, inventors Rasmus-Vorrath et al., filed Apr. 12, 2021.
U.S. Appl. No. 63/209,362, Inventors Gomez-Martinez et al., filed Jun. 10, 2021.
U.S. Appl. No. 63/233,122, inventors Gupta et al., filed Aug. 13, 2021.
U.S. Co-pending Application dated Nov. 11, 2022 in U.S. Appl. No. 17/985,726.
U.S. Corrected Notice of Allowance dated Jan. 6, 2023 in U.S. Appl. No. 16/655,032.
U.S. Corrected Notice of Allowance dated Jun. 27, 2022 in U.S. Appl. No. 16/527,554.
US Corrected Notice of Allowability dated Jun. 4, 2020 in U.S. Appl. No. 16/298,776.
US Corrected Notice of Allowability dated May 3, 2021 in U.S. Appl. No. 16/253,971.
US Corrected Notice of Allowability dated Sep. 22, 2021, in U.S. Appl. No. 17/338,562.
US Corrected Notice of Allowability dated Sep. 23, 2021, in U.S. Appl. No. 16/338,403.
U.S. Corrected Notice of Allowance dated Apr. 28, 2022, in U.S. Appl. No. 15/733,765.
U.S. Corrected Notice of Allowance dated Dec. 4, 2023 in U.S. Appl. No. 17/453,469.
U.S. Corrected Notice of Allowance dated Jul. 17, 2023, in U.S. Appl. No. 17/301,026.

U.S. Corrected Notice of Allowance dated Jun. 12, 2023, in U.S. Appl. No. 17/453,469.
U.S. Corrected Notice of Allowance dated May 26, 2023 in U.S. Appl. No. 17/355,086.
U.S. Corrected Notice of Allowance dated Oct. 24, 2022 in U.S. Appl. No. 17/578,234.
U.S. Corrected Notice of Allowance dated Oct. 31, 2023, in U.S. Appl. No. 17/453,469.
U.S. Corrected Notice of Allowance dated Sep. 18, 2023, in U.S. Appl. No. 16/608,157.
U.S. Corrected Notice of Allowance dated Sep. 25, 2023, in U.S. Appl. No. 16/608,157.
U.S. Final office Action dated Nov. 23, 2022 in U.S. Appl. No. 16/608,157.
U.S. Final Office Action dated Apr. 6, 2023 in U.S. Appl. No. 16/950,774.
US Final Office Action dated Aug. 13, 2021 in U.S. Appl. No. 16/447,169.
US Final Office Action dated Aug. 19, 2021 in U.S. Appl. No. 16/608,159.
U.S. Final office Action dated Dec. 1, 2021 in U.S. Appl. No. 17/328,346.
U.S. Final Office Action dated Dec. 2, 2022 in U.S. Appl. No. 16/550,052.
US Final Office Action dated Dec. 23, 2020 in U.S. Appl. No. 16/338,403.
US Final Office Action dated Feb. 26, 2015 in U.S. Appl. No. 13/479,137.
US Final Office Action dated Jan. 1, 2021 in U.S. Appl. No. 16/550,052.
US Final Office Action dated Jan. 27, 2014 in U.S. Appl. No. 13/479,137.
US Final Office Action dated Jan. 31, 2019 in U.S. Appl. No. 15/534,175.
US Final Office Action dated Jul. 2, 2019 in U.S. Appl. No. 15/691,468.
US Final Office Action dated Jul. 3, 2019 in U.S. Appl. No. 15/623,237.
U.S. Final Office Action dated Jun. 24, 2022, in U.S. Appl. No. 16/447,169.
US Final Office Action dated Mar. 15, 2018 in U.S. Appl. No. 14/951,410.
US Final Office Action dated Mar. 17, 2017 in U.S. Appl. No. 14/887,178.
US Final Office Action dated Mar. 18, 2020 in U.S. Appl. No. 16/253,971.
US Final Office Action dated Mar. 3, 2020 in U.S. Appl. No. 16/508,099.
U.S. Final office Action dated May 19, 2023 in U.S. Appl. No. 17/194,795.
U.S. Final Office Action dated Nov. 15, 2023 in U.S. Appl. No. 17/609,671.
US Final Office Action dated Oct. 28, 2021 in U.S. Appl. No. 16/550,052.
US Final Office Action dated Sep. 19, 2016 in U.S. Appl. No. 14/887,178.
U.S. Final Rejection dated Oct. 18, 2022, in U.S. Appl. No. 17/232,598.
U.S. Non Final office action dated Mar. 28, 2022, in U.S. Appl. No. 17/578,196.
U.S. Non Final office action dated Mar. 28, 2022, in U.S. Appl. No. 17/578,226.
U.S. Non Final office Action dated Sep. 2, 2021 in U.S. Appl. No. 17/328,346.
U.S. Non-Final office Action dated Jan. 23, 2023 in U.S. Appl. No. 17/869,725.
U.S. Non-Final office Action dated Jul. 22, 2022 in U.S. Appl. No. 17/328,346.
U.S. Non-Final office Action dated Nov. 14, 2022 in U.S. Appl. No. 17/804,802.
U.S. Non-Final office Action dated Nov. 15, 2022 in U.S. Appl. No. 16/447,169.

(56) References Cited

OTHER PUBLICATIONS

U.S. Non-Final office Action dated Nov. 15, 2022 in U.S. Appl. No. 17/355,086.
U.S. Non-Final office Action dated Sep. 9, 2022 in U.S. Appl. No. 17/249,442.
U.S. Non-Final Office Action dated Apr. 14, 2023 in U.S. Appl. No. 29/652,916.
U.S. Non-Final Office Action dated Apr. 18, 2023 in U.S. Appl. No. 17/609,671.
U.S. Non-Final Office Action dated Apr. 25, 2023 in U.S. Appl. No. 16/550,052.
U.S. Non-Final Office Action dated Apr. 25, 2023 in U.S. Appl. No. 17/985,720.
U.S. Non-Final Office Action dated Aug. 12, 2022, in U.S. Appl. No. 16/655,032.
U.S. Non-Final Office Action dated Aug. 31, 2023, in U.S. Appl. No. 17/194,795.
U.S. Non-Final Office Action dated Dec. 6, 2022 in U.S. Appl. No. 17/453,469.
U.S. Non-Final office Action dated Dec. 21, 2022 in U.S. Appl. No. 17/194,795.
U.S. Non-Final Office Action dated Dec. 28, 2023 in U.S. Appl. No. 18/310,443.
U.S. Non-Final Office Action dated Feb. 15, 2023 in U.S. Appl. No. 17/083,128.
U.S. Non-Final office Action dated Jan. 27, 2023 in U.S. Appl. No. 17/985,743.
U.S. Non-Final Office Action dated Jul. 15, 2022, in U.S. Appl. No. 16/608,157.
U.S. Non-Final Office Action dated Jul. 20, 2023, in U.S. Appl. No. 17/804,802.
U.S. Non-Final Office Action dated Jul. 24, 2023, in U.S. Appl. No. 16/950,774.
U.S. Non-final Office Action dated Jul. 28, 2022 in U.S. Appl. No. 16/655,032.
U.S. Non-Final Office Action dated Mar. 3, 2023 in U.S. Appl. No. 16/608,157.
U.S. Non-Final office Action dated Mar. 9, 2023 in U.S. Appl. No. 17/909,925.
U.S. Non-Final Office Action dated Mar. 25, 2022, in U.S. Appl. No. 16/550,052.
U.S. Non-Final Office Action dated Mar. 29, 2022, in U.S. Appl. No. 17/578,234.
U.S. Non-Final Office Action dated Nov. 16, 2023 in U.S. Appl. No. 17/194,795.
U.S. Non-Final Office Action dated Oct. 5, 2023, in U.S. Appl. No. 18/115,694.
U.S. Non-Final Office Action dated Oct. 24, 2022, in U.S. Appl. No. 17/486,716.
U.S. Non-Final Office Action dated Oct. 28, 2021 in U.S. Appl. No. 15/733,765.
U.S. Non-Final Office Action dated Oct. 29, 2021 in U.S. Appl. No. 16/527,554.
U.S. Non-Final Office Action dated Sep. 29, 2023, in U.S. Appl. No. 17/989,603.
U.S. Notice of Allowance dated Jan. 9, 2023 in U.S. Appl. No. 17/328,346.
US Notice of Allowability (supplemental) dated Sep. 30, 2020 in U.S. Appl. No. 15/123,069.
US Notice of Allowance (corrected) dated Apr. 18, 2019 in U.S. Appl. No. 15/320,725.
U.S. Notice of Allowance dated Apr. 11, 2023 in U.S. Appl. No. 17/232,598.
U.S. Notice of Allowance dated Apr. 12, 2023 in U.S. Appl. No. 16/447,169.
US Notice of Allowance dated Apr. 17, 2019 in U.S. Appl. No. 15/534,175.
US Notice of Allowance dated Apr. 17, 2019 in U.S. Appl. No. 15/910,936.
U.S. Notice of Allowance dated Apr. 25, 2023 in U.S. Appl. No. 17/985,726.
U.S. Notice of Allowance dated Apr. 26, 2023 in U.S. Appl. No. 17/232,598.
US Notice of Allowance dated Apr. 6, 2020 in U.S. Appl. No. 16/298,776.
U.S. Notice of Allowance dated Apr. 6, 2022, in U.S. Appl. No. 15/733,765.
US Notice of Allowance dated Apr. 9, 2020 in U.S. Appl. No. 15/123,069.
U.S. Notice of Allowance dated Aug. 1, 2022 in U.S. Appl. No. 17/578,196.
U.S. Notice of Allowance dated Aug. 3, 2023, in U.S. Appl. No. 17/869,725.
U.S. Notice of Allowance dated Aug. 10, 2023 in U.S. Appl. No. 17/301,026.
U.S. Notice of Allowance dated Aug. 23, 2023 in U.S. Appl. No. 17/909,925.
U.S. Notice of Allowance dated Aug. 29, 2023 in U.S. Appl. No. 17/486,716.
U.S. Notice of Allowance dated Dec. 7, 2023 in U.S. Appl. No. 17/985,720.
U.S. Notice of Allowance dated Dec. 12, 2023 in U.S. Appl. No. 17/486,716.
US Notice of Allowance dated Dec. 13, 2018 in U.S. Appl. No. 15/978,029.
U.S. Notice of Allowance dated Dec. 13, 2023 in U.S. Appl. No. 17/453,469.
US Notice of Allowance dated Dec. 14, 2018 in U.S. Appl. No. 15/910,936.
U.S. Notice of Allowance dated Dec. 21, 2023 in U.S. Appl. No. 17/909,925.
U.S. Notice of Allowance dated Dec. 29, 2022 in U.S. Appl. No. 16/655,032.
US Notice of Allowance dated Dec. 31, 2020 in U.S. Appl. No. 16/523,624.
US Notice of Allowance dated Dec. 31, 2020 in U.S. Appl. No. 16/555,377.
US Notice of Allowance dated Dec. 7, 2020 in U.S. Appl. No. 16/508,099.
U.S. Notice of Allowance dated Feb. 7, 2023 in U.S. Appl. No. 17/249,442.
U.S. Notice of Allowance dated Feb. 9, 2023 in U.S. Appl. No. 17/232,598.
U.S. Notice of Allowance dated Feb. 14, 2022 in U.S. Appl. No. 16/608,159.
U.S. Notice of Allowance dated Feb. 14, 2023 in U.S. Appl. No. 17/355,086.
U.S. Notice of Allowance dated Feb. 16, 2022 in U.S. Appl. No. 16/664,089.
US Notice of Allowance dated Feb. 4, 2021 in U.S. Appl. No. 16/253,971.
U.S. Notice of Allowance dated Jan. 8, 2024 in U.S. Appl. No. 17/989,603.
U.S. Notice of Allowance dated Jul. 6, 2023 in U.S. Appl. No. 17/870,480.
US Notice of Allowance dated Jul. 1, 2020 in U.S. Appl. No. 15/623,237.
U.S. Notice of Allowance dated Jul. 13, 2023 in U.S. Appl. No. 16/447,169.
U.S. Notice of Allowance dated Jul. 13, 2023 in U.S. Appl. No. 17/940,951.
US Notice of Allowance dated Jul. 17, 2019 in U.S. Appl. No. 15/123,069.
US Notice of Allowance dated Jul. 17, 2019 in U.S. Appl. No. 15/320,725.
US Notice of Allowance dated Jul. 25, 2019 in U.S. Appl. No. 15/534,175.
U.S. Notice of Allowance dated Jun. 7, 2023 in U.S. Appl. No. 17/453,469.
U.S. Notice of Allowance dated Jun. 7, 2023 in U.S. Appl. No. 17/870,480.

(56)        References Cited

OTHER PUBLICATIONS

U.S Notice of Allowance dated Jun. 8, 2022 in U.S. Appl. No. 15/733,765.
U.S. Notice of Allowance dated Jun. 9, 2023 in U.S. Appl. No. 17/985,743.
U.S. Notice of Allowance dated Jun. 12, 2023, in U.S. Appl. No. 17/940,951.
U.S. Notice of Allowance dated Jun. 13, 2022, in U.S. Appl. No. 17/081,809.
US Notice of Allowance dated Jun. 14, 2021 in U.S. Appl. No. 16/338,403.
U.S. Notice of Allowance dated Jun. 16, 2023, in U.S. Appl. No. 17/301,026.
U.S. Notice of Allowance dated Jun. 20, 2022 in U.S. Appl. No. 16/527,554.
U.S. Notice of Allowance dated Jun. 22, 2023, in U.S. Appl. No. 17/985,726.
U.S. Notice of Allowance dated Jun. 23, 2023, in U.S. Appl. No. 17/985,743.
US Notice of Allowance dated Mar. 10, 2021 in U.S. Appl. No. 15/691,468.
US Notice of Allowance dated Mar. 20, 2019 in U.S. Appl. No. 15/320,725.
US Notice of Allowance dated Mar. 26, 2021 in U.S. Appl. No. 16/254,434.
U.S. Notice of Allowance dated Mar. 31, 2023 in U.S. Appl. No. 17/249,442.
US Notice of Allowance dated Mar. 9, 2018 in U.S. Appl. No. 14/887,178.
US Notice of Allowance dated May 14, 2015 in U.S. Appl. No. 13/479,137.
US Notice of Allowance dated May 14, 2019 in U.S. Appl. No. 15/623,235.
U.S. Notice of Allowance dated May 18, 2022, in U.S. Appl. No. 17/081,809.
U.S. Notice of Allowance dated May 19, 2023 in U.S. Appl. No. 17/249,442.
U.S. Notice of Allowance dated May 22, 2023 in U.S. Appl. No. 17/486,716.
U.S. Notice of Allowance dated May 23, 2023 in U.S. Appl. No. 17/869,725.
U.S. Notice of Allowance dated May 26, 2023, in U.S. Appl. No. 17/453,469.
US Notice of Allowance dated May 6, 2020 in U.S. Appl. No. 15/623,237.
US Notice of Allowance dated Nov. 28, 2018 in U.S. Appl. No. 15/123,069.
US Notice of Allowance dated Nov. 3, 2020 in U.S. Appl. No. 15/691,468.
US Notice of Allowance dated Oct. 7, 2021 in U.S. Appl. No. 16/664,089.
US Notice of Allowance dated Oct. 14, 2021 in U.S. Appl. No. 16/664,089.
U.S. Notice of Allowance dated Oct. 17, 2023 in U.S. Appl. No. 17/985,720.
US Notice of Allowance dated Oct. 22, 2018 in U.S. Appl. No. 14/951,410.
US Notice of Allowance dated Sep. 3, 2021, in U.S. Appl. No. 17/338,562.
U.S. Notice of Allowance dated Sep. 12, 2023 in U.S. Appl. No. 16/608,157.
U.S. Notice of Allowance dated Sep. 19, 2023 in U.S. Appl. No. 16/550,052.
U.S. Notice of Allowance dated Sep. 20, 2023, in U.S. Appl. No. 17/453,469.
US Notice of Allowance (supplemental) dated Jun. 12, 2015 in U.S. Appl. No. 13/479,137.
US Office Action dated Apr. 1, 2022 in U.S. Appl. No. 17/578,218.
U.S. Office Action dated Apr. 4, 2022, in U.S. Appl. No. 16/608,157.
US Office Action dated Apr. 27, 2018 in U.S. Appl. No. 15/123,069.

US Office Action dated Aug. 21, 2019 in U.S. Appl. No. 16/508,099.
US Office Action dated Aug. 22, 2019 in U.S. Appl. No. 16/298,776.
US Office Action dated Aug. 7, 2018 in U.S. Appl. No. 15/910,936.
US Office Action dated Aug. 7, 2020 in U.S. Appl. No. 16/338,403.
US Office Action dated Feb. 4, 2019 in U.S. Appl. No. 15/623,235.
US Office Action dated Feb. 7, 2019 in U.S. Appl. No. 15/623,237.
US Office Action dated Feb. 7, 2019 in U.S. Appl. No. 15/691,468.
US Office Action dated Jan. 19, 2021 in U.S. Appl. No. 16/608,159.
US Office Action dated Jan. 25, 2021 in U.S. Appl. No. 16/447,169.
US Office Action dated Jul. 21, 2020 in U.S. Appl. No. 16/523,624.
US Office Action dated Jul. 21, 2020 in U.S. Appl. No. 16/555,377.
US Office Action dated Jul. 23, 2020 in U.S. Appl. No. 16/508,099.
US Office Action dated Jul. 24, 2018 in U.S. Appl. No. 15/978,029.
US Office Action dated Jul. 25, 2019 in U.S. Appl. No. 16/253,971.
US Office Action dated Jul. 29, 2020 in U.S. Appl. No. 16/253,971.
US Office Action dated Jul. 3, 2014 in U.S. Appl. No. 13/479,137.
US Office Action dated Jul. 6, 2018 in U.S. Appl. No. 15/534,175.
US Office Action dated Mar. 25, 2016 in U.S. Appl. No. 14/887,178.
US Office Action dated May 5, 2021 in U.S. Appl. No. 16/550,052.
US Office Action dated May 6, 2020 in U.S. Appl. No. 15/691,468.
US Office Action dated Oct. 23, 2017 in U.S. Appl. No. 14/887,178.
US Office Action dated Sep. 11, 2017 in U.S. Appl. No. 14/951,410.
US Office Action dated Sep. 18, 2020 in U.S. Appl. No. 16/550,052.
US Office Action dated Sep. 23, 2013 in U.S. Appl. No. 13/479,137.
US Office Action dated Sep. 30, 2020 in U.S. Appl. No. 16/254,434.
US Office Action dated Sep. 4, 2018 in U.S. Appl. No. 15/320,725.
U.S. Appl. No. 16/338,403, inventors Shrivastava et al., filed Mar. 29, 2019.
U.S. Appl. No. 17/338,562, inventors Trikha et al., filed Jun. 3, 2021.
U.S. Appl. No. 63/124,673, inventors Tai et al., filed Dec. 11, 2020.
U.S. Appl. No. 63/135,021, inventors Martinson et al., filed Jan. 8, 2021.
U.S. Appl. No. 63/146,365, inventors Brown et al., filed Feb. 5, 2021.
U.S. Appl. No. 63/163,305, inventors Trikha et al., filed Mar. 19, 2021.
U.S. Appl. No. 63/171,871, inventors Gomez-Martinez et al., filed Apr. 7, 2021.
U.S. Appl. No. 63/181,648, inventors Makker et al., filed Apr. 29, 2021.
U.S. Appl. No. 63/187,632, inventors Hur et al., filed May 12, 2021.
U.S. Appl. No. 63/211,400, inventors Martinson et al., filed Jun. 16, 2021.
U.S. Appl. No. 63/226,127, inventors Lee et al., filed Jul. 21, 2021.
U.S. Appl. No. 63/085,254, Inventors Young et al., filed Sep. 30, 2020.
U.S. Appl. No. 63/115,842, Inventors Martinson et al., filed Nov. 19, 2020.
U.S. Appl. No. 63/154,352, Inventors Martinson et al., filed Feb. 26, 2021.
U.S. Appl. No. 63/170,245, Inventors Martinson et al., filed Apr. 2, 2021.
U.S. Appl. No. 63/212,483, inventors Martinson et al., filed Jun. 18, 2021.
U.S. Appl. No. 63/246,770, Inventors Martinson et al., filed Sep. 21, 2021.
U.S. Appl. No. 63/247,684, Inventors Martinson et al., filed Sep. 23, 2021.
U.S. Appl. No. 63/214,741, inventors Marquez et al., filed Jun. 24, 2021.
U.S. Appl. No. 17/791,507, inventors Gopinathanasari et al., filed Jul. 7, 2022.
U.S. Appl. No. 17/899,019, inventors Trikha et al., filed Aug. 30, 2022.
U.S. Appl. No. 17/910,722, inventor Trikha et al., filed Sep. 9, 2022.
U.S. Appl. No. 17/989,603, Inventors Shrivastava et al., filed Nov. 17, 2022.
U.S. Appl. No. 18/028,292, inventors Martinson et al., filed Mar. 24, 2023.
U.S. Appl. No. 18/028,297, inventors Martinson et al., filed Mar. 24, 2023.
U.S. Appl. No. 18/037,067, inventors Tai et al., filed May 15, 2023.

(56) References Cited

OTHER PUBLICATIONS

U.S. Appl. No. 18/281,913 inventors Trikha N, et al., filed Sep. 13, 2023.
U.S. Appl. No. 18/286,521, inventors Rasmus et al., filed Oct. 11, 2023.
U.S. Appl. No. 18/492,495, inventors Trikha N, et al., filed Oct. 23, 2023.
U.S. Appl. No. 18/513,707, inventors Vangati M R, et al., filed Nov. 20, 2023.
U.S. Appl. No. 18/514,589, inventors Trikha NP, filed Nov. 20, 2023.
U.S. Appl. No. 18/555,129, inventors MakkerT, et al., filed Oct. 12, 2023.
U.S. Appl. No. 18/555,275, inventors Hur Yerang et al., filed Oct. 13, 2023.
U.S. Appl. No. 18/565,563, inventors Gomez-Martinez F V, et al., filed Nov. 30, 2023.
U.S. Appl. No. 29/652,916, inventors Martinson et al., filed Jan. 8, 2021.
US Preliminary Amendment dated Apr. 6, 2020 in U.S. Appl. No. 16/550,052.
US Preliminary Amendment dated Dec. 31, 2019 in U.S. Appl. No. 16/608,159.
US Preliminary Amendment dated Mar. 31, 2020 in U.S. Appl. No. 16/608,157.
US Preliminary Amendment dated Nov. 13, 2019 in U.S. Appl. No. 16/447,169.
U.S. Restriction Requirement dated Dec. 12, 2022 in U.S. Appl. No. 29/652,916.
U.S. Supplemental Notice of Allowance dated Aug. 1, 2022 in U.S. Appl. No. 17/171,667.
Woods, D ., "The Alarm Problem and Directed Attention in Dynamic Fault Management.", Ergonomics, 1995, vol. 38, No. 11, pp. 2371-2393.
CA Office Action dated Aug. 13, 2024 in CA Application No. 3062818.
CA Office Action dated Feb. 9, 2024 in CA Application No. 3173471.
CA Office Action dated Feb. 13, 2024 in CA Application No. 3173667.
CN Board Opinion dated Sep. 23, 2024 in CN Application No. 202080022001.X with English translation.
CN Office Action dated Apr. 11, 2024 in CN Application No. 201980003232.3 with English translation.
CN Office Action dated Dec. 6, 2024 in CN Application No. 202080040374.X, with English Translation.
CN Office Action dated Dec. 12, 2023 in CN Application No. 201980003232.3, withEnglish Translation.
CN Office Action dated Jan. 13, 2024 in CN Application No. 202080078084.4, withEnglish Translation.
CN Office Action dated May 15, 2024 in CN Application No. 202080078084.4, with English Translation.
CN Office Action dated Nov. 25, 2024 in CN Application No. 202080078084.4, with English Translation.
CN Office Action dated Sep. 25, 2024 in CN Application No. 201980003232.3 with English translation.
EP Extended European Search report dated Dec. 4, 2024 in EP Application No. 21876368.8.
EP Extended European Search report dated Jan. 30, 2024 in EP Application No. 23218327.7.
EP Extended European Search report dated Mar. 6, 2024 in EP Application No. 23214710.8.
EP Extended European Search Report dated May 28, 2024 in EP Application No. 21775725.1.
EP Office Action dated Feb. 21, 2024 in EP Application No. 20729442.2.
EP Office Action dated Jan. 19, 2024 in EP Application No. 20746440.5.
EP Office Action dated Jul. 2, 2024 in EP Application No. 19188907.0.

EP Office Action dated Jul. 5, 2024, in EP Application No. 19745809.4.
EP Office Action dated Nov. 28, 2024 in EP Application No. 20712740.8.
EP Partial Supplementary European Search report dated Mar. 6, 2024, in EP Application No. 21775725.1.
EP Partial Supplementary European Search report dated Sep. 12, 2024 in EP Application No. 21876368.8.
International Preliminary Report on Patentability and Written Opinion dated Feb. 8, 2024 in PCT Application No. PCT/US2022/074162.
International Search Report and Written Opinion dated Apr. 17, 2024 in PCT Application No. PCT/US2023/084708.
International Search Report and Written Opinion dated Jan. 15, 2024 in PCT Application No. PCT/US2023/074952.
JP Office Action dated Feb. 7, 2024 in JP Application No. 2022-520878, with English Translation.
JP Office Action dated Feb. 13, 2024 in JP Application No. 2020-560912, with EnglishTranslation.
JP Office Action dated Jun. 11, 2024 in JP Application No. 2021-564914, with English Translation.
KR Office Action dated Aug. 28, 2024 in KR Application No. 10-2021-7040307, with English Translation.
Lee E., et al., "The Design and Evaluation of Integrated Envelope and Lighting Control Strategies for Commercial Buildings," Energy & Environment division, 1994, pp. 1-23.
TW Notice of Allowance and Search Report dated Nov. 14, 2024 in TW Application No. 109144085, with English Translation.
TW Notice of Allowances dated Jul. 19, 2024 in TW Application No. 112127320 with English translation.
TW Office Action dated Apr. 29, 2024 in TW Application No. 112127320, with English translation.
U.S. Advisory Action dated Aug. 22, 2024 in U.S. Appl. No. 17/194,795.
U.S. Corrected Notice of Allowance dated Aug. 5, 2024 in U.S. Appl. No. 18/310,443.
U.S. Corrected Notice of Allowance dated Nov. 5, 2024 in U.S. Appl. No. 18/028,293.
U.S. Corrected Notice of Allowance dated Oct. 28, 2024 in U.S. Appl. No. 18/237,146.
U.S. Final Office Action dated Dec. 16, 2024 in U.S. Appl. No. 17/634,150.
U.S. Final Office Action dated May 8, 2024 in U.S. Appl. No. 17/194,795.
U.S. Non Final Office Action dated Mar. 21, 2024, in U.S. Appl. No. 17/634,150.
U.S. Non-Final Office Action dated Apr. 11, 2024 in U.S. Appl. No. 18/218,475.
U.S. Non-Final Office Action dated Apr. 24, 2024 in U.S. Appl. No. 18/237,146.
U.S. Non-Final Office Action dated Aug. 28, 2024 in U.S. Appl. No. 18/428,413.
U.S. Non-Final Office Action dated Dec. 12, 2024 in U.S. Appl. No. 17/666,355.
U.S. Non-Final Office Action dated Feb. 23, 2024 in U.S. Appl. No. 17/313,760.
U.S. Non-Final Office Action dated Jan. 24, 2024 in U.S. Appl. No. 17/609,671.
U.S. Non-Final Office Action dated Jul. 16, 2024 in U.S. Appl. No. 18/513,707.
U.S. Non-Final Office Action dated Jun. 12, 2024 in U.S. Appl. No. 17/300,303.
U.S. Non-Final Office Action dated May 21, 2024 in U.S. Appl. No. 18/028,293.
U.S. Non-Final Office Action dated May 31, 2024 in U.S. Appl. No. 17/612,479.
U.S. Non-Final Office Action dated Oct. 11, 2024 in U.S. Appl. No. 18/492,495.
U.S. Non-Final Office Action dated Sep. 24, 2024 in U.S. Appl. No. 17/679,027.
U.S. Notice of Allowance dated Feb. 14, 2024 in U.S. Appl. No. 17/989,603.

(56)     References Cited

OTHER PUBLICATIONS

U.S. Notice of Allowance dated Feb. 28, 2024 in U.S. Appl. No. 17/989,603.
U.S. Notice of Allowance dated Jan. 16, 2025 in U.S. Appl. No. 18/218,475.
U.S. Notice of Allowance dated Jul. 2, 2024 in U.S. Appl. No. 18/514,589.
U.S. Notice of Allowance dated Mar. 29, 2024 in U.S. Appl. No. 18/115,694.
U.S. Notice of Allowance dated May 1, 2024 in U.S. Appl. No. 18/310,443.
U.S. Notice of Allowance dated May 10, 2024 in U.S. Appl. No. 17/609,671.
U.S. Notice of Allowance dated May 23, 2024 in U.S. Appl. No. 17/609,671.
U.S. Notice of Allowance dated Oct. 15, 2024 in U.S. Appl. No. 17/612,479.
U.S. Notice of Allowance dated Oct. 17, 2024 in U.S. Appl. No. 18/237,146.
U.S. Notice of Allowance dated Oct. 18, 2024 in U.S. Appl. No. 18/028,293.
U.S. Notice of Allowance dated Oct. 29, 2024 in U.S. Appl. No. 17/612,479.
U.S. Notice of Allowance dated Sep. 11, 2024 in U.S. Appl. No. 17/194,795.
U.S. Notice of Allowance dated Sep. 12, 2024 in U.S. Appl. No. 18/213,843.

U.S. Notice of Allowance dated Sep. 26, 2024 in U.S. Appl. No. 18/218,475.
U.S. Appl. No. 18/896,396, inventors Trikha N, et al., filed Sep. 25, 2024.
U.S. Appl. No. 18/898,810, inventors Shrivastava D, et al., filed Sep. 27, 2024.
U.S. Appl. No. 18/905,745, inventor Khanna N, filed Oct. 3, 2024.
U.S. Appl. No. 18/930,277, inventors Shrivastava D, et al., filed Oct. 29, 2024.
U.S. Appl. No. 18/930,286, inventors Rozbicki R.T, et al., filed Oct. 29, 2024.
U.S. Appl. No. 18/933,543, inventors Martinson R.M, et al., filed Oct. 31, 2024.
U.S. Appl. No. 18/974,016, inventors Vangati M.R et al., filed Dec. 9, 2024.
U.S. Appl. No. 18/986,170, inventors Trikha N et al., filed Dec. 18, 2024.
U.S. Restriction Requirement dated Jan. 24, 2024 in U.S. Appl. No. 17/612,479.
U.S. Restriction Requirement dated Jul. 25, 2024 in U.S. Appl. No. 18/492,495.
U.S. Restriction requirement dated Sep. 5, 2024 in U.S. Appl. No. 17/759,709.
U.S. Restriction requirement dated Sep. 24, 2024 in U.S. Appl. No. 17/922,219.
Zheng, Z., et al., "Subscription to Multiple Stream Originators, Draft-zhou-netconf-multi- stream-originators-10," Internet Engineering Task Force, 2019, vol. 6, pp. 1-21.

* cited by examiner

200

230    210

260

215

214

250    225

260

220

280

270

290    Network

2511
Displays

2512
Personalized
Health

2513
Edge
Computing 2514
5G
Connectivity

2520
OS
Distributed Containers

2521
Digital Twin
Building, Sensors,
Network Nodes

2522
Digital Security
TLS v1.2,
128AES-256SHA Crypto

2523
AI/Machine Learning
RNN, MRT, AER,
TLSG, RTLS

2530
Network
OT Network

2531
Power
24v DC

2532
Data
Gbps Linear Coax
Ethernet, Fiber

2533
Compute
x86 & ARM cores,
GB RAM, TB SSDs

| User enters a digital collaboration unit | 2701 |

| Adjust (e.g., move) media display, physical work surface, lighting, cabling and/or other portions of digital collaboration unit. | 2702 |

| Conduct digital collaboration with remote user | 2703 |

| User enters a digital collaboration unit | 2801 |

| Adjust (e.g., move) wall portion of digital collaboration unit to hinder viewing onto the media display and/or onto the user disposed in the digital collaboration unit | 2802 |

| Conduct digital collaboration with remote user | 2803 |

IMMERSIVE COLLABORATION OF REMOTE PARTICIPANTS VIA MEDIA DISPLAYS

CROSS REFERENCE TO RELATED APPLICATIONS

An Application Data Sheet is filed concurrently with this specification as part of the present application. Each application that the present application claims benefit of or priority to as identified in the concurrently filed Application Data Sheet is incorporated herein by reference in its entirety and for all purposes. This application is also related to: U.S. patent application Ser. No. 17/249,148, filed Feb. 22, 2021, titled "CONTROLLING OPTICALLY-SWITCHABLE DEVICES," and to U.S. patent application Ser. No. 16/946,947, filed Jul. 13, 2020, titled "AUTOMATED COMMISSIONING OF CONTROLLERS IN A WINDOW NETWORK," each of which patent applications is incorporated herein by reference in its entirety and for all purposes.

BACKGROUND

This disclosure relates generally to improved digital experience that provides users an enhanced immersive experience, which simulates common presence of a virtual participant (and optional related virtual auxiliary content) and physically present participants in a conference.

Various facilities (e.g., buildings) have windows installed, e.g., in their facades. The windows provide a way to view an environment external to the facility. In some facilities, the window may take a substantial portion (e.g., more than about 30%, 40%, 50%, or 80% of a surface area) of a facility facade. Users may request utilization of at least a portion of the window surface area to view various media. The media may be for entertainment, educational, safety, health, and/or work purposes. The media may facilitate processing, presenting, and/or sharing data. The media may be or the purpose of conducting a conference such as in the form of a video conference with one or more remote parties. At times, a user may want to optimize usage of an interior space of the facility to visualize the media (e.g., by using the window surface area). The media may comprise an electronic media, digital media, and/or optical media. A user may request viewing the media with an ability to view through at least a portion of the window (e.g., with minimal impact on visibility through the window). The media may be displayed via a display that is at least partially transparent (e.g., to visible light). At times viewing the media may require a tinted (e.g., darker) backdrop, At times, a user may want to augment external views and/or projections of the display with overlays, augmented reality, and/or lighting.

At times, interactions over conventional video conferencing feel unnatural and/or distant. For example, it may be difficult to make pupil to pupil eye contact, e.g., because of the arrangement of each of the cameras being offset from the direction of the participants' gaze toward the display. The image may appear flat and/or detached from the real surrounding. Surroundings of the participant at the other end of a video conference may be disjointed from a local surroundings. When auxiliary text and/or graphic materials are shared and displayed by participant(s) at a first location, live updating of the materials has required cumbersome passing of control over the content from participant(s) at a first location to participant(s) at a distant second location (e.g., at another room, another building, or otherwise at another facility).

The user interaction may occur by way of media display construct(s) and imaging device(s). The imaging device may be associated with one or more interactive targets in an enclosure. The interactive target(s) can comprise an optically switchable device (e.g., tintable window of a facility), projected media, environmental appliance, sensor, emitter, and/or any other apparatus that is communicatively coupled to a network in an enclosure, which network facilitates power and/or communication.

In some embodiments, included in these device(s) are optically switchable window(s). The development and deployment of optically switchable windows for enclosures (e.g., buildings and other facilities) have increased as considerations of energy efficiency and system integration gain momentum. Electrochromic windows are a promising class of optically switchable windows. Electrochromism is a phenomenon in which a material exhibits a reversible electrochemically-mediated change in one or more optical properties when stimulated to a different electronic state. Electrochromic materials and the devices made from them may be incorporated into, for example, windows for home, commercial, or other use. The color, shade, hue, tint, transmittance, absorbance, and/or reflectance of electrochromic windows can be changed, e.g., by inducing a change in the electrochromic material. For example, by applying a voltage across the electrochromic material. Such capabilities can allow for control over the intensities of various (e.g., visible light) wavelengths of light that may pass through the window. One area of interest is control systems for driving optical transitions in optically switchable windows to provide requested lighting conditions, e.g., while reducing the power consumption of such devices and/or improving the efficiency of systems with which they are integrated.

SUMMARY

Various aspects disclosed herein alleviate as least part of the shortcomings and/or materialize at least part of the aspirations related to digital collaboration of participants located remotely from one another.

Various embodiments herein relate to methods, systems, software and networks for providing an immersive experience, which simulates common presence of a virtual participant(s) and/or related virtual auxiliary content, and present (e.g. local) participant(s) in conference (e.g., enabled by video conferencing). Such simulation may include (i) using an at least partially transparent media display having a portion of its projecting entities (e.g., pixels) projecting the virtual participant's image and/or (e.g., select) virtual auxiliary content, while keeping at least a portion of the background at least partially transparent (e.g., to visible light), (ii) optionally disposing optical sensor(s) (e.g., included in a camera) behind the transparent media display at the gaze of the participant, and (iii) optionally using added virtual overlays (e.g., plants, furniture) to the virtual image that are consistent with the local environment, which virtual overlays appear perspectively close to the local participants, e.g., to provide a sense of depth ranging from the overlays to the virtual participant projection and/or to the background showing through the transparent media display. Placement of the optical sensor(s) (e.g., camera) behind and at the gaze of the real participant, may allow the participant to view the virtual participant while simultaneously being photographed at the real (e.g., actual) participant's gaze (e.g., focal point). The transparent media display can include touchscreen functionality, e.g., for shared access to any auxiliary documents (e.g., a virtual whiteboard), e.g., making it seem as if the users are sharing the same physical document in real time.

In another aspect, a method for digital collaboration, the method comprises:

(A) establishing a communication link between (i) a first processor operatively coupled to a first media display and associated sensor disposed at a first location occupied by at least one first user and (ii) a second processor operatively coupled to a second media display disposed at a second location occupied by at least one second user; and (B) displaying, with the first media display at the first location, a media stream from the second processor communicated to the first media display via the communication link, wherein a portion of the media stream is suppressed from being displayed on the first media display that is at least partially transparent to visible light, which suppression enables viewing at least a portion of the first location through a portion of the first media display corresponding to the media stream that is suppressed.

In some embodiments, the second processor is operatively coupled to an other sensor configured to capture to at least one second user in the second location. In some embodiments, the communication link comprises a machine to machine communication. In some embodiments, the portion of the media stream which is suppressed comprises a region around an other portion of the media stream which depicts the second user. In some embodiments, the first media display comprises a transparent display, and wherein the portion of the media stream which is suppressed facilitates at least partial viewing of the first location of the first user through the transparent display. In some embodiments, the transparent display facilitates transmission of at least about 30% of light in the visible spectrum therethrough. In some embodiments, the transparent display facilitates transmission of from about 20% to about 90% of light in the visible spectrum therethrough. In some embodiments, the first media display is coupled to a tintable window. In some embodiments, the tintable window alters visibility, color, transmission, and/or reflectance of visible light. In some embodiments, the tintable window comprises an electrochromic device. In some embodiments, the electrochromic device is included in an insulated glass unit configured for installation in an enclosure. In some embodiments, the transparent display spans at least about 30% of an area of the tintable window. In some embodiments, the transparent display spans from about 10% to about 100% of an area of the tintable window. In some embodiments, the tintable window is coupled to a control system configured for adjusting a tint of the tintable window. In some embodiments, the control system comprises, or is operatively coupled to, a building management system. In some embodiments, the control system comprises a distributed network of controllers. In some embodiments, the control system comprises a hierarchical control system in which a master controller is configured to control one or more local controllers. In some embodiments, the control system comprises a controller that is included in a device ensemble, wherein the device ensemble is disposed in an enclosure. In some embodiments, the device ensemble comprises (i) sensors or (ii) a sensor and an emitter. In some embodiments, the device ensemble is disposed in a fixture (e.g., framing portion, ceiling, or wall). In some embodiments, the device ensemble is disposed in a non-fixture (e.g., a furniture, a billboard, or another tangible and movable asset). In some embodiments, the device ensemble comprises (i) a plurality of processors or (ii) a plurality of circuit boards. In some embodiments, the method further comprises (C) displaying on the first media display at least one virtual object which depicts a furnishing that spatially appears to be disposed between (i) the first user and (ii) the media stream displayed on the first media display. In some embodiments, the at least one virtual object is displayed so that it provides an apparent depth which is in front of an apparent depth of the depiction of the second user. In some embodiments, the at least one virtual object is configured to flank a depiction of the at least one second user at least during a portion of streaming the media stream of the at least one second user. In some embodiments, the sensor is an image sensor associated with the first media display, which sensor is configured to capture a first user of the at least one first user, for generating an other media stream to be communicated via the communication link to the second media display, which other media stream is associated with the first location, which first user gazes towards the first media display. In some embodiments, the method further comprises adjusting the capture location to focus on a central, or on a substantially central, position (i) between pupils of a first user of the at least one first user, (ii) between brows of the first user, and/or (iii) at the end of a nose bride of the first user. In some embodiments, the position is vertically aligned, horizontally aligned, or both vertically and horizontally aligned. In some embodiments, adjustment of the capture location is performed manually at least in part. In some embodiments, adjustment of the capture location is performed automatically. In some embodiments, adjustment of the capture location is based at least in part on image processing, machine learning, and/or artificial intelligence. In some embodiments, adjustment of the capture location is controlled by at least one controller. In some embodiments, adjustment of the capture location is controlled by a control system configured to control at least one other device of a facility in which the first media display is disposed. In some embodiments, the method further comprises using the sensor for generating the other media stream from a capture location which corresponds to a gazing region of the first user directed towards the first media display. In some embodiments, the sensor is movable with respect to the first media display, the method further comprising adjusting the capture location to match the gazing region of the first user. In some embodiments, adjustment of the capture location is performed manually at least in part. In some embodiments, adjustment of the capture location is performed automatically according to a captured image of the first user. In some embodiments, the first user is disposed on a first side of the media display, and wherein the capture location of the sensor is disposed on a second side of the first media display that is at least partially transparent to visible light, such that the media stream depicts the first user using images passing through the transparent display of the first media display, which first side is an opposite of the first media display relative to the second side. In some embodiments, the first media display that is at least transparent to visible light is configured to allow at least a portion of the visible light to pass therethrough. In some embodiments, the first media display is configured to allow visible light to pass therethrough when the first media display is nonoperational and/or when the first media display is operational. In some embodiments, the sensor is mounted on a movable carriage driven by the at least one controller. In some embodiments, the first media display is coupled to a tintable window. In some embodiments, the tintable window is an integrated glass unit, and wherein the movable carriage is (i) configured for planar motion, and (ii) disposed in an interior of the integrated glass unit. In some embodiments, the first media display includes a transparent substrate integrating a plurality of light emitting pixels, and wherein the sensor comprises a plurality of sensels disposed on the transparent substrate. In some embodiments, comprising displaying on the first media display and/or the second media display a shared auxiliary content at a region of the first media display and/or at a region of the second media display. In some embodiments, (i) the region of the first media excludes depictions of the at least one second user and/or (ii) the region of the second media excludes depictions of the at least one second user. In some embodiments, the shared auxiliary content is updatable by the at least one first user, by the at least one second user, or by both the at least one first user and the at least one second user. In some embodiments, the region displaying the shared auxiliary content is configured to facilitate touchscreen capability for modifying the shared auxiliary content. In some embodiments, the shared auxiliary content is digitally stored in storage which is responsive to the at least one first user and/or to the at least one second user via an auxiliary communication link. In some embodiments, at least one of the first media display and the second media display, is disposed in an individual portal laid out within an enclosure. In some embodiments, at least one of the first media display and the second media display, is disposed in a small group pod laid out within an enclosure. In some embodiments, at least one of the first media display and the second media display, is disposed in a large group zone laid out within an enclosure. In some embodiments, at least one of the first media display and the second media display, is disposed on a freestanding panel laid out within an enclosure. In some embodiments, at least one of the first media display and the second media display, is disposed in an activity hub laid out within an enclosure. In some embodiments, the method further comprises displaying, with the second media display at the second location, an other media stream of the at least the one first user sent to the second media display from the first media display via the communication link, wherein a first portion of the other media stream is suppressed from being displayed on the second media display that is at least partially transparent to visible light, to facilitate viewing of at least a portion of the second location through a portion of the second media display corresponding to the other media stream that is suppressed. In some embodiments, the other media stream of the at least one second user includes a video stream captured by an other sensor associated with the second media display, and wherein the other sensor captures the video stream from a second capture location which corresponds to a gazing region of a second user of the at least one second user, on the second media display.

In another aspect, an apparatus for digital collaboration, the apparatus comprises at least one controller configured to perform, or direct performance of, of any of the methods disclosed above.

In another aspect, an apparatus for digital collaboration, the apparatus comprises at least one controller configured to: (A) operatively couple to a first processor that is operatively coupled to a first media display disposed at a first location occupied by at least one first user, which operatively coupling of the first processor is via a communication link to a second processor that is operatively coupled to a second media display disposed at a second location occupied by at least one second user; and (B) direct the first media display to display a media stream of the at least one second user sent to the first processor from the second processor via the communication link, wherein a first portion of the media stream is suppressed from being displayed on the first media display that is at least partially transparent to visible light, which suppression enables viewing of at least a portion of the first location through a portion of the first media display corresponding to the media stream that is suppressed.

In some embodiments, the at least one controller comprises circuitry. In some embodiments, the first processor is included in a control system which comprises, or is operatively coupled to, a building management system. In some embodiments, the first processor is included in a control system which comprises a distributed network of controllers. In some embodiments, the first processor is included in a control system which comprises a hierarchical control system in which a master controller is configured to control one or more local controllers. In some embodiments, the first processor is included in a device ensemble, wherein the device ensemble is disposed in an enclosure. In some embodiments, the device ensemble comprises (i) sensors or (ii) a sensor and an emitter. In some embodiments, the device ensemble is disposed in a fixture (e.g., framing portion, ceiling, or wall). In some embodiments, the device ensemble is disposed in a non-fixture (e.g., a furniture, a billboard, or another tangible and movable asset). In some embodiments, the device ensemble comprises (i) a plurality of processors or (ii) a plurality of circuit boards. In some embodiments, the apparatus further comprises a tintable window which alters visibility, color, transmission, and/or reflectance of visible light, wherein the first processor is configured for adjusting a tint of the tintable window. In some embodiments, the apparatus further comprises the tintable window comprises an electrochromic device. In some embodiments, the apparatus further comprises the electrochromic device is included in an insulated glass unit configured for installation in an enclosure.

In another aspect, a non-transitory computer readable product instructions for digital collaboration, the non-transitory computer readable product instructions, when read by one or more processors, cause the one or more processors to execute, or direct execution, of any of the methods disclosed above.

In another aspect, a non-transitory computer readable product instructions for digital collaboration, the non-transitory computer readable product instructions, when read by one or more processors, cause the one or more processors to execute one or more operations, comprises: directing a first media display disposed at a first location, to display a media stream of the at least one second user disposed at a second location, which media stream is sent to a first processor operatively coupled to the first media display, from a second processor operatively coupled to the second media display, which media stream is sent via a communication link, wherein a first portion of the media stream is suppressed from the displaying on the first media display that is at least partially transparent to visible light, which suppression enables viewing of at least a portion of the first location through a portion of the first media display corresponding to the media stream that is suppressed, which one or more processors are operatively coupled to the first processor that is operatively coupled to the first media display disposed at the first location occupied by at least one first user, which operatively coupling of the first processor is via the communication link to the second processor operatively coupled to the second media display disposed at the second location occupied by the at least one second user.

In some embodiments, the product instructions are embedded in one of more non-transitory computer readable media. In some embodiments, the product instructions are included in a program product.

In another aspect, a system for digital collaboration, the system comprises a network configured to facilitate one or more operations of any of the methods disclosed above.

In some embodiments, facilitating one or more operations comprises operatively coupling to one or more devices, operatively coupling to one or more apparatuses, operatively coupling to one or more systems, facilitate communication and/or facilitate power transmission.

In another aspect, a system for digital collaboration, the system comprises:

a network configured to: (a) operatively couple to a first media display disposed at a first location occupied by at least one first user, which first media display is operatively coupled to a first processor; a second media display disposed at a second location occupied by at least one second user, which second media display is operatively coupled to a second processor; and (b) facilitate a communication link between the first processor and the second processor, which communication link is configured to transmit the media stream transmitted to the first media display, wherein a first portion of the media stream is suppressed from being displayed on the first media display that is at least partially transparent to visible light, which suppression enables viewing of at least a portion of the first location through a portion of the first media display corresponding to the media stream that is suppressed.

In some embodiments, the network is configured for transmission of the media stream at least in part by being configured to enable transmission of a protocol of the media stream. In some embodiments, the network is operatively coupled to a hierarchical control system at least partially disposed in an enclosure which includes the first location. In some embodiments, the network is at least partly disposed in a facility and is capable of transmitting power and communication signals. In some embodiments, the network is configured to connect to a plurality of devices in the facility. In some embodiments, (i) at least two of the plurality of devices are of different type and/or (ii) at least two of the plurality of devices are of the same type. In some embodiments, the plurality of devices includes processors, controllers, sensors, emitters, receivers, transmitters, and/or device ensembles. In some embodiments, the plurality of devices includes a controller operatively coupled to a tintable window for operatively controlling the tintable window. In some embodiments, the plurality of devices includes a controller operatively coupled to control a lighting device, a tintable window, a sensor, an emitter, a media display, a dispenser, a processor, a power source, a security system, a fire alarm system, a sound media, an antenna, a radar, a controller, a heater, a cooler, a vent, or a heating ventilation and air conditioning system (HVAC). In some embodiments, the communication signals include cellular communication signals. In some embodiments, the network is configured to transmit at least fourth (4G) or at least fifth (5G) generation cellular communication. In some embodiments, the network is configured for transmission of power and communication signals using coaxial cables, optical wires, and/or twisted wires. In some embodiments, the network is configured of transmitting power and communication signals on a single cable. In some embodiments, the network is the first network installed in a facility. In some embodiments, the network is disposed at least in an envelope of a facility. In some embodiments, the network is configured to transmit two or more communication types on a single wire. In some embodiments, the communication types comprise cellular communication, video communication, control communication, or other data stream.

In another aspect, a method for digital collaboration, the method comprising using a sensor to capture a media stream of at least the one first user disposed in a first location, which sensor is associated with a first media display disposed in the first location, and is configured to obtain the media stream of at least one first user through the first media display that is at least partially transparent to visible light.

In some embodiments, the method further comprises establishing a communication link between (i) a first processor operatively coupled to the first media display and (ii) a second processor operatively coupled to a second media display disposed at a second location occupied by at least one second user. In some embodiments, the communication link comprises a machine to machine communication. In some embodiments, the communication link is configured to facilitate transmission of the media stream. In some embodiments, the method further comprises transmitting the media stream for display on the second media display. In some embodiments, the method further comprises using the sensor for generating the media stream from a capture location which corresponds to a gazing region of the first user directed towards the first media display. In some embodiments, the method further comprises adjusting the capture location to focus on a central, or on a substantially central, position (i) between pupils of a first user of the at least one first user, (ii) between brows of the first user, and/or (iii) at the end of a nose bride of the first user. In some embodiments, the position is vertically aligned, horizontally aligned, or both vertically and horizontally aligned. In some embodiments, adjustment of the capture location is performed manually at least in part. In some embodiments, adjustment of the capture location is performed automatically. In some embodiments, adjustment of the capture location is based at least in part on image processing, machine learning, and/or artificial intelligence. In some embodiments, adjustment of the capture location is controlled by at least one controller. In some embodiments, adjustment of the capture location is controlled by a control system configured to control at least one other device of a facility in which the first media display is disposed. In some embodiments, the sensor is movable with respect to the first media display, the method further comprising adjusting the capture location to match the gazing region of the first user. In some embodiments, the adjusting of the capture location is performed manually at least in part. In some embodiments, adjustment of the capture location is performed automatically according to a captured image of the first user. In some embodiments, the first user is disposed on a first side of the media display, and wherein the capture location of the sensor is disposed on a second side the first media display that is at least partially transparent to visible light, such that the first media stream depicts the first user using images passing through the transparent display of the first media display, which first side is an opposite of the first media display relative to the second side. In some embodiments, the sensor is mounted on a movable carriage driven by at least one controller. In some embodiments, the first media display is coupled to a tintable window. In some embodiments, the tintable window is an integrated glass unit, and wherein the movable carriage is (i) configured for planar motion, and (ii) disposed in an interior of the integrated glass unit. In some embodiments, the first media display includes a transparent substrate integrating a plurality of light emitting pixels, and wherein the sensor comprises a plurality of sensels disposed on the transparent substrate. In some embodiments, the first media display is coupled to a tintable window. In some embodiments, the tintable window alters visibility, color, hue, transmission, and/or reflectance of visible light. In some embodiments, the tintable window comprises an electrochromic device. In some embodiments, the electrochromic device is included in an insulated glass unit configured for installation in an enclosure. In some embodiments, the transparent display spans at least about 30% of an area of the tintable window. In some embodiments, the transparent display spans from about 10% to about 100% of an area of the tintable window. In some embodiments, the tintable window is coupled to a control system configured for adjusting a tint of the tintable window. In some embodiments, the control system comprises, or is operatively coupled to, a building management system. In some embodiments, the control system comprises a distributed network of controllers. In some embodiments, the control system comprises a hierarchical control system in which a master controller that is configured to control one or more local controllers. In some embodiments, the control system comprises a controller that is included in a device ensemble, wherein the device ensemble is disposed in the enclosure. In some embodiments, the device ensemble comprises (i) sensors or (ii) a sensor and an emitter. In some embodiments, the device ensemble is disposed in a fixture (e.g., framing portion, ceiling, or wall). In some embodiments, the device ensemble is disposed in a non-fixture (e.g., a furniture, a billboard, or another tangible and movable asset). In some embodiments, the device ensemble comprises (I) a plurality of processors or (ii) a plurality of circuit boards. In some embodiments, at least one of the first media display and the second media display, is disposed in an individual portal laid out within an enclosure. In some embodiments, at least one of the first media display and the second media display, is disposed in a small group pod laid out within an enclosure. In some embodiments, at least one of the first media display and the second media display, is disposed in a large group zone laid out within an enclosure. In some embodiments, at least one of the first media display and the second media display, is disposed on a freestanding panel laid out within an enclosure. In some embodiments, at least one of the first media display and the second media display, is disposed in an activity hub laid out within an enclosure.

In another aspect, an apparatus for digital collaboration, the apparatus comprises at least one controller configured to perform, or direct performance of, of any of the methods disclosed above.

In another aspect, an apparatus for digital collaboration, the apparatus comprises at least one controller configured to: (A) operatively couple to a sensor that is (i) configured for capturing a media stream (ii) associated with a first image display, (iii) is disposed in a first location in which the first image display is disposed, and (iv) configured to obtain the media stream through the first media display that is at least partially transparent to visible light; and (B) direct the sensor to capture the media stream in the first location.

In some embodiments, the first media display is operatively coupled to a first processor, which first location is occupied by at least one first user, which first processor is operatively coupled via a communication link to a second processor operatively coupled to a second media display disposed at a second location occupied by at least one second user. In some embodiments, the at least one controller is configure to direct transmission of the media stream for display by the second media display.

In another aspect, a non-transitory computer readable product instructions for digital collaboration, the non-transitory computer readable product instructions, when read by one or more processors, causes the one or more processors to execute, or direct execution, of any of the methods disclosed above.

In another aspect, a non-transitory computer readable product instructions for digital collaboration, the non-transitory computer readable product instructions, when read by one or more processors, causes the one or more processors to execute one or more operations comprises: directing a sensor to capture a media stream in a first location, which one or more processors are operatively coupled to the sensor that is (i) configured for capturing a media stream (ii) associated with a first image display, (iii) is disposed in a first location in which the first image display is disposed, and (iv) configured to obtain the media stream through the first media display that is at least partially transparent to visible light.

In some embodiments, the product instructions are embedded in one of more non-transitory computer readable media. In some embodiments, the product instructions are included in a program product.

In another aspect, a system for digital collaboration, the system comprises a network configured to facilitate one or more operations of any of the methods disclosed above.

In some embodiments, facilitating one or more operations comprises operatively coupling to one or more devices, operatively coupling to one or more apparatuses, operatively coupling to one or more systems, facilitate communication and/or facilitate power transmission.

In another aspect, a system for digital collaboration, the system comprises:

a network configured to: (a) operatively coupling to a sensor that is (i) configured for capturing a media stream (ii) associated with a first image display, (iii) is disposed in a first location in which the first image display is disposed, and (iv) configured to obtain the media stream through the first media display that is at least partially transparent to visible light; and (b) facilitate a communicating of the media stream.

In some embodiments, the network is configured for transmitting the media stream at least in part by being configured to enable transmission of a protocol of the media stream. In some embodiments, the network is configured to operatively coupled to a hierarchical control system at least partially disposed in an enclosure which includes the first location. In some embodiments, the network is at least partly disposed in a facility and is capable of transmitting power and communication signals. In some embodiments, the network interconnects a plurality of devices in the facility. In some embodiments, the plurality of devices includes processors, controllers, sensors, emitters, receivers, transmitters, and/or device ensembles. In some embodiments, the plurality of devices includes a controller operatively coupled to a tintable window for operatively controlling the tintable window. In some embodiments, the plurality of devices includes a controller operatively coupled to control a lighting device, a tintable window, a sensor, an emitter, a media display, a dispenser, a processor, a power source, a security system, a fire alarm system, a sound media, an antenna, a radar, a controller, a heater, a cooler, a vent, or a heating ventilation and air conditioning system (HVAC). In some embodiments, the communication signals include cellular communication signals. In some embodiments, the network is configured to transmit at least fourth (4G) or at least fifth (5G) generation cellular communication. In some embodiments, the network is configured for transmission of power and communication signals using coaxial cables, optical wires, and/or twisted wires. In some embodiments, the network is capable of transmitting both power and communication signals in a single cable. In some embodiments, the network is the first network installed in a facility. In some embodiments, the network is disposed at least in an envelope of a facility. In some embodiments, the network is configured to transmit two or more communication types on a single wire. In some embodiments, the communication types comprise cellular communication, video communication, control communication, or other data stream.

In another aspect, a device for interactive digital communication comprising: a frame configured to frame a supportive structure, a media display, and one or more sensors configured for image capturing.

In some embodiments, the frame includes curved and/or straight portions. In some embodiments, at least one corner (e.g., four corners) of the frame are curved. In some embodiments, the supportive structure comprises an opaque or a transparent portion. In some embodiments, the supportive structure is a window such as a tintable window. In some embodiments, the display is a transparent display. In some embodiments, the transparent display is configured to project a redacted image. In some embodiments, the display is configured to project a higher intensity image by a portion of the projecting entities (e.g., pixels) of the media display, and project a relatively reduced intensity image on an other portion of the projecting entities. In some embodiments, the reduced intensity comprises no projection (e.g., zero intensity). In some embodiments, the reduce intensity projection facilitates viewing through the media display. In some embodiments, the device further comprises lighting (e.g., fluorescent, incandescent, and/or LED). The lighting may be a strip disposed above (e.g., immediately above may be in a direction against the gravitational center. Immediately above may be contacting the display) the display. In some embodiments, the lighting comprises a lighting strip. In some embodiments, the device comprises a ledge. In some embodiments, the ledge is configured to act as a table. In some embodiments, the ledge is disposed immediately below the display (e.g., immediately below may be in a direction towards the gravitational center. Immediately below may be contacting the display). In some embodiments, the device is configured to operatively couple (e.g., connect) to a communication and/or power network (e.g. comprising wired and/or wireless coupling). The display may be configured to project images (e.g., stream video images), e.g., of participants and/or any auxiliary content. The display is configured to project overlays (e.g., virtual objects). In some embodiments, the device and/or display is operatively coupled to an app that facilitates a user to configure the display and/or its projection. For example, facilitate choosing overlays and/or adjusting the one or more sensors. In some embodiments, the one or more sensors are operatively coupled to an actuator. The one or more sensors can be stationary or mobile. A user may adjust position of the one or more sensors (e.g., camera) to align with a facial user of the user, e.g., such that an image taken by the one or more sensors will coincide with the user's face (e.g., pupils).

In another aspect, a method for digital collaboration, the method comprises: moving a media display with respect to a wall portion of a digital collaboration unit, which media display is at least partially transparent to visible light, which digital collaboration unit comprises (i) a physical work surface disposed adjacent to the media display and configured to be disposed between the media display and a user of the media display, and/or (ii) lighting disposed adjacent to the media display and configured to project light onto the user and/or across the media display and towards a gravitational center.

In some embodiments, moving of the media display is based at least in part on a position of at least one bodily feature and/or body portion of the user. In some embodiments, moving of the media display comprises a movement with respect to the gravitational center. In some embodiments, the bodily portion comprises a nose, eyebrows, eyes, pupils, a head, a chin, lips, a nose bridge, or ears. In some embodiments, the method further comprises using a sensor to capture a media stream of the user disposed in a location adjacent to the media display, which sensor is associated with the digital collaboration unit. In some embodiments, the sensor is configured to be located on an opposite side of the media display from the user of the media display. In some embodiments, moving the media display includes the media display being movable to a height above a floor of at least an average person in a sitting and/or standing position. In some embodiments, including moving the physical work surface and/or the lighting in coordination with movement of the media display, or vice versa. In some embodiments, the coordination of the movement of the physical work surface and/or the lighting with movement of the media display comprises vertical movement relative to the gravitational center. In some embodiments, the method including moving the physical work surface and/or the lighting without coordination with movement of the media display, or vice versa. In some embodiments, the movement of the physical work surface and/or the lighting comprises a vertical movement relative to the gravitational center.

In another aspect, an apparatus for digital collaboration, the apparatus comprises at least one controller configured to: (a) operatively coupled to the media display, and (b) perform, or direct performance of, any of the methods disclosed above.

In another aspect, a non-transitory computer readable program instructions for digital collaboration, the non-transitory computer readable program instructions, when read by one or more processors operatively coupled to the media display, cause the one or more processors to execute, or direct execution of, any of the methods disclosed above.

In another aspect, a system for digital collaboration, the system comprises: a network configured to operatively coupled to the media display, and transmit one or more signals facilitating the method of any disclosed above.

In another aspect, an apparatus for digital collaboration, the apparatus comprises one or more controllers comprising circuitry, which at least one controller is configured to: (a) operatively couple to a media display; and (b) move, or direct movement of, the media display with respect to a wall portion of a digital collaboration unit, which media display is at least partially transparent to visible light, which digital collaboration unit comprises (i) a physical work surface disposed adjacent to the media display and configured to be disposed between the media display and a user of the media display, and/or (ii) lighting disposed adjacent to the media display and configured to project light onto the user and/or across the media display and towards a gravitational center.

In some embodiments, the at least one controller comprises a hierarchical control system having at least three levels of hierarchy. In some embodiments, the at least one controller comprises a controller disposed in a device ensemble having a housing enclosing at least one sensor. In some embodiments, the device ensemble comprises another sensor, an emitter, or a transceiver. In some embodiments, the at least one controller comprises a microcontroller. In some embodiments, the at least one controller is configured to utilize, or direct utilization of, artificial intelligence for predictive control. In some embodiments, the at least one controller comprises a controller disposed in, or attached to, a fixture of a facility.

In another aspect, a non-transitory computer readable program instructions for digital collaboration, the non-transitory computer readable program instructions, when read by one or more processors operatively coupled to a media display, cause the one or more processors to execute operations comprises: moving, or directing movement of, the media display with respect to a wall portion of a digital collaboration unit, which media display is at least partially transparent to visible light, which digital collaboration unit comprises (i) a physical work surface disposed adjacent to the media display and configured to be disposed between the media display and a user of the media display, and/or (ii) lighting disposed adjacent to the media display and configured to project light onto the user and/or across the media display and towards a gravitational center.

In some embodiments, the one or more processors comprises a hierarchical system of processors having at least three levels of hierarchy. In some embodiments, the one or more processors comprises a processor disposed in a device ensemble having a housing enclosing at least one sensor. In some embodiments, the device ensemble comprises another sensor, an emitter, or a transceiver. In some embodiments, the processor comprises a graphic processing unit. In some embodiments, the operations comprise utilizing, or directing utilization of, an artificial intelligence computational scheme for prediction of a second attribute. In some embodiments, the one or more processors comprises a processor disposed in, or attached to, a fixture of a facility. In some embodiments, the one or more processors comprises a processor disposed externally to a facility. In some embodiments, externally to the facility comprises a cloud server. In some embodiments, the operations comprise remotely updating, or directing remote update, from a source external to a facility.

In another aspect, a system for digital collaboration, the system comprises: a network configured to: (a) operatively couple to a media display; and (b) transmit one or more signals that facilitate moving the media display with respect to a wall portion of a digital collaboration unit, which media display is at least partially transparent to visible light, which digital collaboration unit comprises (i) a physical work surface disposed adjacent to the media display and configured to be disposed between the media display and a user of the media display, and/or (ii) lighting disposed adjacent to the media display and configured to project light onto the user and/or across the media display and towards a gravitational center.

In some embodiments, the network is configured to transmit communication and power on a single cable. In some embodiments, the network is configured to transmit communication protocols, wherein at least two of the communication protocols are different. In some embodiments, the communication protocols comprise at least a fourth generation, or a fifth generation cellular communication protocol. In some embodiments, the communication protocols facilitate cellular, media, control, security, and/or other data communication. In some embodiments, the communication protocols comprise a control protocol that comprises building automation control protocol. In some embodiments, the network is configured to operatively couple to one or more antennas, and optionally wherein the one or more antennas comprise a distributed antenna system. In some embodiments, the network is configured to facilitate remote software updates from a source external to the facility.

In another aspect, an apparatus for digital collaboration, the apparatus comprises: a digital collaboration unit having a wall portion and a media display that is configured to be moveable with respect to the wall portion, which media display is at least partially transparent to visible light, which digital collaboration unit comprises (i) a physical work surface disposed adjacent to the media display and configured to be disposed between the media display and a user of the media display, and/or (ii) lighting disposed adjacent to the media display and configured to project light onto the user and/or across the media display and towards a gravitational center.

In some embodiments, the physical work surface and/or the lighting is configured to be moveable in coordination with movement of the media display, or vice versa. In some embodiments, the movement is in at least a vertical direction relative to the gravitational center. In some embodiments, the physical work surface and/or the lighting is configured to be moveable without coordination with movement of the media display, or vice versa. In some embodiments, the movement is in at least a vertical direction relative to the gravitational center. In some embodiments, movement of the display relative to the wall portion is based at least in part on a position of at least one bodily feature and/or body portion of the user. In some embodiments, movement of the media display comprises a movement with respect to the gravitational center. In some embodiments, the bodily portion comprises a nose, eyebrows, eyes, pupils, a head, a chin, lips, a nose bridge, or ears. In some embodiments, the apparatus further comprises a sensor configured to capture a media stream of the user disposed in a location adjacent to the media display, which sensor is associated with the digital collaboration unit. In some embodiments, the sensor is located on an opposite side of the media display from the user of the media display. In some embodiments, movement of the media display includes the media display being configured to be moveable to a height above a floor of at least an average person in a sitting and/or standing position.

In another aspect, an apparatus for digital collaboration, the apparatus comprises: a first digital collaboration unit comprising a first wall portion including a media display that is at least partially transparent, which media display is configured to be moveable with respect to the first wall portion, which first digital collaboration unit further comprises (i) a second wall portion configured to be moveable to selectively hinder viewing onto the media display and/or onto a first user disposed in the first digital collaboration unit, and/or (ii) at least two sensors mounted spaced apart from each other as part of the first wall portion of the first digital collaboration unit, which at least two sensors are configured to capture an image of the first user located in the first digital collaboration unit.

In some embodiments, the first digital collaboration unit is located in a facility having walls defining a room and the first wall portion is disposed within the room and is configured to be a partition. In some embodiments, first wall portion is shorter than the walls of the room. In some embodiments, the first wall portion is of at least a height of an average person. In some embodiments, movement of the second wall portion comprises a swiveling motion, or a sliding motion. In some embodiments, movement of the media display is based at least in part on a position of at least one bodily feature and/or body portion of the first user. In some embodiments, movement of the media display comprises a movement with respect to a gravitational center. In some embodiments, the bodily portion comprises a nose, eyebrows, eyes, pupils, a head, a chin, lips, a nose bridge, or ears. In some embodiments, at least one of the at least two sensors is located on an opposite side of the media display from the first user of the media display. In some embodiments, movement of the media display includes the media display being moveable to a height above a floor or at least an average person in a sitting and/or standing position. In some embodiments, the apparatus further including (i) a physical work surface disposed adjacent to the media display and configured to be dispose between the media display and the first user of the media display, and/or (ii) lighting disposed adjacent to the media display and configured to project light onto the first user and/or across the media display and towards a gravitational center; and wherein the physical work surface and/or the lighting is configured to be moveable in coordination with movement of the media display, or vice versa. In some embodiments, the movement of the physical work surface and/or the lighting is in at least a vertical direction relative to the gravitational center. In some embodiments, the apparatus further including (i) a physical work surface disposed adjacent to the media display and configured to be dispose between the media display and the first user of the media display, and/or (ii) lighting disposed adjacent to the media display and configured to project light onto the first user and/or across the media display and towards a gravitational center; and wherein the physical work surface and/or the lighting is configured to be moveable without coordination with movement of the media display, or vice versa. In some embodiments, the movement of the physical work surface and/or the lighting is in at least a vertical direction relative to the gravitational center.

In another aspect, a method for digital collaboration, the method comprises: moving a media display with respect to a first wall portion of a first digital collaboration unit, which media display is at least partially transparent, which first digital collaboration unit comprises (i) a second wall portion and/or (ii) at least two sensors mounted spaced apart from each other as part of the first wall portion of the first digital collaboration unit, which at least two sensors are configured to capture an image of a first user located in the first digital collaboration unit; and moving the second wall portion to selectively hinder viewing onto the media display and/or onto the first user disposed in the first digital collaboration unit.

In some embodiments, the first digital collaboration unit is located in a facility having walls defining a room and the first wall portion is disposed within the room and is configured to be a partition. In some embodiments, first wall portion is shorter than the walls of the room. In some embodiments, the first wall portion is of at least a height of an average person. In some embodiments, moving the second wall portion comprises a swiveling motion, or a sliding motion. In some embodiments, moving the media display is based at least in part on a position of at least one bodily feature and/or body portion of the first user. In some embodiments, moving the media display comprises a movement with respect to a gravitational center. In some embodiments, the bodily portion comprises a nose, eyebrows, eyes, pupils, a head, a chin, lips, a nose bridge, or ears. In some embodiments, at least one of the at least two sensors is configured to be located on an opposite side of the media display from the first user of the media display. In some embodiments, moving the media display includes the media display being moveable to a height above a floor or at least an average person in a sitting and/or standing position. In some embodiments, the first digital collaboration unit comprises (i) a physical work surface disposed adjacent to the media display and configured to be dispose between the media display and the first user of the media display, and/or (ii) lighting disposed adjacent to the media display and configured to project light onto the first user and/or across the media display and towards a gravitational center; and the method further comprises moving the physical work surface and/or the lighting in coordination with movement of the media display, or vice versa. In some embodiments, moving the physical work surface and/or the lighting is in at least a vertical direction relative to the gravitational center. In some embodiments, the first digital collaboration unit comprises (i) a physical work surface disposed adjacent to the media display and configured to be dispose between the media display and the first user of the media display, and/or (ii) lighting disposed adjacent to the media display and configured to project light onto the first user and/or across the media display and towards a gravitational center; and the method further comprises moving the physical work surface and/or the lighting without coordination with movement of the media display, or vice versa. In some embodiments, the movement of the physical work surface and/or the lighting is in at least a vertical direction relative to the gravitational center.

In another aspect, an apparatus for digital collaboration, the apparatus comprises at least one controller configured to perform, or direct performance of, any of the methods disclosed above.

In another aspect, a system for digital collaboration, the system comprises: a network configured to operatively couple to the digital collaboration unit, and transmit one or more signals facilitating the method of any disclosed above.

In another aspect, a non-transitory computer readable program instructions for digital collaboration, the non-transitory computer readable program instructions, when read by one or more processors operatively coupled to the first digital collaboration unit, cause the one or more processors to execute, or direct execution of, any of the methods disclosed above.

In another aspect, an apparatus for digital collaboration, the apparatus comprises one or more controllers comprising circuitry, which at least one controller is configured to: (a) operatively couple to a first digital collaboration unit; and (b) move, or direct movement of, a media display with respect to a first wall portion of the first digital collaboration unit, which media display is at least partially transparent, which first digital collaboration unit comprises (i) a second wall portion configured to be moveable to selectively hinder viewing onto the media display and/or onto a first user disposed in the first digital collaboration unit, and/or (ii) at least two sensors mounted spaced apart from each other as part of the first wall portion of the first digital collaboration unit, which at least two sensors are configured to capture an image of the first user located in the first digital collaboration unit.

In some embodiments, the at least one controller comprises a hierarchical control system having at least three levels of hierarchy. In some embodiments, the at least one controller comprises a controller disposed in a device ensemble having a housing enclosing at least one sensor. In some embodiments, the device ensemble comprises another sensor, an emitter, or a transceiver. In some embodiments, the at least one controller comprises a microcontroller. In some embodiments, the at least one controller is configured to utilize, or direct utilization of, artificial intelligence for predictive control. In some embodiments, the at least one controller comprises a controller disposed in, or attached to, a fixture of a facility.

In another aspect, a non-transitory computer readable program instructions for digital collaboration, the non-transitory computer readable program instructions, when read by one or more processors operatively coupled to a first digital collaboration unit, cause the one or more processors to execute operations comprises: moving, or directing movement of, a media display with respect to a first wall portion of the first digital collaboration unit, which media display is at least partially transparent, which first digital collaboration unit comprises (i) a second wall portion configured to be moveable to selectively hinder viewing onto the media display and/or onto a first user disposed in the first digital collaboration unit, and/or (ii) at least two sensors mounted spaced apart from each other as part of the first wall portion of the first digital collaboration unit, which at least two sensors are configured to capture an image of the first user located in the first digital collaboration unit.

In some embodiments, the one or more processors comprises a hierarchical system of processors having at least three levels of hierarchy. In some embodiments, the one or more processors comprises a processor disposed in a device ensemble having a housing enclosing at least one sensor. In some embodiments, the device ensemble comprises another sensor, an emitter, or a transceiver. In some embodiments, the processor comprises a graphic processing unit. In some embodiments, the operations comprise utilizing, or directing utilization of, an artificial intelligence computational scheme for prediction of a second attribute. In some embodiments, the one or more processors comprises a processor disposed in, or attached to, a fixture of a facility. In some embodiments, the one or more processors comprises a processor disposed externally to a facility. In some embodiments, externally to the facility comprises a cloud server. In some embodiments, operations comprise remotely updating, or directing remote update, from a source external to a facility.

In another aspect, a system for digital collaboration, the system comprises: a network configured to: (a) operatively couple to a media display; and (b) transmit one or more signals that facilitate movement of, a media display with respect to a first wall portion of a first digital collaboration unit, which media display is at least partially transparent, which first digital collaboration unit comprises (i) a second wall portion configured to be moveable to selectively hinder viewing onto the media display and/or onto a first user disposed in the first digital collaboration unit, and/or (ii) at least two sensors mounted spaced apart from each other as part of the first wall portion of the first digital collaboration unit, which at least two sensors are configured to capture an image of the first user located in the first digital collaboration unit.

In some embodiments, the network is configured to transmit communication and power on a single cable. In some embodiments, the network is configured to transmit communication protocols, wherein at least two of the communication protocols are different. In some embodiments, the communication protocols comprise at least a fourth generation, or a fifth generation cellular communication protocol. In some embodiments, the communication protocols facilitate cellular, media, control, security, and/or other data communication. In some embodiments, the communication protocols comprise a control protocol that comprises a building automation control protocol. In some embodiments, the network is configured to operatively couple to one or more antennas, and optionally wherein the one or more antennas comprise a distributed antenna system. In some embodiments, the network is configured to facilitate remote software updates from a source external to a facility.

In some embodiments, operatively coupled comprises physically coupled, wirelessly coupled, communicatively coupled, or electronically coupled.

In another aspect, the present disclosure provides systems, apparatuses (e.g., controllers), and/or non-transitory computer-readable medium (e.g., software) that implement any of the methods disclosed herein.

In another aspect, the present disclosure provides methods that use any of the systems and/or apparatuses disclosed herein, e.g., for their intended purpose.

In another aspect, an apparatus comprises at least one controller that is programmed to direct a mechanism used to implement (e.g., effectuate) any of the method disclosed herein, wherein the at least one controller is operatively coupled to the mechanism.

In another aspect, an apparatus comprises at least one controller that is configured (e.g., programmed) to implement (e.g., effectuate) the method disclosed herein. The at least one controller may implement any of the methods disclosed herein.

In another aspect, a system comprises at least one controller that is programmed to direct operation of at least one another apparatus (or component thereof), and the apparatus (or component thereof), wherein the at least one controller is operatively coupled to the apparatus (or to the component thereof). The apparatus (or component thereof) may include any apparatus (or component thereof) disclosed herein. The at least one controller may direct any apparatus (or component thereof) disclosed herein.

In another aspect, a computer software product, comprising a non-transitory computer-readable medium in which program instructions are stored, which instructions, when read by a computer, cause the computer to direct a mechanism disclosed herein to implement (e.g., effectuate) any of the method disclosed herein, wherein the non-transitory computer-readable medium is operatively coupled to the mechanism. The mechanism can comprise any apparatus (or any component thereof) disclosed herein.

In another aspect, the present disclosure provides a non-transitory computer-readable medium comprising machine-executable code that, upon execution by one or more computer processors, implements any of the methods disclosed herein.

In another aspect, the present disclosure provides a non-transitory computer-readable medium comprising machine-executable code that, upon execution by one or more computer processors, effectuates directions of the controller(s) (e.g., as disclosed herein).

In another aspect, the present disclosure provides a computer system comprising one or more computer processors and a non-transitory computer-readable medium coupled thereto. The non-transitory computer-readable medium comprises machine-executable code that, upon execution by the one or more computer processors, implements any of the methods disclosed herein and/or effectuates directions of the controller(s) disclosed herein.

The content of this summary section is provided as a simplified introduction to the disclosure and is not intended to be used to limit the scope of any invention disclosed herein or the scope of the appended claims.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

These and other features and embodiments will be described in more detail with reference to the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "Fig." and "Figs." herein), of which:

FIG. 2 schematically shows a side view of an arrangement of a media display and movable sensor(s) (e.g., camera);

Figure 1:
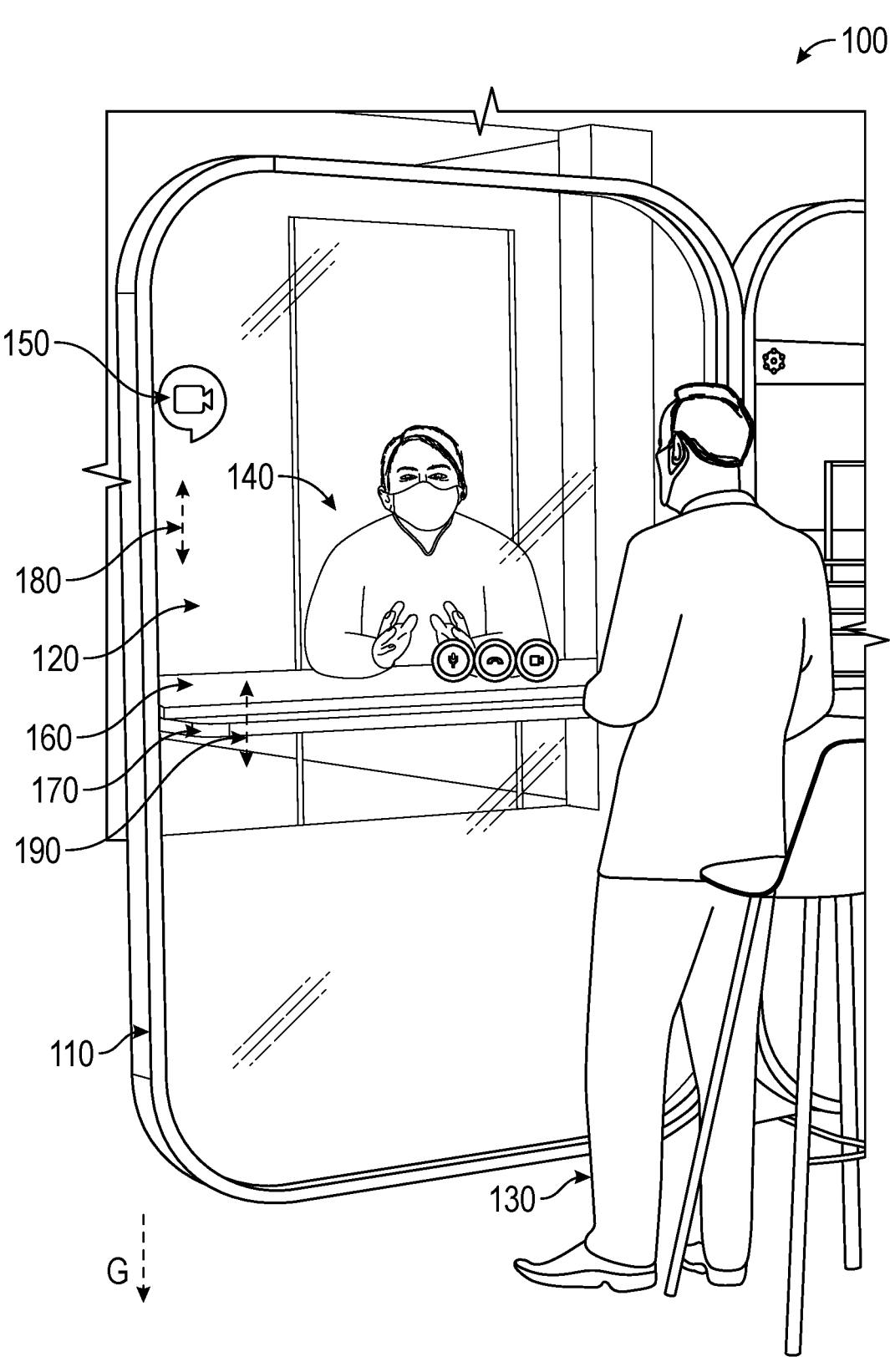
FIG. 1 depicts an immersive video interaction between collaborators via a media display.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an," and "the" are not intended to refer to only a singular entity but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

As used herein, including in the claims, the conjunction "and/or" in a phrase such as "including X, Y, and/or Z", refers to in inclusion of any combination or plurality of X, Y, and Z. For example, such phrase is meant to include X. For example, such phrase is meant to include Y, For example, such phrase is meant to include Z. For example, such phrase is meant to include X and Y. For example, such phrase is meant to include X and Z. For example, such phrase is meant to include Y and Z. For example, such phrase is meant to include a plurality of Xs. For example, such phrase is meant to include a plurality of Ys. For example, such phrase is meant to include a plurality of Zs. For example, such phrase is meant to include a plurality of Xs and a plurality of Ys. For example, such phrase is meant to include a plurality of Xs and a plurality of Zs. For example, such phrase is meant to include a plurality of Ys and a plurality of Zs. For example, such phrase is meant to include a plurality of Xs and Y. For example, such phrase is meant to include a plurality of Xs and Z. For example, such phrase is meant to include a plurality of Ys and Z. For example, such phrase is meant to include X and a plurality of Ys. For example, such phrase is meant to include X and a plurality of Zs. For example, such phrase is meant to include Y and a plurality of Zs. The conjunction "and/or" is meant to have the same effect as the phrase "X, Y, Z, or any combination or plurality thereof." The conjunction "and/or" is meant to have the same effect as the phrase "one or more X, Y, Z, or any combination thereof."

The term "operatively coupled" or "operatively connected" refers to a first element (e.g., mechanism) that is coupled (e.g., connected) to a second element, to allow the intended operation of the second and/or first element. The coupling may comprise physical or non-physical coupling. The non-physical coupling may comprise signal-induced coupling (e.g., wireless coupling). Coupled can include physical coupling (e.g., physically connected), or non-physical coupling (e.g., via wireless communication). Additionally, in the following description, the phrases "operable to," "adapted to," "configured to," "designed to," "programmed to," or "capable of" may be used interchangeably where appropriate.

An element (e.g., mechanism) that is "configured to" perform a function includes a structural feature that causes the element to perform this function. A structural feature may include an electrical feature, such as a circuitry or a circuit element. A structural feature may include an actuator. A structural feature may include a circuitry (e.g., comprising electrical or optical circuitry). Electrical circuitry may comprise one or more wires. Optical circuitry may comprise at least one optical element (e.g., beam splitter, mirror, lens and/or optical fiber). A structural feature may include a mechanical feature. A mechanical feature may comprise a latch, a spring, a closure, a hinge, a chassis, a support, a fastener, or a cantilever, and so forth. Performing the function may comprise utilizing a logical feature. A logical feature may include programming instructions. Programming instructions may be executable by at least one processor. Programming instructions may be stored or encoded on a medium accessible by one or more processors. Additionally, in the following description, the phrases "operable to," "adapted to," "configured to," "designed to," "programmed to," or "capable of" may be used interchangeably where appropriate.

The following detailed description is directed to specific example implementations for purposes of disclosing the subject matter. Although the disclosed implementations are described in sufficient detail to enable those of ordinary skill in the art to practice the disclosed subject matter, this disclosure is not limited to particular features of the specific example implementations described herein. On the contrary, the concepts and teachings disclosed herein can be implemented and applied in a multitude of different forms and ways without departing from their spirit and scope. For example, while the disclosed implementations focus on electrochromic windows (also referred to as smart windows), some of the systems, devices and methods disclosed herein can be made, applied or used without undue experimentation to incorporate, or while incorporating, other types of optically switchable devices that are actively switched/controlled, rather than passive coatings such as thermochromic coatings or photochromic coatings that tint passively in response to the suns rays. Some other types of actively controlled optically switchable devices include liquid crystal devices, suspended particle devices, and micro-blinds, among others. For example, some or all of such other optically switchable devices can be powered, driven or otherwise controlled or integrated with one or more of the disclosed implementations of controllers described herein.

In some embodiments, an enclosure comprises an area defined by at least one structure (e.g., fixture). The at least one structure may comprise at least one wall. An enclosure may comprise and/or enclose one or more sub-enclosure. The at least one wall may comprise metal (e.g., steel), clay, stone, plastic, glass, plaster (e.g., gypsum), polymer (e.g., polyurethane, styrene, or vinyl), asbestos, fiber-glass, concrete (e.g., reinforced concrete), wood, paper, or a ceramic. The at least one wall may comprise wire, bricks, blocks (e.g., cinder blocks), tile, drywall, or frame (e.g., steel frame and/or wooden frame).

In some embodiments, the enclosure comprises one or more openings. The one or more openings may be reversibly closable. The one or more openings may be permanently open. A fundamental length scale of the one or more openings may be smaller relative to the fundamental length scale of the wall(s) that define the enclosure. A fundamental length scale may comprise a diameter of a bounding circle, a length, a width, or a height. A surface of the one or more openings may be smaller relative to the surface the wall(s) that define the enclosure. The opening surface may be a percentage of the total surface of the wall(s). For example, the opening surface can measure at most about 30%, 20%, 10%, 5%, or 1% of the walls(s). The wall(s) may comprise a floor, a ceiling, or a side wall. The closable opening may be closed by at least one window or door. The enclosure may be at least a portion of a facility. The facility may comprise a building. The enclosure may comprise at least a portion of a building. The building may be a private building and/or a commercial building. The building may comprise one or more floors. The building (e.g., floor thereof) may include at least one of: a room, hall, foyer, attic, basement, balcony (e.g., inner or outer balcony), stairwell, corridor, elevator shaft, façade, mezzanine, penthouse, garage, porch (e.g., enclosed porch), terrace (e.g., enclosed terrace), cafeteria, and/or Duct. In some embodiments, an enclosure may be stationary and/or movable (e.g., a train, an airplane, a ship, a vehicle, or a rocket).

In some embodiments, the enclosure encloses an atmosphere. The atmosphere may comprise one or more gases. The gases may include inert gases (e.g., comprising argon or nitrogen) and/or non-inert gases (e.g., comprising oxygen or carbon dioxide). The enclosure atmosphere may resemble an atmosphere external to the enclosure (e.g., ambient atmosphere) in at least one external atmosphere characteristic that includes: temperature, relative gas content, gas type (e.g., humidity, and/or oxygen level), debris (e.g., dust and/or pollen), and/or gas velocity. The enclosure atmosphere may be different from the atmosphere external to the enclosure in at least one external atmosphere characteristic that includes: temperature, relative gas content, gas type (e.g., humidity, and/or oxygen level), debris (e.g., dust and/or pollen), and/or gas velocity. For example, the enclosure atmosphere may be less humid (e.g., drier) than the external (e.g., ambient) atmosphere. For example, the enclosure atmosphere may contain the same (e.g., or a substantially similar) oxygen-to-nitrogen ratio as the atmosphere external to the enclosure. The velocity and/or content of the gas in the enclosure may be (e.g., substantially) similar throughout the enclosure. The velocity and/or content of the gas in the enclosure may be different in different portions of the enclosure (e.g., by flowing gas through to a vent that is coupled with the enclosure). The gas content may comprise relative gas ratio.

In some embodiments, a transparent media display is supported on a transparent panel or substrate having a planar shape. The transparent panel may include a glass pane, a plastic sheet, or other clear material for supporting a media display, and may be configured as a window having a transparent display area. The transparent panel and/or transparent media display may be configured as a thin sheet which follows a straight, curved shape and/or may include bends or other contours. The media display may provide unidirectional projection of images from one side of the media display toward its opposing side to a local user. The unidirectional projection may maintain privacy of the projected media and/or reduce eye strain for the user viewing the projected media by the display.

The projecting media display (e.g., display matrix) may comprise a light emitting diode (LED) array. The LED array may comprise an organic material (e.g., organic light emitting diode abbreviated herein as "OLED"). The OLED may comprise a transparent organic light emitting diode display (abbreviated herein as "TOLED"), which TOLED is at least partially transparent (e.g., to visible light). The display construct may comprise the media display, binding material, and/or transparent substrates (e.g., glass) to bind it together to a display construct. The display construct may comprise a high resolution display. In some embodiments, the display matrix has at least about 2000 pixels at its fundamental length scale, which pixels are the projecting entities of the media display. In some embodiments, the fundamental length scale (abbreviated as "FLS") of the display matrix is a height or a width of the display matrix. In some embodiments, the display matrix is a high resolution or an ultra-high resolution display matrix. In some embodiments, the display construct is configured as a free-standing panel within an enclosure for generating a media display output toward a user on one side of the free-standing panel.

In some embodiments, the display construct is coupled to a viewing (e.g., tintable) window such as by a fastener, wherein the window defines a portion of an exterior or interior wall. In some embodiments, the fastener comprises a hinge, a bracket, or a cover. In some embodiments, the hinge is (i) connected to the bracket that is connected to the display construct and (ii) connected to the cover that is connected to a fixture, which hinge facilitates swiveling of the display construct with respect to the fixture about a hinge joint. In some embodiments, the hinge is (i) reversibly connected to the bracket that is irreversibly connected to the display construct and (ii) reversibly connected to the cover that is reversibly connected to a fixture, which hinge facilitates swiveling of the display construct with respect to the fixture about a hinge joint. In some embodiments, the cover comprises a swiveling portion that can be reversibly opened and closed. In some embodiments, a circuitry and/or wiring is covered from a viewer by the cover, which circuitry and/or wiring can be exposed at least in part by opening the swiveling portion.

In some embodiments, when the tintable window is in its darkest tint state and the display construct projects the media, a user cannot see through (i) the display construct and (ii) the tintable window. In some embodiments, a tint level of the tintable window considers a position of a sun, weather condition, transmittance of light through the tintable windows, media projected by the display, and/or reading of one or more sensors. In some embodiments, at least one of the one or more sensors is disposed externally to the building in which the tintable window is disposed. In some embodiments, the weather condition comprises any dispersive entities in the atmosphere (e.g., cloud coverage, dust, rain, hail, or snow). In some embodiments, transmittance of light through the tintable windows is with respect to external light impinging on the viewing (e.g., tintable) window. In some embodiments, the transmittance of light through the viewing (e.g., tintable) window depends on the material properties of the viewing (e.g., tintable) window. The material properties may include manner of fabrication, thickness of one or more layers, conductive entity type, conductive entity concentration, and/or FLS, of the tintable window (e.g., optically switchable device included therein, such as an electrochromic construct).

With the media display being transparent at least in part and being disposed on a transparent support panel, a visual reproduction of a remote user on the media display may be presented in a way that results in an enhanced immersive experience. In some embodiments, video reproduction of the remote user is generated on a portion of the media display (e.g., as a cutout or filled-in silhouette of the remote user) while another portion of the media display is 1) muted (e.g., remains transparent so that the local user see through the media display to a local environment on the opposite side of the media display), and/or 2) reproduces virtual objects devised to enhance an illusion that the remote user is integrated with the local environment. As used herein, the term "media display" or media display construct" may include light emitting structures and light receiving structures, as well as supporting electronics such as an image processor, controller, and network interfaces capable of generating, transmitting, receiving, and or manipulating video streams.

FIG. 1 shows an example of digital collaboration unit 100 that is a standalone unit. A transparent panel carries a media display 120 over at least a part of the surface of the panel bordered by framing 110. The media display 120 may be movable relative to the framing 110 and/or transparent panel in a direction indicated, for example, in the directions of arrow 180 and/or movable relative to a gravitational center G. A position of the media display 120 may be automatically adjusted based on a height and/or position of a local user such as 130, which may be based on bodily features (e.g., a nose, eyebrows, eyes, pupils, a head, a chin, lips, a nose bridge, or ears) of local user 130 and/or historic preferences of local user 130. A position of the media display 120 may be (e.g., digitally and/or manually) adjustable by local user 130. A position of the media display 120 may be automatically adjustable, e.g., with a manual override, e.g., by local user 130. Cabling coupled to the media display 120 may move with the media display 120 when the media display is moving. In the example shown in FIG. 1, display 120 occupies an area on the panel bordered by framing 110, with an aspect ratio corresponding to a video output generated by conventional image sensors. An aspect ratio corresponding to the video output can be of about 16:9, of about 4:3, or any value between the aforementioned aspect ratios. The panel bordered by framing 110 and display 120 are free-standing in an enclosure such as an office space, e.g., for utilization by a local user 130 disposed on a side of media display 120 toward which video images are projected by display 120. User 130 is engaged in a video conference with a remote user who is depicted by a streamed virtual image 140 on the display 120, wherein the media stream used to generate image 140 may be captured by an image sensor at the remote location of the remote user. The image taken by the remote image sensor may be trimmed to project an image of the remote user, e.g., without any projected content in at least in a portion of the area surrounding the remote user (e.g., in the manner of a green-screen cutout) to provide an illusion that the remote user is seen as being present in the local environment. The example shown in FIG. 1 shows a remote user 140 that is cut from its real surrounding captured by the remote sensor, which remote surrounding appear transparent to user 130, such that user 130 can see cutout image 140 of the remote user devoid of the remote surrounding, and user 130 can see through a surrounding of cutout image 140. The display may generate the remote user's image at an image scale that causes the size of the image to represent the remote user at or close to life-size, e.g., with respect to the local user 130. The removal of a remote surrounding (e.g., background around the remote user's virtual image) can be performed locally in an image processor coupled to media display 120, remotely on the media stream before being transmitted. Remotely may be in a cloud, at the remote user's local, or at any other remote place to user 130. In some embodiments, media display 120 has a touchscreen capability (not shown in FIG. 1). The locally displayed images includes icons 150, e.g., that may be used for a control interface allowing user 130 to generate user commands for a control system handling the video conference. Although not shown, a digital collaboration unit (e.g., the media display and associated controller and/or processor) may include microphone(s) and/or other sound sensor(s), loudspeaker(s), etc., e.g., to facilitate audio communication. FIG. 1 shows an example of a physical work surface (e.g., a real ledge) 170 on which user 130 can lean and/or place real items on, and virtual work surface (e.g., a virtual ledge) 160 that remote user 140 seems to lean on. The physical work surface 170 may be movable relative to the framing 110 and/or transparent panel in a direction indicated, for example, in the directions of arrow 190 and/or movable relative to a gravitational center G. A position of the physical work surface 170 may be automatically adjusted based on a height and/or position of local user 130, which may be based on bodily features of local user 130 and/or historic preferences of local user 130. A position of the physical work surface 170 may be manually adjustable by a local user 130. A position of the physical work surface 170 may be automatically adjustable, e.g., with a manual override. A media display 120 and physical work surface 170 may be secured to each other to move in unison (e.g., in a concerted and/or coupled movement). A media display 120 and physical work surface 170 may each engage a mechanism that moves them in unison. A media display 120 and/or physical work surface 170 may be moveable without movement of the other (e.g., unconcerted movement, or uncoupled movement). The virtual ledge 160 may be a real remote ledge captured by the remote camera, or an emulated perspective ledge that is a virtual overlay. Virtual ledge 160 may appear as part of display 120 as retaining its relative position in the projected media, regardless of any movement of display 120 and/or physical work surface (e.g., physical ledge) 170. The panel held by framing 110 can comprise a transparent substrate (e.g., glass or plastic), which transparent substrate may comprise a tintable window. The transparent substrate may support the display construct 120. The display construct may be supported by framing 110 (e.g., an unsupported by the transparent substrate that is surrounded by framing 110).

In some embodiments, an immersive experience is enhanced by locating at least one sensor (e.g., an optical sensor such as an image sensor) behind at least a portion of the transparent media display to capture images of a user (e.g., video conference participant) from a location corresponding to the user's gaze, e.g., while participating in the video conference. To provide an appearance of a local user (e.g., as seen by the other remote user(s) on the video conference) in which the local user seems to be looking directly at the other remote user(s) (e.g., instead of appearing to be looking off to one side as with conventional image sensors located off to the side of a display such as a computer monitor), the sensor(s) may be positioned behind the transparent display. In some embodiments, the image sensor location is arranged to be directly behind a position on the media display from which the remote user's image is projected to the local user. As a result, the local user's focal point, when looking at the image of a remote participant, becomes aligned with the sensor(s) (e.g., camera) placement, and the media stream sent to the remote participant(s) represents that focal point as being pointed directly toward the remote participant. Since the media display is transparent at least in part (e.g., passes some degree of visible light in both directions), an image of the local user may be captured from an opposite side of the media display and/or support panel (e.g., within the aspect-ratio profile of the media display). In some embodiments, the image sensor(s) (e.g., sensor array) is disposed at a fixed location (e.g., at a vertical and horizontal center) relative to the media display. In some embodiments, the image sensor location is adjustable (manually and/or automatically) in a vertical direction and/or a horizontal direction, e.g., to correspond with an actual gazing direction of the user whose images are being captured (e.g., the local user).

In some embodiments, at least one sensor is disposed behind the display, e.g., to capture an image of a local user (e.g., to be streamed to remote user(s)). For placing a sensor(s) (e.g., video camera or other image sensor(s)) behind a transparent display to capture images of a local user, a separate sensor(s) (e.g., optical sensor and/or image sensor) may be deployed behind the display construct, or an integrated sensor(s) may be disposed within (or intimately associated with) the display construct. Behind the media display, is a side of the media display that is opposite to the side in which the user is disposed and/or towards which the image is projected by the media display (e.g., in a unidirectionally projecting media display). In some embodiments, a sensor(s) (e.g., video image sensor and/or sensor array) is configured as an autonomous unit supported on an opposite side of the transparent panel, which opposite side of the media display is a side of the media display that is (i) opposite to the side in which a local user is disposed and/or (ii) towards which the image is projected by the media display (e.g., in a unidirectionally projecting media display). Placing the sensor(s) behind the displayed image by the media display, can help obscure the sensor(s) from the local user's view. The media display can be a display construct that is part of an integrated glass unit (IGU). The media display can be coupled (e.g., attached via an adhesive and/or a fastener) to the supportive structure (e.g., tintable window). The supportive structure (e.g., tintable window) can be part of an IGU. In some embodiments, the sensor(s) (e.g., a camera) is integrated as part of the IGU (e.g., located between inner and outer glass panes in an IGU) and directed toward the user through a transparent display. The transparent display can be associated with the inner pane of an IGU, or externally coupled to an IGU that is devoid of a media display.

In some embodiments, the sensor(s) that capture an image in the local in which the display is disposed, are included in a camera. An optical focus (e.g., fixed focus) of the camera (e.g., which is disposed behind a transparent display) may be set to correspond to a nominal distance from the camera to a typical position of a local user (in the facility in which the camera is disposed). The focal distance may be different (e.g., significantly greater) than the distance from the camera to the transparent display, e.g., such that any image artifacts related to any light projected by the display and/or any visible structures of the display, are muted by de-focusing. Image processing may be used to remove or otherwise compensate for any light that might be emitted by the media display toward the camera. The camera may have an adjustable focus. The adjustable focus may be manually and/or automatically adjusted. For example, the focal point of the camera may be adjusted, e.g., automatically and/or by a user (e.g., using an application (App.).

In some embodiments, the sensor(s) (e.g., in a camera) may be configured for height adjustment, e.g., to match an eye level of the person being captured. The sensor(s) may be operatively coupled (e.g., connected) to an actuator such as a motor (e.g., a servo-motor). The actuator may comprise a Servomechanism (e.g., abbreviated herein as "servo"). The actuator may use feedback control scheme to correct the action of the sensor(s). The actuator may be operatively coupled to one or more controllers (e.g., a dedicated controller and/or the control system of the facility). The feedback scheme may comprise error-sensing negative feedback. The actuator may control the displacement of the sensor(s). The actuator may comprise, or be operatively coupled to, an encoder. The actuator may be operatively coupled to a position feedback mechanism, e.g., to ensure the position of the sensor(s) is at the user's gaze. The sensor(s) may be operatively coupled to one or more controllers that include a feedback control scheme. The one or more controllers may receive error-correction signals to help control mechanical position of the sensor(s), speed of the sensor(s) movement, attitude or any other measurable variables related to displacement of the sensor(s). The feedback control scheme may comprise a closed-loop feedback control scheme. The sensor(s) (e.g., camera) may be disposed on a support such as a carrier. The actuator may facilitate automatically positioning the sensor(s) (e.g., camera) to a center of the user's gaze (e.g., moving up-down and/or right-left). Down may be towards a gravitational center. The sensor(s) (e.g., camera) may be static or movable. The movement may be manually controlled by the local participant who is at the same local as the sensor(s) (e.g., in the same facility such as in the same room). In some embodiments, (e.g., manual) preferences for positioning an adjustable sensor(s) are stored, e.g., and assigned per user, per media display, and/or per local (e.g., per conference room and/or booth). The preferences may later be recalled, e.g., for automatically controlling the sensor position in response to activation of that sensor(s) (e.g., camera) by the user. The preferences may later be recalled, e.g., for automatically controlling sensor(s) position in response to activation of another sensor(s) (e.g., another camera) by the same user (e.g., the user preferences may be propagated to other media displays operatively coupled to vision sensor(s)). In some embodiments, movement is controlled to follow the optimal gaze point automatically, e.g., by using image recognition software. For example, facial feature tracking based at least in part on pattern recognition, can be optionally applied to the captured images. The facial feature may comprise eyes, pupils, nose (e.g., bridge and/or nostrils), eye brows, ears, distance between eyebrows, cheeks, chin, mouth, border of face, or hair line. The sensor(s) position adjustment may use a combination of techniques. For example, user preferences may be propagated to other media displays operatively coupled to vision sensor(s) as an initial sensors, and fine tuned (I) using image recognition software and/or (ii) manual user adjustment.

Figure 2:
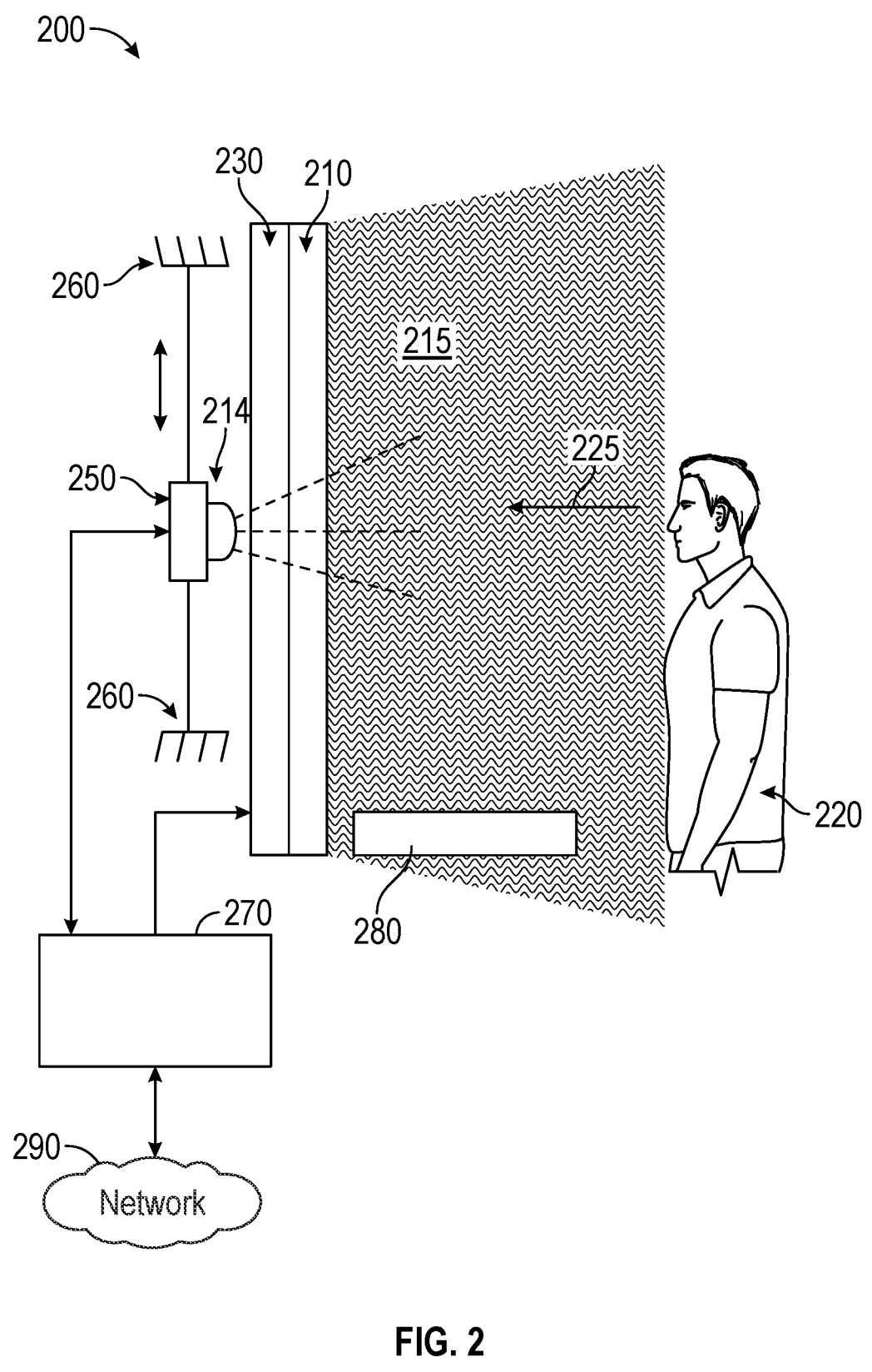

FIG. 2 shows an example of a camera system 200 for aligning a location from which images are captured with a focal point of a user's gaze toward the media display. A transparent media display 210 projects video images 215 toward a local user 220 who is disposed on a viewing side of media display 210. User 220 has a gazing direction 225 when looking at media display 210 when viewing a media stream, e.g., of a remote participant of a video conference and/or other digital collaboration. Media display 210 is supported by and/or is disposed on a transparent panel 230, which may be comprised of a tintable window. Sensor(s) 214 (e.g., in a camera) is disposed on a movable carriage (e.g., servo-system) 250 that is supported by mounts 260 fixed relative to panel 230 and media display 210. In some embodiments (not shown in the example of FIG. 2), the mount is integrated or attached to: the media display, the supportive substrate, and/or to a framing thereof. FIG. 2 shows an example of at least one controller 270 that is coupled to the movable carriage 250 for commanding movements of the carriage that place image sensor 214 in alignment with gazing direction 225. Controller 270 is operatively coupled to a network 290, e.g., for streaming content between local system 200 and the remote systems (e.g., media displays and controller) of the remote participant(s).

In some embodiments, the facility comprises a network. The network may be a communication and/or power network. The network may be coupled to a control system (e.g. that may comprise distributed network of controllers and/or a hierarchical control system). The display construct, the image sensor(s), and/or the tintable window may be operatively coupled to the network, e.g., and to the control system. The control system may control at least one other device of the facility such as devices adjusting to the environment of the facility, geo-location related devices, health, safety, entertainment, hospitality, work, and/or educational devices. At least a portion of the network may be (i) the first network deployed in the facility, (ii) disposed at an envelope of the facility, (iii) communicate power and communication on a single cable of the network, (iv) comprise electrical and optical cabling, (v) communicate two or more communication types on a single wire, and/or (vi) transmit communication and power on a single wire. The network may be configure to control different device types of the facility in which it is disposed. The network may be configured for environmental, health, and/or safety control. The local environment around local system 200 may include objects and/or surfaces perceived by user 220 during the collaboration. Some of the local environment may be seen through transparent media display 210 (e.g., portions not blocked by an image of the remote participants and/or auxiliary objects presented), and some objects are between user 220 and transparent media display 210. For example, a desk or table 280 may provide a work surface for user 220 at a lower end of media display 210. Virtual object(s) may be added to the images being displayed by media display 210 perspectively, e.g., to enhance an illusion that the remote participant(s) are in the local environment. For example, the virtual objects can include a virtual extension of table 280 that appears to local user 220 to perspectively extend into media display 210.

Figure 3:
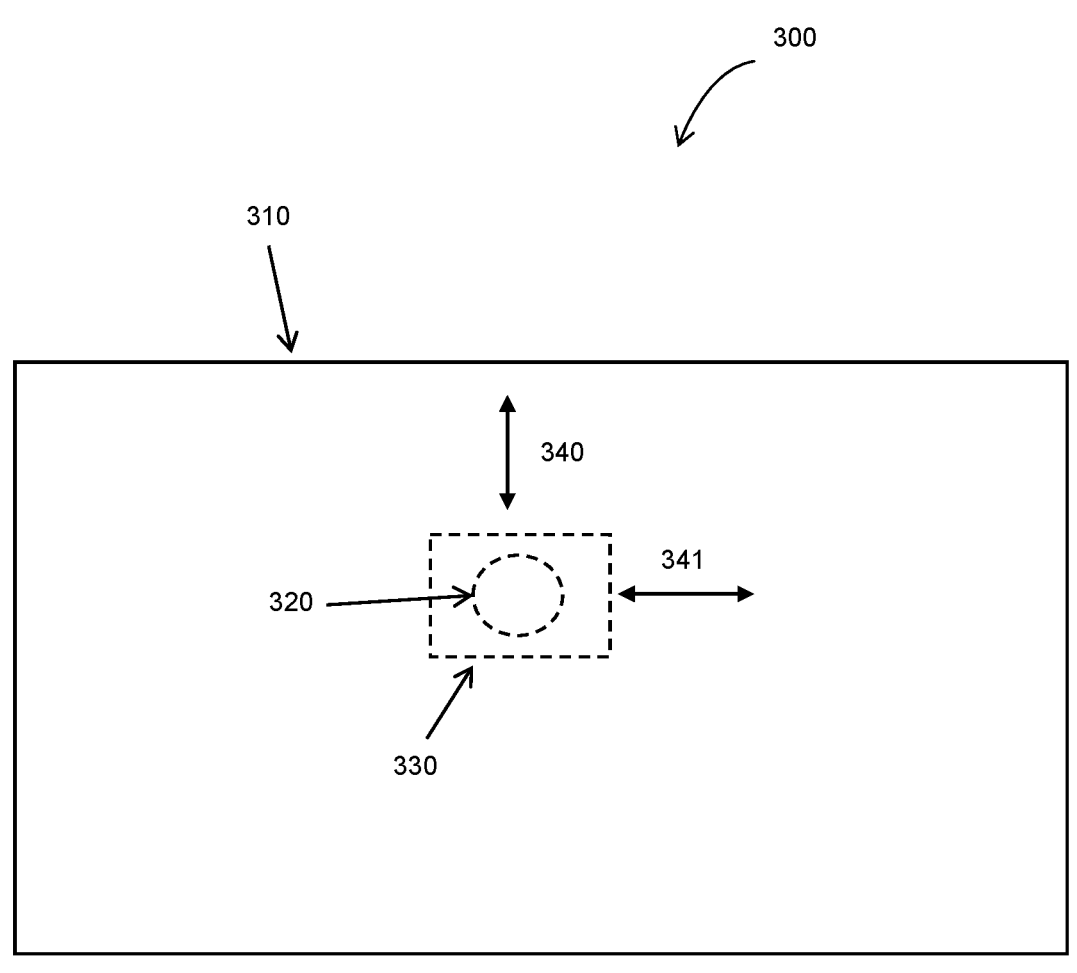
FIG. 3 shows a plan view of a display and movable sensor(s) (e.g., camera)

FIG. 3 shows an example of a front view of a digital collaboration system 300 having a transparent media display 310. Behind media display 310, image sensor(s) (e.g., in a camera) 320 is mounted on a movable carriage 330. Carriage 330 can be (e.g., servo and/or manually) controlled for vertical 340 and/or horizontal 431 movement with respect to gravitational center 342, e.g., to position sensor(s) 320 in a location corresponding to the local user's gaze.

In some embodiments, sensor(s) (e.g., comprising a video image sensor) is located separate from and/or behind a transparent media display, with behind being a side of the display away from the user and/or opposite to the direction of media projection by the display. A transparent display (such as a transparent organic light emitting diode (TOLED) array) can be configured to project an image substantially unidirectionally (e.g., from a front surface). At times, some portion of the light may be projected back toward the image sensor(s). The image sensor(s) may have an optical focal point such that a user located at a distance looking at the media display is in focus (e.g., at the focal point or substantially at the focal point), while the media display itself (e.g., the projecting entities of the media display) appears out of focus. The user may be disposed in front of the media display. The projecting entities of the media display may appear to the sensor(s) out of focus because (i) they are located away from the focal point of the sensor(s) (e.g., and closer to the sensor(s) as compared to the user). Any light leakage (e.g., glare) toward the sensor(s) from emitting entities of the media display (e.g., from the display pixels) may be spread over a plurality of sensors (e.g., sensing pixels) in the captured image, e.g., because of being out of focus. The emitting entities may include emitting entities that are within the field of view of the image sensor. The emitting entities may include emitting entities that are out of the field of view of the image sensor, e.g., and adjacent to the field of view of the image sensor. The brightness of any emitting entity (e.g., TOLED pixel) of the display as detected by any sensor (e.g., sensing pixel) may be (e.g., markedly) reduced (e.g., eliminated). The reduction may comprise filtering (e.g., optical filtering). The filtering may relate to the media projected by the projecting entities (e.g., that contribute to the glare). The reduction of glare may facilitate transmission of an image of a local user captured by the local sensor(s) through the transparent display, as transmitted to a remote user. The image captured by the local sensor(s) that is transmitted to the remote user(s), may by be crisp and/or minimally affected (e.g., unaffected) by projection of the local media display.

Figure 4:
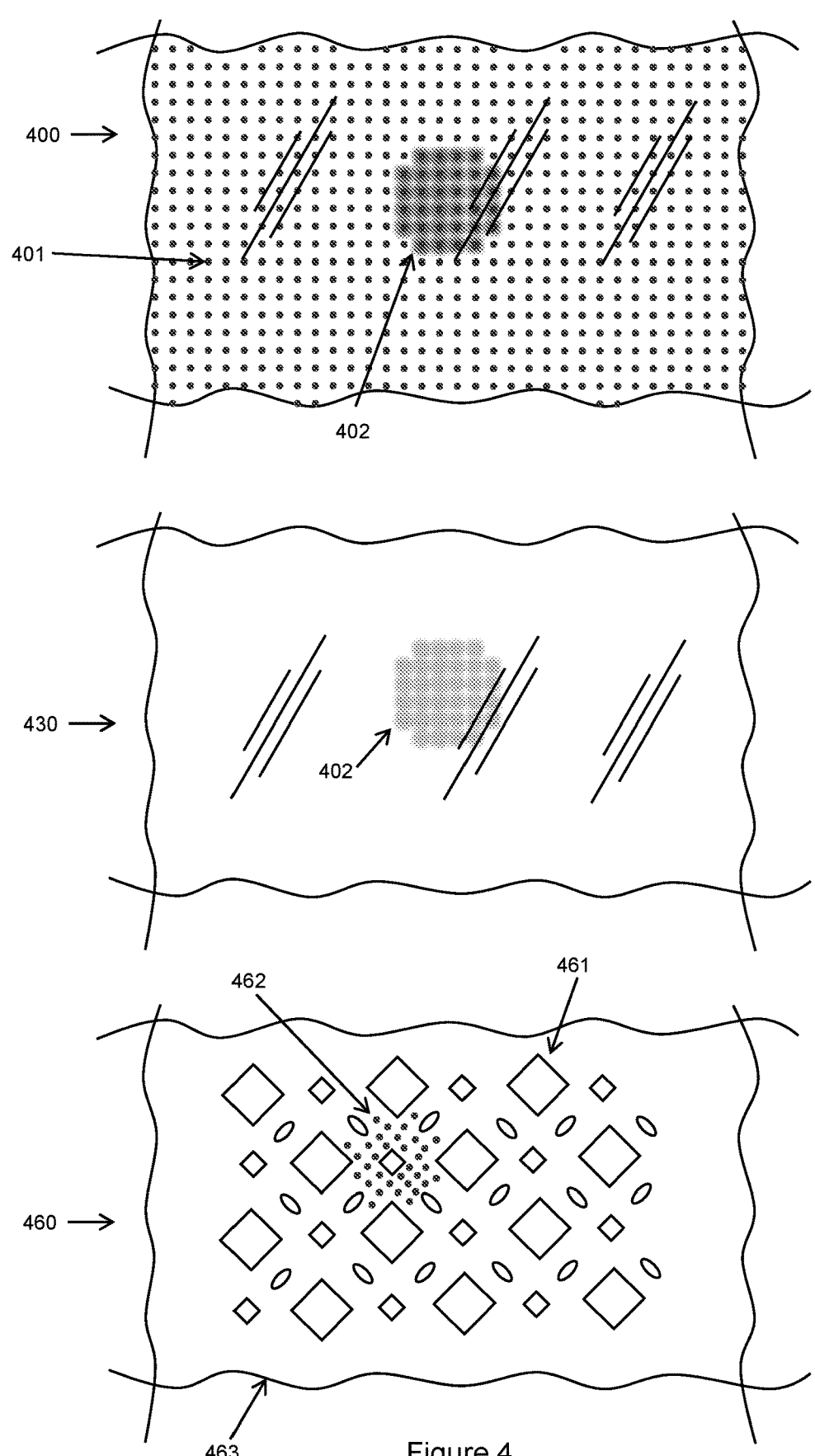
FIG. 4 shows interactions of media display substrates with image sensors.

FIG. 4 depicts some example relationships between display pixels 401 and camera pixels. View 400 is a view from a front side of a media display wherein an array of LED pixels 401 project an image to a local user. The front side of the display is the side of the display observed by the user and/or towards which the media is displayed. A shaded area 402 corresponds to a region of the media display through which an image sensor behind the media display receives light being captured for a media stream to remote user(s). Thus, a subset of all the LED pixels of the media display are in a position to potentially project light in a backwards direction toward the image sensor. View 430 is a view from a rear side of the media display. Light directed from the rear side of the media display in region 402 appears diffused to the image sensor, e.g., since region 402 is de-focused. In some instances, each pixel of the camera image may capture an area within region 402 smaller than a pixel size of the media display. Without wishing to be bound to theory, this may be because of convergence of light rays directed onto the pixels of the image sensor. The de-focused light from a pixel of the media display can spread over a number of camera pixels, such that a captured image may be influenced (e.g., mostly defined) by the light of the exterior scene passing through the transparent media display.

In some embodiments, an integrated image sensor is disposed within, or is intimately associated with, the transparent display assembly. A transparent substrate or set of substrates joined together in a common construct may include light-emitting entities (e.g., pixels) for the media display and light-sensing camera pixels (also known as "sensels") deposited on the common construct (e.g., as part of the media display construct). For example the sensels and the emitting entities of the media display can be part of a laminate or part of a common integrated glass unit (IGU). Various patterns can be employed for arranging the two pixel types to optimize imaging performance and/or minimize interactions between them. For (e.g., each) image pixel of the media display, light emitting entities may be provided for separate primary colors (e.g., RGB sub-pixels). The number of such elements, their surface areas, and/or arrangement patterns may depend upon an overall design and/or manufacturing process of the media display. The sensels may be arranged in a matrix (e.g., a grid of sensels). The projecting entities of the media display may be arranged in a matrix (e.g., a grid of projecting entities such as an LED grid). The grid of the sensels may be offset from the grid of projecting entities of the media display (e.g., to ensure optimal sensing of the sensels through the emitting entity matrix of the media display). The degree of offset between the two grids may facilitate minimum interference and/or overlap (e.g., no overlap, or substantially no overlap) between sensels and the projecting entities of the media display. Each of the light-emitting entities of the media display may occupy a larger surface area as compared to each of the light-sensing sensels. In some embodiments a sensel may have a size that is equal, or substantially equal, to a projecting entity of the media display (e.g., LED pixel). The light emitting entities may comprise TOLED pixels.

In some embodiments, sensels of a video image sensor array are disposed behind and/or between the media display pixels (e.g., in 2D from the user's perspective). A single lens, or a composite lens, may be incorporated (e.g., at least with respect to the imaging sensels), to capture the requested image. When integrated with a tintable window (e.g., an electrochromic window), the glass pane of the window can be patterned and/or controlled to provide an adjustable tint. The pattern and/or tint may function as an iris or filter for the senses (e.g., camera), e.g., embedded within the laminate and/or IGU.

To move the effective location (e.g., height) from which an image is captured of the local user, separate groupings of sensels may be constructed at respective locations on the display construct. In some embodiments, separate sensel groups are spaced apart from one another. Electronic switching of the outputs of separate groups of sensels may be used to select an effective camera height from different respective locations on the display construct. A continuous expanse of sensels may be utilized to cover an area greater than what is used at any one time, to capture an image. Electronic switching may select between different overlapping groups of sensels to choose from different heights, e.g., at a greater resolution.

In the example shown in FIG. 4, a high-magnification view 460 is shown of an integrated display and sensor construct 463 integrating light-emitting regions 461 with light-sensing regions 462. Integrated construct 463 may include a plurality of transparent layers joined together (e.g., as a laminate) and/or include an integrated glass unit (IGU). In the integrated construct, there may be a transparent substrate, transparent anode, transparent organic layer, and transparent cathode (e.g., of the tintable window such as an electrochromic window). Light-emitting regions 461 and light-sensing regions 462 may be formed on different substrates or on a common substrate. The integrated construct may be constructed such that external light sensed by the image sensing sensels first passes through at least a portion of the media display before reaching the sensels. Whether on the same or a different substrate, light-sensing regions 462 may be located offset from (e.g., between) light-emitting regions 461 (containing light emitting entities of the media display) when viewed in 2D from a location occupied by the user to be imaged.

In some embodiments, a transparent media display is used to enhance the immersive experience of a collaborative digital communication (e.g., video conference), e.g., by emulating the virtual participant's image with the local environment of the local participant(s), while stripping away incongruous elements of the remote environment of the remote participant(s) and/or auxiliary content to be presented (e.g., presentation, data sheet, article, picture, video, or any other document or exhibit). The media stream from the remote participant(s) may be altered before being displayed on the local transparent media display, e.g., by having a portion of the incoming information surrounding the material to be communicated (e.g., the virtual participant's image and/or auxiliary presentable content) removed. The removal of the incongruous content may facilitate retaining at least partial transparency of the media display in the area that was dedicated for the incongruous content. For example, emitting entities in the area of the media display in which the incongruous content should have been displayed, may be emitting dimmer light, or no light, e.g., to facilitate at least partial transparency of that area. The at least partial transparency of that area may facilitate viewing therethrough by a local viewer to provide an illusion that the virtual remote participant's image and/or auxiliary presentable content is disposed in the local environment. For example, a remote background around the virtual image of the remote user and/or remote presentation content, is replaced with a local (e.g., actual and real) view through the transparent display of a local environment of the local participant(s) (e.g., local viewer(s)). The area around the virtual remote participant's image and/or auxiliary content, may provide visibility of the local environment, e.g., to enhance an illusion that the remote user is present in the local environment. The virtual participant's image may be generated at an image scale that causes the size of the image on the local media display to be at or close to actual life-size. In some embodiments, physical furnishings are deployed in the local environment in ways that provide additional cues that further enhance the illusion. For example, a table or desk in the local environment placed in front of the media display may be oriented in an alignment that would extend into a plausible juxtaposition with the remote participant. For example, a virtual extension of the virtual perspective add-on overlay object (e.g., plant, or furniture such as a table) to the virtual image of the remote participant may be added. The virtual perspective object may provide an illusion of extension between the local participant(s) and the remote participant(s) and/or virtual remove auxiliary content. As another example, by including matching furnishings at multiple endpoints of a video conference (e.g., including a real table or desk in front of each real media display), each combined field of view for each respective participant (e.g., their view of their local environment combined with the virtual objects generated on their media display) can include the same matching desk or table on both sides of a video conference for creating a convincing telepresence illusion.

In some embodiments, virtual overlays are added to the displayed media stream that are configured to imitate the local environment (e.g., a ledge, a plant, or any other object).

The virtual overlay object may match the aesthetics of the local environment. The virtual overlay may be added automatically and/or per user's request. The virtual overlay may be personalized and/or chosen by a user such as the local participant(s) (e.g., using an App.). An overlay may be made to appear as an extension of a local furnishing (e.g., a virtual extension of a real local table or desk that is located in front of the local media display), or may represent a separate object (e.g., furnishing) having properties otherwise consistent with the local environment (e.g., aesthetic of the environment, usage of the environment, and/or purpose of the environment). The virtual overlay may be a perspective overlay. For example, a virtual overlay may be made to appear closer in the projected image to the viewing user (e.g., in front of the remote user in the projected image), thereby providing a virtual transition leading to the remote virtual image of the user and/or auxiliary content for presentation. Thus, a virtual object represented by the overlay may depict an object that spatially (e.g. perspectively) appears to be disposed between the local viewer(s) and the portion of the projected media stream displayed on the local media display that corresponds to the cut-out image of the remote participant and/or auxiliary content devoid of remote background. An overlay may be added to (e.g., merged with) a media stream, e.g., so that a virtual object is configured to flank a depiction of the virtual image of the remote participant and/or remote auxiliary content.

Figure 5:
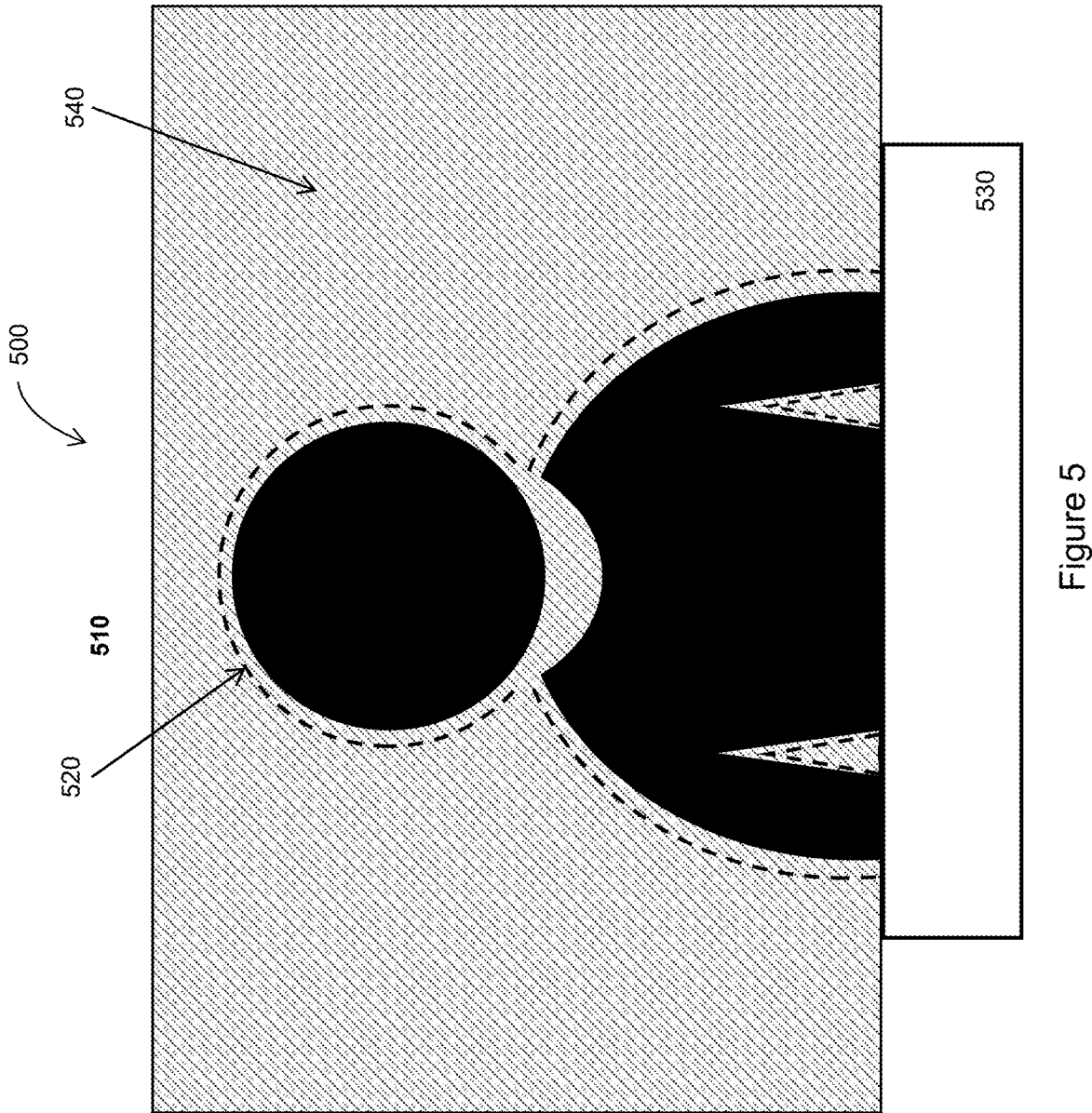
FIG. 5 schematically illustrates a user cutout to be extracted from an incoming image to be displayed on a media display.

FIG. 5 shows an example media display 500 projecting a virtual image 510 of a remote user. A dashed line 520 shows a cutout profile bordering image 510 that delineates between a foreground region to be reproduced that includes the remote user and a background region for which no image is to be projected (e.g., unless an overlay is added). A table 530 is located as a real local furnishing of a local environment in front of media display 500. Area 540 of the media display represents a background that is redacted from the remote virtual image, and is left at least partially or entirely transparent, so that the real local environment can be viewed therethrough.

Figure 6:
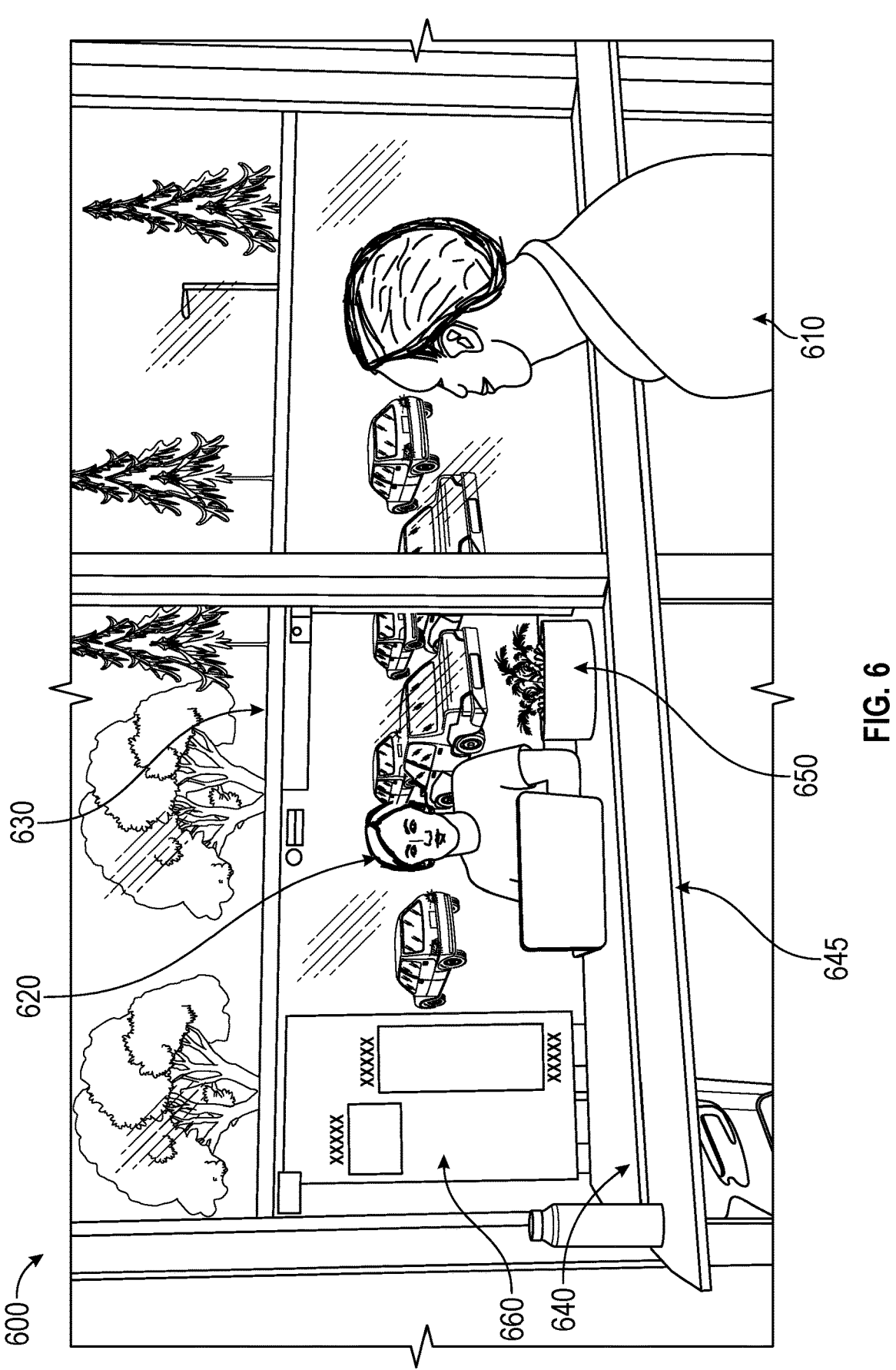
FIG. 6 depicts an immersive video interaction between collaborators via a transparent media display integrated with an exterior window of a building.

FIG. 6 depicts an example of a video conference in progress in a framing setup 600, which video conference is between a first local user 610 and a second remote user 620 presenting auxiliary content (e.g., data sheet) 660. A media display construct 630 disposed in front of local user 610 is projecting an image of user 620 along with a table overlay (e.g., a virtual table) 640 and a planter overlay (e.g., virtual planter) 650. A real ledge or table 645 is present in the local environment of user 610. Overlay 640 may depict a furnishing consistent with, and/or having an appearance of being a (e.g., perspective) extension of ledge 645.

Figure 7:
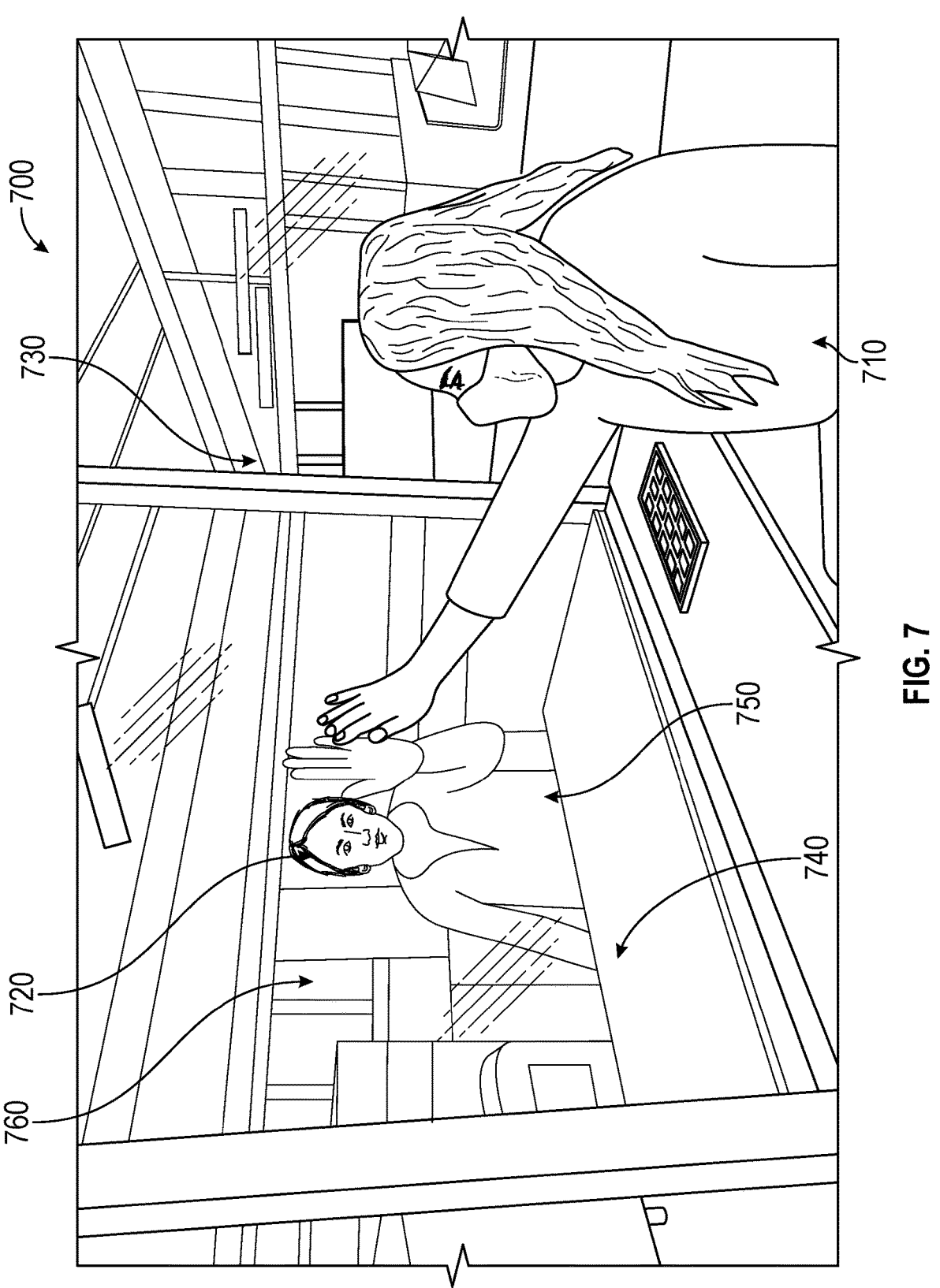
FIG. 7 depicts an immersive video interaction between collaborators via a transparent media display on a standalone panel inside a facility.

FIG. 7 depicts an example of a video conference 700 in progress between a first, local user 710 and a second, remote user 720. A media display construct 730 projects an image of user 720 along with a virtual table overlay 740, with the image of user 720 being cut-out and/or placed so that it does not overlap with overlay 740. User image 720 does not extend to the bottom edge of media display 730, but instead a lower edge of the cut-out coincides with an edge 750 of overlay 740. Thus, the illusion may be enhanced that makes remote user 720 appear to be farther away from local user 710 that the table or ledge represented by overlay 740. A background of remote user 720 is redacted such that user 710 can see the real local surrounding through portion 760 that forms the local background of the virtual image of remote user 720.

In some embodiments, shared auxiliary content is displayed to, and may optionally be manipulated by, participant(s) to a digital collaboration (e.g., simultaneously and/or in real time). At times, the right to manipulate the content can be restricted, e.g., by the presenter of the auxiliary content, according to a hierarchy of the participant(s) in the organization, and/or according to a hierarchy of the participants in the meeting. For example, a meeting organizer may have content manipulation rights, whereas a non-organizer may not. For example, a meeting presenter may have content manipulation rights of his presented content, whereas a non-presenter may not. For example, a manager participant may have content manipulation rights of his presented content, whereas a participant at a non-managerial position may not. The content manipulation rights may be prescribed manually (e.g., by the meeting organizer and/or presenter), e.g., before the meeting, during the meeting and/or in real time as the content is presented. The manipulation right prescription can be visible and/or manipulable via an app. The manipulation right prescription may be presented on the media display, e.g., during presentation (e.g., in a dropdown menu and/or screen). The app (e.g., application) may be executable on (i) a transitory processor such as of a smartphone, laptop, tablet, or (ii) other computing device of a participant. Auxiliary content may include text, graphic presentations, graphs, drawings, paintings, and/or a whiteboard capability. In some embodiments, a transparent display includes at least one region that has a touch screen functionality. A support app may be used that communicates with the media displays (e.g., with the controllers or image processors of the media displays). The support app can be configured to handle the auxiliary content (e.g., controlling access, creating and editing text, graphics, or other content). The support app may react to inputs generated by (e.g., each of) the participants (e.g., conveying content edits and/or modifying how the content is displayed) The support ap may relay the manipulation (e.g., revisions and/or comments) (I) to a central data source or (II) directly to (e.g., each) processor associated with the media display participating in the digital communication. The support app may provide functionality for defining (e.g., selecting from a menu) virtual elements to be displayed such as overlays (e.g., of furnishings, plants, or any other virtual objects). Selections defining a virtual environment may be made before, during, and/or after the digital communication (e.g., video conference) has launched. Configurations for particular media display systems (e.g., participant stations) and/or particular pairings of participant stations, may be stored for use in automatically configuring calls involving the stations. FIG. 6 depicts an example of a virtual document 660 being displayed on media display 630 being projected to user 610. A remote media display at a remote location of user 620 could likewise project an image of virtual document, e.g., similar to 660.

In some embodiments, Auxiliary content, the media display, the virtual overlays, or any combination thereof are controllable (e.g., manipulatable) using a digital twin of the enclosure in which the media display is disposed (e.g., in a touchless manner). The digital twin may include a database in a local server and/or in a cloud server, that stores content and/or rendering information that may be used to generate a representation of the auxiliary content to be shown on (e.g., each of) the media displays of the participants to a digital collaboration, and/or manipulation toolkit that can be utilized during the digital collaborative communication.

In some embodiments, when participants to a digital collaboration have determined a request to establish a video conference session, a support app and/or a digital twin is activated to configure details of the session. For example, network access information (e.g., addresses), media display and media streaming capabilities, image placement, elements of a virtual environment (e.g., overlays), and/or any pre-defined auxiliary content may optionally be defined using the support app. At an appointed time, the participants may take their places and launch their conference session via a network or networks (e.g., transport media and servers) linking their media displays (e.g., transparent displays, image sensors, controllers, and/or processors). Upon launch, media streams between the participant's media displays may be initiated such that a "cut-out" representation of remote participant(s) are projected on each transparent media display. For example, a portion of a media stream surrounding an image of the remote participant may be suppressed from being displayed, which suppression enables viewing at least a portion of the local environment through a portion of the local media display corresponding to the media stream portion that is suppressed. If selected (e.g., manually and/or automatically), appropriate overlays are merged with the media stream to respective media displays. The redacted (e.g., cut-out) representation of a participant may be captured using image sensor(s) that is located at a capture location that corresponds to a gazing region of the corresponding user directed towards the corresponding media display. The image sensor(s) may capture images through at least a portion of the transparent media display. The capture location(s) may be fixed or adjustable (e.g., manually and/or automatically adjustable). When an image sensor has an adjustable capture location then before or during a video conference session, the sensing location may be adjusted according to a direction in which the imaged user gazes towards the transparent media display. For example, the capture location may be adjusted to focus on a central, or on a substantially central, position such as (i) between pupils of the imaged user, (ii) between their brows, (iii) at the end of a nose bridge of the user, and/or (iv) any other capture location to focus, e.g., as disclosed herein. When a conference session includes auxiliary content, the touchscreen portions of the media display(s), a support app, and/or a virtual twin (e.g., data server), may be used to display and/or interact with the auxiliary content. The touchscreen portions of the media display(s), support app, and/or virtual twin, may be used to display and/or adjust virtual overlays before and/or during a conference session, e.g., if requested to enhance the integration of the immersive digital experience, for aesthetic considerations, for branding considerations, or just for fun.

Figure 8:
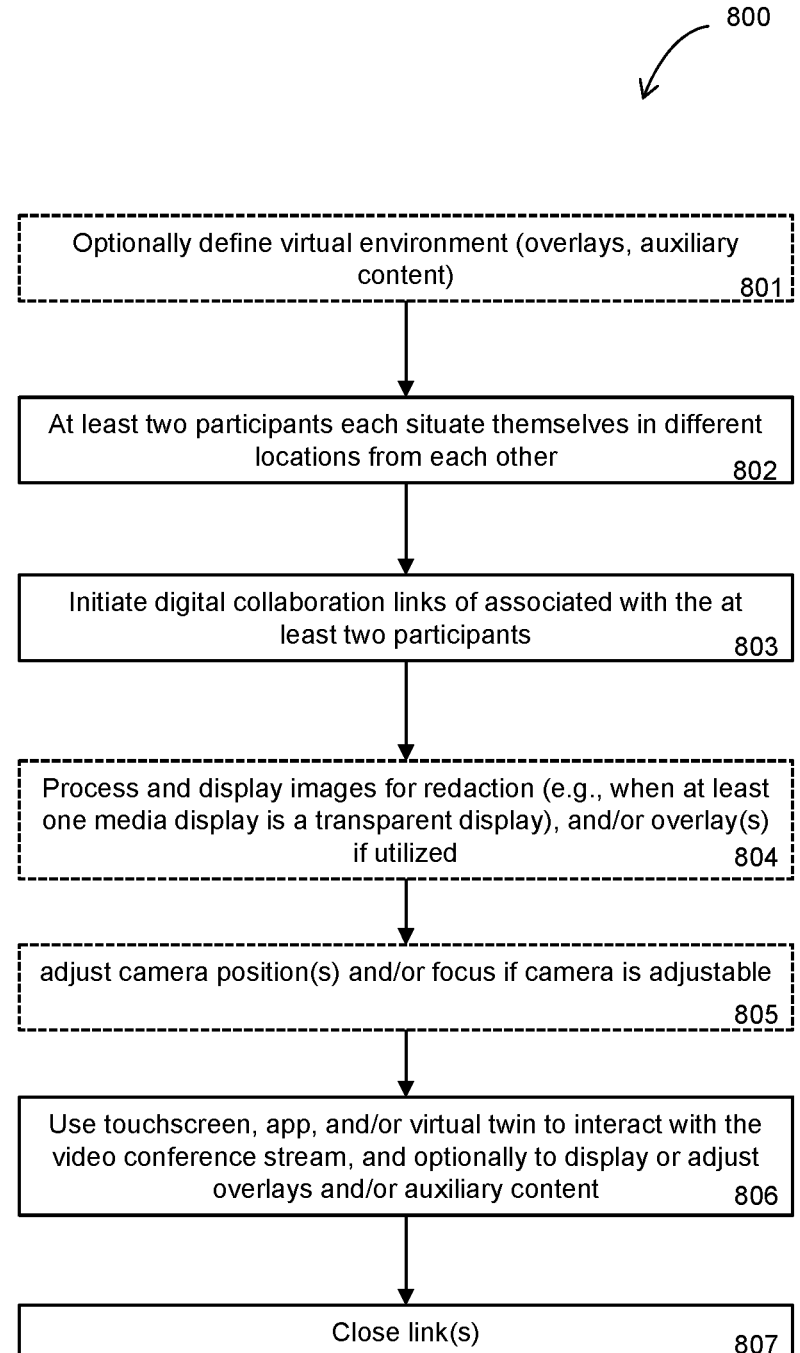
FIG. 8 shows a flowchart of an immersive collaboration method.

FIG. 8 shows an example of operations that may be performed in connection with a collaborative digital communication (e.g., video conference) session between remote participants. In an optional operation 801, a virtual environment may be defined (e.g., retrieved or selected) and optional auxiliary content may be set up and/or retrieved. At least two participants of the conference session in different (e.g., remote) locations, each situate themselves in proximity to a transparent media display and digital collaboration system in operation 802. In an operation 803, video conference links associated with the participants are initiated at each of the corresponding media display systems. During the conference session in an operation 804, images from respective media streams may be processed and displayed so that (i) if at least one of the media displays of the collaborative digital experience is a transparent display, background redacted (e.g., cut-out) images of the virtual image of the participant(s) displayed and/or any auxiliary content are displayed, and (iii) any selected overlays are displayed, on the respective media display. To provide accurate tracking of a participant's gaze, the positions and/or focus of any adjustable cameras may be adjusted in an operation 805. Camera adjustment may be vertical and/or horizontal, and may be manual and/or automatic. In an operation 806, a touchscreen, support app, and/or virtual twin may be used to interact with the video conference streams (e.g., to display, manipulate (e.g., adjust) overlays or auxiliary content). At the completion of the video conference session, the network links may be closed in operation 807. Preferences of participants, virtual overlays, camera, and/or media display setting may be stored (e.g., on the network).

In some embodiments, a digital twin (e.g., virtual twin) is used. The digital twin may provide a model of facility (e.g., comprising a building or buildings), including the structure of the facility, various (e.g., network-connected) devices in the facility, and network components in or coupled to the facility. In some embodiments, the digital twin includes representations of one or more transparent media display systems along with predetermined overlay(s). The digital twin may include a database for storing auxiliary content data, user preferences, media display preferences, camera preferences, and/or various definitions. The virtual model may comprise an electronic file associated with the facility, device(s), and/or network(s) such as a Building Information Model (BIM) (e.g., an Autodesk Revit® file or similar facility related file). A control interface to the digital twin can be configured to permit authorized users to initiate changes in the operation of various target devices (e.g., including media display(s)), e.g., since the digital twin links up each represented target element with (e.g., all) the needed information to select and/or control that target device (e.g., media display). For example, the target device may comprise a media display system. Users may initiate changes in how auxiliary content is displayed and/or changes to the auxiliary content itself. Via the media display system (e.g., using a touchscreen and/or via remote communication comprising gesture or sound recognition), a user may control any other device operatively coupled to the network, e.g., through the digital twin.

In some embodiments, dynamic elements in the digital twin include target (e.g., device) settings. The target setting may comprise (e.g., existing or predetermined): tint values, temperature settings, and/or light switch settings for the facility. The target settings may comprise available actions in media displays, such as controlling auxiliary content and/or overlays. The available actions may comprise menu items and/or hotspots in displayed content. The digital twin may include virtual representation of the target, of movable objects (e.g., chairs or doors), and/or of occupants (actual images from a camera or from stored avatars). In some embodiments, the dynamic elements can be targets (e.g., devices) that are newly plugged into the network, and/or disappear from the network (e.g., due to a malfunction or relocation). The digital twin can reside in any circuitry (e.g., processor) operatively coupled to the network. The circuitry in which the digital circuitry resides may be in the facility, outside of the facility, and/or in the cloud. In some embodiments, a two-way link is maintained between the digital twin and a real circuitry. The real circuitry may be part of the control system (e.g., of the facility). The real circuitry may be included in the master controller, network controller, floor controller, local controller, or in any other node in a processing system (e.g., in the facility or outside of the facility). For example, the two-way link can be used by the real circuitry to inform the digital twin of changes in the dynamic and/or static elements, e.g., so that the 3D representation of the enclosure can be updated (e.g., in real time). The two-way link may be used by the digital twin to inform the real circuitry of manipulative (e.g., control) actions entered by a user on a mobile circuitry. The mobile circuitry can be a remote controller (e.g., comprising a handheld pointer, manual input buttons, or touchscreen) that may execute the support app.

Figure 9:
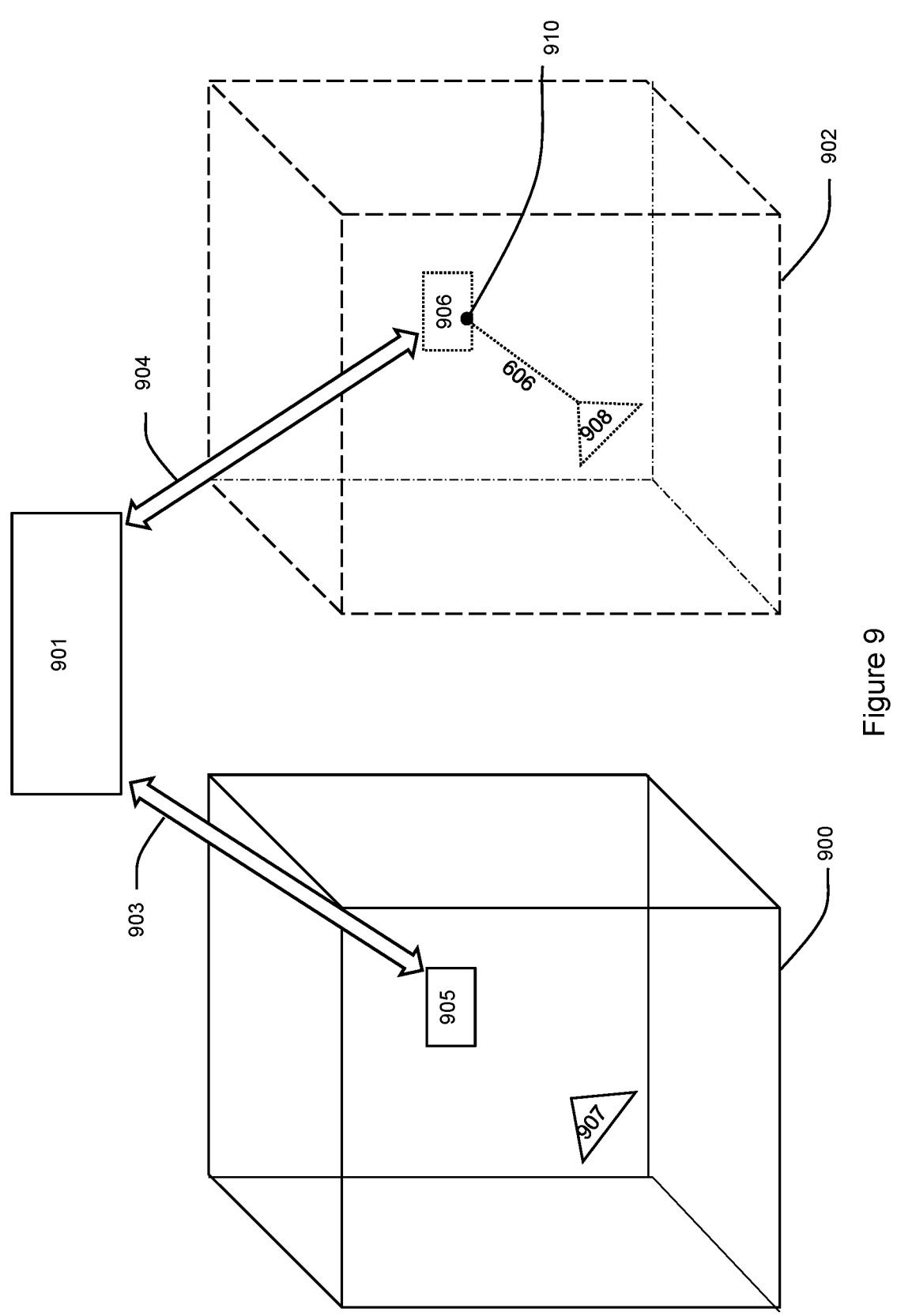
FIG. 9 depicts an enclosure communicatively coupled to its digital twin representation.

FIG. 9 shows an example of a control system in that a real, physical enclosure (e.g., room or building) 900 includes a controller network for managing interactive network devices under control of a processor 901 (e.g., a master controller). The structure and contents of building 900 are represented in a 3D model digital twin 902 as part of a modeling and/or simulation system executed by a computing asset. The computing asset may be co-located with, or remote from, enclosure 900 and processor (e.g., master controller) 901. A network link 903 in enclosure 900 connects processor 901 with a plurality of network nodes including an interactive target 905 such as a media display, Interactive target 905 is represented as a virtual object 906 in digital twin 902. A network link 904 connects processor 901 with digital twin 902. In some embodiments, the digital twin resides in processor 901.

In the example shown in FIG. 9, a user located in enclosure 900 carries a handheld control 907 that may have a circuitry (e.g., processor) for executing a support app and a pointing capability (e.g., to couple with the target 905). The location of handheld control 907 may be tracked, for example, via a network link with digital twin 902 (not shown). The link may include some transport media contained within network 903. Handheld controller 907 is represented as a virtual handheld controller 908 within digital twin 902. Based at least in part on the tracked location and pointing capability of handheld controller 907, when the user initiates a pointing event (e.g., aiming at a particular target and pressing an action button on the handheld controller) it is transmitted to digital twin 902. Accordingly, digital twin 902 may identify an intended action directed to a target (e.g., represented as a digital ray 909 from the tracked location in digital twin 902). Digital ray 909 intersects with virtual device 906 at a point of intersection 910. A resulting interpretation of actions made by the user in the digital twin 902 is reported by digital twin 902 to processor 901 via network link 904. In response, processor 901 relays a control message to interactive device 905 to initiate a commanded action, e.g., in accordance with a gesture (or other input action) made by the user using handheld controller 907.

In some embodiments, a video camera is placed behind a transparent display for capturing images of a local user. An immersive experience can be obtained when an image of a remote participant of a video conference is blended with a present (local) environment (real and/or augmented) using a transparent media display (e.g., TOLED). In some embodiments, the transparent display construct is coupled to a structure (e.g., a supportive structure that can be a fixture or a non-fixture). The structure (e.g., supportive structure) may comprise a window, a wall, or a board. The display construct may be coupled to the structure, e.g., with a fastener. There may be a distance between the display construct and the structure, e.g., when the display construct is operational. The distance may be at most about 0.5 meters (m), 0.4 m, 0.3 m, 0.2 m, 0.1 m, 0.05 m, 0.025 m, or 0.01 m. Examples of fasteners, media display, display construct, supportive structure, control system and network, can be found in International Patent Application Serial No. PCT/US20/53641, which is incorporated herein by reference in its entirety.

In some embodiments, a display construct that is coupled with a viewing (e.g., a tintable viewing) window. The viewing window may include an integrated glass unit. The display construct may include one or more glass panes.

In some embodiments, at least a portion of a window surface in a facility is utilized to display the various media using the glass display construct. The display may be utilized for (e.g., at least partial) viewing an environment external to the window (e.g., outdoor environment), e.g., when the display is not operating. The display may be used to display media (e.g., as disclosed herein), to augment the external view with (e.g., optical, real, and/or virtual) overlays, augmented reality, and/or lighting (e.g., the display may act as a light source). The media may be used for entertainment and non-entertainment purposes. The display may be used for medical, security, educational, informative, monetary, hospitality, and/or other purposes. The media may be used for work (e.g., data analysis, drafting, and/or video conferencing). The media may be manipulated (e.g., by utilizing the display construct, any control tools, gesture control, and/or related apps such as disclosed herein). Utilizing the display construct can be direct or indirect. Indirect utilization of the media may be using an input device such as via a mobile circuitry (e.g., controller) such as an electronic mouse, a stylus, or a keyboard. The input device may be communicatively (e.g., wired and/or wirelessly) coupled to the media. Direct utilization may be by using the display construct as a touch screen using a user (e.g., finger) or a directing device (e.g., an electronic pen or stylus). The directing device may be made or, and/or coated with a low abrasive material (e.g., a polymer). The low abrasive material may be configured to facilitate (e.g., repeatedly) contacting the display construct with minimal damage (e.g., scratching) to the display construct. The low abrasive material may comprise a polymer or resin (e.g., plastic). The directing device may be passive or active. The active directing device may operatively couple to the display construct and/or network. The active directing device may comprise a circuitry. The active directing device may comprise a remote controller. The directing device may facilitate direction of operations related to media presented by the display construct. The directing device may facilitate (e.g., real time and/or in situ) interaction with the media presented by the display construct. Examples of directing devices, control system and network, can be found in International Patent Application Serial No. PCT/US20/53641 which is incorporated herein by reference in its entirety. Examples of digital twin, gesture control, controlling circuitry (e.g., VR devices) service devices, target devices, control system and network, can be found in International Patent Application Serial No. PCT/US21/27418, which is incorporated herein by reference in its entirety.

Embodiments described herein relate to vision windows with a tandem (e.g., transparent) display construct. In certain embodiments, the vision window is a tintable window such as an electrochromic window. The electrochromic window may comprise a solid state and/or inorganic electrochromic (EC) device. The vision window may be in the form of an integrated glass unit (IGU). When the IGU includes an electrochromic (abbreviated herein as "EC") device, it may be termed an "EC IGU." The EC IGU can tint (e.g., darken) a room in which it is disposed and/or provide a tinted (e.g., darker) background as compared to a non-tinted IGU. The tinted IGU can provide a background preferable (e.g., necessary) for acceptable (e.g., good) contrast on the (e.g., transparent) display construct. In another example, windows with (e.g., transparent) display constructs can replace televisions (abbreviated herein as "TVs") in commercial and residential applications. Together, the (e.g., transparent) display construct and the tintable window (e.g., in the form of EC IGU) can provide visual privacy glass function, e.g., because the display can augment the privacy provided by tintable window (e.g., EC window).

The display may be integrated as a display construct with window panel(s) (e.g., frame(s)). Examples of display constructs can be found in International Patent Application Serial No. PCT/US20/53641, which is incorporated herein by reference in its entirety.

In some embodiments, a display construct may include one or more glass panes. The display (e.g., display matrix) may comprise a light emitting diode (LED). The LED may comprise an organic material (e.g., organic light emitting diode abbreviated herein as "OLED"). The OLED may comprise a transparent organic light emitting diode display (abbreviated herein as "TOLED"), which TOLED is at least partially transparent. The display may have at its fundamental length scale 2000, 3000, 4000, 5000, 6000, 7000, or 8000 pixels. The display may have at its fundamental length scale any number of pixels between the aforementioned number of pixels (e.g., from about 2000 pixels to about 4000 pixels, from about 4000 pixels to about 8000 pixels, or from about 2000 pixels to about 8000 pixels). A fundamental length scale may comprise a diameter of a bounding circle, a length, a width, or a height. The fundamental length scale may be abbreviated herein as "FLS." The display construct may comprise a high resolution display. For example, the display construct may have a resolution of at least about 550, 576, 680, 720, 768, 1024, 1080, 1920, 1280, 2160, 3840, 4096, 4320, or 7680 pixels, by at least about 550, 576, 680, 720, 768, 1024, 1080, 1280, 1920, 2160, 3840, 4096, 4320, or 7680 pixels (at 30 Hz or at 60 Hz). The first number of pixels may designate the height of the display and the second pixels may designates the length of the display. For example, the display may be a high resolution display having a resolution of 1920×1080, 3840×2160, 4096×2160, or 7680×4320. The display may be a standard definition display, enhanced definition display, high definition display, or an ultra-high definition display. The display may be rectangular. The image projected by the display matrix may be refreshed at a frequency (e.g., at a refresh rate) of at least about 20 Hz, 30 Hz, 60 Hz, 70 Hz, 75 Hz, 80 Hz, 100 Hz, or 120 Hertz (Hz). The FLS of the display construct may be at least 20", 25", 30", 35", 40", 45", 50", 55", 60", 65", 80", or 90 inches ("). The FLS of the display construct can be of any value between the aforementioned values (e.g., from about 20" to about 55", from about 55" to about 100", or from about 20" to about 100").

In some embodiments, at least a portion of a window surface in a facility is utilized to display the various media using the glass display construct. The display may be utilized for (e.g., at least partial) viewing an environment external to the window (e.g., outdoor environment), e.g., when the display is not operating. The display may be used to display media (e.g., as disclosed herein), to augment the external view with (e.g., optical) overlays, augmented reality, and/or lighting (e.g., the display may act as a light source). The media may be used for entertainment and non-entertainment purposes. The media may be used for work (e.g., data analysis, data processing, data manipulation, drafting, compilation, and/or video conferencing). The media may be manipulated (e.g., at least in part by utilizing the display construct). Utilizing the display construct can be direct or indirect. Indirect utilization of the media may be using an input device such as an electronic mouse, or a keyboard. The input device may be communicatively (e.g., wired and/or wirelessly) coupled to the media. Direct utilization may be by using the display construct as a touch screen using a user (e.g., finger) or a contacting device (e.g., an electronic pen or stylus).

Figure 10A:
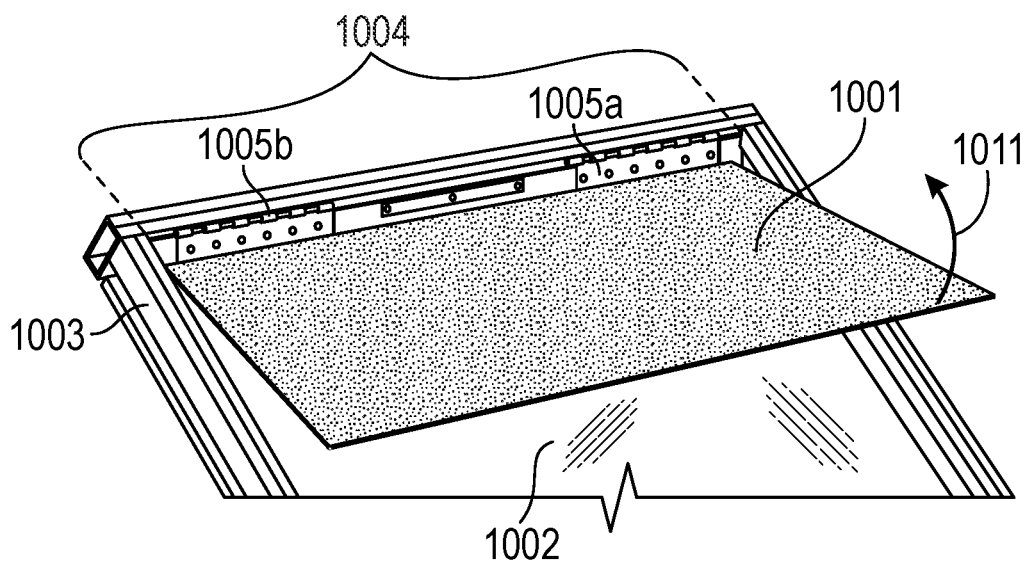
FIGS. 10A and 10B show various windows and displays.

FIG. 10A shows an example of a window 1002 framed in a window frame 1003, and a fastener structure 1004 comprising a first hinge 1005*a* and a second hinge 1005*b*, which hinges facilitate rotating display construct 1001 about the hinge axis, e.g., in a direction of arrow 1011. The window may be a smart window such as an electrochromic (EC) window. The window may be in the form of an EC IGU. In one embodiment, mounted to window frame (e.g., 1003) is one or more display constructs (e.g., transparent display) (e.g., 1001) that is transparent at least in part. In one embodiment, the one or more display constructs (e.g., transparent display) comprises T-OLED technology, but it should be understood that the present invention should not be limited by or to such technology. In one embodiment, one or more display constructs (e.g., transparent display) is mounted to frame (e.g., 1003) via a fastener structure (e.g., 1004). In one embodiment the fastener structure (also referred to herein as a "fastener") comprises a bracket. In one embodiment, the fastener structure comprises an L-bracket. In one embodiment, L-bracket comprises a length that approximates or equals a length of a side of window (e.g., and in the example shown in FIG. 10A, also the length of the fastener 1004). In embodiments, the fundamental length scale (e.g., length) of a window is at most about 60 feet ('), 50', 40', 30', 25', 20', 15', 10', 5' or 1'. The FLS of the window can be of any value between the aforementioned values (e.g. from 1' to 60', from 1' to 30', from 30' to 60', or from 10' to 40'). In embodiments, the fundamental length scale (e.g., length) of a window is at least about 60', 80', or 100'. In one embodiment, the display construct (e.g., transparent display) encompasses an area that (e.g., substantially) matches a surface area of the lite (e.g., pane).

Figure 10B:
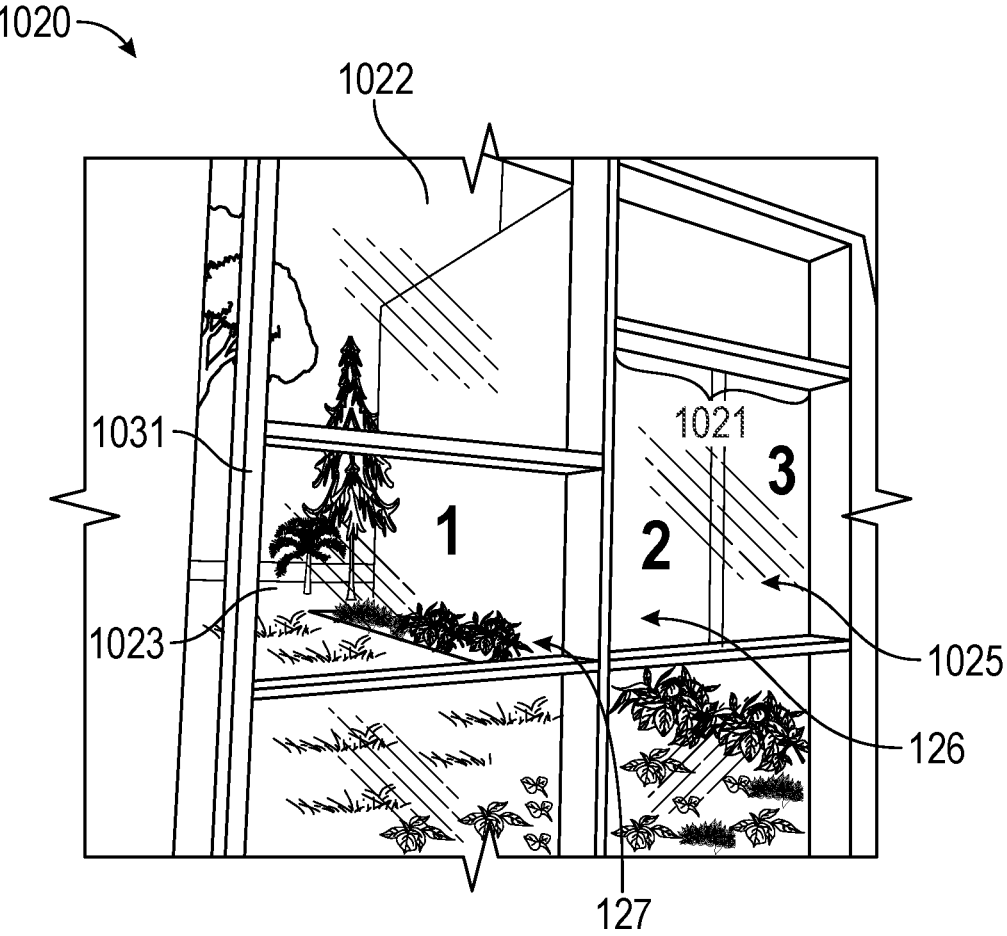

FIG. 10B shows an example of various windows in a facade 1020 of a building, which facade comprises windows 1022, 1023, and 1021, and display constructs 1, 2, and 3. In the example shown in FIG. 10B, display construct 1 is transparent at least in part and is disposed over window 1023 (e.g., display construct 1 is super positioned over window 1023) such that the entirety of window 1023 is covered by the display construct, and a user can view through the display construct 1 and the window 1023 the external environment (e.g., flowers, glass, and trees). Display construct 1 is coupled to the window with a fastener that facilitates rotation of the display construct about an axis parallel to the window bottom horizontal edge, which rotation is in the direction of arrow 1027. In the example shown in FIG. 10B, display constructs 2 and 3 are transparent at least in part and are disposed over window 1021 such that the entirety of window 1021 is covered by the two display construct each covering (e.g., extending to) about half of the surface area of window 1021, and a user can view through the display constructs 2 and 3 and the window 1021 the external environment (e.g., flowers, glass, and trees). Display construct 2 is coupled to the window 1021 with a fastener that facilitates rotation of the display construct about an axis parallel to the window left vertical edge, which rotation is in the direction of arrow 1026. Display construct 3 is coupled to the window with a fastener that facilitates rotation of the display construct about an axis parallel to the window 1021 right vertical edge, which rotation is in the direction of arrow 1025.

In some embodiments, the display construct comprises a hardened transparent material such as plastic or glass. The glass may be in the form of one or more glass panes. For example, the display construct may include a display matrix (e.g., an array of lights) disposed between two glass panes. The array of lights may include an array of colored lights. For example, an array of red, green, and blue colored lights. For example, an array of cyan, magenta, and yellow colored lights. The array of lights may include light colors used in electronic screen display. The array of lights may comprise an array of LEDs (e.g., OLEDs, e.g., TOLEDs). The matrix display (e.g., array of lights) may be at least partially transparent (e.g., to an average human eye). The transparent OLED may facilitate transition of a substantial portion (e.g., greater than about 30%, 40%, 50%, 60%, 80%, 90% or 95%) of the intensity and/or wavelength to which an average human eye senses. The matrix display may form minimal disturbance to a user looking through the array. The array of lights may form minimal disturbance to a user looking through a window on which the array is disposed. The display matrix (e.g., array of lights) may be maximally transparent. At least one glass pane of the display construct may be of a regular glass thickness. The regular glass may have a thickness of at least about 1 millimeters (mm), 2 mm, 3 mm, 4 mm, 5 mm, or 6 mm. The regular glass may have a thickness of a value between any of the aforementioned values (e.g., from 1 mm to 6 mm, from 1 mm to 3 mm, from 3 mm to about 4 mm, or from 4 mm to 6 mm). At least one glass pane of the display construct may be of a thin glass thickness. The thin glass may have a thickness of at most about 0.4 millimeters (mm), 0.5 mm, 0.6 mm, 0.7 mm, 0.8 mm, or 0.9 mm thick. The thin glass may have a thickness of a value between any of the aforementioned values (e.g., from 0.4 mm to 0.9 mm, from 0.4 mm to 0.7 mm, or from 0.5 mm to 0.9 mm). The glass of the display construct may be at least transmissive (e.g., in the visible spectrum). For example, the glass may be at least about 80%, 85%, 90%, 95%, or 99% transmissive. The glass may have a transmissivity percentage value between any of the aforementioned percentages (e.g., from about 80% to about 99%). The display construct may comprise one or more panes (e.g., glass panes). For example, the display construct may comprise a plurality (e.g., two) of panes. The glass panes may have (e.g., substantially) the same thickness, or different thickness. The front facing pane may be thicker than the back facing pane. The back facing pane may be thicker than the front facing pane. Front may be in a direction of a prospective viewer (e.g., in front of display construct 1001, looking at display construct 1001). Back may be in the direction of a (e.g., tintable) window (e.g., 1002). One glass may be thicker relative to another glass. The thicker glass may be at least about 1.25*, 1.5*, 2*, 2.5*, 3* 3.5*, or 4* thicker than the thinner glass. The symbol "*" designates the mathematical operation of "times." The transmissivity of the display construct (that including the one or more panes and the display matrix (e.g., light-array or LCD)) may be of at least about 20%, 30%, 35%, 40%, 45%, 50%, 60%, 70%, 80%, or 90%. The display construct may have a transmissivity percentage value between any of the aforementioned percentages (e.g., from about 20% to about 90%, from about 20% to about 50%, from about 20% to about 40%, from about 30% to about 40%, from about 40% to about 80%, or from about 50% to about 90%). A higher transmissivity parentage refers higher intensity and/or broader spectrum of light that passes through a material (e.g., glass). The transmissivity may be of visible light. The transmissivity may be measured as visible transmittance (abbreviated herein as "Tvis") referring to the amount of light in the visible portion of the spectrum that passes through a material. The transmissivity may be relative to the intensity of incoming light. The display construct may transmit at least about 80%, 85%, 90%, 95%, or 99% of the visible spectrum of light (e.g., wavelength spectrum) therethrough. The display construct may transmit a percentage value between any of the aforementioned percentages (e.g., from about 80% to about 99%). In some embodiments, instead of an array of lights, a liquid crystal display is utilized.

Figure 11:
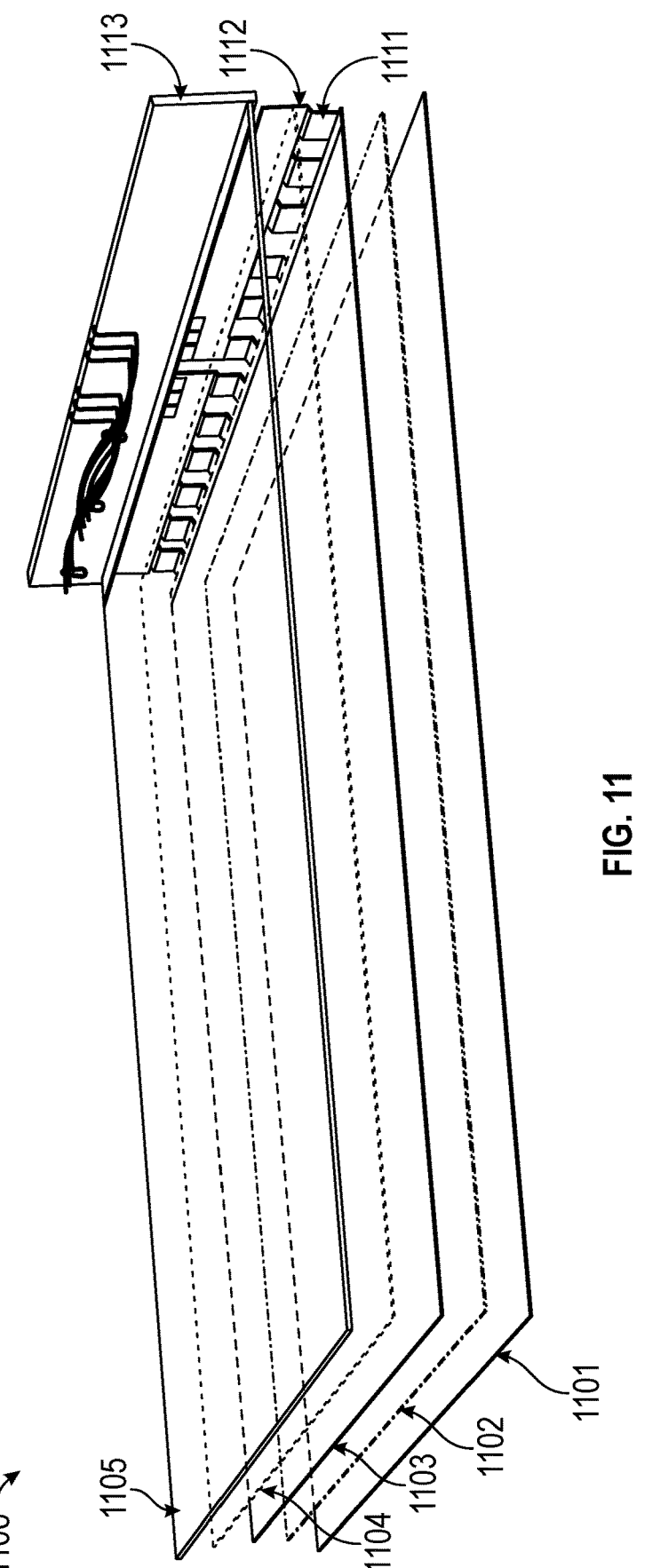
FIG. 11 schematically shows a display (e.g., a display construct assembly)

FIG. 11 shows a schematic example of a display construct assembly (e.g., laminate) 1100 prior to its lamination, which display construct that includes a thicker glass pane 1105, a first adhesive layer 1104, a display matrix 1103, a second adhesive layer 1102, and a thinner glass pane 1101, which matrix is connected via wiring 1111 to a circuitry 1112 that controls at least an aspect of the display construct, which display construct is coupled to a fastener 1113.

In some embodiments, gesture command is used for controlling a mobile circuitry or other interface that controls a video conference session, the real or virtual environments, and/or auxiliary content. A sensor (e.g., an image sensor) may be used instead of (or in addition to) a microphone, to perceive and record the user's command. The mobile circuitry may be communicatively coupled to the network that is communicatively coupled to a digital twin of the enclosure in which the target is disposed. Instead of a voice recognition module, a gesture recognition module may be employed for analyzing the mobile circuitry and/or sensor (e.g., camera) data. For example, a user may be positioned within a field of view of a camera so that movements of the user can be captured which are carried out according to a requested control action to be taken in connection with controllable targets (e.g., devices) such as tintable windows. For example, movements of the user can be captured by the mobile device manipulated by the user (e.g., moved by the user) that are carried out according to a requested control action to be taken in connection with controllable targets (e.g., devices) such as tintable windows. Examples of digital twin, gesture control, controlling circuitry (e.g., VR devices) service devices, target devices, control system and network, can be found in International Patent Application Serial No. PCT/US21/27418, which is incorporated herein by reference in its entirety.

Figure 12:
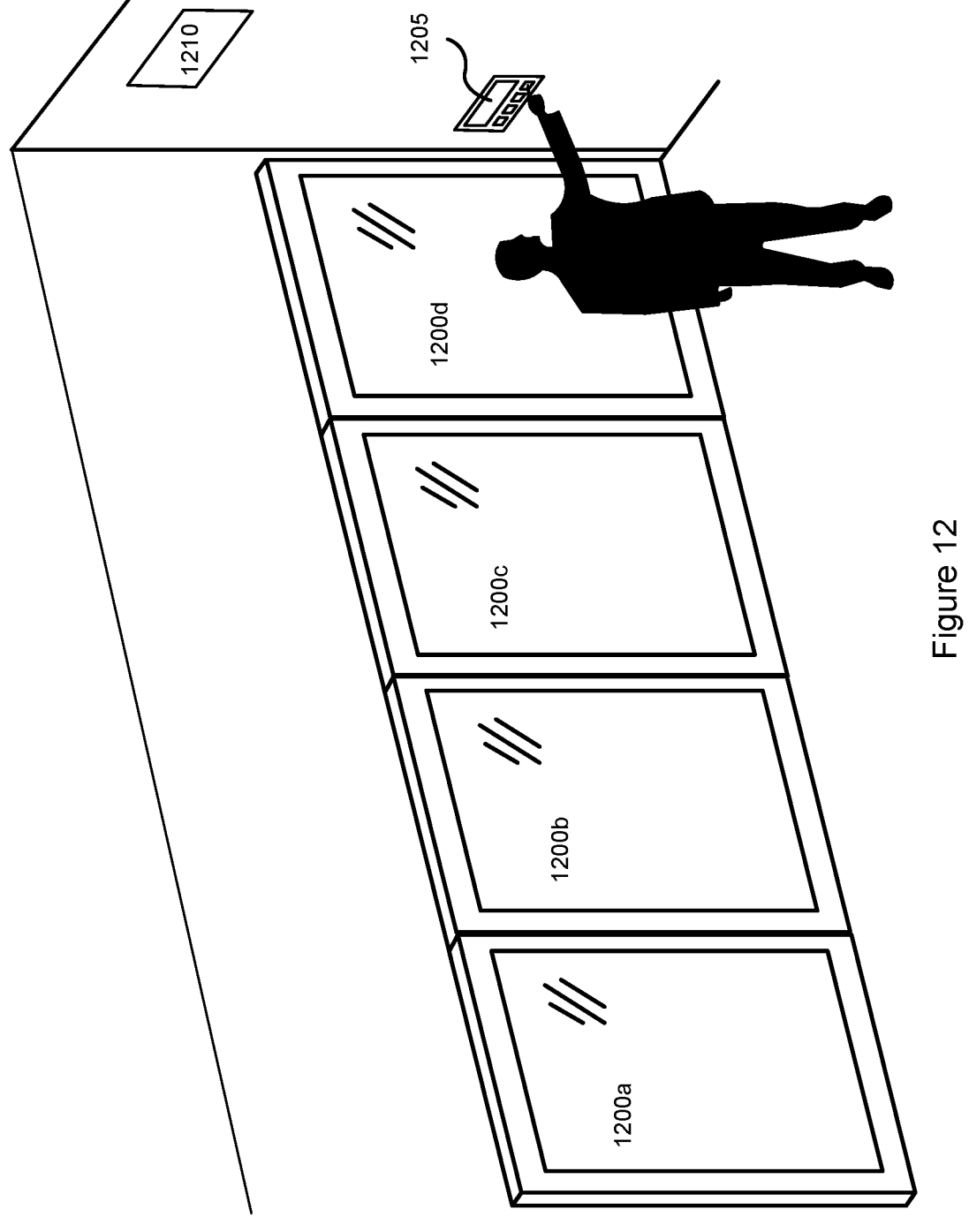
FIG. 12 schematically shows a user interacting with a device of disposed on or attached to a wall.

FIG. 12 shows an example of a user interacting with a device 1205 for controlling status of a target that is the optical state of electrochromic windows 1200a-1200d. In this example, the device 1205 is a wall device as described above. In some embodiments, the wall device 1205 is or includes a smart device such as an electronic tablet or similar device. Device 1205 may be a device configured to control the electrochromic windows 1200a-1200d, including but not limited to a smartphone, tablet, laptop, PC, etc. The device 1205 may run an application/program that is configured to control the electrochromic windows. In some embodiments, the device 1205 communicates with an access point 1210, for example through a wired connection or a wireless connection (e.g., WiFi, Bluetooth, Bluetooth low energy, ZigBee, WiMax, etc.). The wireless connection can allow at least one apparatus (e.g., target apparatus) to connect to the network, internet, and/or communicate with one another wirelessly within an area (e.g., within a range). The access point 1210 may be a networking hardware device that allows a wireless technology (e.g., Wi-Fi) compliant device to connect to a wired network. The device 1205 may communicate with a controller (e.g., of a control system such as a window controller, network controller, and/or master controller) through a connection scheme.

Embodiments of the invention may be scalable to adapt an immersive experience according to a number of participants in a video conference. Media display systems and associated furnishings can be tailored to varying collaboration modalities to accommodate group sizes and/or different types of meetings. In an office setting, a plurality of conferencing units or stations having a variety of adaptations for differently sized groups of participants may be deployed in a space-efficient manner. In some embodiments, an individual portal is constructed with room for a single local participant. An individual portal may be free-standing in an open space of a room for quick communications and/or to facilitate a few local participants sharing a conference with remote parties. The individual portal may be constructed with isolation walls or panels around at least one side of the media display to provide audio and video privacy and/or to reduce the possibility of spreading contagions within an office. In some embodiments, small group nooks (e.g., pods) are provided with room for a few participants (e.g., maintaining a separation for social distancing). More than one media display may be deployed in a pod to facilitate the participation of multiple remote participants (e.g., each being shown life-size on a respective media display). In some embodiments, a modality is provided in which a greater number of transparent media display constructs are deployed for large group zones or huddle spaces. In each modality, transparent media displays can be incorporated into freestanding panels in building interiors or into a supportive structure such as an architectural (e.g., externally bordering) glass. The different sizes of conferencing stations can be adapted for particular functions. For example, a layout of media displays and/or the associated furnishing can be configured for supporting reception services or for acting as distribution (e.g., postal, inventory, sales, merchandise) hubs.

Figure 13:
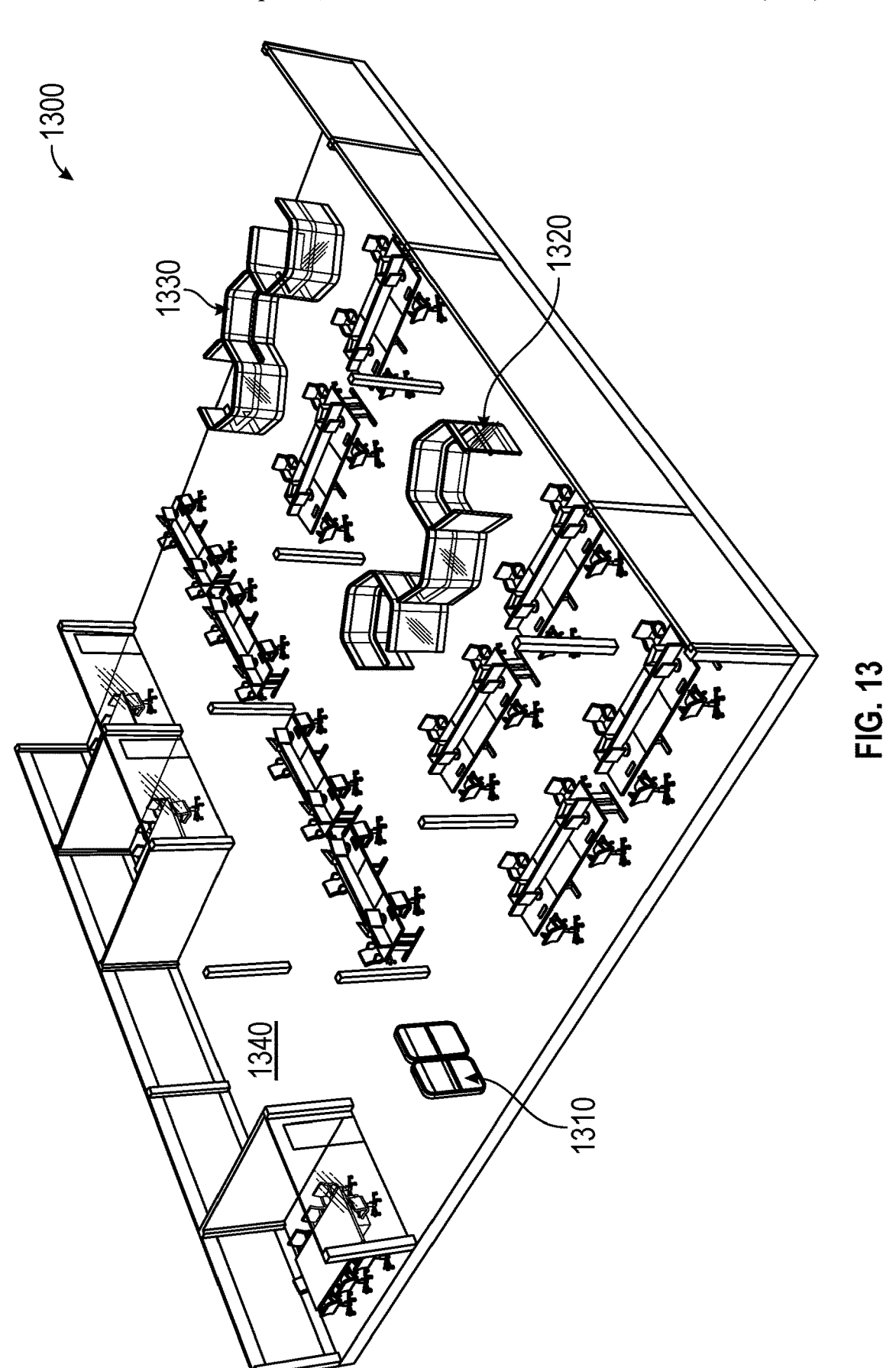
FIG. 13 schematically shows a perspective view of an office space in a building including areas for immersive video collaboration.

FIG. 13 shows an example floorplan 1300 of an office setting (e.g., an office suite). Floorplan 1300 includes various combinations and arrangements of digital collaboration units (e.g., freestanding, individual portals, small group pods and/or large open areas fitted with array of media displays). Floorplan 1300 includes a pair of freestanding, individual portals 1310 (other examples illustrated in FIGS. 14-16 and 26). Freestanding, individual portals 1310 may stand alone (e.g., only one digital collaboration unit) and/or multiple (two or more) portals may be disposed side-by-side (e.g., two portals illustrated in FIG. 13). Multiple freestanding, individual portals such as 1310 may be arranged in a straight line, in bent line such as in a zig-zag shape, or in other shapes. FIG. 13 shows examples of small group pods combined (e.g., sharing some walls) into space-efficient groupings 1320 and 1330 (other example illustrated in FIG. 24). Small group pods 1320, 1330 may have one, two, three or more polygonal-shaped (e.g. hexagon shaped) digital collaboration units with connecting walls between each adjacent unit. At least a portion of the (e.g., entire) connecting walls may be opaque. At least a portion of the (e.g., entire) connecting walls may be transparent. The connecting walls may be variable between opaque and at least partially translucent (e.g., a tintable window). A (large) open area such as 1340 may be fitted with an array of media displays to provide immersive conferencing between groups of local and remote participants (example illustrated in FIG. 17).

Figure 14:
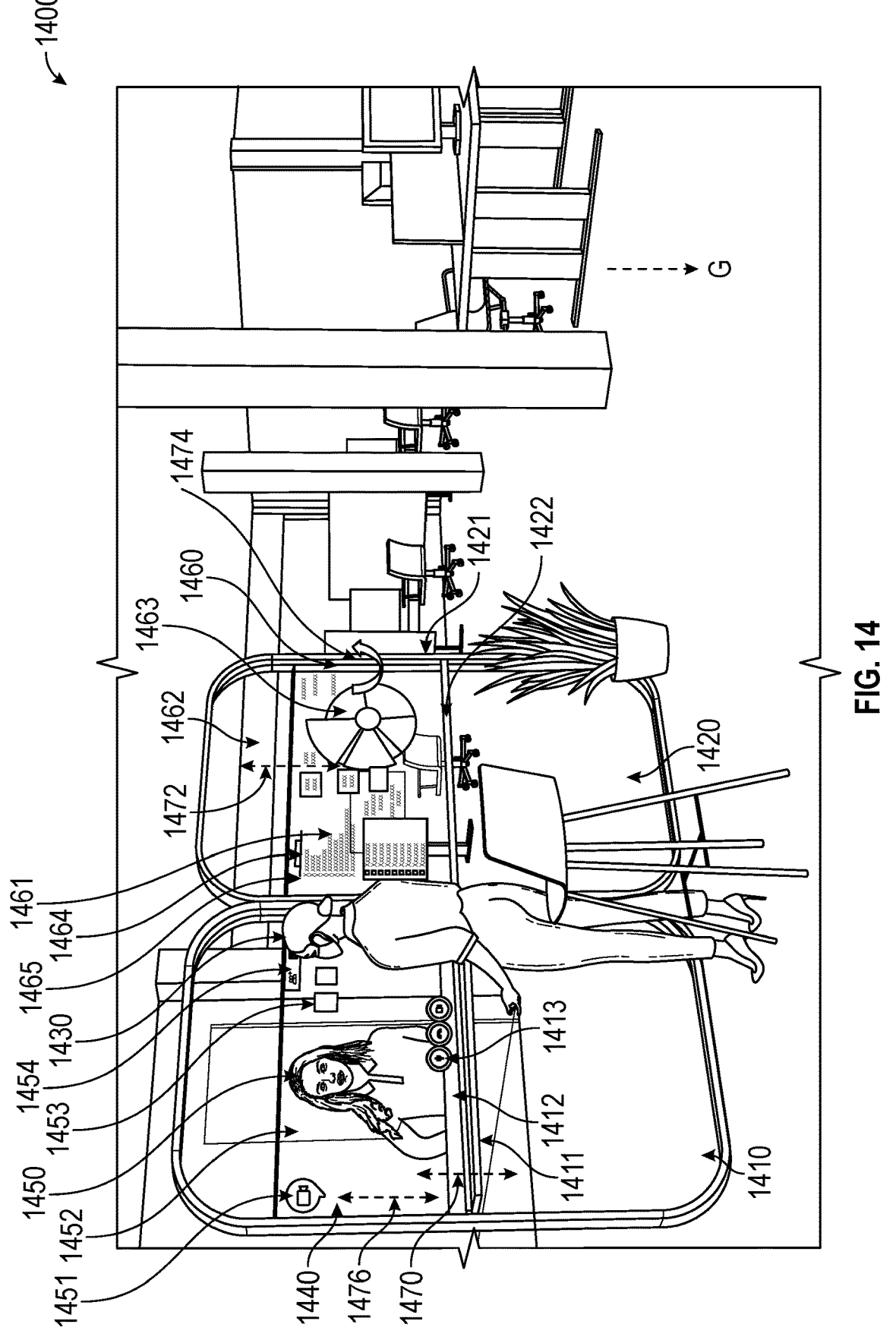
FIG. 14 depicts an immersive video interaction between collaborators using an individual portal.

FIG. 14 shows a portion of a floorplan section 1400 in greater detail with side-by-side freestanding, individual portals 1410 and 1420 having transparent supportive structures such as 1462. Portal 1410 includes a physical work surface (e.g., a physical ledge) 1411 on which a mobile object can be placed (e.g., laptop or cellphone). The physical work surface 1411 may be (i) movable relative to the transparent supportive structures 1462 (e.g., in a direction indicated by arrows 1470) and/or (ii) movable relative to a gravitational center G. A position of the physical work surface 1411 may be automatically adjusted based on a height and/or position of a local user 1430, which may be based on bodily features of local user 1430 and/or historic preferences of local user 1430. A position of the physical work surface 1411 may be manually adjustable by local user 1430. A position of the physical work surface 1411 may be automatically adjustable, e.g., with a manual override. The mobile platform can include a wireless charger. A local user 1430 utilizes a transparent media display 1440 in portal 1410 to view a media stream including a remote user 1450 and auxiliary content 1453. The transparent media display 1440 may be movable relative to the supportive structures 1462 and/or framing 1421 for example, as indicted by arrows 1476 and/or movable relative to a gravitational center G. A position of the transparent media display 1440 may be automatically adjusted based at least in part on a height and/or position of local user 1430, which may be based at least in part on bodily features (e.g., a nose, eyebrows, eyes, pupils, a head, a chin, lips, a nose bridge, or ears) of local user 1430 and/or historic preferences of local user 1430. A position of transparent media display 1440 may be manually adjustable by a local user 1430. A position of the transparent media display 1440 may be automatically adjustable, e.g., with a manual override. Cabling coupled to the transparent media display 1440 may move with the display 1440. A transparent media display 1440 and physical work surface 1411 may be secured to each other to move in unison (e.g., in a coupled and/or concerted movement). A transparent media display 1440 and physical work surface 1411 may each engage a mechanism that moves them in unison. A transparent media display 1440 and/or physical work surface 1411 may each be moveable without movement of the other (e.g., in a non-coupled, non-concerted movement, and/or individualized movement). The remote background is redacted from an image stream of the remote program and is not projected on media display 1440, thus facilitating viewing through the redacted area 1452 of the remote media stream. Media display 1440 is a transparent media display that project in addition to the redacted remote media stream, also icons 1451, 1454, and 1413 that facilitate control of various aspects associated with the digital communication, and virtual overlay 1412. Icon 1451 facilitates control of the video camera capturing user 1430 (e.g., adjustment of the camera's focus, height, and/or its usage). Icons 1413 can facilitate various aspects of the communication such as capturing a screenshot, adjusting volume, and commenting. Icons 1454 can facilitate annotation and/or other manipulation of items presented during the digital interaction such as documents 1453. To provide greater space of conveying auxiliary content, a media display 1460 of portal 1420 can be rolled into the video conferencing session (e.g., as a screen extension and/or a second screen) e.g., so that the remote user and the auxiliary content can be show at a large (e.g., actual size) size simultaneously. The second media display 1420 includes auxiliary content 1463, notes, and annotations 1463 (e.g., by the local and/or remote user). Media display 1460 excludes any background, and thus the local background 1461 can be viewed through transparent display 1460. Transparent displays 1440 and 1460 are bordered by a line of light (e.g., fluorescent or LED light) such as 1465, and by framing such as 1421 that hold the transparent display in conjunction with the transparent supportive structure such as 1462. The line of light 1465 may be (i) movable relative to the transparent supportive structures 1462 (e.g., in a direction indicated by arrows 1472), (ii) movable relative to the framing 1421, and/or (iii) movable relative to a gravitational center G. A position of the line of light 1465 may be automatically adjusted based at least in part on a height and/or position of a local user 1430, which may be based at least in part on bodily features of local user 1430 and/or historic preferences of local user 1430. A position of the line of light 1465 may be manually adjustable, e.g., by local user 1430. A position of the line of light 1465 may be automatically adjustable, e.g., with a manual override. A transparent media display 1440 and line of light 1465 may be secured to each other to move in unison (e.g., in a concerted, coupled, and/or coordinated movement). A transparent media display 1440 and line of light 1465 may each engage a mechanism (e.g., comprising an actuator) that moves them in unison. A transparent media display 1440, physical work surface 1411 and line of light 1465 may be secured to each other to move in unison. A transparent media display 1440, physical work surface 1411 and line of light 1465 may each engage a mechanism that moves them in unison. A transparent media display 1440 and/or physical work surface 1411 and/or line of light 1465 may each be moveable without movement of the others (e.g., in a non-concerted, non-coupled, non-coordinated, and/or individualized movement). Portals 1410 and 1420 also include panel caps such as 1422, thorough which wiring can go through and/or local controllers can reside. The wires can also run through the panel framing such as 1421. The media display 1460 is pivotable about a hinge. The hinge has a vertical pivot axis (e.g., about arrow 1474), which hinge is secured to panel framing 1421. A hinge securing a media display to the framing may have a pivot axis that is vertical, a horizontal or at any other angle. The hinge may be configured such that the media display may pivot from engagement with framing of the digital collaboration unit (such as 1421) (i) towards a direction of an expected user, or (ii) away from an expected position of the user. The local controller (e.g., of the media display(s) may reside in the panel caps and/or in the portal framing. Examples of panel caps, controllers, wiring, and wiring guides can be found in International Patent Application Serial No. PCT/US20/53641, which is incorporated herein by reference in its entirety. Examples of wireless chargers, controllers, mobile circuitry, network, controllers, framing systems, and devices (e.g., display construct, and tintable windows) can be found in U.S. Patent Application Ser. No. 63/170,245, filed Apr. 2, 2021, titled "DISPLAY CONSTRUCT FOR MEDIA PROJECTION AND WIRELESS CHARGING," which is incorporated herein by reference in its entirety.

Figure 15:
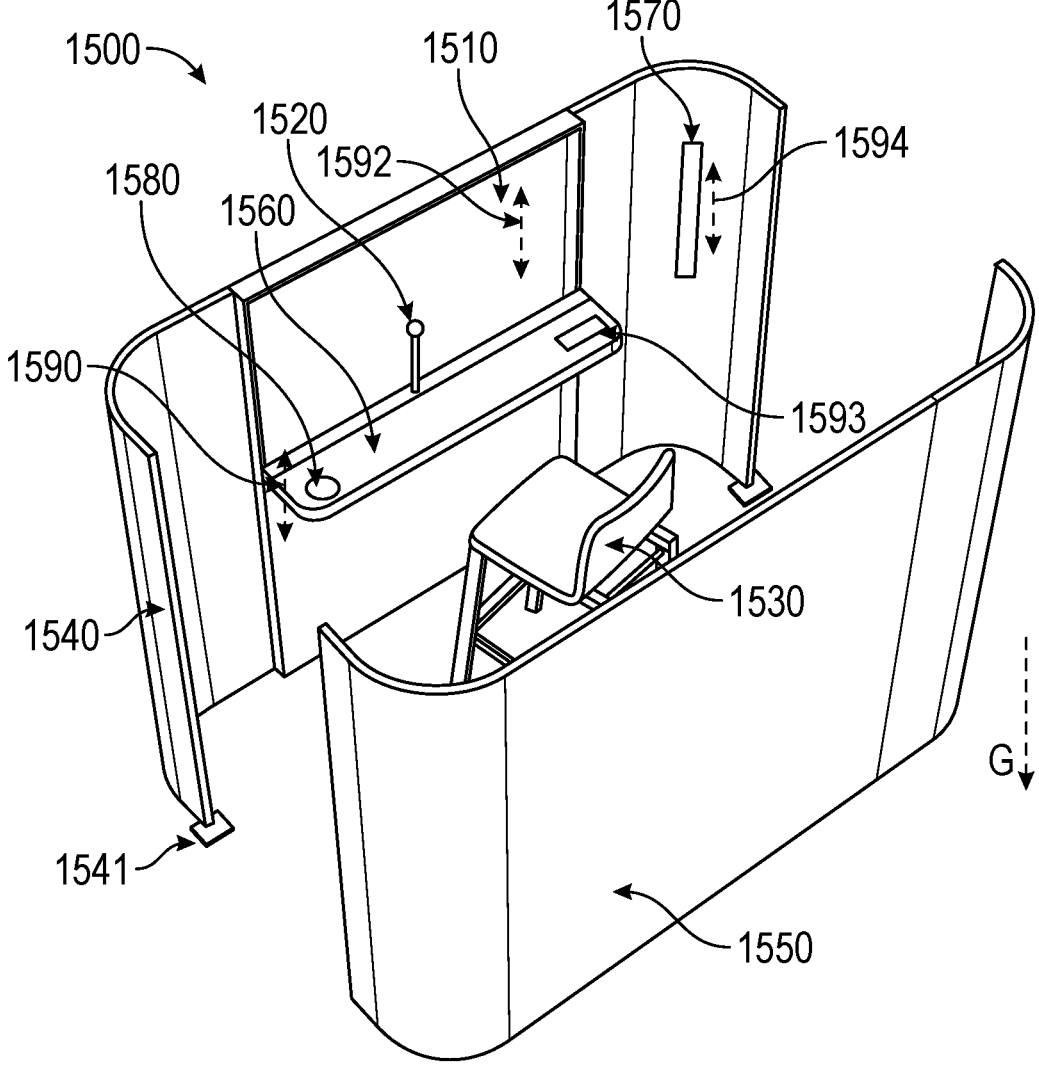
FIG. 15 depicts a nook or pod for immersive video interaction which is at least partially enclosed for privacy.

FIG. 15 shows an example of a personal portal 1500 with enhanced privacy. A transparent media display 1510 and a video image sensor 1520 (e.g., behind display 1510) are arranged for utilization by a user within a single seat 1530. The media display 1510 may be movable relative to a body and/or framing of the personal portal 1500 (e.g., in directions of arrows 1592) and/or movable relative to a gravitational center G. Cabling coupled to the media display 1510 may move with the media display 1510. A position of the media display 1510 may be automatically adjusted based at least in part on a height and/or position of a local user, which may be based at least in part on bodily features (e.g., a nose, eyebrows, eyes, pupils, a head, a chin, lips, a nose bridge, or ears) of a local user and/or historic preferences of a local user. A position of the media display 1510 may be manually adjustable by a local user. A position of the transparent media display 1510 may be automatically adjustable, e.g., with a manual override. Cabling coupled to the transparent media display 1510 may move with the display 1510. Privacy panels 1540 and 1550 may comprise sound dampening materials, e.g., to provide a quiet space for conducting a conference and/or to limit propagation of sound outside portal 1500. Privacy panels may also comprise one or more door(s) (not shown) between privacy panel 1540 and privacy panel 1550, which door(s) may comprise sound dampening materials. The door(s) may pivot, accordion and/or swivel to allow for ingress and egress of the personal portal 1500. For enhancing an immersive experience, a physical work surface (e.g., a table ledge) 1560 in front of media display 1510 can be duplicated at the remote location(s) (e.g., when collaborating with users having a similarly constructed portal). The physical work surface 1560 may be movable relative to a body and/or framing of the personal portal 1500 (e.g., in directions of arrows 1590) and/or movable relative to a gravitational center G. A position of the physical work surface 1560 may be automatically adjusted based at least in part on a height and/or position of a local user, which may be based at least in part on bodily features of a local user and/or historic preferences of a local user. A position of the physical work surface 1560 may be manually adjustable by a local user. A position of the physical work surface 1560 may be automatically adjustable, e.g., with a manual override. A transparent media display 1510 and physical work surface 1560 may be secured to each other to move in unison. A transparent media display 1510 and physical work surface 1560 may each engage a mechanism that moves them in unison (e.g., in concert, together, and/or in tandem). A transparent media display 1510 and/or physical work surface 1560 may be moveable without movement of the other (e.g., separately, and/or in a non-concerted action). The physical work surface 1560 may comprise fixed accessories (e.g., a wireless charging station) 1593 coupled thereto. The transparent media display 1510 may comprise fixed accessories (a wireless charging station, not shown) coupled thereto. The fixed accessories may be embedded in the physical work surface, panel(s) and/or framing. The fixed accessories coupled to the physical work surface 1560 and/or the transparent media display 1510 may be movable (e.g., up-down) relative to a body and/or framing of the personal portal 1500 in unison with, or separately from, the physical work surface 1560 and/or the transparent media display 1510. Cabling coupled to the fixed accessories may move with the respective fixed accessory. Media experience adjusters 1570 (e.g., lighting and/or speaker) may be provided to help ensure a good quality media stream is obtained, e.g., by camera 1520. The media experience adjusters 1570 may be (i) movable relative to the privacy panels 1540 (e.g., in a direction indicated by arrows 1594), (ii) movable relative to the body of the personal portal, (iii) movable relative to framing of the personal portal 1500, and/or (iv) movable relative to a gravitational center. The media experience adjusters 1570 may be stationary. A position of the lighting 1570 may be automatically adjusted based at least in part on a height and/or position of a local user, which may be based at least in part on bodily features of a local user and/or historic preferences of a local user. A position of the lighting 1570 may be manually adjustable by a local user. A position of the lighting 1570 may be automatically adjustable, e.g., with a manual override. A transparent media display 1510 and lighting 1570 may be secured to each other to move in unison. A transparent media display 1510 and lighting 1570 may each engage a mechanism that moves them in unison. A transparent media display 1510, physical work surface 1560 and lighting 1570 may be secured to each other to move in unison. A transparent media display 1510, physical work surface 1560 and lighting 1570 may each engage a mechanism that moves them in unison. A transparent media display 1510 and/or physical work surface 1560 and/or lighting 1570 may each be moveable without movement of the others. A loudspeaker 1580 may provide sound output, and/or a personal headphone can be provided with audio content (e.g., using a Bluetooth connection). Camera 1520 may have a fixed focus (e.g., set to avoid image degradation from viewing through the pixels of media display 1510), or may have an adjustable focus. Camera 1520 may be horizontally and/or vertically adjustable (e.g., by the user). Camera 1520 may have a wide field-of-view to capture table ledge 1560. Wiring of the network (e.g., power and/or communication) may run thought the walls of personal portal 1500 such as panel 1540, and connect to the network via connector 1541 disposed on the floor. In other embodiments, the connection may be to a wall or to a ceiling of the facility. Personal portal 1500 may be operatively coupled to the network (e.g., external network and/or local network of the facility).

In some embodiments, at least one of the components of the digital communication unit may be movable. In some embodiments, at least one of the components of the digital communication unit may be stationary (e.g., not movable). The at least one component of the digital communication unit may comprise (a) a media display (e.g., display construct), (b) a physical work surface (e.g., physical ledge), (c) lighting, (d) speaker, (e) sensor (e.g., video image sensor such as a camera), (f) fixed accessory (e.g., a charging station such as a wireless charging station) or (g) another media experience adjuster.

Figure 16:
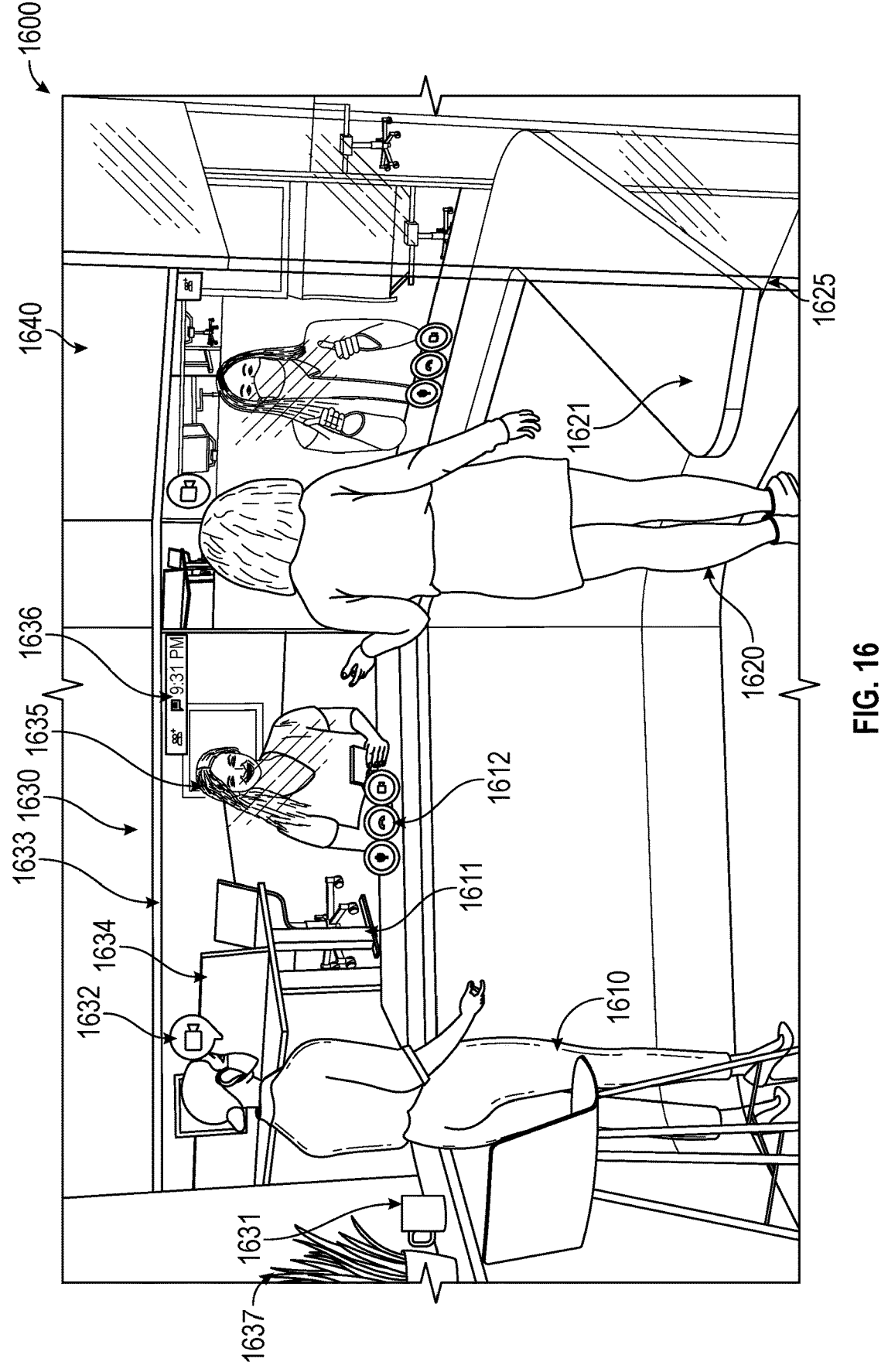
FIG. 16 depicts an immersive video interaction between collaborators using multiple individual portals.

FIG. 16 shows an example of a group pod 1600 with space for accommodating local users such as 1610 and 1620. Pod 1600 includes at least two transparent media displays such as 1630 and 1640 for displaying media streams from respective remote users (e.g., at different remote locations). Even when the multiple remote environments have a different appearance from the local environment and from each other, each participant having a transparent display such as participants 1610 and 1620, may experience all participants as though they shared a local environment, as the remote background of remote participants is redacted, thus allowing the local environment to show through the redacted remote background portion of the media stream, as in 1634. The media display 1630 displays a remote participant 1635, local camera controls 1632, lighting panel 1633, dropdown and/or informative menu 1636 that includes chat, participants data, and timing information. Media display 1630 also displays ledge perspective overlay 1611 and icons 1612 that facilitate voice and streaming control. Media display 1640 has displays similar features. Group pod 1600 includes a physical ledge 1621 on which objects such as public items (e.g., plant 1637), and personal items (e.g., cup 1631) can be placed. Group pod 1600 includes transparent supportive panels such as 1625. IN other embodiments, at least one of the transparent supportive panels can be substituted by a nontransparent (e.g., opaque) supportive panel. The supportive panel can comprise gypsum, cardboard, cork, plaster, a polymer (e.g., plastic), a ceramic, a composite material, a metal (e.g., elemental metal and/or metal alloy), or glass.

The supportive panel can comprise a glossy or matt exposed surface. The exposed surface of at least a portion of the supportive structure can be planar or rough. At least a portion of the exposed surface of the supportive structure may be dispersive, transmissive, or reflective. The physical ledge may comprise a (e.g., wireless) charging station. Group pod 1600 may comprise wiring (e.g., in its walls, framing, and/or framing caps).

Figure 17:
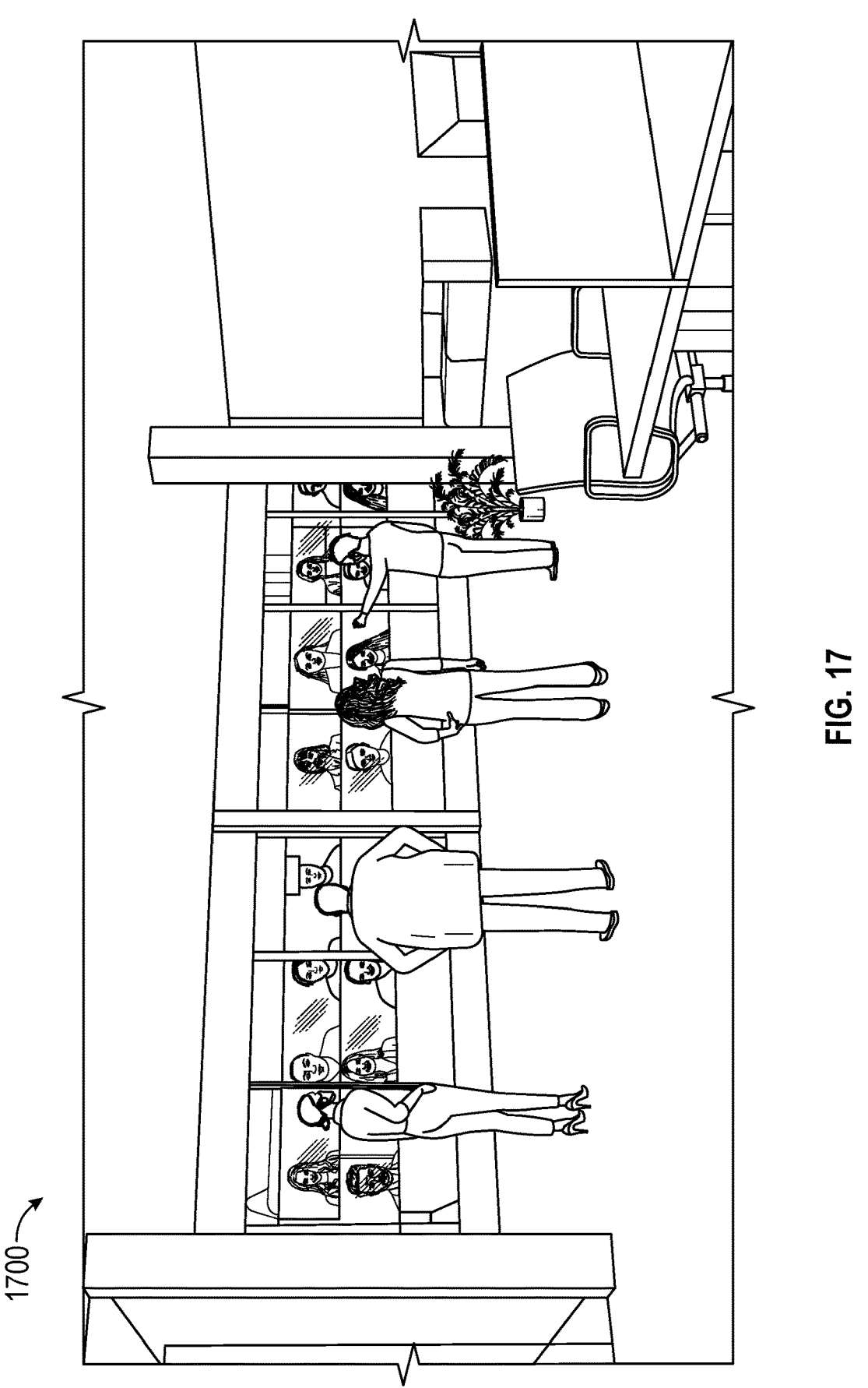
FIG. 17 depicts an immersive video interaction between collaborators using multiple displays in a local area accommodating many local participants.

FIG. 17 shows an example of a large group huddle space 1700 that may achieve an immersive experience for local and remote participants by employing transparent media displays so that (1) remote users and/or remote auxiliary content are shown as cutouts that integrate with a local environment in which their remote background is redacted, and/or (2) camera(s) imaging the local and/or remote participants can obtain media streams in which the imaged participants are directing their gaze toward the camera, Each image from a remote location may be shown on an individual transparent media display. An image from a remote location may be shown on multiple as duplicate images and/or on all transparent media displays of a display matrix as a single image (e.g., using a video wall functionality). The remote users may be shown as cutouts (e.g., without their native background), e.g., regardless of when the remote user is being shown on an individual transparent media display or being shown on a display matrix using the video wall functionality (e.g., being shown on multiple displays of a display matrix as a single collective image).

In some embodiments, a transparent media display is combined with a tintable window (e.g., an electrochromic window). In some embodiments, a dynamic state of an electrochromic window is controlled by altering a voltage signal to an electrochromic device (ECD) used to provide tinting or coloring. An electrochromic window can be manufactured, configured, or otherwise provided as an insulated glass unit (IGU). IGUs may serve as the fundamental constructs for holding electrochromic panes (also referred to as "lites") when provided for installation in a building. An IGU lite or pane may be a single substrate or a multisubstrate construct, such as a laminate of two substrates. IGUs, especially those having double- or triple-pane configurations, can provide a number of advantages over single pane configurations; for example, multi-pane configurations can provide enhanced thermal insulation, noise insulation, environmental protection and/or durability when compared with single-pane configurations. A multi-pane configuration also can provide increased protection for an ECD, for example, because the electrochromic films, as well as associated layers and conductive interconnects, can be formed on an interior surface of the multi-pane IGU and be protected by an inert gas fill in the interior volume of the IGU.

Certain disclosed embodiments provide a network infrastructure in the enclosure (e.g., a facility such as a building). The network infrastructure is available for various purposes such as for providing communication and/or power services. The communication services may comprise high bandwidth (e.g., wireless and/or wired) communications services. The communication services can be to occupants of a facility and/or users outside the facility (e.g., building). The network infrastructure may work in concert with, or as a partial replacement of, the infrastructure of one or more cellular carriers. The network infrastructure can be provided in a facility that includes electrically switchable windows. Examples of components of the network infrastructure include a high speed backhaul. The network infrastructure may include at least one cable, switch, physical antenna, transceivers, sensor, transmitter, receiver, radio, processor and/or controller (that may comprise a processor). The network infrastructure may be operatively coupled to, and/or include, a wireless network. The network infrastructure may comprise wiring. One or more sensors can be deployed (e.g., installed) in an environment as part of installing the network and/or after installing the network. The network may be a local network. The network may comprise a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. The communication may comprise media communication facilitating stills, music, or moving picture streams (e.g., movies or videos). The communication may comprise data communication (e.g., sensor data). The communication may comprise control communication, e.g., to control the one or more nodes operatively coupled to the networks. The network may comprise a first (e.g., cabling) network installed in the facility. The network may comprise a (e.g., cabling) network installed in an envelope of the facility (e.g., such as in an envelope of an enclosure of the facility. For example, in an envelope of a building included in the facility).

In various embodiments, a network infrastructure supports a control system for one or more windows such as tintable (e.g., electrochromic) windows. The control system may comprise one or more controllers operatively coupled (e.g., directly or indirectly) to one or more windows. While the disclosed embodiments describe tintable windows (also referred to herein as "optically switchable windows," or "smart windows") such as electrochromic windows, the concepts disclosed herein may apply to other types of switchable optical devices comprising a liquid crystal device, an electrochromic device, suspended particle device (SPD), NanoChromics display (NCD), Organic electroluminescent display (OELD), suspended particle device (SPD), NanoChromics display (NCD), or an Organic electroluminescent display (OELD). The display element may be attached to a part of a transparent body (such as the windows). The tintable window may be disposed in a (non-transitory) facility such as a building, and/or in a transitory facility (e.g., vehicle) such as a car, RV, bus, train, airplane, helicopter, ship, or boat.

In some embodiments, a tintable window exhibits a (e.g., controllable and/or reversible) change in at least one optical property of the window, e.g., when a stimulus is applied. The change may be a continuous change. A change may be to discrete tint levels (e.g., to at least about 2, 4, 8, 16, or 32 tint levels). The optical property may comprise hue, or transmissivity. The hue may comprise color. The transmissivity may be of one or more wavelengths. The wavelengths may comprise ultraviolet, visible, or infrared wavelengths. The stimulus can include an optical, electrical and/or magnetic stimulus. For example, the stimulus can include an applied voltage and/or current. One or more tintable windows can be used to control lighting and/or glare conditions, e.g., by regulating the transmission of solar energy propagating through them. One or more tintable windows can be used to control a temperature within a building, e.g., by regulating the transmission of solar energy propagating through the window. Control of the solar energy may control heat load imposed on the interior of the facility (e.g., building). The control may be manual and/or automatic. The control may be used for maintaining one or more requested (e.g., environmental) conditions, e.g., occupant comfort. The control may include reducing energy consumption of a heating, ventilation, air conditioning and/or lighting systems. At least two of heating, ventilation, and air conditioning may be induced by separate systems. At least two of heating, ventilation, and air conditioning may be induced by one system. The heating, ventilation, and air conditioning may be induced by a single system (abbreviated herein as "HVAC"). In some cases, tintable windows may be responsive to (e.g., and communicatively coupled to) one or more environmental sensors and/or user control. Tintable windows may comprise (e.g., may be) electrochromic windows. The windows may be located in the range from the interior to the exterior of a structure (e.g., facility, e.g., building). However, this need not be the case. Tintable windows may operate using liquid crystal devices, suspended particle devices, microelectromechanical systems (MEMS) devices (such as microshutters), or any technology known now, or later developed, that is configured to control light transmission through a window. Windows (e.g., with MEMS devices for tinting) are described in U.S. patent application Ser. No. 14/443,353, filed May 15, 2015, now U.S. Pat. No. 10,359, 681, issued Jul. 23, 2019, titled "MULTI-PANE WINDOWS INCLUDING ELECTROCHROMIC DEVICES AND ELECTROMECHANICAL SYSTEMS DEVICES," and incorporated herein by reference in its entirety. In some cases, one or more tintable windows can be located within the interior of a building, e.g., between a conference room and a hallway. In some cases, one or more tintable windows can be used in automobiles, trains, aircraft, and other vehicles, e.g., in lieu of a passive and/or non-tinting window.

In some embodiments, the tintable window comprises an electrochromic device (referred to herein as an "EC device" (abbreviated herein as ECD, or "EC"). An EC device may comprise at least one coating that includes at least one layer. The at least one layer can comprise an electrochromic material. In some embodiments, the electrochromic material exhibits a change from one optical state to another, e.g., when an electric potential is applied across the EC device. The transition of the electrochromic layer from one optical state to another optical state can be caused, e.g., by reversible, semi-reversible, or irreversible ion insertion into the electrochromic material (e.g., by way of intercalation) and a corresponding injection of charge-balancing electrons. For example, the transition of the electrochromic layer from one optical state to another optical state can be caused, e.g., by a reversible ion insertion into the electrochromic material (e.g., by way of intercalation) and a corresponding injection of charge-balancing electrons. Reversible may be for the expected lifetime of the ECD. Semi-reversible refers to a measurable (e.g., noticeable) degradation in the reversibility of the tint of the window over one or more tinting cycles. In some instances, a fraction of the ions responsible for the optical transition is irreversibly bound up in the electrochromic material (e.g., and thus the induced (altered) tint state of the window is not reversible to its original tinting state). In various EC devices, at least some (e.g., all) of the irreversibly bound ions can be used to compensate for "blind charge" in the material (e.g., ECD).

In some implementations, suitable ions include cations. The cations may include lithium ions (Li+) and/or hydrogen ions (H+) (i.e., protons). In some implementations, other ions can be suitable. Intercalation of the cations may be into an (e.g., metal) oxide. A change in the intercalation state of the ions (e.g., cations) into the oxide may induce a visible change in a tint (e.g., color) of the oxide. For example, the oxide may transition from a colorless to a colored state. For example, intercalation of lithium ions into tungsten oxide ($WO_{3-y}$ ($0 < y \leq {\sim} 0.3$)) may cause the tungsten oxide to change from a transparent state to a colored (e.g., blue) state. EC device coatings as described herein are located within the viewable portion of the tintable window such that the tinting of the EC device coating can be used to control the optical state of the tintable window.

Figure 18:
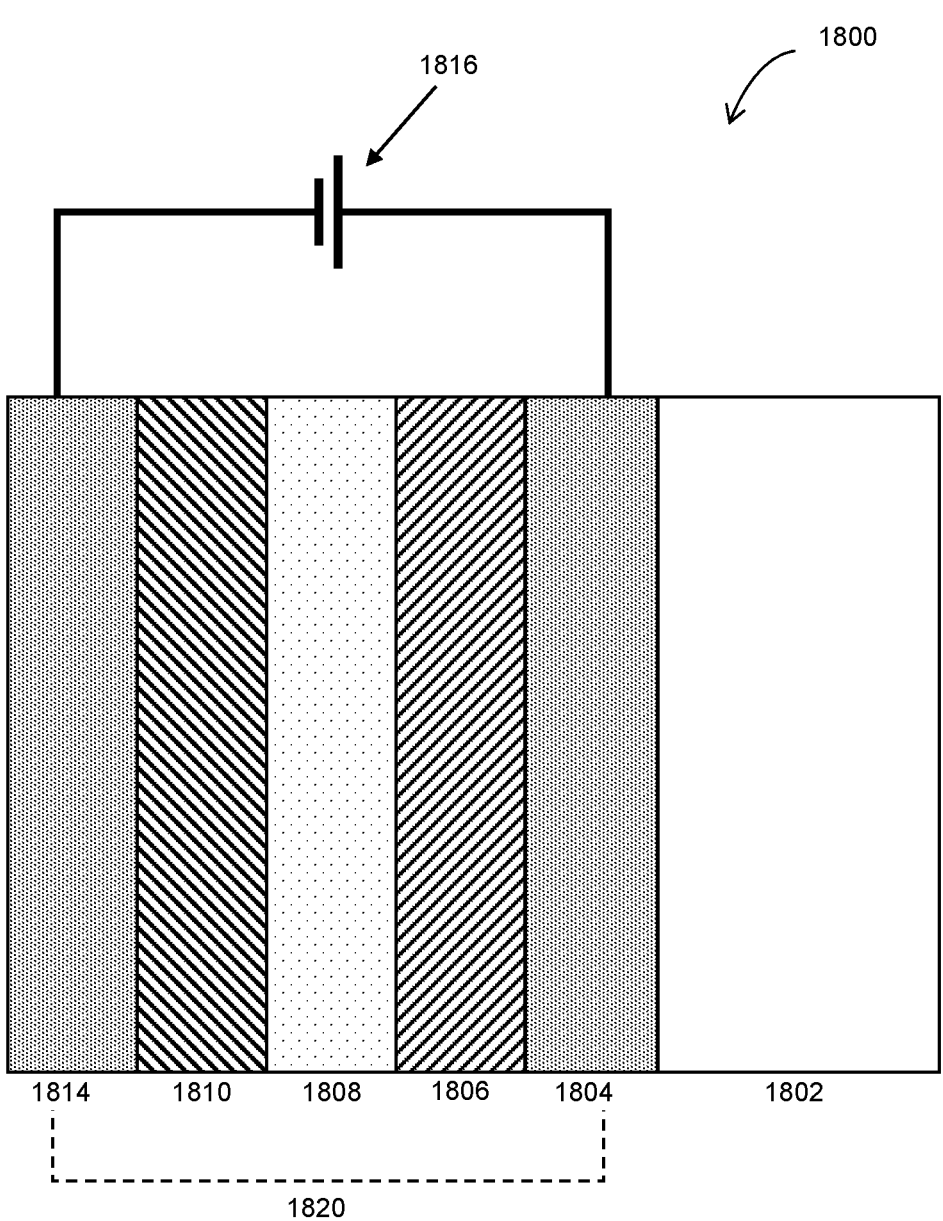
FIG. 18 schematically shows an electrochromic device.

FIG. 18 shows an example of a schematic cross-section of an electrochromic device 1800 in accordance with some embodiments. The EC device coating is attached to a substrate 1802, a transparent conductive layer (TCL) 1804, an electrochromic layer (EC) 1806 (sometimes also referred to as a cathodically coloring layer or a cathodically tinting layer), an ion conducting layer or region (IC) 1808, a counter electrode layer (CE) 1810 (sometimes also referred to as an anodically coloring layer or anodically tinting layer), and a second TCL 1814. Elements 1804, 1806, 1808, 1810, and 1814 are collectively referred to as an electrochromic stack 1820. A voltage source 1816 operable to apply an electric potential across the electrochromic stack 1820 effects the transition of the electrochromic coating from, e.g., a clear state to a tinted state. In other embodiments, the order of layers is reversed with respect to the substrate. That is, the layers are in the following order: substrate, TCL, counter electrode layer, ion conducting layer, electrochromic material layer, TCL. In various embodiments, the ion conductor region (e.g., 1808) may form from a portion of the EC layer (e.g., 1806) and/or from a portion of the CE layer (e.g., 1810). In such embodiments, the electrochromic stack (e.g., 1820) may be deposited to include cathodically coloring electrochromic material (the EC layer) in direct physical contact with an anodically coloring counter electrode material (the CE layer). The ion conductor region (sometimes referred to as an interfacial region, or as an ion conducting substantially electronically insulating layer or region) may form where the EC layer and the CE layer meet, for example through heating and/or other processing steps. Examples of electrochromic devices (e.g., including those fabricated without depositing a distinct ion conductor material) can be found in U.S. patent application Ser. No. 13/462,725, filed May 2, 2012, titled "ELECTROCHROMIC DEVICES," that is incorporated herein by reference in its entirety. In some embodiments, an EC device coating may include one or more additional layers such as one or more passive layers. Passive layers can be used to improve certain optical properties, to provide moisture, and/or to provide scratch resistance. These and/or other passive layers can serve to hermetically seal the EC stack 1820. Various layers, including transparent conducting layers (such as 1804 and 1814), can be treated with anti-reflective and/or protective layers (e.g., oxide and/or nitride layers).

In some embodiments, an IOU includes two (or more) substantially transparent substrates. For example, the IOU may include two panes of glass. At least one substrate of the IOU can include an electrochromic device disposed thereon. The one or more panes of the IOU may have a separator disposed between them. An IGU can be a hermetically sealed construct, e.g., having an interior region that is isolated from the ambient environment. A "window assembly" may include an IGU. A "window assembly" may include a (e.g., stand-alone) laminate. A "window assembly" may include one or more electrical leads, e.g., for connecting the IGUs and/or laminates. The electrical leads may operatively couple (e.g., connect) one or more electrochromic devices to a voltage source, switches and the like, and may include a frame that supports the IGU or laminate. A window assembly may include a window controller, and/or components of a window controller (e.g., a dock).

Figure 19:
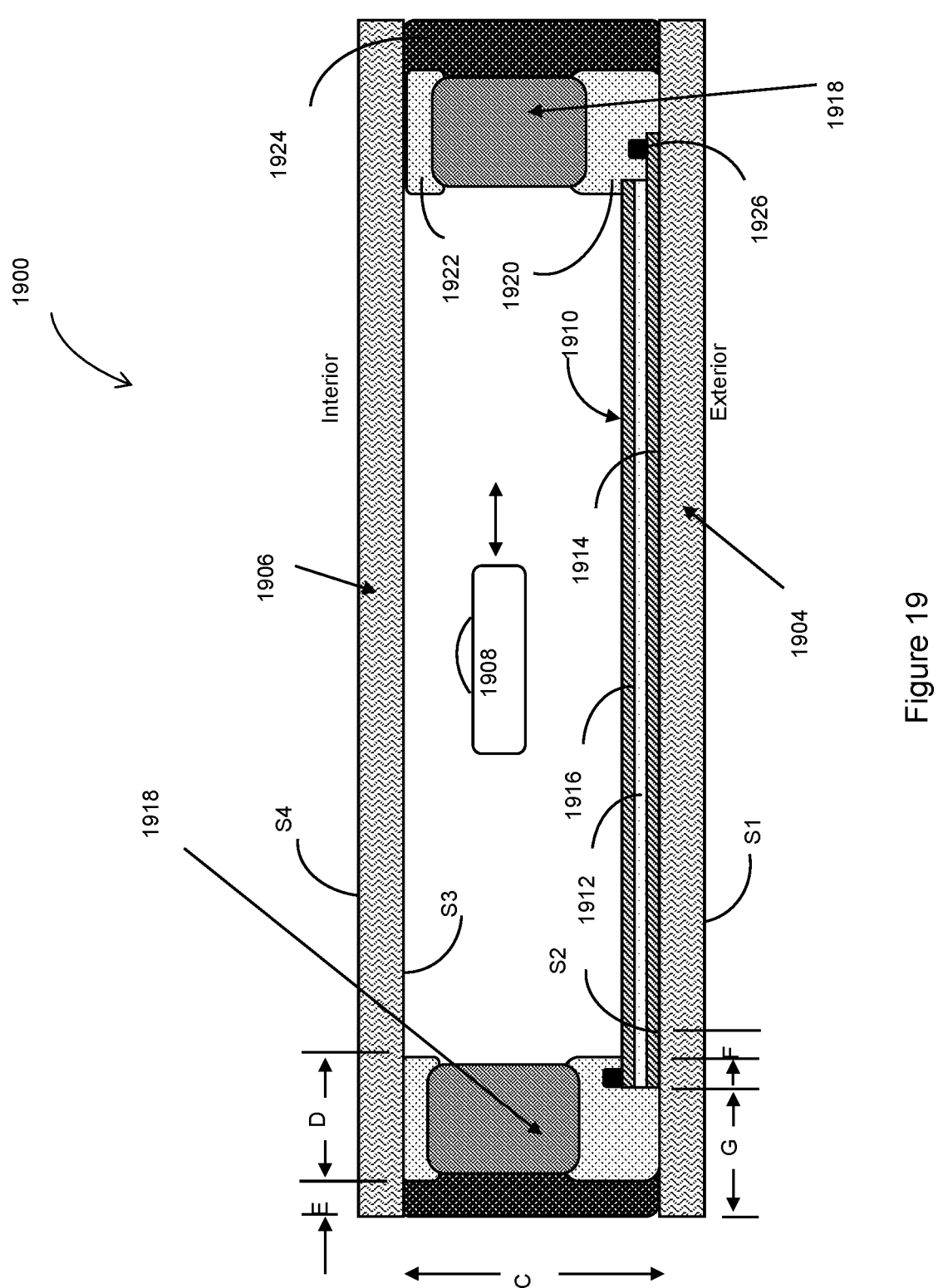
FIG. 19 shows a cross-sectional view of an example electrochromic window in an Integrated Glass Unit (IGU)

FIG. 19 shows an example implementation of an IGU 1900 that includes a first pane 1904 having a first surface S1 and a second surface S2. In some implementations, the first surface S1 of the first pane 1904 faces an exterior environment, such as an outdoors or outside environment. The IGU 1900 also includes a second pane 1906 having a first surface S3 and a second surface S4. In some implementations, the second surface S4 of the second pane 1906 faces an interior environment, such as an inside environment of a home, building or vehicle, or a room or compartment within a home, building or vehicle.

In some embodiments, (e.g., each of the) first and/or the second panes 1904 and 1906 are transparent and/or translucent to light, e.g., in the visible spectrum. For example, (e.g., each of the) first and/or second panes 1904 and 1906 can be formed of a glass material (e.g., an architectural glass or other shatter-resistant glass material such as, for example, a silicon oxide ($SO_x$)-based glass material. The (e.g., each of the) first and/or second panes 1904 and 1906 may be a soda-lime glass substrate or float glass substrate. Such glass substrates can be composed of, for example, approximately 75% silica ($SiO_2$) as well as $Na_2O$, CaO, and several minor additives. However, the (e.g., each of the) first and/or the second panes 1904 and 1906 can be formed of any material having suitable optical, electrical, thermal, and mechanical properties. For example, other suitable substrates that can be used as one or both of the first and the second panes 1904 and 1906 can include other glass materials as well as plastic, semi-plastic and thermoplastic materials (for example, poly (methyl methacrylate), polystyrene, polycarbonate, allyl diglycol carbonate, SAN (styrene acrylonitrile copolymer), poly(4-methyl-1-pentene), polyester, polyamide), and/or mirror materials. In some embodiments, (e.g., each of the) first and/or the second panes 2204 and 2206 can be strengthened, for example, by tempering, heating, or chemically strengthening.

In the example shown in FIG. 19, first and second panes 1904 and 1906 are spaced apart from one another by a spacer 1918, which is typically a frame structure, to form an interior volume. In some embodiments, the interior volume is filled with Argon (Ar) or another gas, such as another noble gas (for example, krypton (Kr) or xenon (Xn)), another (non-noble) gas, or a mixture of gases (for example, air). Filling the interior volume with a gas such as Ar, Kr, or Xn can reduce conductive heat transfer through the IGU 1900. Without wishing to be bound to theory, this may be because of the low thermal conductivity of these gases as well as improve acoustic insulation, e.g., due to their increased atomic weights. In some embodiments, the interior volume 1908 can be evacuated of air or other gas. Spacer 1918 generally determines the height "C" of the interior volume 1908 (e.g., the spacing between the first and the second panes 1904 and 1906). In the example shown in FIG. 19, the thickness (and/or relative thickness) of the ECD, sealant 1920/1922 and bus bars 1926/1928 may not be to scale. These components are generally thin and are exaggerated here, e.g., for ease of illustration only. In some embodiments, the spacing "C" between the first and the second panes 1904 and 1906 is in the range of approximately 6 mm to approximately 30 mm. The width "D" of spacer 1918 can be in the range of approximately 5 mm to approximately 15 mm (although other widths are possible and may be desirable). Spacer 1918 may be a frame structure formed around all sides of the IGU 1900 (for example, top, bottom, left and right sides of the IOU 1900). For example, spacer 1918 can be formed of a foam or plastic material. In some embodiments, spacer 1918 can be formed of metal or other conductive material, for example, a metal tube or channel structure having at least 3 sides, two sides for sealing to each of the substrates and one side to support and separate the lites and as a surface on which to apply a sealant, 1924. A first primary seal 1920 adheres and hermetically seals spacer 1918 and the second surface S2 of the first pane 1904. A second primary seal 1922 adheres and hermetically seals spacer 1918 and the first surface S3 of the second pane 1906. In some implementations, each of the primary seals 1920 and 1922 can be formed of an adhesive sealant such as, for example, polyisobutylene (PIB). In some implementations, IGU 1900 further includes secondary seal 1924 that hermetically seals a border around the entire IOU 1900 outside of spacer 1918. To this end, spacer 1918 can be inset from the edges of the first and the second panes 1904 and 1906 by a distance "E." The distance "E" can be in the range of approximately four (4) millimeters (mm) to approximately eight (8) mm (although other distances are possible and may be desirable). In some implementations, secondary seal 1924 can be formed of an adhesive sealant such as, for example, a polymeric material that resists water and that adds structural support to the assembly, such as silicone, polyurethane and similar structural sealants that form a water-tight seal.

In the example of FIG. 19, the ECD coating on surface S2 of substrate 1904 extends about its entire perimeter to and under spacer 1918. This configuration is functionally desirable as it protects the edge of the ECD within the primary sealant 1920 and aesthetically desirable because within the inner perimeter of spacer 1918 there is a monolithic ECD without any bus bars or scribe lines.

Configuration examples of IGUs are described in U.S. Pat. No. 8,164,818, issued Apr. 24, 2012 and titled ELEC-TROCHROMIC WINDOW FABRICATION METHODS, U.S. patent application Ser. No. 13/456,056, filed Apr. 25, 2012, titled "ELECTROCHROMIC WINDOW FABRICA-TION METHODS", International Patent Application Serial No. PCT/US12/68817, filed Dec. 10, 2012, titled "THIN-FILM DEVICES AND FABRICATION", U.S. Pat. No. 9,454,053, issued Sep. 27, 2016, titled "THIN-FILM DEVICES AND FABRICATION", and International Patent Application Serial No. PCT/US14/73081, filed Dec. 13, 2014, titled "THIN-FILM DEVICES AND FABRICA-TION", each of which is hereby incorporated by reference in its entirety.

In the example shown in FIG. 19, an ECD 1910 is formed on the second surface S2 of the first pane 1904. The ECD 1910 includes an electrochromic ("EC") stack 1912, which itself may include one or more layers. For example, the EC stack 1912 can include an electrochromic layer, an ion-conducting layer, and a counter electrode layer. The electrochromic layer may be formed of one or more inorganic solid materials. The electrochromic layer can include or be formed of one or more of a number of electrochromic materials, including electrochemically-cathodic or electro-chemically-anodic materials. EC stack 1912 may be between first and second conducting (or "conductive") layers. For example, the ECD 1910 can include a first transparent conductive oxide (TCO) layer 1914 adjacent a first surface of the EC stack 1912 and a second TCO layer 1916 adjacent a second surface of the EC stack 1912. An example of similar EC devices and smart windows can be found in U.S. Pat. No. 8,764,950, titled ELECTROCHROMIC DEVICES, by Wang et al., issued Jul. 1, 2214 and U.S. Pat. No. 9,261,751, titled ELECTROCHROMIC DEVICES, by Pradhan et al., issued Feb. 16, 2216, which is incorporated herein by reference in its entirety. In some implementations, the EC stack 1912 also can include one or more additional layers such as one or more passive layers. For example, passive layers can be used to improve certain optical properties, to provide moisture or to provide scratch resistance. These or other passive layers also can serve to hermetically seal the EC stack 1912.

When a transparent media display is combined with IGU 1900, the media display may be disposed upon second pane 1906 (e.g., with video images projected away from second pane 1906). In other embodiments, the media display is attached (e.g., fastened or adhered to) the IGU. FIG. 19 shows an example of image sensor 1908 mounted in the interior volume of the IOU between first and second panes 1904 and 1906. Such a location for sensor 1908 is unobtrusive and well protected from any harsh environmental conditions (e.g., humidity and/or debris such as dust). Sensor 1908 may be fixed, or a be operatively coupled to an actuator (e.g., a servo-mechanism). The actuator may be provided within the interior volume, e.g., for actively controlling an image capturing location.

In some embodiments, a network infrastructure is provided in the enclosure (e.g., a facility such as a building). The network infrastructure is available for various purposes such as for providing communication and/or power services. The communication services may comprise high bandwidth (e.g., wireless and/or wired) communications services. The communication services can be to occupants of a facility and/or users outside the facility (e.g., building). The network infrastructure may work in concert with, or as a partial replacement of, the infrastructure of one or more cellular carriers. The network may comprise one or more levels of encryption. The network may be communicatively coupled to the cloud and/or to one or more servers external to the facility. The network may support at least a fourth generation wireless (4G), or a fifth-generation wireless (5G) communication. The network may support cellular signals external and/or internal to the facility. The downlink communication network speeds may have a peak data rate of at least about 5 Gigabits per second (Gb/s), 10 Gb/s, or 20 Gb/s. The uplink communication network speeds may have a peak data rate of at least about 2 Gb/s, 5 Gb/s, or 10 Gb/s. The network infrastructure can be provided in a facility that includes electrically switchable windows. Examples of components of the network infrastructure include a high speed backhaul. The network infrastructure may include at least one cable, switch, (e.g., physical) antenna, transceivers, sensor, transmitter, receiver, radio, processor and/or controller (that may comprise a processor). The network infrastructure may be operatively coupled to, and/or include, a wireless network. The network infrastructure may comprise wiring (e.g., comprising an optical fiber, twisted cable, or coaxial cable). One or more devices (e.g., sensors and/or emitters) can be deployed (e.g., installed) in an environment, e.g., as part of installing the network infrastructure and/or after installing the network infrastructure. The device(s) may be communicatively coupled to the network. The network may comprise a power and/or communication network. The device can be self-discovered on the network, e.g., once it couples (e.g., on its attempt to couple) to the network. The network structure may comprise peer to peer network structure, or client-server network structure. The network may or may not have a central coordination entity (e.g., server(s) or another stable host). Examples of network, facility, control system, and devices can be found in International Patent Application Serial No. PCT/US21/17946, filed Feb. 12, 2021, titled "DATA AND POWER NETWORK OF A FACILITY," which is incorporated herein by reference in its entirety.

In some embodiments, a building management system (BMS) is a computer-based control system. The BMS can be installed in a facility to monitor and otherwise control (e.g., regulate, manipulate, restrict, direct, monitor, adjust, modulate, vary, alter, restrain, check, guide, or manage) the facility. For example, the EMS may control one or more devices communicatively coupled to the network. The one or more devices may include mechanical and/or electrical equipment such as ventilation, lighting, power systems, elevators, fire systems, and/or security systems. Controllers (e.g., nodes and/or processors) may be suited for integration with a BMS. A BMS may include hardware. The hardware may include interconnections by communication channels to one or more processors (e.g., and associated software), e.g., for maintaining one or more conditions in the facility. The one or more conditions in the facility may be according to preference(s) set by a user (e.g., an occupant, a facility owner, and/or a facility manager). For example, a BMS may be implemented using a local area network, such as Ethernet. The software can utilize, e.g., internet protocols and/or open standards. One example is software from Tridium, Inc. (of Richmond, Va.). One communication protocol that can be used with a BMS is BACnet (building automation and control networks). A node can be any addressable circuitry. For example, a node can be a circuitry that has an Internet Protocol (IP) address.

In some embodiments, a BMS may be implemented in a facility, e.g., a multi-story building. The BMS may function (e.g., also) to control one or more characteristics of an environment of the facility. The one or more characteristics may comprise: temperature, carbon dioxide levels, gas flow, various volatile organic compounds (VOCs), and/or humidity in a building. There may be mechanical devices that are controlled by a BMS such as one or more heaters, air conditioners, blowers, and/or vents. To control the facility environment, a BMS may turn these various devices on and/or off under defined conditions. A core function of a BMS may be to maintain a comfortable environment for occupants of the environment, e.g., while minimizing heating and cooling costs and/or demand. A BMS can be used to control one or more of the various systems. A BMS may be used to optimize the synergy between various systems. For example, the BMS may be used to conserve energy and lower building operation costs.

In some embodiments, a plurality of devices may be operatively (e.g., communicatively) coupled to the control system. The plurality of devices may be disposed in a facility (e.g., including a building and/or room). The control system may comprise the hierarchy of controllers. The devices may comprise an emitter, a sensor, or a window (e.g., IGU). The device may be any device as disclosed herein. At least two of the plurality of devices may be of the same type. For example, two or more IGUs may be coupled to the control system. At least two of the plurality of devices may be of different types. For example, a sensor and an emitter may be coupled to the control system. At times, the plurality of devices may comprise at least 20, 50, 100, 500, 1000, 2500, 5000, 7500, 10000, 50000, 100000, or 500000 devices. The plurality of devices may be of any number between the aforementioned numbers (e.g., from 20 devices to 500000 devices, from 20 devices to 50 devices, from 50 devices to 500 devices, from 500 devices to 2500 devices, from 1000 devices to 5000 devices, from 5000 devices to 10000 devices, from 10000 devices to 100000 devices, or from 100000 devices to 500000 devices). For example, the number of windows in a floor may be at least 5, 10, 15, 20, 25, 30, 40, or 50. The number of windows in a floor can be any number between the aforementioned numbers (e.g., from 5 to 50, from 5 to 25, or from 25 to 50). At times, the devices may be in a facility comprising a multi-story building. At least a portion of the floors of the multi-story building may have devices controlled by the control system (e.g., at least a portion of the floors of the multi-story building may be controlled by the control system).

In some embodiments, the facility comprises a multi-story building. The multi-story building may have at least 2, 8, 10, 25, 50, 80, 100, 120, 140, or 160 floors, e.g., that are controlled by the control system and/or comprise the network infrastructure. The number of floors controlled by the control system and/or comprising the network infrastructure may be any number between the aforementioned numbers (e.g., from 2 to 50, from 25 to 100, or from 80 to 160). The floor may be of an area of at least about 150 m$^2$, 250 m$^2$, 500 m$^2$, 1000 m$^2$, 1500 m$^2$, or 2000 square meters (m$^2$). The floor may have an area between any of the aforementioned floor area values (e.g., from about 150 m$^2$ to about 2000 m$^2$, from about 150 m$^2$ to about 500 m$^2$ from about 250 m$^2$ to about 1000 m$^2$, or from about 1000 m$^2$ to about 2000 m$^2$). The building may comprise an area of at least about 1000 square feet (sqft), 2000 sqft, 5000 sqft 10000 sqft, 100000 sqft, 150000 sqft, 200000 sqft, or 500000 sqft. The building may comprise an area between any of the above mentioned areas (e.g., from about 1000 sqft to about 5000 sqft, from about 5000 sqft to about 500000 sqft, or from about 1000 sqft to about 500000 sqft). The building may comprise an area of at least about 100 m$^2$, 200 m$^2$, 500 m$^2$, 1000 m$^2$, 5000 m$^2$, 10000 m$^2$, 25000 m$^2$, or 50000 m$^2$. The building may comprise an area between any of the above mentioned areas (e.g., from about 100 m$^2$ to about 1000 m$^2$, from about 500 m$^2$ to about 25000 m$^2$, from about 100 m$^2$ to about 50000 m$^2$), The facility may comprise a commercial or a residential building. The commercial building may include tenant(s) and/or owner(s). The residential facility may comprise a multi or a single family building. The residential facility may comprise an apartment complex. The residential facility may comprise a single family home. The residential facility may comprise multifamily homes (e.g., apartments). The residential facility may comprise townhouses. The facility may comprise residential and commercial portions. The facility may comprise at least about 1, 2, 5, 10, 50, 100, 150, 200, 250, 300, 350, 400, 420, 450, 500, or 550 windows (e.g., tintable windows). The windows may be divided into zones (e.g., based at least in part on the location, façade, floor, ownership, utilization of the enclosure (e.g., room) in which they are disposed, any other assignment metric, random assignment, or any combination thereof. Allocation of windows to the zone may be static or dynamic (e.g., based on a heuristic). There may be at least about 2, 5, 10, 12, 15, 30, 40, or 46 windows per zone.

In some embodiments, a window controller is integrated with a BMS. For example, the window controller can be configured to control one or more tintable windows (e.g., electrochromic windows). In one embodiment, the one or more electrochromic windows include at least one all solid state and inorganic electrochromic device, but may include more than one electrochromic device, e.g., where each lite or pane of an IGU is tintable. In one embodiment, the one or more electrochromic windows include (e.g., only) all solid state and inorganic electrochromic devices. In one embodiment, the electrochromic windows are multistate electrochromic windows. Examples of tintable windows can be found in, in U.S. patent application Ser. No. 12/851,514, filed Aug. 5, 2010, titled "MULTIPANE ELECTROCHROMIC WINDOWS," which is incorporated herein by reference in its entirety.

In some embodiments, one or more devices such as sensors, emitters, and/or actuators, are operatively coupled to at least one controller and/or processor. Sensor readings may be obtained by one or more processors and/or controllers. A controller may comprise a processing unit (e.g., CPU or GPU). A controller may receive an input (e.g., from at least one device or projected media). The controller may comprise circuitry, electrical wiring, optical wiring, socket, and/or outlet. A controller may receive an input and/or deliver an output. A controller may comprise multiple (e.g., sub-) controllers. An operation (e.g., as disclosed herein) may be performed by a single controller or by a plurality of controllers. At least two operations may be each preconformed by a different controller. At least two operations may be preconformed by the same controller. A device and/or media may be controlled by a single controller or by a plurality of controllers. At least two devices and/or media may be controlled by a different controller. At least two devices and/or media may be controlled by the same controller. The controller may be a part of a control system. The control system may comprise a master controller, floor (e.g., comprising network controller) controller, or a local controller. The local controller may be a target controller. For example, the local controller may be a window controller (e.g., controlling an optically switchable window), enclosure controller, or component controller. The controller may be a part of a hierarchal control system. They hierarchal control system may comprise a main controller that directs one or more controllers, e.g., floor controllers, local controllers (e.g., window controllers), enclosure controllers, and/or component controllers. The target may comprise a device or a media. The device may comprise an electrochromic window, a sensor, an emitter, an antenna, a receiver, a transceiver, or an actuator.

In some embodiments, the network infrastructure is operatively coupled to one or more controllers. In some embodiments, a physical location of the controller type in the hierarchal control system changes. A controller may control one or more devices (e.g., be directly coupled to the devices). A controller may be disposed proximal to the one or more devices it is controlling. For example, a controller may control an optically switchable device (e.g., IGU), an antenna, a sensor, and/or an output device (e.g., a light source, sounds source, smell source, gas source, HVAC outlet, or heater). In one embodiment, a floor controller may direct one or more window controllers, one or more enclosure controllers, one or more component controllers, or any combination thereof. The floor controller may comprise a floor controller. For example, the floor (e.g., comprising network) controller may control a plurality of local (e.g., comprising window) controllers. A plurality of local controllers may be disposed in a portion of a facility (e.g. in a portion of a building). The portion of the facility may be a floor of a facility. For example, a floor controller may be assigned to a floor. In some embodiments, a floor may comprise a plurality of floor controllers, e.g., depending on the floor size and/or the number of local controllers coupled to the floor controller. For example, a floor controller may be assigned to a portion of a floor. For example, a floor controller may be assigned to a portion of the local controllers disposed in the facility. For example, a floor controller may be assigned to a portion of the floors of a facility. A master controller may be coupled to one or more floor controllers. The floor controller may be disposed in the facility. The master controller may be disposed in the facility, or external to the facility. The master controller may be disposed in the cloud. A controller may be a part of, or be operatively coupled to, a building management system. A controller may receive one or more inputs. A controller may generate one or more outputs. The controller may be a single input single output controller (SISO) or a multiple input multiple output controller (MIMO). A controller may interpret an input signal received. A controller may acquire data from the one or more components (e.g., sensors). Acquire may comprise receive or extract. The data may comprise measurement, estimation, determination, generation, or any combination thereof. A controller may comprise feedback control. A controller may comprise feed-forward control. Control may comprise on-off control, proportional control, proportional-integral (PI) control, or proportional-integral-derivative (PID) control. Control may comprise open loop control, or closed loop control. A controller may comprise closed loop control. A controller may comprise open loop control. A controller may comprise a user interface. A user interface may comprise (or operatively coupled to) a keyboard, keypad, mouse, touch screen, microphone, speech recognition package, camera, imaging system, or any combination thereof. Outputs may include a display (e.g., screen), speaker, or printer. In some embodiments, a local controller controls one or more devices and/or media (e.g., media projection). For example, a local controller can control one or more IGUs, one or more sensors, one or more output devices (e.g., one or more emitters), one or more media, or any combination thereof.

In some embodiments, a BMS includes a multipurpose controller. By incorporating feedback (e.g., of the controller), a BMS can provide, for example, enhanced: 1) environmental control, 2) energy savings, 3) security, 4) flexibility in control options, 5) improved reliability and usable life of other systems (e.g., due to decreased reliance thereon and/or reduced maintenance thereof), 6) information availability and/or diagnostics, 7) higher productivity from personnel in the building (e.g., staff), and various combinations thereof. These enhancements may derive automatically controlling any of the devices. In some embodiments, a BMS may not be present. In some embodiments, a BMS may be present without communicating with a master network controller. In some embodiments, a BMS may communicate with a portion of the levels in the hierarchy of controllers. For example, the BMS may communicate (e.g., at a high level) with a master network controller. In some embodiments, a BMS may not communicate with a portion of the levels in the hierarchy of controllers of the control system. For example, the BMS may not communicate with the local controller and/or intermediate controller. In certain embodiments, maintenance on the BMS would not interrupt control of the devices communicatively coupled to the control system. In some embodiments, the BMS comprises at least one controller that may or may not be part of the hierarchical control system.

Figure 20:
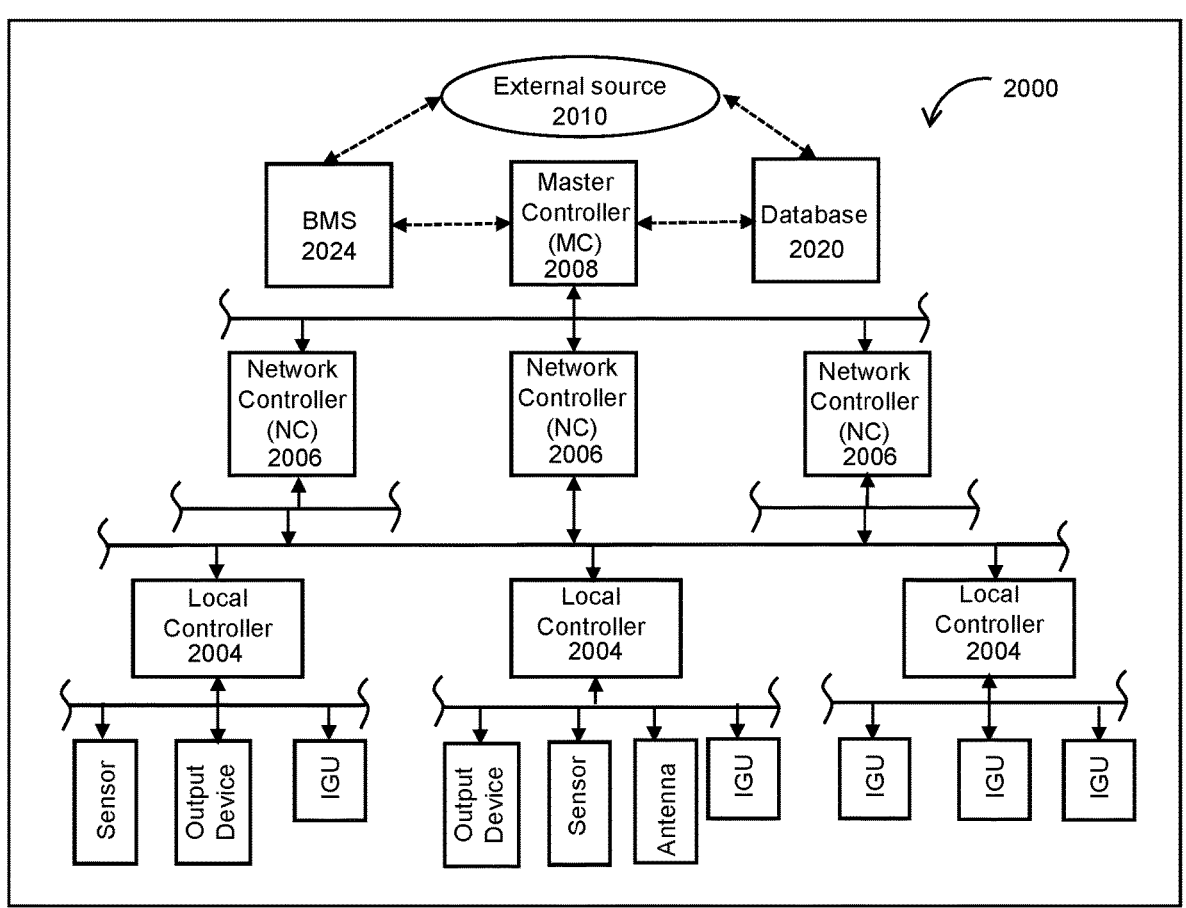
FIG. 20 schematically shows an example of a control system architecture and a building.
Figure 20:
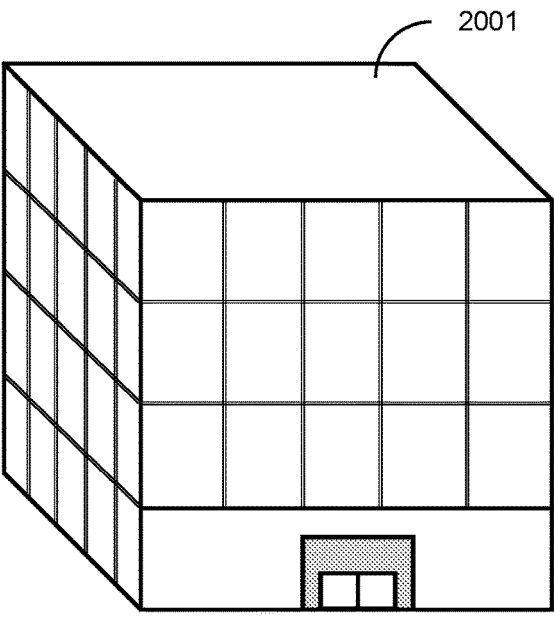

FIG. 20 shows an example of a control system architecture 2000 disposed at least partly in an enclosure (e.g., building) 2001. Control system architecture 2000 comprises a master controller 2008 that controls floor controllers (e.g., network controllers) 2006, that in turn control local controllers 2004. In the example shown in FIG. 20, a master controller 2008 is operatively coupled (e.g., wirelessly and/or wired) to a building management system (BMS) 2024 and to a database 2020. Arrows in FIG. 20 represents communication pathways. A controller may be operatively coupled (e.g., directly/indirectly and/or wired and/wirelessly) to an external source 2010. Master controller 2008 may control floor controllers that include network controllers 2006, that may in turn control local controllers such as window controllers 2004. Floor controllers 2006 may also be include network controllers (NC). In some embodiments, the local controllers (e.g., 2004) control one or more targets such as IGUs, one or more sensors, one or more output devices (e.g., one or more emitters), media, or any combination thereof. The external source may comprise a network. The external source may comprise one or more sensor or output device. The external source may comprise a cloud-based application and/or database. The communication may be wired and/or wireless. The external source may be disposed external to the facility. For example, the external source may comprise one or more sensors and/or antennas disposed, e.g., on a wall or on a ceiling of the facility. The communication may be monodirectional or bidirectional. In the example shown in FIG. 20, the communication all communication arrows are meant to be bidirectional.

In some embodiments, a controller or other network device includes a sensor or sensor ensemble. For example, a plurality of sensors or a sensor ensemble may be organized into a sensor module. A sensor ensemble may comprise a circuit board, such as a printed circuit board, e.g., in which a number of sensors are adhered or affixed to the circuit board. Sensor(s) can be removed from a sensor module. For example, a sensor may be plugged into and/or unplugged out of, the circuit board. Sensor(s) may be individually activated and/or deactivated (e.g., using a switch). The circuit board may comprise a polymer. The circuit board may be transparent or non-transparent. The circuit board may comprise metal (e.g., elemental metal and/or metal alloy). The circuit board may comprise a conductor. The circuit board may comprise an insulator. The circuit board may comprise any geometric shape (e.g., rectangle or ellipse). The circuit board may be configured (e.g., may be of a shape) to allow the ensemble to be disposed in frame portion such as a mullion (e.g., of a window). The circuit board may be configured (e.g., may be of a shape) to allow the ensemble to be disposed in a frame (e.g., door frame and/or window frame). The frame may comprise one or more holes, e.g., to allow the sensor(s) to obtain (e.g., accurate) readings. The circuit board may be enclosed in a wrapping. The wrapping may comprise flexible or rigid portions. The wrapping may be flexible. The wrapping may be rigid (e.g., be composed of a hardened polymer, from glass, or from a metal (e.g., comprising elemental metal or metal alloy). The wrapping may comprise a composite material. The wrapping may comprise carbon fibers, glass fibers, and/or polymeric fibers. The wrapping may have one or more holes, e.g., to allow the sensor(s) to obtain (e.g., accurate) readings. The circuit board may include an electrical connectivity port (e.g., socket). The circuit board may be connected to a power source (e.g., to electricity). The power source may comprise renewable and/or non-renewable power source.

Figure 21:
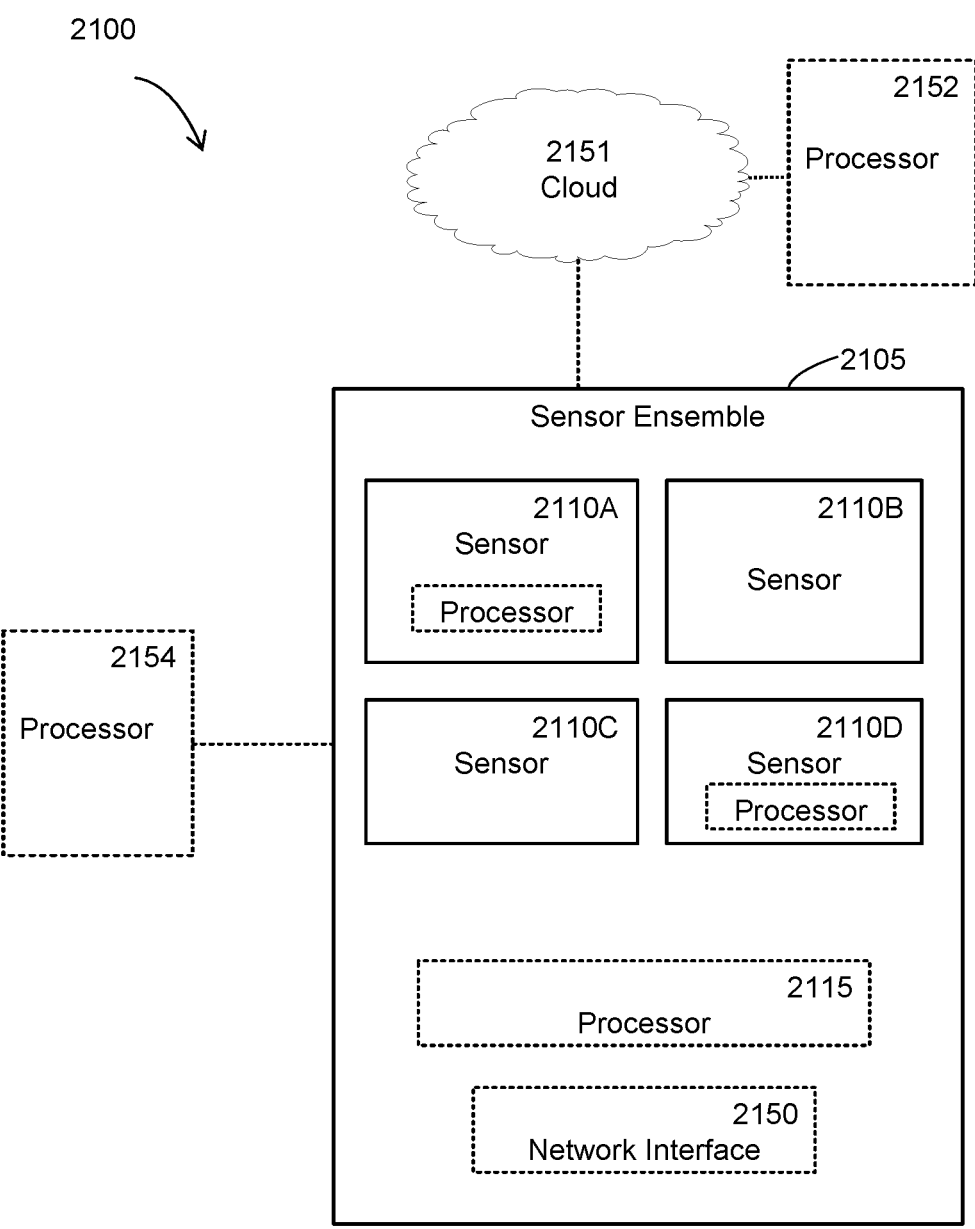
FIG. 21 shows a schematic example of a sensor arrangement.

FIG. 21 shows an example of diagram 2100 having an example of an ensemble of sensors organized into a sensor module. Sensors 2110A, 2110B, 2110C, and 2110D are shown as included in sensor ensemble 2105. An ensemble of sensors organized into a sensor module may include at least 1, 2, 4, 5, 8, 10, 20, 50, or 500 sensors. The sensor module may include a number of sensors in a range between any of the aforementioned values (e.g., from about 1 to about 1000, from about 1 to about 500, or from about 500 to about 1000). Sensors of a sensor module may comprise sensors configured and/or designed for sensing a parameter comprising: temperature, humidity, carbon dioxide, particulate matter (e.g., between 2.5 μm and 10 μm), total volatile organic compounds (e.g., via a change in a voltage potential brought about by surface adsorption of volatile organic compound), ambient light, audio noise level, pressure (e.g., gas, and/or liquid), acceleration, time, radar, lidar, radio signals (e.g., ultra-wideband radio signals), passive infrared, glass breakage, or movement detectors. The sensor ensemble (e.g., 2105) may comprise non-sensor devices, such as buzzers and light emitting diodes. Examples of sensor ensembles and their uses can be found in U.S. patent application Ser. No. 16/447,169, filed Jun. 20, 2019, titled "SENSING AND COMMUNICATIONS UNIT FOR OPTICALLY SWITCHABLE WINDOW SYSTEMS" that is incorporated herein by reference in its entirety.

In some embodiments, an increase in the number and/or types of sensors may be used to increase a probability that one or more measured property is accurate and/or that a particular event measured by one or more sensor has occurred. In some embodiments, sensors of sensor ensemble may cooperate with one another. In an example, a radar sensor of sensor ensemble may determine presence of a number of individuals in an enclosure. A processor (e.g., processor 2115 such as a microprocessor) may determine that detection of presence of a number of individuals in an enclosure is positively correlated with an increase in carbon dioxide concentration. In an example, the processor-accessible memory may determine that an increase in detected infrared energy is positively correlated with an increase in temperature as detected by a temperature sensor. In some embodiments, network interface (e.g., 650) may communicate with other sensor ensembles similar to sensor ensemble. The network interface may additionally communicate with a controller.

Individual sensors (e.g., sensor 2110A, sensor 2110D, etc.) of a sensor ensemble may comprise and/or utilize at least one dedicated processor. A sensor ensemble may utilize a remote processor (e.g., 2154) utilizing a wireless and/or wired communications link. A sensor ensemble may utilize at least one processor (e.g., processor 2152), which may represent a cloud-based processor coupled to a sensor ensemble via the cloud (e.g., 2151). Processors (e.g., 2152 and/or 2154) may be located in the same building, in a different building, in a building owned by the same or different entity, a facility owned by the manufacturer of the window/controller/sensor ensemble, or at any other location. In various embodiments, as indicated by the dotted lines of FIG. 21, sensor ensemble 2105 is not required to comprise a separate processor and network interface. These entities may be separate entities and may be operatively coupled to ensemble 2105. The dotted lines in the example shown in FIG. 21 designate optional features. In some embodiments, onboard processing and/or memory of one or more ensemble of sensors may be used to support other functions (e.g., via allocation of ensembles(s) memory and/or processing power to the network infrastructure of a building).

In some embodiments, sensor data is exchanged among various network devices and controllers. The sensor data may also be accessible to remote users (e.g., inside or outside the same building) for retrieval using personal electronic devices, for example. Applications executing on remote devices to access sensor data may also provide commands for controllable functions such as tint commands for a window controller. An example window controller(s) is described in International Patent Application Serial No. PCT/US16/58872, filed Oct. 26, 2016, titled "CONTROLLERS FOR OPTICALLY-SWITCHABLE DEVICES," and in U.S. patent application Ser. No. 15/334,832, filed Oct. 26, 2016, titled "CONTROLLERS FOR OPTICALLY-SWITCHABLE DEVICES," each of which is herein incorporate by reference in its entirety.

The methods, systems and/or the apparatus described herein may comprise a control system. The control system can be in communication with any of the apparatuses (e.g., sensors) described herein. The sensors may be of the same type or of different types, e.g., as described herein. For example, the control system may be in communication with the first sensor and/or with the second sensor. A plurality of devices (e.g., sensors and/or emitters) may be disposed in a container and may constitute an ensemble (e.g., a digital architectural element). The ensemble may comprise at least two devices of the same type. The ensemble may comprise at least two devices of a different type. The devices in the ensemble may be operatively coupled to the same electrical board. The electrical board may comprise circuitry. The electrical board may comprise, or be operatively coupled to a controller (e.g., a local controller). The control system may control the one or more devices (e.g., sensors). The control system may control one or more components of a building management system (e.g., lightening, security, and/or air conditioning system). The controller may regulate at least one (e.g., environmental) characteristic of the enclosure. The control system may regulate the enclosure environment using any component of the building management system. For example, the control system may regulate the energy supplied by a heating element and/or by a cooling element. For example, the control system may regulate velocity of an air flowing through a vent to and/or from the enclosure. The control system may comprise a processor. The processor may be a processing unit. The controller may comprise a processing unit. The processing unit may be central. The processing unit may comprise a central processing unit (abbreviated herein as "CPU"). The processing unit may be a graphic processing unit (abbreviated herein as "GPU"). The controller(s) or control mechanisms (e.g., comprising a computer system) may be programmed to implement one or more methods of the disclosure. The processor may be programmed to implement methods of the disclosure. The controller may control at least one component of the forming systems and/or apparatuses disclosed herein. Examples of a digital architectural element can be found in International Patent Application Serial No. PCT/US20/70123 that is incorporated herein by reference in its entirety.

Figure 22:
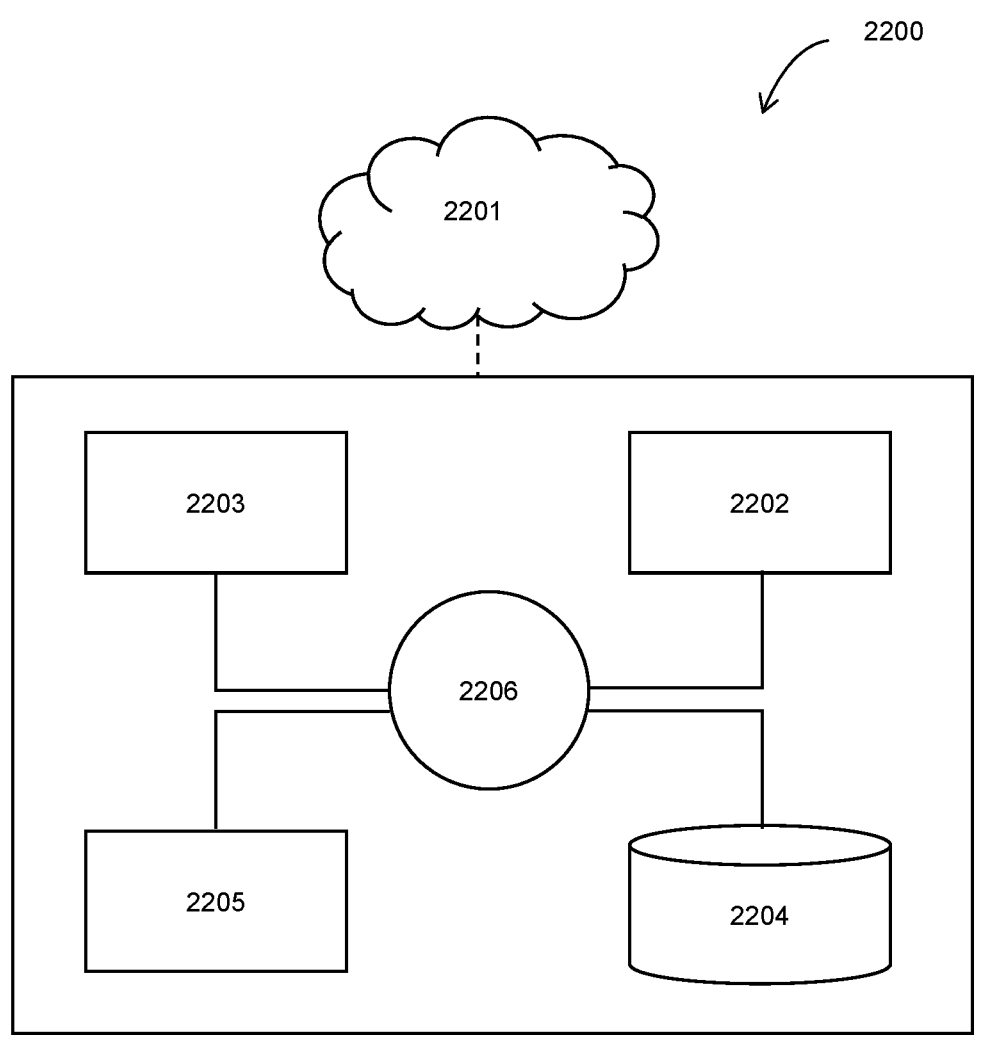
FIG. 22 schematically shows a processing system and related components.

FIG. 22 shows a schematic example of a computer system 200 that is programmed or otherwise configured to one or more operations of any of the methods provided herein. The computer system can control (e.g., direct, monitor, and/or regulate) various features of the methods, apparatuses, and systems of the present disclosure, such as, for example, control heating, cooling, lightening, and/or venting of an enclosure, or any combination thereof. The computer system can be part of, or be in communication with, any sensor or sensor ensemble disclosed herein. The computer may be coupled to one or more mechanisms disclosed herein, and/or any parts thereof. For example, the computer may be coupled to one or more sensors, valves, switches, lights, windows (e.g., IGUs), motors, pumps, optical components, or any combination thereof.

The computer system can include a processing unit (e.g., 2206) (also "processor," "computer" and "computer processor" used herein). The computer system may include memory or memory location (e.g., 2202) (e.g., random-access memory, read-only memory, flash memory), electronic storage unit (e.g., 2204) (e.g., hard disk), communication interface (e.g., 2203) (e.g., network adapter) for communicating with one or more other systems, and peripheral devices (e.g., 2205), such as cache, other memory, data storage and/or electronic display adapters. In the example shown in FIG. 22, the memory 2202, storage unit 2204, interface 2203, and peripheral devices 2205 are in communication with the processing unit 2206 through a communication bus (solid lines), such as a motherboard. The storage unit can be a data storage unit (or data repository) for storing data. The computer system can be operatively coupled to a computer network ("network") (e.g., 2201) with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 2202. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (CPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 2200 can be included in the circuit.

The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

The computer system can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory 2202 or electronic storage unit 2204. The machine executable or machine-readable code can be provided in the form of software. During use, the processor 2206 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code or can be compiled during runtime. The code can be supplied in a programming language that can be selected to enable the code to execute in a pre-compiled or as-compiled fashion. In some embodiments, the processor comprises a code. The code can be program instructions. The program instructions may cause the at least one processor (e.g., computer) to direct a feed forward and/or feedback control loop. In some embodiments, the program instructions cause the at least one processor to direct a closed loop and/or open loop control scheme. The control may be based at least in part on one or more sensor readings (e.g., sensor data). One controller may direct a plurality of operations. At least two operations may be directed by different controllers. In some embodiments, a different controller may direct at least two of operations (a), (b) and (c). In some embodiments, different controllers may direct at least two of operations (a), (b) and (c). In some embodiments, a non-transitory computer-readable medium cause each a different computer to direct at least two of operations (a), (b) and (c). In some embodiments, different non-transitory computer-readable mediums cause each a different computer to direct at least two of operations (a), (b) and (c). The controller and/or computer readable media may direct any of the apparatuses or components thereof disclosed herein. The controller and/or computer readable media may direct any operations of the methods disclosed herein. The controller may be operatively (communicatively) coupled to control logic (e.g., code embedded in a software) in which its operation(s) are embodied.

In one or more aspects, one or more of the functions described herein may be implemented in hardware, digital electronic circuitry, analog electronic circuitry, computer software, firmware, including the structures disclosed in this specification and their structural equivalents thereof, or in any combination thereof. Certain implementations of the subject matter described in this document also can be implemented as one or more controllers, computer programs, or physical structures, for example, one or more modules of computer program instructions, encoded on a computer storage media for execution by, or to control the operation of window controllers, network controllers, and/or antenna controllers. Any disclosed implementations presented as or for electrochromic windows can be more generally implemented as or for switchable optical devices (including windows, mirrors, etc.).

Various modifications to the embodiments described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the devices as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this does not necessarily mean that the operations are required to be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

In some embodiments, the network infrastructure is configured to operatively couple to one or more (e.g., an array of) chargers. The charger can be disposed in the interior of the framing or framing cap portion. The chargers may be wireless chargers in the sense that they do not require wiring into the device they are charging (e.g., a transitory circuitry such as a mobile phone, pad, laptop, a tag (e.g., and ID tag), or any other charge requiring device such as one comprising a transitory processor). The charging devices may electrically charge the transitory circuitry. The charging device may be disposed in a transom (also known as "horizontal mullion"). The charging device may be disposed in any real asset that operatively (e.g., electronically) coupled to the network (e.g., local network of a facility), and that is configured to facilitate wireless charging, e.g., on at least one of its surfaces. The charging device may comprise an electromagnetic induction charging for transitory circuitry (e.g., mobile device). In some embodiments, the transitory circuitry (e.g., mobile device) to be wirelessly charge is configured for (e.g., enables) wireless charging. The wireless charging may or may not require contact of the charging device with the device to be charged. The wireless charging device does not require connection of electrical wiring between the charging device and the device to be charged (e.g., the mobile circuitry). The wireless charging may facilitate interaction of facility occupants with fixtures and/or real assets (e.g., furniture) of the facility. The charging stations may be installed as part of the network, e.g., during construction of the facility. If the local network of the facility is the initial network installed in the facility, the facility may be opened to occupants with such wireless charging devices on its first day of opening. Usage of charging station may reduce the number of required outlets in the facility, and/or free outlets for usage other than mobile device charging, thus potentially increasing the aesthetics of the facility fixtures, allowing more design flexibility of the facility interior, and increase the usage of fixtures and/or real assets of the facility. The infrastructure installed in the building (e.g., including framing systems and network) may include the wireless charging stations (e.g., as part of the framing system or not). In using wireless charging stations in a facility, (a) developers can offer a state of the art building with mobile device wireless charging integrated into the building from day one (1) in convenient, non-obstructive locations and/or (b) occupants will have more and/or easier access locations to charge their mobile devices (e.g., without wires getting in their way and/or taking up much needed outlets). Developers may wish to create connected spaces that are built to the requests of occupants to increasingly utilize mobile devices, and/or allow seamless and easy charging. Wireless charging may require a user to place the mobile device on the wireless charging stations without more.

In some embodiments, a real asset and/or a fixtures (e.g., a framing portion such as a transom) may comprise a material that facilitates wireless charging therethrough. For example, a material that facilitate (e.g., has no or reduced blockage of) electromagnetic field. When the real asset and/or fixture is made of a material with diminished ability to facilitate wireless charging, the real asset and/or fixture may have a portion having a material that facilitates wireless charging. For example, a transom made of metal (e.g., Aluminum), may have a portion (e.g., break portion) made of a material that facilitates wireless charging (e.g., a non-metallic material). The material may constitute an electrical break area that is configured to facilitate wireless charging (e.g., electromagnetic induction) technology. For example, the real asset and/or fixture may have at least one portion of a material that is configured for reduced blockage of (e.g., does not block) the electromagnetic field from penetrating therethrough from the charging device to the charged device.

In some embodiments, the wireless charging station is in a framing portion supporting one or more display constructs. For example, when a user views media projected by the display construct, the user may place his mobile device on a transom (e.g., near the wireless charging device) while watching the media, and the mobile device of the user may be (e.g., seamlessly) charged during that time. The wireless charging may require placement of the mobile device adjacent to (e.g., on top of, beneath, or to the side of) the charging device.

Figure 23:
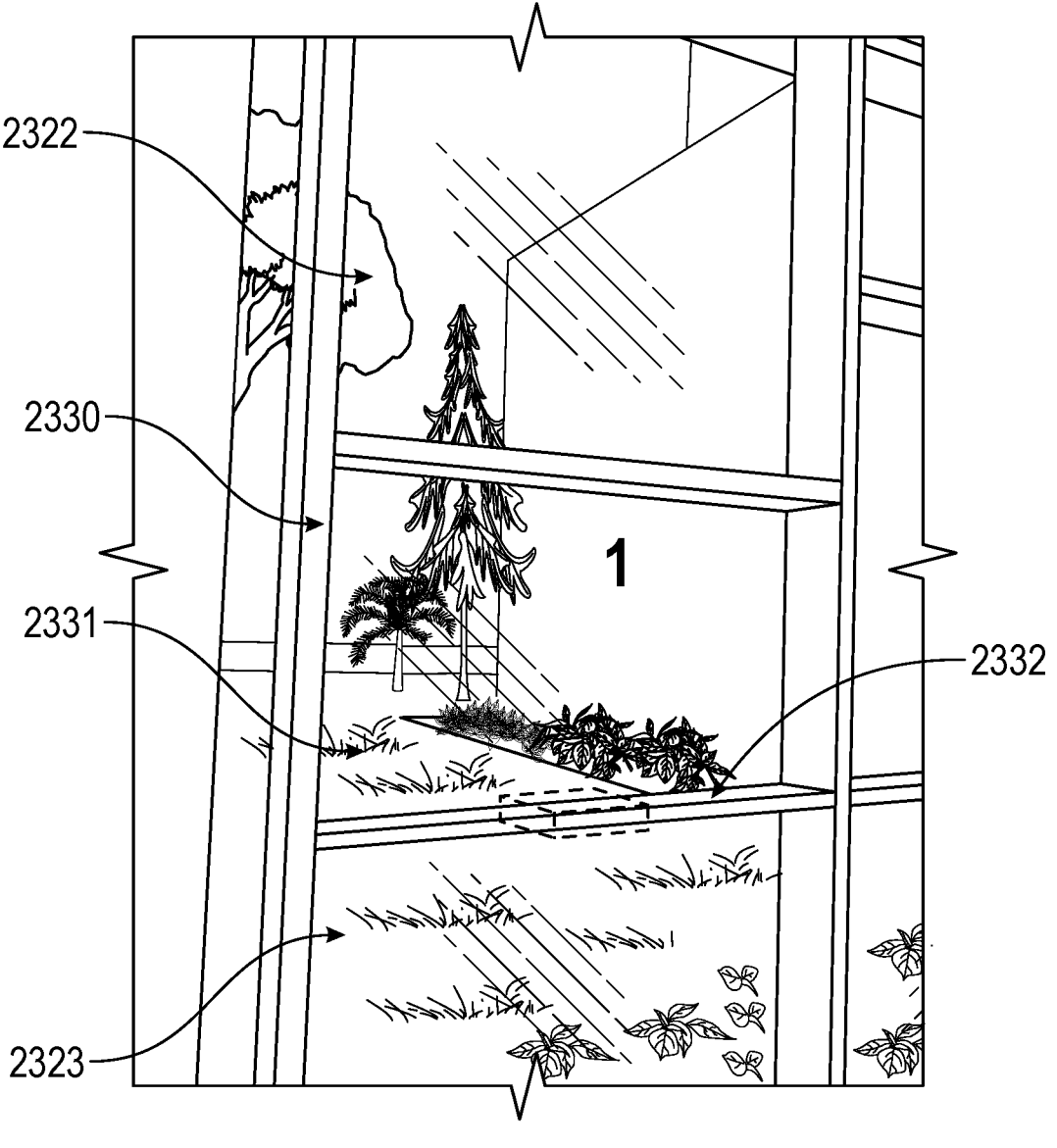
FIG. 23 show various windows and a display construct in a framing system.

FIG. 23 shows an example of a charging station embedded in a fixture of a facility. Display construct 2331 (also indicated as #1) is disposed in a framing system having a mullion 2330 and a transom 2332. The framing station holds the display construct 2331 and windows such as 2322 and 2332. The transom 2332 includes charging device in its interior in the area 2350, which charging device is coupled to the network (e.g., the same network to which the display construct 2331 is coupled to). Transom 2332 includes a wireless charging station in the exterior of transom 2332, in area 2350. The area of the charging station may extend beyond 2350, e.g., depending on the charging capability (e.g., range) of the wireless charging device. A user watching media displayed by display construct 2331 may rest the device to be charged (e.g., mobile device) on the transom while watching the displayed media, thus allowing seamless charging of the device to be charged (e.g., provided the device to be charged is configured for wireless charging). The device to be charged can be wirelessly charged regardless of the user using the display construct. At least one of the windows (e.g., 2322 and 2323) may or may not be tintable windows. At least one of the windows (e.g., 2322 and 2323) may or may not be smart windows such as electrochromic windows.

In some embodiments, the local network is operatively coupled to wireless charging device. The wireless charging may comprise inductive charging. The wireless charging may be cordless charging. The wireless charging may facilitate contactless (e.g., cordless) charging between the charging device and the device to be charged. For example, the wireless charging may be devoid of a requirement to make electrical contact with the charging device or any intermediary thereto (e.g., a docking station or a plug). The wireless charging may facilitate wireless transfer of electrical power. The wireless charging may utilize electromagnetic induction to provide electricity to devices to be charged, e.g., portable (e.g., transitory) devices. The transitory device may comprise vehicles, power tools, electric dental equipment (e.g., toothbrushes), or any other medical devices. The portable device may or may not require precise alignment with the charging device (e.g., charging pad). The wireless charging may transfer energy through inductive coupling. The wireless charging may include passing an alternating current through an induction coil in the charging device (e.g., charging pad). The wireless charging may include generating a magnetic field. The magnetic field may fluctuate in strength (e.g., when an amplitude of the alternating electric current is fluctuating). This changing magnetic field may create an alternating electric current in an induction coil of the portable device (e.g., mobile device). The alternating current in the induction coil may pass through a rectifier, e.g., to convert it to a direct current. The direct current may charge a battery and/or provide operating power of the portable device (e.g., transitory circuitry).

In some embodiments, the wireless charging device (e.g., also used here as wireless charge or inductive charger) utilizes resonant inductive coupling. The charging device may comprise a capacitor, e.g., to one or more (e.g., to each of the) induction coils. The addition of the capacitor may create two low current circuits with a (e.g., specific) resonance frequency. The frequency of the alternating current may be matched with the resonance frequency. The frequency may be chosen, e.g., depending on the distance requested for peak efficiency. For example, depending on the distance between the charging device and the designated placement of the device to be charged. For example, depending on the material(s) disposed between the charging device and the designated placement of the device to be charged. The charging device may comprise a movable transmission coil. The charging device and/or device to be charged may comprise a receiver coil such as silver-plated copper or aluminum (e.g., to minimize weight and/or decrease resistance such as due to skin effects).

In some embodiments the wireless charging device is a high power charging device. In some embodiments the wireless charging device is a low power charging device. The low power charging device may be configured to charge small electronic devices such as cell phones, handheld devices, computers (e.g., laptops). The low power charging device may be configured to charge at power levels of at most about 50 watts (W), 100 W, 150 W, 200 W, 250 W, 300 W, 350 W, 400 W, 450 W, or 500 W. The low power charging device may be configured to charge at power levels between any of the aforementioned power levels (e.g., from about 50 W to about 100 W, from about 100 W to about 500 W, or from about 50 W to about 500 W). The high power charging device may be configured to charge at power levels of at least about 700 W, one (1) kilowatt (KW), 10 KW, 11 KW, 100 KW, 200 KW, 300 KW, or 500 KW. The high power charging device may be configured to charge at power levels between any of the aforementioned power levels (e.g., from about 700 W to about 500 KW, from about 700 W to about 10 KV, or from about 1 KW to about 500 KW).

In some embodiments, the wireless charging stations may provide advantages over wired charging stations. For example, in wireless charging there is a lower risk of electrical faults such as due to corrosion, electrocution, and wiring tangling. For example, in wireless charging there is an absence of wear and tear damage of electrical connectors, sockets and/or wiring, e.g., since no wiring and connection is required between the charging device and the device to be charge. For example, wireless charging offers an increased usage convenience and/or facility aesthetics. For example, wireless charging offers convenient frequent charging. The wireless charging may allow for dynamic charging, e.g., charging the mobile device while it is in motion (e.g., depending on the capacity of the charging device). When medical devices are to be charged, wireless charging may reduce the infection risk, e.g., by eliminating a requirement to connect to electricity outlets and/or wiring used by multiple users. The charging speed can be of 1, 2 or 3 wireless power transfer (WPT) class, e.g., as defined by the Society of Automotive Engineers (SAE) International. The wireless charging may be at a distance of at most about 1 centimeter (cm), 2 cm, 4 cm, 5 cm, 8 cm, 10 cm, 25 cm, 50 cm, 75 cm, 100 cm, 250 cm, 500 cm, 750 cm, 900 cm, or 1000 cm from the charging device. The wireless charging may be at a distance from the charging device between any of the aforementioned values (e.g., from about 1 cm to about 10 cm, from about 1 cm to about 50 cm, from about 1 cm to about 100 cm, or from about 1 cm to about 1000 cm). The wireless charging may be at a distance of at most about 1 inches ("), 1.5", 1.6, 6" or 12" from the charging device. The wireless charging may be at a distance from the charging device between any of the aforementioned values (e.g., from about 1" to about 12"). The wireless charging may be at a distance of at most about 5 feet ('), 10', 20', 30', 40' or 50' from the charging device. The wireless charging may be at a distance from the charging device between any of the aforementioned values (e.g., from about 5' to about 50').

In some embodiments, the charging device may abide by at least one standard (e.g., protocol) accepted in the jurisdiction. The standard may comprise Qi or Power Matter Alliance (PMA) standard. The standard may comprise J1773 (Mange charge), SAE J2954, AirFuel Alliance, Alliance for Wireless Power (A4WP, or Rezence), or ISO 15118 standard. The standard may define a frequency and/or a connection protocol. The charging device may be configured to compile with a plurality (e.g., all) standards accepted in the jurisdiction. The standard may be an open interface standard. The standard may be a wireless power transfer standard. The standard may be a Wireless Power Consortium standard. The standard may be an Institute of Electrical and Electronics Engineers standard. The standard may be an AirFuel alliance standard (e.g., combining A4WP and PMA). The standard may be a road vehicle standard.

In some embodiments, the charging device is operatively coupled to the network and/or control system of the facility. The charging device may be controlled by the control system. For example, the control system may schedule shutting off or on the charging device. The control system may control the operating mode of the charging device. The control system may be integrated or separate from the control system of the facility. The charging device may be additionally or alternatively manually controlled (e.g., by a user), e.g., through an application module. The application module of the charging device may comprise a graphic user interface (GUI). The application module may be configured to receive user input. The application module may be configured for installation of the device to be charged. The application module may be configured for installation of a device coupled to the network of the facility. The charging device may be discoverable by the network. The network may be operatively (e.g. communicatively) coupled to a Building Information Modeling (BIM) (e.g., Revit file) of the facility. Location and/or status of the charging device(s) coupled to the network may be updated (e.g. intermittently or in real time) to the network, e.g., and to the BIM file. The application module may indicate the location, operational mode, and/or status of the charging device. The GUI may depict a location, operational mode, and/or status of the charging device in the BIM file of the facility. The GUI may indicate location of the user and/or device to be charged, which location is with respect to the facility (e.g. of an enclosure such as a room of the facility), for example, as depiction in the BIM file. The GUI may show a simplistic version (e.g., with lower level of details such as a select level of details) than the details available in the BIM file. For example, the application module may show fixtures and select devices (e.g., one or more charging devices and/or one or more media displays) of the facility.

In some embodiments dynamic mobility (e.g., vertical movement relative to a body of a digital collaboration unit, to a framing of a digital collaboration unit, and/or to a gravitational center) of portions of a digital collaboration of a facility, may be utilized. The portions of a digital collaboration unit may comprise a physical work surface, media display, lighting, transparent panel, cabling and/or a fixed accessory. The digital collaboration unit may comprise free-standing collaboration unit, digital collaboration unit coupled to exterior fixture (e.g., wall or window), small group pods, or digital collaboration units disposed in large open areas in the form of a matrix (e.g., a display matrix such as functioning as a video wall). At least one, some and/or all portions of a digital collaboration unit that have dynamic mobility may be mounted to a body (e.g., panel) and/or framing of a digital collaboration unit. A media display with dynamic mobility may be coupled to a ceiling of a facility, with an ability to slide or pivot (e.g., vertically) into position relative to a digital collaboration unit. A dynamically moveable media display coupled to a ceiling may comprise guide railings and/or magnetic support. The movement may be actuated by a physical force comprising magnetic or electrical force. The movement may be actuated by an actuator (e.g., motor). The movement may be actuated by an attractive force (e.g., a magnetic force). At least one, some and/or all portions of a digital collaboration unit that have dynamic mobility may have movement that is coupled (e.g., move together in unison). The dynamic mobility may be controlled (e.g., using at least one controller such as any of the controller or control systems disclosed herein). Some and/or all portions of a digital collaboration unit that have dynamic mobility may engage a mechanism to cause movement of multiple portions in unison (e.g., a coupled, and/or concerted movement). At least one, some and/or all portions of a digital collaboration unit that have dynamic mobility may have independent movement (e.g., not coupled, non-concerted, and/or separate). At least one, some and/or all portions of a digital collaboration unit that have dynamic mobility may have automatic movement (e.g., using sensors that sense physical characteristics (e.g., bodily features of a local user) and/or historic preferences of a local user to determine adjustment). The physical bodily features of a local user may comprise a nose, eyebrows, eyes, pupils, a head, a chin, lips, a nose bridge, or ears. Some and/or all portions of a digital collaboration unit that have dynamic mobility may have manual movement. Some and/or all portion of a digital collaboration unit that have dynamic mobility may have automatic movement, e.g. with manual override. A virtual ledge may appear in a transparent display and retain its position to, in effect, move with the local media display and/or physical work surface.

In some embodiments a digital collaboration unit includes multiple image sensors (e.g., video cameras) mounted on at least two remote portions of the digital collaboration unit and/or a media display. The at least two remote portions may include corners on opposite sides of a body and/or any framing and/or a transparent panel. The multiple image sensors may be employed to produce a stereo image of a local user of the digital collaboration unit. The stereo image may be streamed to a remote user. The multiple image sensors may have dynamic mobility, providing movement (e.g., automatic and/or manual) that may adjust for physical characteristics and/or historic preferences of a local user.

In some embodiments a digital collaboration unit includes a movable wall that allows expansion, contraction, opening and/or confining the unit. A movable partition (e.g. panel such as a wall and/or door) may provide for adjustment to (i) accommodate ingress into the unit, (ii) accommodate egress out of the unit, and/or (iii) facilitate privacy for a local user in the unit. A moveable partition (e.g., panel such as a wall) may be partially or fully opaque. A movable partition may comprise tintable glass. A movable partition may be mounted (e.g. via hinge) to a body and/or framing of a digital collaboration unit, e.g., to allow for movement (e.g., pivoting about a hinge). A movable partition may be mounted to a body and/or framing of the digital collaboration unit, e.g., to allow for (e.g., accordion style) expanding and contracting the unit. A moveable partition may be partially or fully opaque and/or comprise tintable glass, e.g. to limit viewing into the digital collaboration unit from outside of the digital collaboration unit and/or from an adjacent digital collaboration unit (e.g., as part of a group pod). A moveable partition may comprise a split door with or without a media display on (e.g., a top portion) of the moveable partition (e.g., wall). Moveable partition (e.g., wall and/or supportive panels) may include wood, metal, fabric, laminates, plastic and/or tintable glass.

Figure 24:
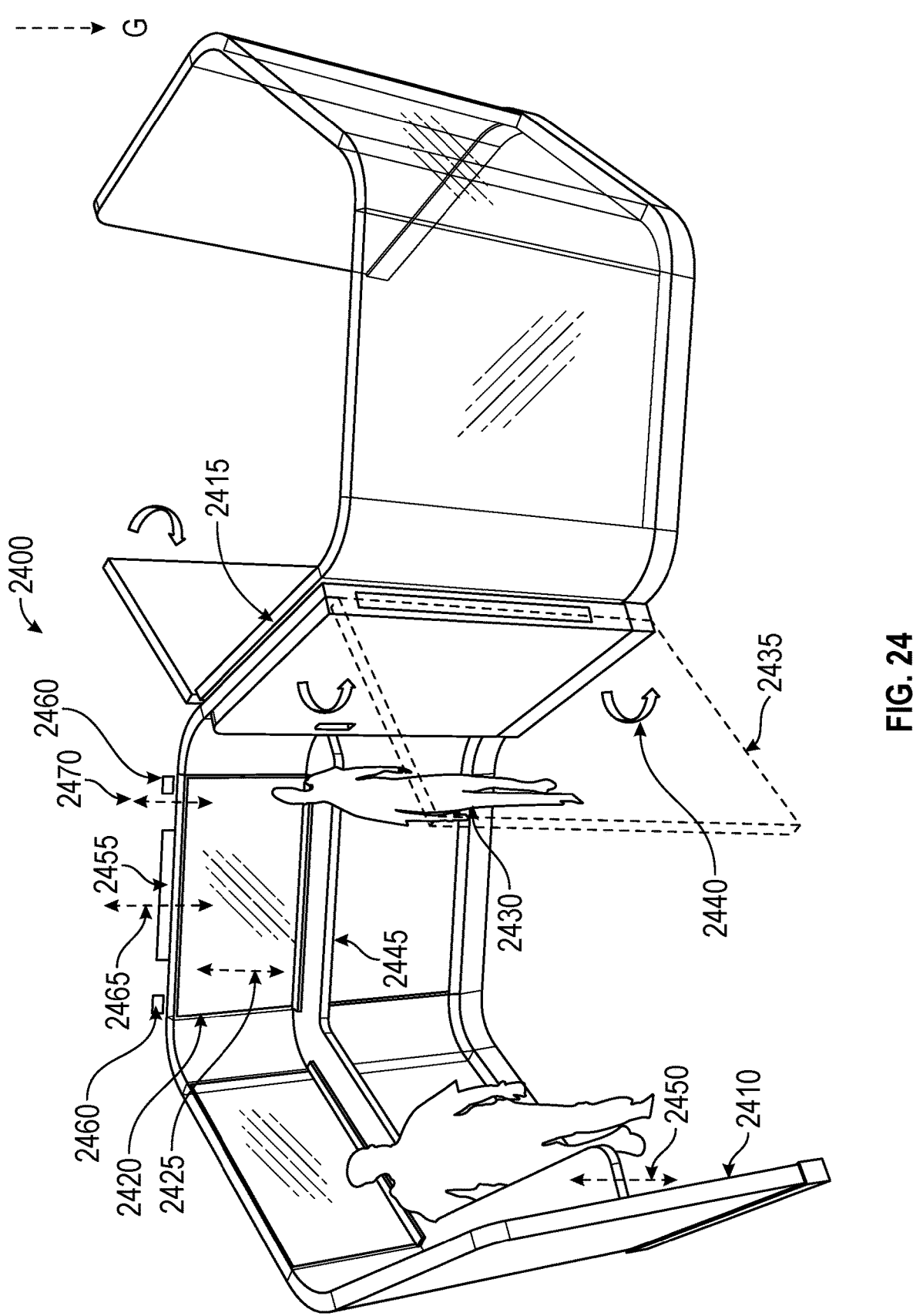
FIG. 24 schematically shows a perspective view of digital collaboration units.

FIG. 24 shows an example of digital collaboration units (e.g., group pods) 2400. A body of a digital collaboration unit 2400 comprises supportive panels 2410, which may be transparent and/or partially opaque and/or comprise tintable windows. Adjacent digital collaboration units 2400 has a connecting (common) wall 2415, which may be transparent and/or partially or fully opaque and/or comprise tintable windows. A media display 2420 may be movable relative to a body 2405 and/or framing of the digital collaboration unit 2400 (e.g., in direction of arrows 2425) and/or movable relative to a gravitational center G. Cabling coupled to the media display 2420 may move with the media display 2420. A position of the transparent media display 2420 may be automatically adjusted based at least in part on a height and/or position of a local user 2430, which be based at least in part on bodily features (e.g., a nose, eyebrows, eyes, pupils, a head, a chin, lips, a nose bridge, or ears) of local user such as 2430 and/or historic preferences of the local user such as 2430. A position of the transparent media display 2420 be manually adjustable by local user such as 2430. A position of the transparent media display 2420 may be automatically adjustable, e.g., with a manual override. Cabling coupled to the transparent media display 2420 may move with the display 2420. Supportive panels 2410 may comprise sound dampening materials, e.g., to provide a quiet space for conducting a conference and/or to limit propagation of sound outside digital collaboration unit 2400. Supportive panels may comprise a moveable partition (e.g., wall and/or door) 2435 mounted (e.g., with a hinge) for pivoting (e.g., in direction of arrow 2440 and vice versa, between a first position, shown in solid lines in FIG. 24, and a second position, shown in dashed lines) to a supportive panel 2410 and/or connecting wall 2415, which moveable wall 2435 may comprise sound dampening materials. The moveable wall 2435 may pivot to allow for ingress and egress of the digital collaboration unit 2400. A physical work surface (e.g., a table ledge) 2445 in front of media display 2420 can be duplicated at the remote location(s) (e.g., when collaborating with users having a similarly constructed portal). The physical work surface may enhance an immersive experience and/or enhance convenience generally. The physical work surface 2445 may be movable relative to a body and/or framing (e.g., supportive panels 2410) of the digital collaboration unit 2400 (e.g., in direction of arrows 2450) and/or movable relative to a gravitational center G. A position of the physical work surface 2445 may be automatically adjusted based at least in part on a height and/or position of a local user 2430, which may be based at least in part on bodily features of a local user 2430 and/or historic preferences of a local user 2430. A position of the physical work surface 2445 may be manually adjustable by a local user 2430. A position of the physical work surface 2445 may be automatically adjustable, e.g., with a manual override. A transparent media display 2420 and physical work surface 2445 may be secured to each other to move in unison. At least one of transparent media display 2420 and physical work surface 2445 may (e.g., each) engage a mechanism that moves them, e.g., separately or in unison. A transparent media display 2420 and/or physical work surface 2445 each be moveable without movement of the other (e.g., separate movement, and/or non-coordinated movement). The physical work surface 2445 comprise fixed accessories (not shown) coupled thereto. The transparent media display 2420 comprise fixed accessories (not shown) coupled thereto. Fixed accessories coupled to the physical work surface 2445 and/or the transparent media display 2420 be movable (e.g., up-down) relative to a supportive panel 2410, relative to framing of the digital collaboration unit 2400 (e.g., in unison with the physical work surface 2445), relative to the transparent media display 2420, and/or relative to the gravitational center G. Cabling coupled to the fixed accessories move in association with the respective fixed accessory. Lighting 2455 be provided, e.g., to help ensure a good quality media stream is obtained by one or more image sensors (e.g., cameras) 2460. The lighting 2455 may be movable relative to the supportive panels 2410 (e.g., in a direction indicated by arrows 2465), movable relative to framing of the digital collaboration unit 2400, and/or movable relative to a gravitational center G. A position of the lighting 2455 may be automatically adjusted based at least in part on a height and/or position of local user such as 2430, which may be based at least in part on bodily features of local user such as 2430 and/or historic preferences of local user such as 2430. A position of the lighting 2455 may be manually adjustable by local user such as 2430. A position of the lighting 2455 be automatically adjustable, e.g., with a manual override. A transparent media display 2420 and lighting 2455 may be secured to each other to move in unison. A transparent media display 2420 and lighting 2455 may each engage a mechanism that moves them in unison. A transparent media display 2420, physical work surface 2445 and lighting 2455 may be secured to each other to facilitate their concerted (e.g., unison) movement. A transparent media display 2420, physical work surface 2445 and lighting 2455 may each engage a mechanism that moves them in unison or separately. At least two of: (i) transparent media display 2420, (ii) physical work surface 2445, and (iii) lighting 2455, may be moveable separately (e.g., in a non-coordinated fashion, in a non-unified fashion). A loudspeaker (not shown) may provide sound output, and/or personal headphone or earphone (not shown) can be provided with audio content (e.g., using a Bluetooth connection, or wired). With at least two image sensors (e.g., cameras) 2460, mounted on at least two separate positions (e.g., corners on opposite sides of a body and/or any framing and/or a transparent panel) of the digital collaboration unit 2400 and/or a media display 2420, the multiple image sensors 2460 may be employed to produce a stereo image of a local user 2430 of the digital collaboration unit 2400. The sensors 2460 may be configured to generate the stereo image. The stereo image may be streamed to a remote user, e.g., as part of a digital collaboration session. The multiple image sensors 2460 may be movable, e.g., (i) relative to the supportive panels 2410 (e.g., in a direction indicated by arrows 2470), (ii) relative to framing of the digital collaboration unit 2400, and/or (iii) relative to a gravitational center G. The sensors may be stationary. A position of the image sensors 2460 may be automatically adjusted based at least in part on a height and/or position of a local user 2430, which may be based at least in part on bodily features of local user 2430 and/or historic preferences of local user 2430. A position of the image sensors 2460 may be manually adjustable by local user 2430. A position of the image sensors 2460 may be automatically adjustable, e.g., with a manual override. A transparent media display 2420 and image sensors 2460 may be secured to each other to move in unison (e.g., in concert). A transparent media display 2420 and image sensors 2460 may (e.g., each) engage a mechanism that moves them, e.g., separately or in unison. At least two of transparent media display 2420, physical work surface 2445, lighting 2455, and image sensors 2460, may be operatively coupled (e.g., secured to each other and/or electronically coupled) to move in unison. At least two of transparent media display 2420, physical work surface 2445, lighting 2455, and image sensors 2460, may engage a mechanism that moves them in unison. At least two of transparent media display 2420, physical work surface 2445, lighting 2455, and image sensors 2460, may be separately moveable (e.g., movable without movement of the other(s)). Wiring of the network (e.g., power and/or communication) may run thought the body 2405 of digital collaboration unit 2400, such as supportive panel 2410, and connect to the network via connector (e.g., disposed on the floor, wall or ceiling of the facility). Digital collaboration unit 2400 may be operatively coupled to the network (e.g., external network and/or local network of the facility).

In some embodiments one or more digital collaboration units are operatively coupled to at least one controller such as part of a control system (e.g., forming a smart building platform). The control system may comprise various applications (apps) (e.g., apps for operating media displays, apps for personalized health management, apps for edge computing, and/or apps for communication within or outside of a facility). The apps may run on an operating system. A control system may comprise operating system distributed containers (e.g., building information management connections and files, digital security to prevent unauthorized access, and/or artificial intelligence/machine learning capabilities). The at least one controller may be operatively coupled to the network. The operating system may run on a network. The at least one controller may operatively couple to the network having network nodes and/or connections (e.g., power supply, data storage, data transfer (wired and/or wireless), and/or computing capability/processors). The network may be operatively couple to various nodes such as one or more devices (e.g., sensors, emitters, or transceivers). The transceivers may comprise radios (e.g., UWB radios). The network may be a secured network (e.g., offer digital security). The network may be operatively coupled to an artificial intelligence (e.g., a machine learning) module (e.g., computational scheme). the network may offer cellular communication (e.g., abiding by at least a $4^{th}$ generation, or a $5^{th}$ generation cellular communication protocol).

Figure 25:
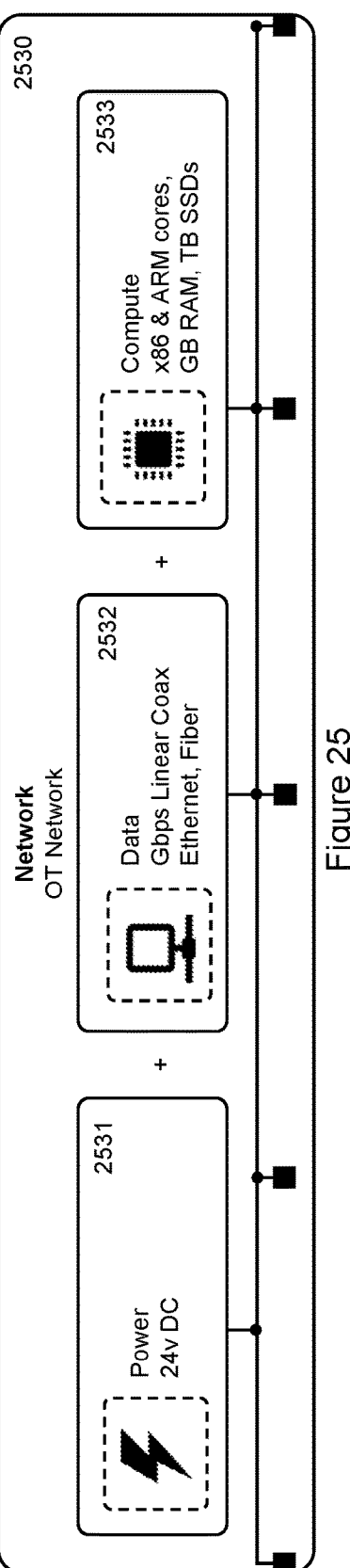
FIG. 25 schematically shows a control system, associated network, and associated devices.

FIG. 25 shows an example of a control system, associated network, and associated devices, that may be used in connection with a collaborative digital communication (e.g., video conference) session between local and remote participants, e.g., using digital collaboration units as discussed herein. The control system is operatively coupled to a network portion 2530 having network nodes and/or connections for communication and/or power supply. Power 2531 (e.g., 24 volt DC) is transmitted over the network 2530. Data 2532 is transferred over the network (e.g., via Gpbs Linear Coax Ethernet and/or fiber optic). The network portion 2530 is operatively coupled to controllers and/or processors 2533 (e.g., x86 and ARM cores, Gigabytes of random access memory (RAM), and/or Terabytes of memory on solid state drives (SSD)). The control system may comprise, or be operatively coupled to, a facility operating system (OS) portion 2520. Building Information Management (BIM) files (e.g., a digital twin of a facility), various sensors and/or other network nodes 2521 comprise part of the facility operating system 2520. Digital security (e.g., TLS v1.2, 128AES-256SHA Crypto) 2522 comprise part of the facility operating system 2520. The digital security 2522 may limit access to the network while allowing for edge computing. Artificial intelligence (AI)/machine learning (RNN, MRT, AER, TLSG, RTLS) 2523 may comprise part of the facility operating system 2520. The control system may comprise applications (e.g., applications for operating media displays 2511, applications for personalized health management 2512, applications allowing for edge computing 2513, and/or applications for communication within or outside of a facility 2514). 2510 that run on the facility operating system.

Figure 26:
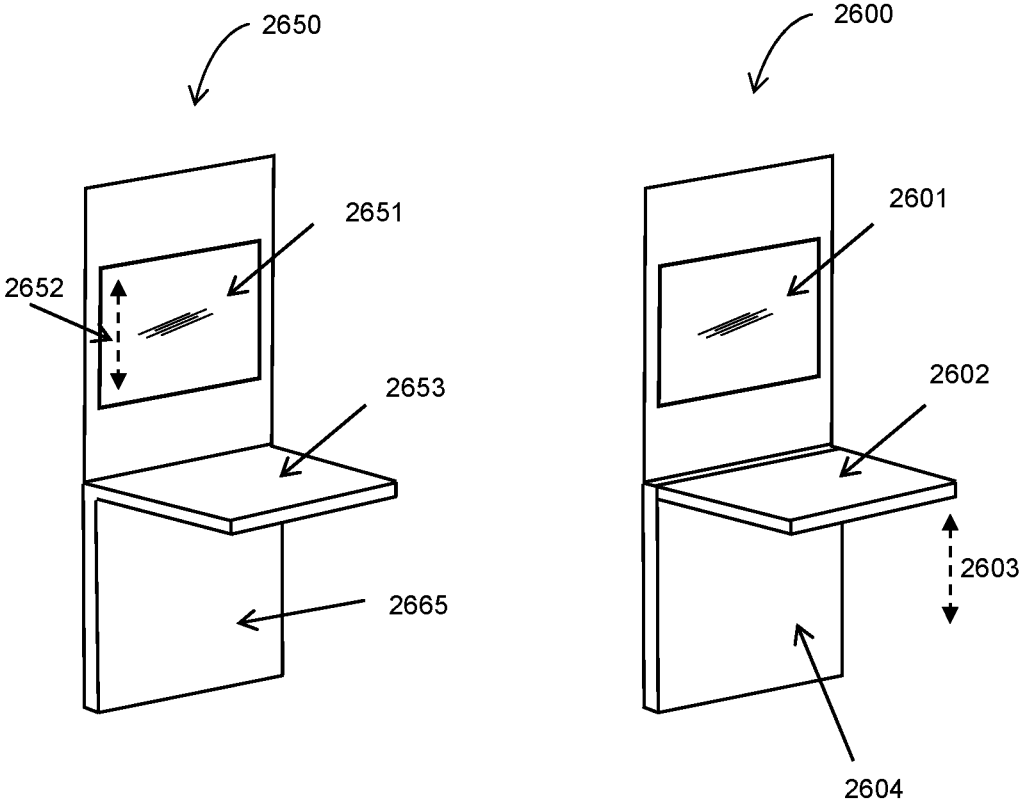
FIG. 26 schematically shows a perspective view of digital collaboration units.

FIG. 26 shows an example of a digital collaboration unit 2600 having a supportive structure (e.g., comprising a window, a wall, framing, a body, a transparent panel, an opaque panel, or a base) 2604. The digital collaboration unit 2600 comprises a physical work surface (e.g., a physical ledge) 2602 that can be moveable (e.g., in the direction of arrows 2603) relative to the supportive structure 2604, and/or to a fixture such as a floor, a ceiling, and/or a wall. The physical work surface 2602 is supported by the supportive structure 2604. The digital collaboration unit 2600 comprises a (e.g., transparent) display 2601, which may be in communication with a network and used for conducting immersive video interactions with remote users. FIG. 26 shows an example of a digital collaboration unit 2650 having a supportive structure (e.g., comprising a window, a wall, framing, a body, a transparent panel, an opaque panel, or a base) 2665. The digital collaboration unit 2650 comprises a physical work surface (e.g., a physical ledge) 2653.

The physical work surface 2653 is supported by the supportive structure 2665. The digital collaboration unit 2650 comprises a (e.g., transparent) display 2651, which may be in communication with a network and used for conducting immersive video interactions with remote users. The display 2651 may be moveable (e.g., in the direction of arrows 2652) relative to the supportive structure 2665. The (e.g., transparent) display may be supported by a window, a wall, framing, a body, a transparent panel, a base and/or a ceiling.

Figure 27:
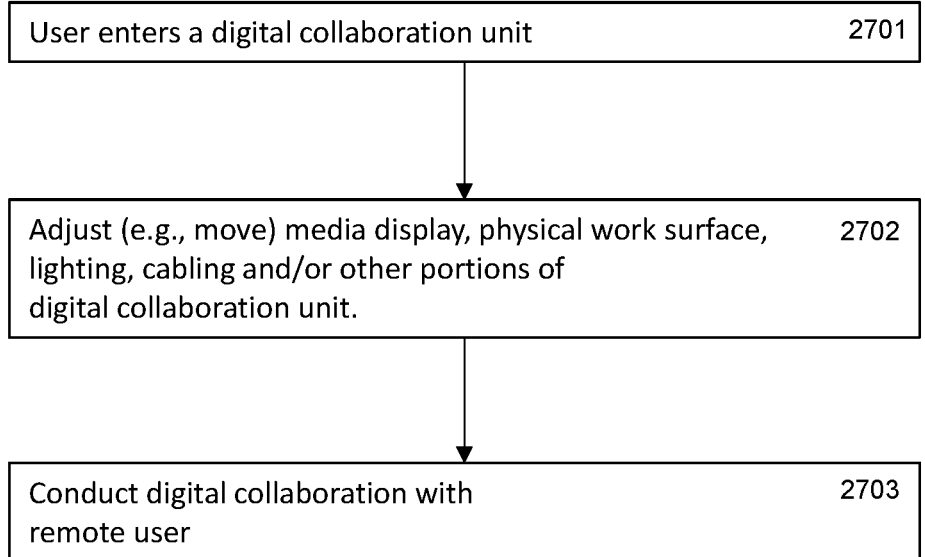
FIG. 27 shows a flowchart of immersive digital collaboration.

FIG. 27 shows an example of operations that may be performed in connection with a collaborative digital communication session (e.g., to facilitate a video conference session, or collaborative online streaming such as movie streaming) between remote participants. A user enters a digital collaboration unit 2701. One or more media display(s), one or more physical work surface(s), lighting, cabling, fixed accessories, and/or other portions of the digital collaboration unit may be adjusted (e.g., moved) 2702. The adjustment(s) may be automatic, manual, or a combination of automatic and manual. Digital collaboration with a remote user is conducted 2703.

Figure 28:
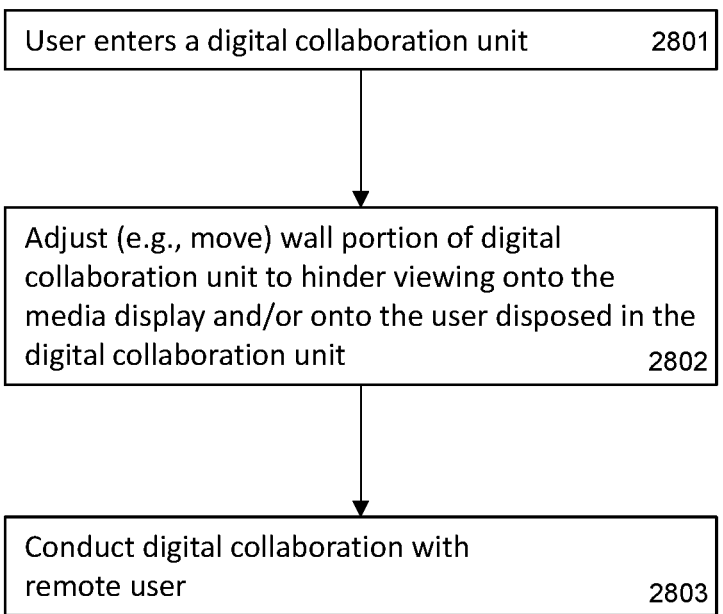
FIG. 28 shows a flowchart of immersive digital collaboration.

FIG. 28 shows an example of operations that may be performed in connection with a collaborative digital communication (e.g., video conference) session between remote participants. A user enters a digital collaboration unit 2801. One or more portions of the digital collaboration unit may be adjusted (e.g., moved) to hinder viewing onto the media display(s) and/or onto the user disposed in the digital collaboration unit 2802. Digital collaboration with a remote user is conducted 2803.

In some embodiments, a digital collaboration unit comprises item(s) (i) a display, (ii) a physical working area, (iii) lighting, or (iv) any other fixed accessory. A digital collaboration unit may comprise a display (e.g., media display such as a display construct) that is stationary or (e.g., vertically) movable. A digital collaboration unit may comprise a physical working area (e.g., a physical ledge) that is stationary or (e.g., vertically) movable. A digital collaboration unit may comprise lighting that is stationary or (e.g., vertically) movable. A digital collaboration unit may comprise any other fixed accessory that is stationary or (e.g., vertically) movable. A digital collaboration unit may comprise items (i) a display, (ii) a physical working area, (iii) lighting, or (iv) any other fixed accessory, in which at least two of the items (i), (ii), (iii), and (iv) are stationary or movable. At least two of the times includes all of the times. Movable can be controllably movable (e.g., automatically with the aid of sensor(s), or manually with the aid of a user input. When at least two of the items (i), (ii), (iii), and (iv) are movable in the digital collaboration unit, then can be movable together (e.g., in concert, in tandem, as a coordinated movement), or separately (e.g., individually, in a non-coordinated fashion, not in tandem). When any of the items (i), (ii), (iii), and (iv) are automatically movable, the movement is facilitated (e.g., controlled) by at least one controller. The at least one controller can be part of, or operatively coupled to, any of the control systems disclosed herein such as a control system that controls the facility in which the digital collaboration unit is disposed.

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. An apparatus for digital collaboration, the apparatus comprising:

a digital collaboration unit having a media display disposed within a first location; and one or more controllers comprising circuitry;

wherein:

the media display comprises an electrochromic display that is at least partially transparent to visible light;

the one or more controllers are configured to display, on the media display, a media stream received from a remote processor, the media stream including a depiction of a remotely located remote user, to redact a background portion of the media stream from being displayed on the media display, the redacted portion comprising a region around the depiction of the remote user, and to enable a local user to view, through the redacted portion, at least a portion of the first location behind the media display; and the one or more controllers are further configured to display, within the redacted portion, a virtual overlay based on the first location, the virtual overlay comprising a depiction of an object, and wherein the depiction of the object appears continuous with a physical object at the first location.

2. The apparatus for digital collaboration of claim 1 wherein the one or more controllers are further configured to adjust a transparency of the electrochromic display based, at least in part, on an element selected from the group consisting of: a position of a sun, a weather condition, images displayed on the media display, and a reading from one or more sensors.

3. The apparatus for digital collaboration of claim 1 wherein the electrochromic display comprises a camera configured for capturing an image of the local user.

4. The apparatus for digital collaboration of claim 3 wherein the camera is configured for a focus that is greater than the distance between the camera and the electrochromic display to avoid capturing images displayed on the media display.

5. The apparatus for digital collaboration of claim 1 wherein the electrochromic display comprises a wireless charger.

6. The apparatus of claim 1, wherein a position of the depiction of the remotely located remote user is based on the depiction of the object.

7. A method for digital collaboration, the method comprising:

receiving a media stream, the media stream including a depiction of a remote user;

redacting a background portion of the media stream, the redacted portion comprising a region around the depiction of the remote user;

rendering a portion of an electrochromic display transparent, the transparent portion corresponding to at least a portion of the redacted portion of the media stream;

displaying, on the electrochromic display, the redacted media stream;

enabling a local user to view, through the transparent portion of the electrochromic display, at least a portion of a first location behind the electrochromic display; and displaying, within the redacted portion, a virtual overlay based on the first location, the virtual overlay comprising a depiction of an object, and wherein the depiction of the object appears continuous with a physical object at the first location.

8. The method for digital collaboration of claim 7 further comprising displaying on the electrochromic display, within the redacted portion, a virtual overlay based on the first location.

9. The method for digital collaboration of claim 7 further comprising adjusting a transparency of the electrochromic display based, at least in part, on an element selected from the group consisting of: a position of a sun, a weather condition, images displayed on the media display, and a reading from one or more sensors.

10. The method for digital collaboration of claim 7 further comprising capturing an image of the local user with a camera built into the electrochromic display.

11. The method for digital collaboration of claim 10 further comprising setting the camera with a focus that is greater than the distance between the camera and the electrochromic display to avoid capturing images displayed on the electrochromic display.

* * * * *